US012752999B2

(12) United States Patent
Yamaki et al.

(10) Patent No.: US 12,752,999 B2
(45) Date of Patent: Oct. 6, 2026

(54) LIQUID-FILLED COMBINATION CONTAINER, INSPECTION METHOD, AND MANUFACTURING METHOD FOR LIQUID-FILLED COMBINATION CONTAINER

(71) Applicant: DAI NIPPON PRINTING CO., LTD., Tokyo-to (JP)

(72) Inventors: Kazumasa Yamaki, Tokyo-to (JP); Takuma Baba, Tokyo-to (JP); Kouichi Tatsumi, Tokyo-to (JP); Noriko Kumazawa, Tokyo-to (JP); Noriko Nakata, Tokyo-to (JP); Masatoshi Kuroda, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 155 days.

(21) Appl. No.: 18/724,849

(22) PCT Filed: Dec. 28, 2022

(86) PCT No.: PCT/JP2022/048666
§ 371 (c)(1),
(2) Date: Nov. 13, 2024

(87) PCT Pub. No.: WO2023/127967
PCT Pub. Date: Jul. 6, 2023

(65) Prior Publication Data

US 2025/0058955 A1 Feb. 20, 2025

(30) Foreign Application Priority Data

Dec. 28, 2021 (JP) ................................ 2021-215261

(51) Int. Cl.
*B65D 81/26* (2006.01)
*A61J 1/14* (2023.01)
(Continued)

(52) U.S. Cl.
CPC .......... *B65D 81/268* (2013.01); *A61J 1/1468* (2015.05); *B65B 57/00* (2013.01); *B65D 77/0406* (2013.01)

(58) Field of Classification Search
None
See application file for complete search history.

(56) References Cited

U.S. PATENT DOCUMENTS 5,217,118 A 6/1993 Mochizuki et al.
2007/0212789 A1 9/2007 Havens et al.
2016/0313236 A1* 10/2016 Helfmann .............. G01N 21/59

FOREIGN PATENT DOCUMENTS

BE 1004986 A4 * 3/1993 ............. B65D 81/24
JP H05-319459 A 12/1993
(Continued)

OTHER PUBLICATIONS

Nov. 7, 2025 Office Action issued in Japanese Patent Application No. 2024-074477.

(Continued)

*Primary Examiner* — Jennifer Wecker
*Assistant Examiner* — Tracy Ching-Tian Colena
(74) *Attorney, Agent, or Firm* — Oliff PLC

(57) ABSTRACT

A liquid-filled combination container includes a container having oxygen permeability and containing liquid in a containing portion, a barrier container having oxygen barrier properties and accommodating the container, at least one oxygen reactant that can react with oxygen in the barrier container, and a fluorescent material that varies in fluorescence time or fluorescence intensity according to a surrounding oxygen concentration. The oxygen reactant is fixed to at least any one of an outer surface of the container and an inner surface of the barrier container. The fluorescent material is provided on an inner surface of the container at a
(Continued)

fluorescent material installation location apart from the containing portion of the container.

15 Claims, 37 Drawing Sheets

(51) Int. Cl.
*B65B 57/00* (2006.01)
*B65D 77/04* (2006.01)

(56) References Cited

FOREIGN PATENT DOCUMENTS

| | | |
|---|---|---|
| JP | 2005-313934 A | 11/2005 |
| JP | 2010-107197 A | 5/2010 |
| JP | 2011-212366 A | 10/2011 |
| JP | 2016-512455 A | 4/2016 |
| JP | 2018-119894 A | 8/2018 |

OTHER PUBLICATIONS

OxyDot Oxygen Sensors O2xyDot (single sheet), http://web.archive.org/web/20210924203445/https:/industrialphysics.com/product/oxydot - oxygen-sensors-o2xydot - singlesheet, 2021.
Feb. 16, 2024 Office Action issued in Japanese Patent Application No. 2023-571233.
Mar. 20, 2023 Search Report issued in International Patent Application No. PCT/JP2022/048666.
Jun. 20, 2024 International Preliminary Report on Patentability issued in International Patent Application No. PCT/JP2022/048666.

* cited by examiner

LIQUID-FILLED COMBINATION CONTAINER, INSPECTION METHOD, AND MANUFACTURING METHOD FOR LIQUID-FILLED COMBINATION CONTAINER

TECHNICAL FIELD

The present disclosure relates to a liquid-filled combination container, an inspection method, and a manufacturing method for a liquid-filled combination container.

BACKGROUND ART

A container that contains liquid is known (for example, PTL 1). Depending on a type of liquid, the liquid decomposes due to oxygen in the container. To deal with this inconvenience, it is conceivable to perform treatment to reduce the oxygen concentration of the liquid in a container body. For example, the oxygen concentration in the container and the oxygen concentration of the liquid contained in the container can be reduced by nitrogen bubbling.

PTL 1: Japanese Unexamined Patent Application Publication No. 2011-212366

SUMMARY OF INVENTION

For the purpose of checking whether the oxygen concentration in the container containing liquid and the oxygen concentration of the liquid contained in the container are sufficiently small, or the like, it is desired to inspect the oxygen concentration in the container. Particularly, if the container is opened by destruction or the like in order to inspect the oxygen concentration in the container, the oxygen concentration in the container varies, and the container needs to be sealed again, so it is desired to inspect the oxygen concentration in the container containing liquid without opening the container. It is an object of the present disclosure to inspect an oxygen concentration in a container containing liquid without opening the container.

A first liquid-filled combination container according to one embodiment of the present disclosure includes a container having oxygen permeability and containing liquid in a containing portion, a barrier container having oxygen barrier properties and accommodating the container, at least one oxygen reactant that can react with oxygen in the barrier container, and a fluorescent material that varies in fluorescence time or fluorescence intensity according to a surrounding oxygen concentration. The oxygen reactant is fixed to at least any one of an outer surface of the container and an inner surface of the barrier container. The fluorescent material is provided on an inner surface of the container at a fluorescent material installation location apart from a contact region of the containing portion, the contact region contacting with the liquid. The container has light transmission properties at least at the fluorescent material installation location. The barrier container includes a light transmission location where the barrier container has light transmission properties. Light can be applied from outside the barrier container to the fluorescent material by allowing the light to penetrate through the barrier container at the light transmission location and the container at the fluorescent material installation location.

A second liquid-filled combination container according to one embodiment of the present disclosure includes a container having oxygen permeability and containing liquid in a containing portion, a barrier container having oxygen barrier properties and accommodating the container, at least one oxygen reactant that can react with oxygen in the barrier container, and a fluorescent material that varies in fluorescence time or fluorescence intensity according to a surrounding oxygen concentration. The fluorescent material is provided on an inner surface of the container at a fluorescent material installation location apart from a contact region of the containing portion, the contact region contacting with the liquid. The container has light transmission properties at least at the fluorescent material installation location. The barrier container includes a light transmission location where the barrier container has light transmission properties. An oxygen reactant accommodating portion that accommodates the oxygen reactant is defined in part of the barrier container. The oxygen reactant is disposed at a location not placed between the fluorescent material installation location and the light transmission location when accommodated in the oxygen reactant accommodating portion.

In the first and second liquid-filled combination containers according to one embodiment of the present disclosure, the barrier container may contact with the outer surface of the container at the fluorescent material installation location.

In the first and second liquid-filled combination containers according to one embodiment of the present disclosure, the container may include a coating layer that forms the inner surface of the container and that suppresses adhesion of the liquid to the inner surface of the container.

In the first and second liquid-filled combination containers according to one embodiment of the present disclosure, the container may include at least any one material of glass and cyclic olefin polymer.

Each of the first and second liquid-filled combination containers according to one embodiment of the present disclosure may further include a bonding layer bonding the fluorescent material to the inner surface of the container at the fluorescent material installation location and having light transmission properties, and the bonding layer may include at least one resin selected from the group consisting of light-curing acrylic resin, light-curing silicone resin, and epoxy resin.

In the first and second liquid-filled combination containers according to one embodiment of the present disclosure, the barrier container may include at least any one resin of acrylic resin and polyethylene terephthalate resin.

In the first and second liquid-filled combination containers according to one embodiment of the present disclosure, the barrier container may have deformable flexibility so as to contact with the outer surface of the container at the fluorescent material installation location.

A third liquid-filled combination container according to one embodiment of the present disclosure includes a container having oxygen permeability and containing liquid in a containing portion, a barrier container having oxygen barrier properties and accommodating the container, and at least one oxygen reactant that can react with oxygen in the barrier container. The oxygen reactant is fixed to at least any one of an outer surface of the container and an inner surface of the barrier container. The container includes a first location and a second location apart from a contact region of the containing portion, the contact region contacting with the liquid. The oxygen reactant is spaced apart from a straight line connecting the first location with the second location. The container has light transmission properties at least at the first location and the second location. The barrier container has light transmission properties at least at a location that intersects with the straight line connecting the first location with the second location.

A fourth liquid-filled combination container according to one embodiment of the present disclosure includes a container having oxygen permeability and containing liquid in a containing portion, a barrier container having oxygen barrier properties and accommodating the container, and at least one oxygen reactant that can react with oxygen in the barrier container. The container includes a first location and a second location apart from a contact region of the containing portion, the contact region contacting with the liquid. The oxygen reactant is spaced apart from a straight line connecting the first location with the second location. The container has light transmission properties at least at the first location and the second location. The barrier container has light transmission properties at least at a location that intersects with the straight line connecting the first location with the second location. An oxygen reactant accommodating portion that accommodates the oxygen reactant is defined in part of the barrier container. The oxygen reactant is disposed at a location apart from the straight line connecting the first location with the second location when accommodated in the oxygen reactant accommodating portion.

In the fourth liquid-filled combination container according to one embodiment of the present disclosure, the barrier container may contact with an outer surface of the container at the first location and the second location.

Each of the third and fourth liquid-filled combination containers according to one embodiment of the present disclosure may further include an outer container that accommodates the barrier container, and the outer container may include a light transmitting portion that intersects with a straight line connecting the first location with the second location and allowing light to pass through.

In the first to fourth liquid-filled combination containers according to one embodiment of the present disclosure, the container may be fixed to the barrier container.

In the first to fourth liquid-filled combination containers according to one embodiment of the present disclosure, a positional relationship between the container and the oxygen reactant may be determined.

In the first to fourth liquid-filled combination containers according to one embodiment of the present disclosure, the container may include a container body including an opening part and a stopper that closes the opening part, the stopper may have oxygen permeability, the stopper may include a first face opposed to the container body and a second face located on an opposite side to the first face, and the oxygen reactant may be located on the second face side of the stopper.

A fifth liquid-filled combination container according to one embodiment of the present disclosure includes a container having oxygen permeability and containing liquid in a containing portion, a barrier container having oxygen barrier properties and accommodating the container, at least one oxygen reactant that can react with oxygen in the barrier container, and a fluorescent material that varies in fluorescence time or fluorescence intensity according to a surrounding oxygen concentration. The fluorescent material is provided on an inner surface of the container at a fluorescent material installation location apart from a contact region of the containing portion, the contact region contacting with the liquid. The container has light transmission properties at least at the fluorescent material installation location. The barrier container includes a light transmission location where barrier container has light transmission properties. The oxygen reactant is held in a holding space formed between part of an outer surface of the container and part of an inner surface of the barrier container. The holding space is not located between the fluorescent material installation location and the light transmission location.

A sixth liquid-filled combination container according to one embodiment of the present disclosure includes a container having oxygen permeability and containing liquid in a containing portion, a barrier container having oxygen barrier properties and accommodating the container, and at least one oxygen reactant that can react with oxygen in the barrier container. The container includes a first location and a second location apart from a contact region of the containing portion, the contact region contacting with the liquid. The container has light transmission properties at least at the first location and the second location. The barrier container has light transmission properties at least at a location that intersects with a straight line connecting the first location with the second location. The oxygen reactant is held in a holding space formed between part of an outer surface of the container and part of an inner surface of the barrier container. The straight line connecting the first location with the second location does not pass through the holding space.

In the sixth liquid-filled combination container according to one embodiment of the present disclosure, the container may include a container body including an opening part and a cap portion including a stopper that closes the opening part, the container body may include a head portion forming the opening part, a neck portion coupled to the head portion, a trunk portion having a greater width than the neck portion in a direction orthogonal to an axial direction in which an axis of the container extends, and a shoulder portion connecting the neck portion with the trunk portion, and the first location and the second location may be located at the neck portion.

In the sixth liquid-filled combination container according to one embodiment of the present disclosure, the container may include a third location and a fourth location apart from the contact region of the containing portion, the contact region contacting with the liquid, the third location and the fourth location being different from the first location and the second location, the container may have light transmission properties at least at the third location and the fourth location, and the barrier container may have light transmission properties at least at a location that intersects with a straight line connecting the third location with the fourth location.

In the sixth liquid-filled combination container according to one embodiment of the present disclosure, a length of a line segment located in the container in the straight line connecting the first location with the second location may be equal to a length of a line segment located in the container in the straight line connecting the third location with the fourth location, and a total of a length of a line segment located in a space between the container and the barrier container in the straight line connecting the first location with the second location may be equal to a total of a length of a line segment located in the space between the container and the barrier container in the straight line connecting the third location with the fourth location.

In the sixth liquid-filled combination container according to one embodiment of the present disclosure, the barrier container may contact with the container in a first contact region continuous in a circumferential direction orbiting around an axis of the container and a second contact region continuous in the circumferential direction and opposed to the first contact region across the axis, the first location and the third location may be located in the first contact region, and the second location and the fourth location may be located in the second contact region.

In the sixth liquid-filled combination container according to one embodiment of the present disclosure, in an imaginary plane perpendicular to the axis and passing through the first contact region and the second contact region, an angle formed between a straight line connecting the axis with one end of the first contact region in the circumferential direction and a straight line connecting the axis with the other end of the first contact region in the circumferential direction may be larger than or equal to 120°, and an angle formed between a straight line connecting the axis with one end of the second contact region in the circumferential direction and a straight line connecting the axis with the other end of the second contact region in the circumferential direction may be larger than or equal to 120°.

In the sixth liquid-filled combination container according to one embodiment of the present disclosure, the container may include a container body including an opening part and a cap portion including a stopper that closes the opening part, and the barrier container may be a bag including a first film that forms a first face of the barrier container, a second film that forms a second face of the barrier container opposed to the first face, and a seal part that joins the first film with the second film at least at part of the first film and the second film, and accommodating the container between the first film and the second film.

In the sixth liquid-filled combination container according to one embodiment of the present disclosure, the seal part may join the first film with the second film in all around in an in-plane direction of each of the first film and the second film.

In the sixth liquid-filled combination container according to one embodiment of the present disclosure, the seal part may include a first lateral seal part and a second lateral seal part opposed in a direction orthogonal to an axial direction in which an axis of the container extends, and a length obtained by subtracting ¼ of a length of a circumference of the container in a circumferential direction orbiting around the axis from a distance between the first lateral seal part and the second lateral seal part and then multiplying the subtracted result by 0.8 may be less than a maximum width of the oxygen reactant in a direction orthogonal to a thickness direction of the oxygen reactant.

In the sixth liquid-filled combination container according to one embodiment of the present disclosure, a distance between the first film and the cap portion and a distance between the second film and the cap portion may be less than a width of the oxygen reactant in a thickness direction of the oxygen reactant.

In the sixth liquid-filled combination container according to one embodiment of the present disclosure, the container body may include a head portion forming the opening part, a neck portion coupled to the head portion, a trunk portion having a greater width than the neck portion in a direction orthogonal to an axial direction in which an axis of the container extends, and a shoulder portion connecting the neck portion with the trunk portion, and a distance between the first film and the shoulder portion and a distance between the second film and the shoulder portion may be less than a width of the oxygen reactant in a thickness direction of the oxygen reactant.

In the sixth liquid-filled combination container according to one embodiment of the present disclosure, the barrier container may include a first close contact region and a second close contact region in which parts not joined by the seal part with which the first film and the second film are joined are in close contact with each other, and the first close contact region and the second close contact region may be formed at locations between which the container is placed in a direction orthogonal to an axial direction in which an axis of the container extends.

In the sixth liquid-filled combination container according to one embodiment of the present disclosure, at least part of each of the first close contact region and the second close contact region may overlap part of the oxygen reactant in the axial direction.

In the first to sixth liquid-filled combination containers according to one embodiment of the present disclosure, the oxygen reactant may be an oxygen absorber that absorbs oxygen in the barrier container or an oxygen sensing material that senses an oxygen status in the barrier container.

A first inspection method according to one embodiment of the present disclosure is an inspection method of inspecting an oxygen concentration in the container of any one of the above-described liquid-filled combination containers and includes a fluorescence measurement step of measuring a fluorescence time or a fluorescence intensity of the fluorescent material by applying light for causing the fluorescent material to emit fluorescence to the fluorescent material by allowing the light to penetrate through the barrier container at the light transmission location and the container at the fluorescent material installation location, and a measurement step of measuring an oxygen concentration in the container in accordance with the fluorescence time or the fluorescence intensity of the fluorescent material, measured in the fluorescence measurement step.

In the first inspection method according to one embodiment of the present disclosure, the barrier container may contact with an outer surface of the container at the fluorescent material installation location, and, in the fluorescence measurement step, a fluorescence time or a fluorescence intensity of the fluorescent material may be measured by applying light for causing the fluorescent material to emit fluorescence to the fluorescent material by allowing the light to penetrate through the container at the fluorescent material installation location and a part of the barrier container, which contacts with the fluorescent material installation location.

In the first inspection method according to one embodiment of the present disclosure, in the fluorescence measurement step, in a state where a detecting apparatus including an illuminating portion that emits light for causing the fluorescent material to emit fluorescence and a sensor portion that measures a fluorescence time or a fluorescence intensity of the fluorescent material is brought into contact with the part of the barrier container, which contacts with the fluorescent material installation location, the fluorescence time or the fluorescence intensity of the fluorescent material may be measured by using the sensor portion by applying the light for causing the fluorescent material to emit fluorescence to the fluorescent material by using the illuminating portion.

In the first inspection method according to one embodiment of the present disclosure, the barrier container may have deformable flexibility so as to contact with the outer surface of the container at the fluorescent material installation location, the first inspection method may further include a step of bringing the detecting apparatus into contact with the barrier container and bringing the barrier container into contact with the outer surface of the container at the fluorescent material installation location by pressing the barrier container with the detecting apparatus.

A second inspection method according to one embodiment of the present disclosure is an inspection method of inspecting an oxygen concentration in the container of any one of the above-described liquid-filled combination containers and includes an attenuation factor measurement step of measuring an attenuation factor of laser light or LED light with a wavelength to be attenuated according to an oxygen concentration in an optical path by applying the laser light or the LED light to the liquid-filled combination container such that the laser light or the LED light penetrates through the barrier container at the location where the barrier container has light transmission properties and the container at the first location and the second location, and a measurement step of measuring the oxygen concentration in the container in accordance with the attenuation factor measured in the attenuation factor measurement step.

In the second inspection method according to one embodiment of the present disclosure, in the attenuation factor measurement step, in a state where the barrier container is in contact with an outer surface of the container at the first location and the second location, the laser light or the LED light may be applied to the liquid-filled combination container so as to penetrate through the container at the first location and the second location.

The second inspection method according to one embodiment of the present disclosure may further include a step of bringing the barrier container into contact with an outer surface of the container at the first location and the second location.

In the second inspection method according to one embodiment of the present disclosure, the wavelength of the laser light or the LED light may include a wavelength of 760 nm.

The second inspection method according to one embodiment of the present disclosure further includes a first standard sample measurement step of measuring an attenuation factor of the laser light or the LED light by applying the laser light or the LED light to a first standard sample such that the laser light or the LED light penetrates through an inside of the container, the first standard sample including the container containing air inside and the barrier container accommodating the container, and a second standard sample measurement step of measuring an attenuation factor of the laser light or the LED light by applying the laser light or the LED light to a second standard sample such that the laser light or the LED light penetrates through the inside of the container, the second standard sample including the container in which an oxygen concentration is lower than an oxygen concentration of air and is identified and the barrier container accommodating the container. The measurement step includes a step of calculating the oxygen concentration in the container of the liquid-filled combination container from the attenuation factor measured in the attenuation factor measurement step, in accordance with a relationship between the attenuation factor measured in the first standard sample measurement step and the oxygen concentration in the container in the first standard sample and a relationship between the attenuation factor measured in the second standard sample measurement step and the oxygen concentration in the container in the second standard sample.

In the second inspection method according to one embodiment of the present disclosure, in the first standard sample measurement step, similarly to a disposition of the barrier container, a light source that applies the laser light or the LED light, and a measuring instrument that measures an attenuation factor of the laser light or the LED light, with respect to the container when the laser light or the LED light is applied to the liquid-filled combination container in the attenuation factor measurement step, the barrier container of the first standard sample, the light source, and the measuring instrument may be disposed with respect to the container of the first standard sample, and the laser light or the LED light may be applied to the first standard sample, and, in the second standard sample measurement step, similarly to a disposition of the barrier container, the light source, and the measuring instrument with respect to the container when the laser light or the LED light is applied to the liquid-filled combination container in the attenuation factor measurement step, the barrier container of the second standard sample, the light source, and the measuring instrument may be disposed with respect to the container of the second standard sample, and the laser light or the LED light may be applied to the second standard sample.

A third inspection method according to one embodiment of the present disclosure is an inspection method for a liquid-filled combination container including a container having oxygen permeability and containing liquid in a containing portion, a barrier container having oxygen barrier properties and accommodating the container, at least one oxygen reactant that can react with oxygen in the barrier container, and a fluorescent material that varies in fluorescence time or fluorescence intensity according to a surrounding oxygen concentration. The fluorescent material is provided on an inner surface of the container at a fluorescent material installation location apart from a contact region of the containing portion, the contact region contacting with the liquid. The container has light transmission properties at least at the fluorescent material installation location. The barrier container includes a light transmission location where barrier container has light transmission properties. The inspection method includes a disposing step of disposing the oxygen reactant such that the oxygen reactant is not located between the fluorescent material installation location and the light transmission location, a fluorescence measurement step of measuring a fluorescence time or a fluorescence intensity of the fluorescent material by applying light for causing the fluorescent material to emit fluorescence to the fluorescent material by allowing the light to penetrate through the barrier container at the light transmission location and the container at the fluorescent material installation location, and a measurement step of measuring an oxygen concentration in the container in accordance with the fluorescence time or the fluorescence intensity of the fluorescent material, measured in the fluorescence measurement step.

A fourth inspection method according to one embodiment of the present disclosure is an inspection method for a liquid-filled combination container including a container having oxygen permeability and containing liquid in a containing portion, a barrier container having oxygen barrier properties and accommodating the container, and at least one oxygen reactant that can react with oxygen in the barrier container. The container includes a first location and a second location apart from a contact region of the containing portion, the contact region contacting with the liquid. The container has light transmission properties at least at the first location and the second location. The barrier container has light transmission properties at least at a location that intersects with the straight line connecting the first location with the second location. The fourth inspection method includes a disposing step of disposing the oxygen reactant at a location spaced apart from the straight line connecting the first location with the second location, an attenuation factor measurement step of measuring an attenuation factor of laser light or LED light with a wavelength to be attenuated according to an oxygen concentration in an optical path by applying the laser light or the LED light to the liquid-filled combination container such that the laser light or the LED light penetrates through the barrier container at the location where the barrier container has light transmission properties and the container at the first location and the second location, and a measurement step of measuring the oxygen concentration in the container in accordance with the attenuation factor measured in the attenuation factor measurement step.

In the fourth inspection method according to one embodiment of the present disclosure, the container may include a third location and a fourth location apart from the contact region of the containing portion, the contact region contacting with the liquid, the third location and the fourth location being different from the first location and the second location, the container may have light transmission properties at least at the third location and the fourth location, the barrier container may have light transmission properties at least at a location that intersects with a straight line connecting the third location with the fourth location. The fourth inspection method may include an additional disposing step of disposing the oxygen reactant at a location spaced apart from the straight line connecting the third location with the fourth location, an additional attenuation factor measurement step of measuring an attenuation factor of laser light or LED light with a wavelength to be attenuated according to an oxygen concentration in an optical path by applying the laser light or the LED light to the liquid-filled combination container such that the laser light or the LED light penetrates through the barrier container at the location where the barrier container has light transmission properties and the container at the third location and the fourth location, an additional measurement step of measuring the oxygen concentration in the container in accordance with the attenuation factor measured in the additional attenuation factor measurement step, and an average value calculation step of calculating an average value of oxygen concentrations in the container from a plurality of measured oxygen concentrations at least including the oxygen concentration measured in the measurement step and the oxygen concentration measured in the additional measurement step.

In the fourth inspection method according to one embodiment of the present disclosure, a length of a line segment located in the container in the straight line connecting the first location with the second location may be equal to a length of a line segment located in the container in the straight line connecting the third location with the fourth location, and a total of a length of a line segment located in a space between the container and the barrier container in the straight line connecting the first location with the second location may be equal to a total of a length of a line segment located in the space between the container and the barrier container in the straight line connecting the third location with the fourth location.

The fourth inspection method according to one embodiment of the present disclosure may further include a contact step of bringing the barrier container into contact with an outer surface of the container, in the contact step, the barrier container is brought into contact with the container in a first contact region continuous in a circumferential direction orbiting around an axis of the container and a second contact region continuous in the circumferential direction and opposed to the first contact region across the axis, and the first location and the third location may be located in the first contact region, and the second location and the fourth location may be located in the second contact region.

In the fourth inspection method according to one embodiment of the present disclosure, in an imaginary plane perpendicular to the axis and passing through the first contact region and the second contact region, an angle formed between a straight line connecting the axis with one end of the first contact region in the circumferential direction and a straight line connecting the axis with the other end of the first contact region in the circumferential direction may be larger than or equal to 120°, and an angle formed between a straight line connecting the axis with one end of the second contact region in the circumferential direction and a straight line connecting the axis with the other end of the second contact region in the circumferential direction may be larger than or equal to 120°.

In the fourth inspection method according to one embodiment of the present disclosure, the barrier container may be a bag including a first film that forms a first face of the barrier container, a second film that forms a second face of the barrier container opposed to the first face, and a seal part that joins the first film with the second film at least at part of the first film and the second film, and accommodating the container between the first film and the second film, the fourth inspection method may further include a contact step of bringing the barrier container into contact with an outer surface of the container at the first location and the second location, and, in the contact step, the barrier container may be brought into contact with the outer surface of the container at the first location and the second location by pulling a first pulling region of the barrier container, which does not overlap the container in a plan view in a thickness direction of the first film, and a second pulling region on an opposite side to the first pulling region across the container in a plan view in the thickness direction of the first film, such that the first pulling region and the second pulling region separate from each other.

The fourth inspection method according to one embodiment of the present disclosure may further include a contact step of bringing the barrier container into contact with an outer surface of the container at the first location and the second location, and, in the contact step, the barrier container may be brought into contact with the outer surface of the container at the first location and the second location by a pressing member pressing the barrier container from outside to bring the barrier container into contact with the outer surface of the container.

In the fourth inspection method according to one embodiment of the present disclosure, the container may include a container body including an opening part and a cap portion including a stopper that closes the opening part, the container body may include a head portion forming the opening part, a neck portion coupled to the head portion, a trunk portion having a greater width than the neck portion in a direction orthogonal to an axial direction in which an axis of the container extends, and a shoulder portion connecting the neck portion with the trunk portion, and the first location and the second location may be located at the neck portion.

The fourth inspection method according to one embodiment of the present disclosure may include an acquisition step of, at first time and second time later than the first time, acquiring a first oxygen concentration that is an oxygen concentration in the container at the first time and a second oxygen concentration that is an oxygen concentration in the container at the second time by measuring an oxygen concentration in the container with any one of the above-described inspection methods, and an identification step of, when the second oxygen concentration is higher than or equal to 100 times a measurement limit and higher than or equal to 0.99 times and lower than or equal to 1.01 times the first oxygen concentration, when the second oxygen concentration is higher than or equal to the measurement limit and lower than 100 times the measurement limit and higher than or equal to 0.9 times and lower than or equal to 1.1 times the first oxygen concentration, or when the second oxygen concentration is lower than the measurement limit and the first oxygen concentration is lower than the measurement limit, identifying an oxygen saturation solubility to the liquid contained in the container in accordance with the second oxygen concentration and identifying an oxygen dissolution amount of the liquid in accordance with the identified oxygen saturation solubility.

In the fourth inspection method according to one embodiment of the present disclosure, the acquisition step may include a step of vibrating the container at time between the first time and the second time.

In the fourth inspection method according to one embodiment of the present disclosure, the acquisition step may include a step of determining whether an oxygen concentration in the barrier container is lower than or equal to a target value.

The fourth inspection method according to one embodiment of the present disclosure may include a step of, at first measurement time and second measurement time later than the first measurement time, acquiring an oxygen concentration in the container at the first measurement time and an oxygen concentration in the container at the second measurement time by measuring an oxygen concentration in the container with any one of the above-described inspection methods, a step of identifying an oxygen saturation solubility to the liquid contained in the container at the first measurement time in accordance with the oxygen concentration in the container at the first measurement time, and identifying a first oxygen dissolution amount that is an oxygen dissolution amount of the liquid at the first measurement time in accordance with the identified oxygen saturation solubility, a step of identifying an oxygen saturation solubility to the liquid contained in the container at the second measurement time in accordance with the oxygen concentration in the container at the second measurement time, and identifying a second oxygen dissolution amount that is an oxygen dissolution amount of the liquid at the second measurement time in accordance with the identified oxygen saturation solubility, a step of calculating a rate of reduction in the oxygen dissolution amount of the liquid in accordance with the first oxygen dissolution amount and the second oxygen dissolution amount, and determining whether the rate of reduction is higher than or equal to a target value, and a step of determining whether the oxygen concentration in the barrier container is lower than or equal to a target value.

A manufacturing method for the first liquid-filled combination container according to one embodiment of the present disclosure includes an inspection step of inspecting a liquid-filled combination container with any one of the above-described inspection methods.

A seventh liquid-filled combination container according to one embodiment of the present disclosure includes a container having oxygen permeability and containing liquid in a containing portion, a barrier container having oxygen barrier properties and accommodating the container, at least one oxygen reactant that can react with oxygen in the barrier container, and a fluorescent material that varies in fluorescence time or fluorescence intensity according to a surrounding oxygen concentration. The oxygen reactant is fixed to at least any one of an outer surface of the container and an inner surface of the barrier container. The fluorescent material is provided on an inner surface of the barrier container at a barrier container fluorescent material installation location. The barrier container has light transmission properties at least at the barrier container fluorescent material installation location. Light can be applied from outside the barrier container to the fluorescent material by allowing the light to penetrate through the barrier container at the barrier container fluorescent material installation location.

A fifth inspection method according to one embodiment of the present disclosure is an inspection method of inspecting an oxygen concentration in the barrier container of any one of the above-described liquid-filled combination containers and includes a barrier container fluorescence measurement step of measuring a fluorescence time or a fluorescence intensity of the fluorescent material by applying light for causing the fluorescent material to emit fluorescence to the fluorescent material by allowing the light to penetrate through the barrier container at the barrier container fluorescent material installation location, and a barrier container measurement step of measuring an oxygen concentration in the barrier container in accordance with the fluorescence time or the fluorescence intensity of the fluorescent material, measured in the barrier container fluorescence measurement step.

An eighth liquid-filled combination container according to one embodiment of the present disclosure includes a container having oxygen permeability and containing liquid in a containing portion, a barrier container having oxygen barrier properties and accommodating the container, and at least one oxygen reactant that can react with oxygen in the barrier container. The oxygen reactant is fixed to at least any one of an outer surface of the container and an inner surface of the barrier container. The barrier container includes a barrier container first location and a barrier container second location. The oxygen reactant and the container are spaced apart from a straight line connecting the barrier container first location with the barrier container second location. The barrier container has light transmission properties at least at the barrier container first location and the barrier container second location.

A sixth inspection method according to one embodiment of the present disclosure is an inspection method of inspecting an oxygen concentration in the barrier container of any one of the above-described liquid-filled combination containers and includes a barrier container attenuation factor measurement step of measuring an attenuation factor of laser light or LED light with a wavelength to be attenuated according to an oxygen concentration in an optical path by applying the laser light or the LED light to the liquid-filled combination container such that the laser light or the LED light penetrates through the barrier container at the barrier container first location and the barrier container second location, and a barrier container measurement step of measuring an oxygen concentration in the barrier container in accordance with the attenuation factor measured in the barrier container attenuation factor measurement step.

According to the present disclosure, it is possible to inspect an oxygen concentration in a container containing liquid without opening the container.

DESCRIPTION OF EMBODIMENTS

First Embodiment

Figure 1:
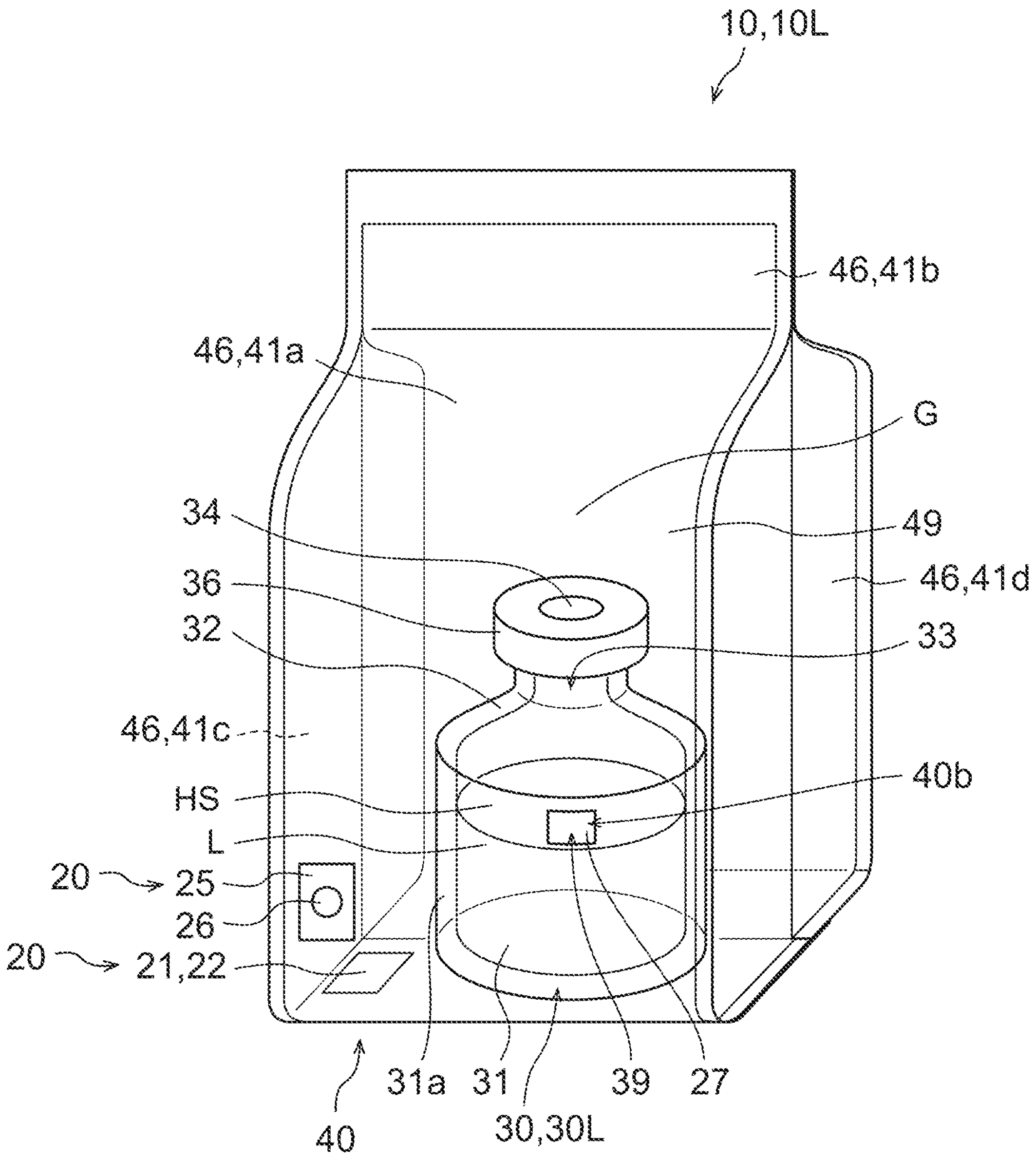
FIG. 1 is a view for illustrating a first embodiment of the present disclosure and is a perspective view that shows an example of a liquid-filled combination container.

Hereinafter, a first embodiment of the present disclosure will be described with reference to the drawings. In the drawings attached to the present specification, for the sake of easiness of illustration and understanding, the scale, dimensional aspect ratio, and the like are changed or exaggerated as needed from those of real ones.

FIGS. 1 to 12 are views that illustrate the first embodiment of the present disclosure. A liquid-filled container 30L includes a container 30 and liquid L contained in the container 30. The container 30 has oxygen permeability. The container 30 at least partially includes a part having oxygen permeability. The container 30 includes an inner surface 30*a* that is a surface of the container 30 on a side where the liquid L is contained, and an outer surface 30*b* that is a surface on an opposite side to the inner surface 30*a*. A liquid-filled combination container 10L includes the liquid-filled container 30L and a barrier container 40. The barrier container 40 has oxygen barrier properties. The barrier container 40 can accommodate the liquid-filled container 30L. In the liquid-filled combination container 10L, the liquid-filled container 30L is accommodated in the barrier container 40. With the liquid-filled combination container 10L, it is possible to sufficiently reduce an oxygen concentration in the container 30 in a short period by adjusting the amount of oxygen in the barrier container 40 with an oxygen absorber 21 that absorbs oxygen in the barrier container 40.

The liquid-filled container 30L according to the first embodiment includes a fluorescent material 27. The fluorescent material 27 provided in the liquid-filled container 30L varies in fluorescence time or fluorescence intensity according to a surrounding oxygen concentration. A fluorescence time is a time from when fluorescence of the fluorescent material 27 begins as a result of application of light to the fluorescent material 27 to when the fluorescent material 27 ends fluorescence. A fluorescence intensity is the intensity of fluorescence of the fluorescent material 27 when light is applied to the fluorescent material 27. Particularly, the intensity of fluorescence at a wavelength at which the fluorescent material 27 exhibits the highest intensity of fluorescence may be used as a fluorescence intensity. Specifically, as the surrounding oxygen concentration increases, the fluorescence time of the fluorescent material 27 shortens; whereas, as the surrounding oxygen concentration decreases, the fluorescence time of the fluorescent material 27 extends. As the surrounding oxygen concentration increases, the fluorescence intensity of the fluorescent material 27 decreases; whereas, as the surrounding oxygen concentration decreases, the fluorescence intensity of the fluorescent material 27 increases. The fluorescent material 27 is provided on an inner surface 30*a* of the container 30. An oxygen concentration in the container 30 can be inspected by measuring the fluorescence time or fluorescence intensity of the fluorescent material 27 through application of light for causing the fluorescent material 27 to emit fluorescence to the fluorescent material 27.

The components will be more specifically described with reference to specific examples illustrated. Next, the liquid-filled container 30L will be described.

The liquid-filled container 30L includes the container 30 and the liquid L contained in the container 30. The container 30 has oxygen permeability. The container 30 can hermetically seal the liquid L. The container 30 is permeable to oxygen and impermeable to the liquid L. The container 30 having oxygen permeability is an airtight container.

An airtight container means a container from which leakage of gas is not detected through a submersion method defined in JIS Z 2330:2012. More specifically, a container that can have no leakage of air bubbles when the container containing gas is immersed in water is determined as an airtight container. In a state where no leakage of air bubbles from a container containing gas is recognized when the container is immersed in water, the airtight container is determined as being in an airtight state. In a submersion test, a container under test is immersed from a water surface to a depth greater than or equal to 10 cm and less than or equal to 30 cm. The presence or absence of air bubbles is determined through visual observation over 10 minutes.

The liquid L to be contained in the container 30 is not limited. The liquid L may be a solution including a solvent and a solute dissolved in the solvent. The solvent is not limited. The solvent may be water or alcohol. The liquid L is not limited to liquid in a strict sense. The liquid L may be a suspension in which solid particles are dispersed. The liquid L serving as a food may be tea, coffee, black tea, soup, sap, soup stock, or a concentrated solution obtained by concentrating one or more of them. The liquid L serving as a drug may be an oral medicine, an external medicine, or an injection. Other than foods or drugs, the liquid L may be blood or body fluid.

The liquid L is contained in the container 30. A part of the container 30 where the liquid L is contained is referred to as a containing portion 31. The volume of the liquid L contained in the container 30 is less than the volume of the container 30. For this reason, the liquid L contacts with part of the containing portion 31. A region that contacts with the liquid L in the containing portion 31 in a state where the container 30 is still standing is referred to as a contact region 31*a*. The state where the container 30 is still standing includes a state where the container 30 is disposed such that the liquid level of the liquid L is stable for a predetermined time. In an example, the container 30 is designed in advance to be disposed in a specific orientation such that the liquid level of the liquid L is stable for a predetermined time. In this case, the state where the container 30 is still standing includes a state where the container 30 is disposed in the specific orientation. For example, in FIG. 1, the contact region 31*a* is a region of the containing portion 31, which contacts with the liquid L in a state where the container 30 is upright. The state where the container 30 is upright is, for example, a state where the container 30 is stably disposed on a horizontal placement surface. When the container 30 includes a container body 32 including an opening part 33 as will be described later, the state where the container 30 is upright may be a state where the opening part 33 of the container body 32 is oriented upward. The state where the container 30 is still standing includes the state where the container 30 is upright and also includes a state where the container 30 is disposed such that the liquid level of the liquid L contained in the containing portion 31 is stable, other than the state where the container 30 is upright. For example, the state where the container 30 is still standing can include a state where the opening part 33 of the container body 32 is laterally oriented and a state where the opening part 33 of the container body 32 is oriented obliquely upward. The state where the container 30 is still standing includes a state where the liquid level of the liquid L is made stable by supporting the container 30 with the barrier container 40. The state where the container 30 is still standing includes a state where the liquid level of the liquid L is made stable by supporting the container 30 with a member other than the barrier container 40. Specifically, the state where the container 30 is still standing includes a state where the liquid level of the liquid L is made stable by supporting the container 30 with an intermediate container 50 (described later) accommodating the container 30 and accommodated in the barrier container 40. The state where the container 30 is still standing includes a state where the liquid level of the liquid L is made stable by supporting the container 30 with an outer container 55 (described later) accommodating the container 30 and the barrier container 40. The state where the container 30 is still standing includes a state where the liquid level of the liquid L is made stable by hanging the container 30. A space that arises above the contact region 31*a*, contacting with the liquid L, of the containing portion 31 of the container 30 and that can contain gas is referred to as a head space HS.

The inside of the container 30 may also be in an aseptic condition. The liquid L may be a liquid that should be maintained in an aseptic condition. The liquid L that should be maintained in an aseptic condition includes a hypersensitive liquid like foods and drugs. A hypersensitive liquid L easily degrades by post sterilization performed after manufacturing (also referred to as final sterilization). Post sterilization cannot be applied to a hypersensitive liquid. Examples of the post sterilization include high pressure steam sterilization, dry heat sterilization, radiation sterilization, ethylene oxide gas sterilization, and hydrogen peroxide gas plasma sterilization. A hypersensitive liquid L in the specification means a liquid for which 5% or more in weight percentage of all the effective ingredients contained in the liquid is decomposed by subjecting the liquid L to post sterilization and 1% or more in weight percentage of effective ingredients contained in the liquid is decomposed by subjecting the liquid L to post sterilization. A hypersensitive liquid L to which post sterilization cannot be applied can be manufactured by using a manufacturing line disposed in an aseptic environment. In other words, a hypersensitive liquid L can be manufactured by aseptic manipulation. Examples of the hypersensitive liquid L include anticancer drug, antiviral drug, vaccine, and antipsychotic drug.

The amount of oxygen in the liquid L manufactured by aseptic manipulation can be adjusted by replacing the entire space in which the manufacturing line for the liquid L is disposed, with inert gas. However, having the entire space, in which the manufacturing line for the liquid L is disposed, be in an inert gas atmosphere is accompanied by enormous capital investment. Therefore, the amount of oxygen in the container in which hypersensitive liquid is contained has been depending on replacement of the atmosphere in the container with inert gas, bubbling of the liquid L with inert gas, or the like.

In contrast, with the technique according to the present embodiment described below, the oxygen concentration in the barrier container 40 can be sufficiently reduced by accommodating the liquid-filled container 30L in the barrier container 40 and using the oxygen absorber 21 that absorbs oxygen in the barrier container 40. Furthermore, an oxygen concentration (%) in the container 30 can be sufficiently reduced in a short period, and an oxygen dissolution amount (mg/L) in the liquid L can also be sufficiently reduced. In an example, the oxygen dissolution amount of the liquid L can be reduced to less than 0.15 mg/L, less than or equal to 0.04 mg/L, less than or equal to 0.03 mg/L, less than or equal to 0.02 mg/L, or less than 0.015 mg/L.

A product (liquid L) with the wording "sterilized", "sterile", or the like, the inside of a container that contains the product, a product (liquid L), such as a pharmaceutical, under the condition of commercialization, that is, the product is "sterile", and the inside of the container that contains the product all correspond to an "aseptic condition" used here. A product (liquid L) that satisfies $10^{-6}$ in sterility assurance level (SAL) defined in JIS T 0806:2014 and the inside of the container that contains the product also correspond to "sterile" used in the specification. A product in which fungi do not grow after keeping a temperature higher than or equal to room temperature (for example, 20° C.) for four weeks and the inside of the container that contains the product also correspond to "sterile" used in the specification. A product in which fungi do not grow after keeping a cold storage state (for example, lower than or equal to 8° C.) for eight weeks and the inside of the container that contains the product also correspond to "sterile" used in the specification. A drug in which fungi do not grow after keeping a temperature higher than or equal to 28° C. and lower than or equal to 32° C. for two weeks and the inside of the container that contains the drug also correspond to "sterile" used in the specification.

The container 30 has oxygen permeability. The fact that the container has oxygen permeability means that, in an atmosphere of a temperature of 23° and a humidity of 40% RH, oxygen penetrates through the container at a predetermined oxygen permeation amount or greater and is movable between the inside of the container and the outside of the container. The predetermined oxygen permeation amount is greater than or equal to $1\times10^{-1}$ (mL/(day×atm)). The predetermined oxygen permeation amount may be greater than or equal to 1 (mL/(day×atm)), may be greater than or equal to 1.2 (mL/(day×atm)), or may be greater than or equal to 5 (mL/(day×atm)). With the container 30 having oxygen permeability, the amount of oxygen in the container 30 can be adjusted by oxygen permeation through the container 30.

An upper limit may be set to the oxygen permeation amount by which oxygen permeates through the container 30. By setting an upper limit, leakage of water vapor or the like from the container 30 can be suppressed. By setting the upper limit, the influence on the liquid L in the container 30 due to a high gas permeation rate after the barrier container 40 is opened can be suppressed. The oxygen permeation amount by which oxygen permeates through the container 30 may be less than or equal to 100 (mL/(day×atm)), may be less than or equal to 50 (mL/(day×atm)), or may be less than or equal to 10 (mL/(day× atm)).

A range of the oxygen permeation amount may be determined by combining the above-described selected lower limit of the oxygen permeation amount with the above-described selected upper limit of the oxygen permeation amount.

An oxygen permeability coefficient of a material that is a component of part of the container 30 with an oxygen permeability may be higher than or equal to $1\times10^{-12}$ ($cm^3$(STP)·cm/($cm^2$·sec·Pa)), may be higher than or equal to $5\times10^{-12}$ ($cm^3$(STP)·cm/($cm^2$·sec·Pa)), or may be higher than or equal to $1\times10^{-11}$ ($cm^3$(STP)·cm/($cm^2$·sec·Pa)). By setting a lower limit to the oxygen permeability coefficient, oxygen permeation through the container 30 is facilitated, so adjustment of the oxygen concentration in the container 30 can be quickly performed. When the part having oxygen permeability includes a plurality of layers, the material that is a component of at least one layer may have the above-described oxygen permeability coefficient, and each of the materials that are components of all the layers may have the above-described oxygen permeability coefficient.

When a measuring object is a resin film or a resin sheet, an oxygen permeability coefficient is a value measured in compliant with JIS K 7126-1. When a measuring object is rubber, an oxygen permeability coefficient is a value measured in compliant with JIS K 6275-1. An oxygen permeability coefficient is a value measured by using OXTRAN, 2/61) that is a transmittance measuring device produced by MOCON, U.S.A. in an environment of a temperature of 23° C. and a humidity of 40% RH.

All the gases may be allowed to permeate through the container 30. Only some of the gases including oxygen may be allowed to permeate through the container 30. Only oxygen may be allowed to permeate through the container 30.

The container 30 may have oxygen permeability in a manner such that oxygen can permeate through every part of the container 30. The container 30 may have oxygen permeability in a manner such that oxygen can permeate through only a part of the container 30.

Figure 2:
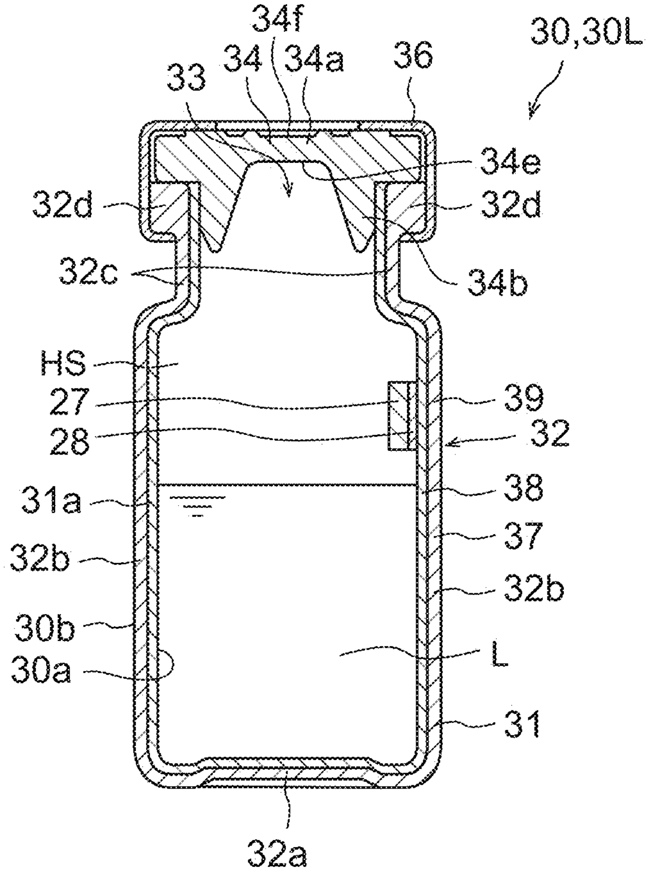
FIG. 2 is a longitudinal sectional view that shows a liquid-filled container that can be included in the liquid-filled combination container of FIG. 1.

As shown in FIG. 2, the container 30 may include the container body 32 and a stopper 34. The container body 32 includes the opening part 33. The stopper 34 is held at the opening part 33. As shown in FIG. 2, the stopper 34 includes a first face 34*e* opposed to the container body 32 and a second face 34*f* located on an opposite side to the first face 34*e*. The stopper 34 contacts with the opening part 33 at the first face 34*e*. The stopper 34 closes the opening part 33. Thus, the stopper 34 suppresses leakage of the liquid L from the opening part 33. In this example, the stopper 34 has oxygen permeability. When a part of the container 30 having oxygen permeability is not in contact with the liquid L, oxygen permeation via the part can be facilitated. When the container 30 including the container body 32 and the stopper 34 is in a normal state (a state where the above-described container 30 is upright), the stopper 34 is located away from the liquid L contained in the container body 32. In other words, in a normal storage state of the container 30, oxygen permeation via the stopper 34 of the container 30 can be facilitated. In terms of this point, the amount of oxygen in the container 30 can be quickly adjusted by imparting oxygen permeability to the stopper 34.

The stopper 34 having oxygen permeability may be made of a material having the above-described oxygen permeability coefficient ($cm^3$(STP)·cm/($cm^2$·sec·Pa)). The oxygen permeability coefficient of the material that is a component of the stopper 34 may be higher than the oxygen permeability coefficient of a material that is a component of the container body 32. A part of the stopper 34 may have oxygen permeability. A part of the stopper 34 may have oxygen permeability over the entire thickness. The stopper 34 may have oxygen permeability over the entire thickness at a central part apart from a periphery and have oxygen barrier properties at a peripheral part surrounding the central part.

For example, the configuration of a part of the container 30, having oxygen permeability, may be determined such that the oxygen concentration (%) in the container 30 can be decreased by 5% or more by keeping the container 30, containing liquid of which the oxygen dissolution amount is 8 mg/L, in the barrier container 40 for four weeks.

In the illustrated example, the area of the opening part 33, that is, the opening area of the container body 32, may be larger than or equal to 1 $mm^2$, may be larger than or equal to 10 $mm^2$, or may be larger than or equal to 30 $mm^2$. The thickness of the stopper 34 may be less than or equal to 3 mm or may be less than or equal to 1 mm. Thus, oxygen permeation through the container 30 is facilitated, so adjustment of the oxygen concentration in the container 30 can be quickly performed. A needle of a syringe can be inserted into the stopper 34. Furthermore, from the viewpoint of making it possible to insert a straw, the thickness of the stopper, for example, the thickness of a film-shaped stopper, may be less than or equal to several tenths of millimeters.

The area of the opening part 33 may be smaller than or equal to 5000 $mm^2$. The thickness of the stopper 34 may be larger than or equal to 0.01 mm. Thus, leakage of water vapor or the like can be reduced, so the influence on liquid in the container 30 after the barrier container 40 is opened due to a high oxygen permeation rate can be reduced. The range of the area of the opening part may be determined by combining the upper limit of the area of the opening part with the above-described selected lower limit of the area of the opening part. The range of the thickness of the stopper 34 may be determined by combining the lower limit of the thickness of the stopper 34 with the above-described selected upper limit of the thickness of the stopper 34.

The stopper 34 having oxygen permeability is not limited and may include various configurations. In the example shown in FIG. 2, the stopper 34 is inserted into the opening part 33 of the container body 32 to close the opening part 33. The stopper 34 shown in FIG. 2 includes a plate-shaped plate part 34*a* and a cylindrical part 34*b* extending from the plate part 34*a*. The cylindrical part 34*b* has, for example, a cylindrical shape. The cylindrical part 34*b* is inserted into the opening part 33. The plate part 34*a* includes a flange extending radially outward from the cylindrical part 34*b*. The flange of the plate part 34*a* is placed on a head portion 32*d* of the container body 32. In another example, the stopper 34 may include an external screw thread or an internal screw thread. The stopper 34 may be secured to the container body 32 by meshing of screw threads.

The stopper 34 may contain silicone. The stopper 34 may be made of only silicone. A part of the stopper 34 may be made of silicone. Silicone contained in the stopper 34 is solid in an environment where the container 30 is planned to be used. Silicone contained in the stopper 34 does not need to contain silicone that will be liquid in a room temperature environment, such as silicone oil. Silicone is a substance having a siloxane bond as a principal chain. The stopper 34 may be made of silicone elastomer. The stopper 34 may be made of silicone rubber.

Silicone rubber is a rubber-like substance made of silicone. Silicone rubber is a synthetic resin containing silicone as a main ingredient and is a rubber-like substance. Silicone rubber is a rubber-like substance having a siloxane bond as a principal chain. Silicone rubber may be a thermosetting chemical compound having a siloxane bond. Examples of the silicone rubber include methyl silicone rubber, vinyl-methyl silicone rubber, phenyl-methyl silicone rubber, dimethyl silicone rubber, and fluorosilicone rubber.

The oxygen permeability coefficient of silicone and the oxygen permeability coefficient of silicone rubber may be higher than or equal to $1\times10^{-12}$ ($cm^3$(STP)·cm/($cm^2$·sec·Pa)) or may be higher than or equal to $1\times10^{-11}$ ($cm^3$(STP)·cm/($cm^2$·sec·Pa)). The oxygen permeability coefficient of silicone and the oxygen permeability coefficient of silicone rubber may be lower than or equal to $1\times10^{-9}$ ($cm^3$(STP)·cm/($cm^2$·sec·Pa)). Silicone and silicone rubber have about 10 times a hydrogen permeability coefficient than natural rubber, have about 20 times an oxygen permeability coefficient than natural rubber, and have about 30 times a nitrogen permeability coefficient than natural rubber. Silicone and silicone rubber have 70 times or more a hydrogen permeability coefficient than butyl rubber, have 40 times or more an oxygen permeability coefficient than butyl rubber, and have 650 times or more a nitrogen permeability coefficient than butyl rubber.

At least a part of the stopper 34 may be made of silicone. In other words, the whole or one part of the stopper 34 may be made of silicone or silicone rubber. For example, a part of the stopper 34 may be made of silicone or silicone rubber over its overall thickness. The part may be a central part of the stopper 34 or may be part or whole of a peripheral part surrounding the central part.

As shown in FIG. 2, the container body 32 may include a bottom portion 32*a*, a trunk portion 32*b*, a neck portion 32*c*, and the head portion 32*d* in this order. The containing portion 31 for the liquid L may be made up of the bottom portion 32*a* and the trunk portion 32*b*. The head portion 32*d* forms a distal end part of the container body 32. The head portion 32*d* is thicker than the other part. The neck portion 32*c* is located between the trunk portion 32*b* and the head portion 32*d*. The neck portion 32*c* is reduced in width, particularly, reduced in diameter, with respect to the trunk portion 32*b* and the head portion 32*d.*

The container body 32 may be transparent so that the contained liquid L can be observed from outside. In other words, the container body 32 may have light transmission properties. Here, being transparent and having light transmission properties mean that a transmittance at a specific wavelength is higher than or equal to 10%, preferably higher than or equal to 20%, or further preferably higher than or equal to 50%. In the first embodiment, the specific wavelength is the wavelength of light that excites the fluorescent material 27 and is the wavelength of fluorescence emitted from the fluorescent material 27. In an example, when the fluorescent material 27 is excited by blue LED light to emit fluorescence with a wavelength longer than or equal to 500 nm and shorter than or equal to 600 nm, the specific wavelength is a wavelength around 450 nm and a wavelength longer than or equal to 500 nm and shorter than or equal to 600 nm. As in the case of an inspection method for a liquid-filled combination container 10L according to a second embodiment as will be described later, when an attenuation factor of laser light or LED light with a wavelength to be attenuated according to an oxygen concentration in an optical path is measured by applying the laser light or the LED light such that the laser light or the LED light penetrates through the inside of the container 30 and an oxygen concentration in the container 30 is measured in accordance with the measured attenuation factor, the specific wavelength is a wavelength to be attenuated according to the oxygen concentration. A wavelength to be attenuated according to an oxygen concentration is, for example, 760 nm. The inspection method for the liquid-filled combination container 10L according to the second embodiment (described later) can also be used in measuring the concentration of another gas, such as carbon dioxide and water vapor, in the container 30. A transparent member and part of a transparent member, and a member having light transmission properties and part of a member having light transmission properties, which will be referred to in the specification, may have a haze (JIS K 7136:2000) of lower than or equal to 50%, preferably lower than or equal to 30%, more preferably lower than or equal to 10%, or further preferably lower than or equal to 5%.

As shown in FIG. 2, the container 30 may further include a fixing tool 36. The fixing tool 36 suppresses detachment of the stopper 34 from the container body 32. The fixing tool 36 is secured to the head portion 32*d* of the container body 32. As shown in FIGS. 1 and 2, the fixing tool 36 covers the periphery of the plate part 34*a* of the stopper 34. The fixing tool 36 presses the flange of the plate part 34*a* against the head portion 32*d*. The fixing tool 36 suppresses detachment of the stopper 34 from the container body 32 while the stopper 34 is exposed at a part. A gap between the stopper 34 and the container body 32 is liquidtight and airtight by the fixing tool 36. The fixing tool 36 places the container 30 in an airtight state. The fixing tool 36 may be a sheet metal that can be fixed to the head portion 32*d*. The fixing tool 36 may be a cap that is screwed to the head portion 32*d*.

In the illustrated example, the oxygen permeability coefficient of the material that is a component of the container body 32 may be lower than the oxygen permeability coefficient of the material that is a component of the stopper 34. The container body 32 may have oxygen barrier properties. In other words, the container 30 may have oxygen permeability only at a part. The oxygen permeability coefficient of the material that is a component of the part having oxygen barrier properties may be lower than or equal to $1\times10^{-13}$ ($cm^3$(STP)·cm/($cm^2$·sec·Pa)) or may be lower than or equal to $1\times10^{-17}$ ($cm^3$(STP)·cm/($cm^2$·sec-Pa)).

Here, the container 30 may include at least any one material of glass and cyclic olefin polymer. For example, the container body 32 of the container 30 may include at least any one material of glass and cyclic olefin polymer. A cyclic olefin polymer included in the container 30 may be a cyclic olefin copolymer. Examples of the container body 32 having oxygen barrier properties and containing glass include a glass bottle. Examples of the container body 32 having oxygen barrier properties and containing a cyclic olefin polymer include the container body 32 manufactured by using a resin sheet or a resin plate containing a cyclic olefin polymer. In this example, a resin sheet or a resin plate may be made up of a layer containing a cyclic olefin polymer. The container body 32 may include a multilayer body including a metal vapor deposition film. Not only oxygen barrier properties but also transparency can be imparted to the container body 32 using a multilayer body or glass. When the container 30 or the container body 32 is transparent, the liquid L contained inside can be checked from outside the container 30.

The container 30 may include a coating layer 38 that is a component of the inner surface 30*a* of the container 30. In the example shown in FIG. 2, the container body 32 of the container 30 includes a base layer 37 and the coating layer 38. The coating layer 38 is a component of the inner surface 30*a* of the container 30 and suppresses adhesion of the liquid L to the inner surface 30*a* of the container 30. In the first embodiment, the coating layer 38 is a component of the inner surface 30*a* of the container 30 at least at a fluorescent material installation location 39 (described later). In an example, the coating layer 38 is a component of a part made by the container body 32 of the inner surface 30*a* of the container 30 and is a component of a part defining the head space HS. In the example shown in FIG. 2, the coating layer 38 is a component of the whole of the part made by the container body 32 of the inner surface 30*a* of the container 30.

The phrase "a part of the container has oxygen permeability" means that, in an atmosphere of a temperature of 23° and a humidity of 40% RH, oxygen penetrates through the part of the container at a predetermined oxygen permeation amount or greater and is movable between the inside of the container and the outside of the container. The predetermined oxygen permeation amount is greater than or equal to $1\times10^{-1}$ (mL/(day×atm)). The predetermined oxygen permeation amount may be greater than or equal to 1 (mL/(day×atm)), may be greater than or equal to 1.2 (mL/(day×atm)), or may be greater than or equal to 3 (mL/(day×atm)). The amount of oxygen in the container 30 can also be adjusted by a part of the container 30, having oxygen permeability.

The predetermined oxygen permeation amount may be less than or equal to 100 (mL/(day×atm)), may be less than or equal to 50 (mL/(day×atm)), or may be less than or equal to 10 (mL/(day×atm)). By providing an upper limit to the oxygen permeation amount, leakage of water vapor or the like can be reduced, so the influence on liquid in the container 30 after the barrier container 40 is opened due to a high oxygen permeation rate can be reduced. A range of the oxygen permeation amount may be determined by combining the above-described selected lower limit of the oxygen permeation amount with the above-described selected upper limit of the oxygen permeation amount.

Figure 3:
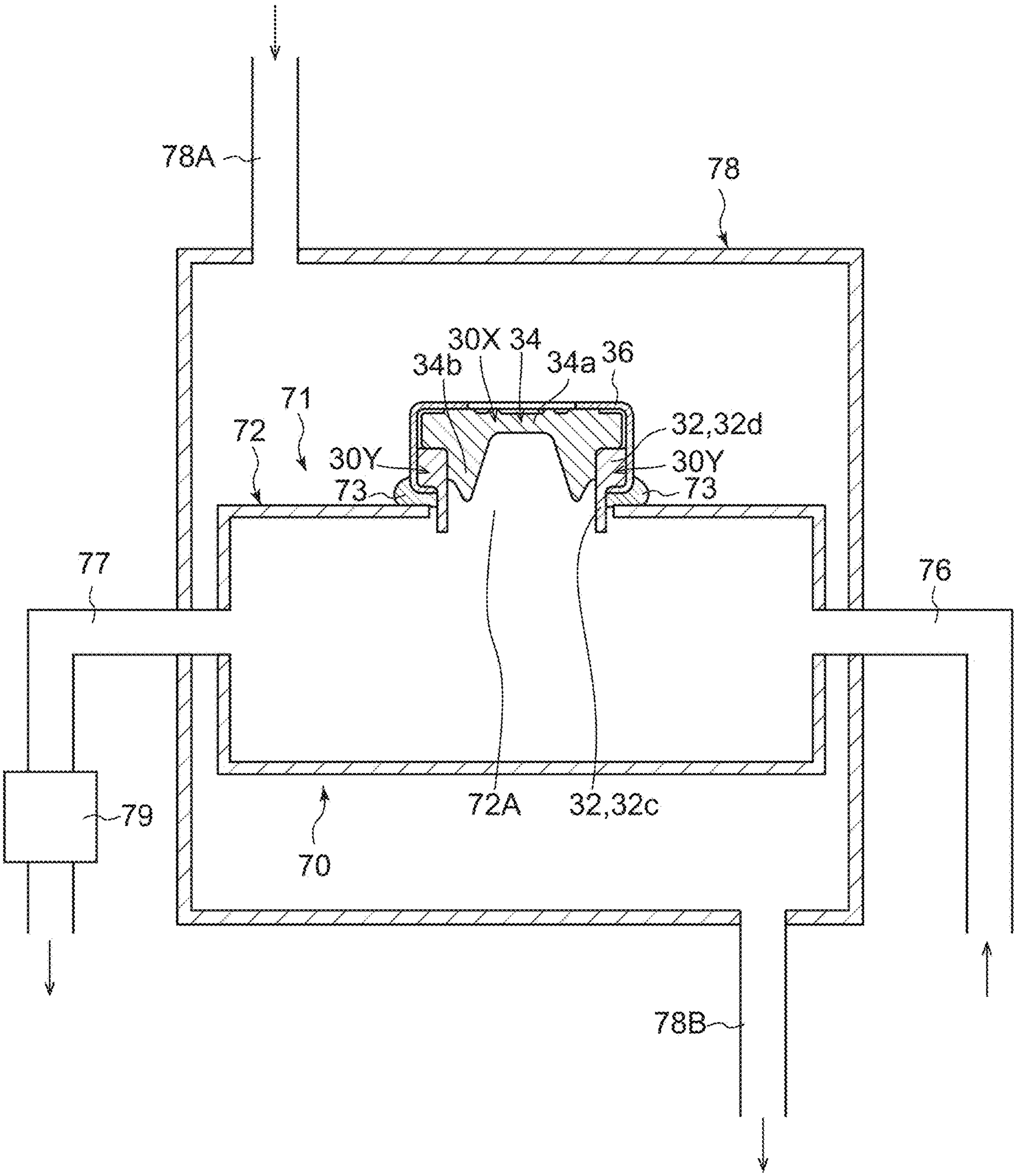
FIG. 3 is a longitudinal sectional view that shows a method of measuring an oxygen permeation amount at one part of the container shown in FIG. 2.

An oxygen permeation amount (mL/(day×atm)) at which oxygen permeates through a part of the container can be measured by using a test container 70 including the part as shown in FIG. 3. The test container 70 includes a partition wall 71. The test container 70 includes an internal space defined by the partition wall 71. The partition wall 71 includes a part of the container and a main wall 72 having oxygen barrier properties. The amount of permeation of the part of the container is identified as the oxygen permeation amount (mL/(day×atm)) of the test container 70.

An oxygen concentration in the test container 70 is, for example, kept lower than or equal to 0.05%. The test container 70 connects with a first channel 76 and a second channel 77. The second channel 77 connects with an oxygen measuring instrument 79 that measures the amount of oxygen. The oxygen measuring instrument 79 can measure the amount (mL) of oxygen flowing in the second channel 77. The oxygen measuring instrument 79 can be an oxygen amount measuring instrument used in (OXTRAN, 2/61) produced by MOCON, U.S.A. The first channel 76 supplies gas into the test container 70. The first channel 76 may supply gas not containing oxygen. The first channel 76 may supply inert gas. The first channel 76 may supply nitrogen. The second channel 77 discharges gas in the test container 70. The inside of the test container 70 is maintained in a substantially no oxygen condition by the first channel 76 and the second channel 77. The oxygen concentration in the test container 70 may be maintained to be lower than or equal to 0.05%, may be maintained to be lower than 0.03%, or may be maintained at 0%.

The test container 70 is disposed in a test atmosphere of a temperature of 23° and a humidity of 40% RH. The oxygen concentration of the atmosphere in which the test container 70 is disposed is higher than the oxygen concentration in the test container 70. The test atmosphere may be an air atmosphere. The oxygen concentration of the air atmosphere is 20.95%. When the test container 70 is disposed in the test atmosphere, oxygen permeates through a part 30X of the container and moves from the test atmosphere into the test container 70. Gas in the test container 70 is discharged through the second channel 77. By measuring the amount of oxygen flowing through the second channel 77 with the oxygen measuring instrument 79, the oxygen permeation amount per day (mL/(day×atm)) at which oxygen permeates through the part 30X can be measured in the atmosphere of a temperature of 23° and a humidity of 40% RH.

In the illustrated example, the test container 70 is disposed in a test chamber 78. The atmosphere in the test chamber 78 is maintained at a temperature of 23° and a humidity of 40% RH. Air is supplied through a supply path 78A into the test chamber 78. Gas in the test chamber 78 is discharged through a discharge path 78B. Air circulates because of the supply path 78A and the discharge path 78B, and the oxygen concentration in the test chamber 78 is maintained at 20.95%.

In the example shown in FIG. 3, a pump for circulating air may be provided in one of the supply path 78A and the discharge path 78B. In the example shown in FIG. 3, the supply path 78A and the discharge path 78B may be open to an air atmosphere under atmospheric pressure. Furthermore, the test container 70 does not need to be disposed in the test chamber 78. The test chamber 78 may be omitted, and the test container 70 may be disposed in an air atmosphere under atmospheric pressure.

FIG. 3 shows a method of measuring the oxygen permeation amount in an example of the part 30X of the container 30, having oxygen permeability. In the example shown in FIG. 3, the partition wall 71 is made up of the part 30X of the container 30, having oxygen permeability, and the main wall 72 having oxygen barrier properties. For example, the partition wall 71 may be made up of the part 30X cut out from the container 30 and the main wall 72 connected to the periphery of the part 30X. The main wall 72 includes a through-hole 72A that exposes the part 30X. A surrounding part of the through-hole 72A and a part 30Y adjacent to the part 30X may be airtightly joined to each other. In the illustrated example, the part 30Y adjacent to the part 30X is airtightly joined to the surrounding part of the through-hole 72A of the main wall 72 via a barrier jointing material 73. In the example shown in FIG. 3, a part around the stopper 34 of the container 30 shown in FIG. 2 is cut. In this example, the stopper 34 is the part 30X having oxygen permeability. The parts 32*c*, 32*d* forming the opening part 33 of the container body 32 and the fixing tool 36 airtightly connect with the main wall 72 via the barrier jointing material 73 as the part 30Y adjacent to the part 30X having oxygen permeability.

In the example shown in FIG. 3, the container body 32 is cut at the neck portion 32*c*. The stopper 34 is compressed and held in the opening part 33 formed by the head portion 32*d* of the container body 32. A gap between the container body 32 and the stopper 34 is airtight by the fixing tool 36. The fixing tool 36 having oxygen barrier properties, such as aluminum, partially covers the stopper 34. The container body 32 and the fixing tool 36, having oxygen barrier properties, connect with the main wall 72 via the barrier jointing material 73. The stopper 34 is maintained in a state similar to a state at the time when the container 30 is closed in actual use, such as compression in the opening part 33 and fastening with the fixing tool 36. Therefore, the oxygen permeation amount at the stopper 34 can be measured in a condition similar to that in actual use.

The method of measuring the oxygen permeation amount (mL/(day×atm)) at which oxygen permeates through a part of the container has been described above. The oxygen permeation amount (mL/(day×atm)) at which oxygen permeates through the whole of the container can be identified by dividing the container into two or more parts and adding up the oxygen permeation amount measured for each part. For example, the oxygen permeation amount of the container 30 shown in FIG. 2 can be identified by measuring the oxygen permeation amount of the container body 32 and adding up the oxygen permeation amount of the container body 32 and the oxygen permeation amount of the part 30X, measured with the method shown in FIG. 3. The oxygen permeation amount (mL/(day×atm)) of the container body 32 can be measured by using the test container 70 manufactured by combining the container body 32 with the main wall 72.

The volume of the container 30, for example, may be greater than or equal to 1 mL and less than or equal to 1100 mL, may be greater than or equal to 3 mL and less than or equal to 700 mL, or may be greater than or equal to 5 mL and less than or equal to 200 mL.

In the illustrated example, the container body 32 is a glass bottle. In other words, the base layer 37 of the container body 32 is made of glass. The base layer 37 of the container body 32 is made of, for example, borosilicate glass. The container 30 may be a vial bottle. A vial bottle is the container 30 including the container body 32, the stopper 34 inserted in the opening part 33 of the container body 32, and a seal serving as a fixing tool that fixes the stopper 34. In the container 30 that is a vial bottle, the seal is swaged together with the stopper at the head portion of the container body by using a hand gripper or the like. The volume of the container 30 that is a vial bottle may be greater than or equal to 1 ml or may be greater than or equal to 3 mL. The volume of the container 30 that is a vial bottle may be less than or equal to 500 ml or may be less than or equal to 200 mL.

When the container 30 is a vial bottle, the oxygen permeability coefficient of the material that is a component of the stopper 34 may be higher than the oxygen permeability coefficient of glass that is a component of the container body 32. Movement of oxygen from the inside of the container 30 to the outside of the container 30 can be facilitated by placing the part of the container 30, having oxygen permeability, apart from the liquid L. The container 30 that is a vial bottle can be stably disposed on a placement surface by bringing the bottom portion 32*a* of the container body 32 into contact with the placement surface. In other words, in the container 30 that is a vial bottle, the state where the bottom portion 32*a* of the container body 32 is in contact with the placement surface is the above-described state where the container 30 is upright. At this time, the stopper 34 is placed apart from the liquid L. The stopper 34 does not contact with the liquid L. Therefore, in a normal storage state of the container 30, oxygen permeation via the stopper 34 of the container 30 can be facilitated.

The illustrated container 30 can maintain the internal pressure at a negative pressure under atmospheric pressure. The container 30 can contain gas while maintaining the gas at a negative pressure under atmospheric pressure. The container 30 may be able to contain gas while maintaining the gas at a positive pressure under atmospheric pressure. In these examples, the container 30 may have such a stiffness that the shape can be sufficiently maintained. However, the container 30 may deform to some extent under atmospheric pressure when the internal pressure is maintained at a negative pressure or a positive pressure. The above-described illustrated specific example or a can manufactured from metal is illustrated as the container 30 that can maintain the internal pressure at a negative pressure or a positive pressure.

The phrase "gas can be contained while being maintained at a negative pressure under atmospheric pressure" means that gas can be contained without breakage while the internal pressure is maintained at a negative pressure higher than or equal to 0.80 atm. The container 30 that can contain gas while maintaining the gas at a negative pressure under atmospheric pressure may be an airtight container even when the internal pressure is 0.80 atm. With the container that can contain gas while maintaining the gas at a negative pressure under atmospheric pressure, the volume in the case where the internal pressure is 0.80 atm can be maintained at 95% or higher of the volume in the case where the internal pressure is 1.0 atm.

Oxygen including the container body 32 and the stopper 34 and of which the stopper 34 has oxygen permeability has been described as an example of the container 30. However, the mode of the container 30 is not limited thereto. The container 30 may include the container body 32 having oxygen permeability at least at a part has oxygen permeability and the stopper 34 having oxygen barrier properties.

The barrier container 40 has a volume by which the container 30 can be accommodated. The barrier container 40 can be closed by, for example, welding, such as a heat seal and ultrasonic bonding, or joining using a jointing material, such as an adhesion material and a bonding material. The barrier container 40 may be an airtight container. The volume of the barrier container 40 may be, for example, greater than or equal to 5 mL and less than or equal to 1200 mL. When the container 30 is a small container like a vial bottle, for example, a container having a volume greater than or equal to 1 mL and less than or equal to 20 mL, the volume of the barrier container 40 may be greater than or equal to 1.5 mL and less than or equal to 500 mL.

The barrier container 40 has oxygen barrier properties. The phrase "the container has oxygen barrier properties" means that the oxygen permeability (mL/($m^2$×day×atm)) of the container is lower than or equal to one. The oxygen permeability (mL/($m^2$×day×atm)) of the container having oxygen barrier properties may be lower than or equal to 0.5 or may be lower than or equal to 0.1. The oxygen permeability is measured in compliant with JIS K 7126-1. An oxygen permeability is measured by using OXTRAN, 2/61) that is a permeability measuring device produced by MOCON, U.S.A. in an environment of a temperature of 23° C. and a humidity of 40% RH. For containers to which JIS K 7126-1 is not applied, an oxygen permeability may be identified by measuring the above-described oxygen permeation amount and dividing the obtained oxygen permeation amount by a surface area.

The oxygen permeability coefficient of the material that is a component of the barrier container 40 having oxygen barrier properties may be lower than or equal to $1\times10^{-13}$ ($cm^3$(STP)·cm/($cm^2$·sec·Pa)) or may be lower than or equal to $1\times10^{-17}$ ($cm^3$(STP)·cm/($cm^2$·sec·Pa)).

Examples of the barrier container 40 having oxygen barrier properties include a container including a metal layer formed by vapor deposition or transcription, and a glass bottle. The barrier container 40 may include a multilayer body including a layer having oxygen barrier properties. A multilayer body may include a resin layer or a metal vapor deposition film. In this case, the resin layer or the metal vapor deposition film may have oxygen barrier properties. The barrier container 40 includes a transparent part. In other words, the barrier container 40 includes a light transmission location 40*b* where the barrier container 40 has light transmission properties. Part of the barrier container 40 may be transparent. The whole of the barrier container 40 may be transparent. Transparency together with oxygen barrier properties can be imparted to the barrier container 40 using a multilayer body and the barrier container 40 using glass or resin. By imparting the barrier container 40 with transparency, the liquid-filled container 30L accommodated inside can be checked from outside the barrier container 40.

The barrier container 40 may contain at least any one resin of acrylic resin and polyethylene terephthalate resin. For example, when the barrier container 40 includes a multilayer body including a resin layer, the resin layer may contain any one or both of acrylic resin and polyethylene terephthalate resin.

In the example shown in FIG. 1, the barrier container 40 is made from a resin film having oxygen barrier properties. The barrier container 40 is a so-called pouch. The barrier container 40 shown in FIG. 1 is a so-called gusset bag. The barrier container 40 includes a first main film 41*a*, a second main film 41*b*, a first gusset film 41*c*, and a second gusset film 41*d*. The films 41*a* to 41*d* are joined airtightly by, for example, welding, such as a heat seal and ultrasonic bonding, or joining using a jointing material, such as an adhesion material and a bonding material.

Figure 4:
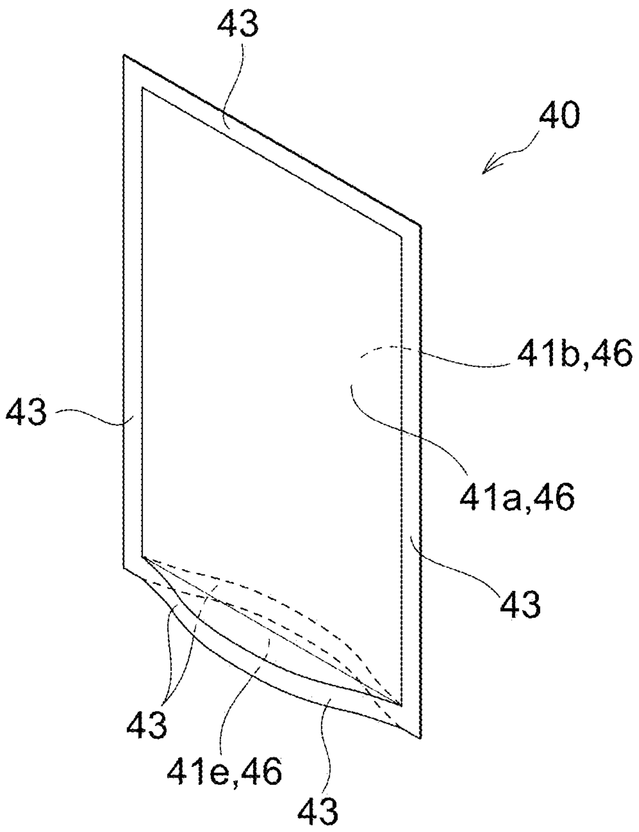
FIG. 4 is a perspective view that shows another example of a barrier container.

In the barrier container 40 shown in FIG. 1, instead of joining separate films, a single folded film may form adjacent two or more of the films 41*a* to 41*d*. As shown in FIG. 1, a gusset bag can form a rectangular bottom surface for the barrier container 40. By disposing the container 30 on the bottom surface, the container 30 can be stably kept in the barrier container 40. However, as shown in FIG. 4, the barrier container 40 may include a bottom film 41*e* together with the first main film 41*a* and the second main film 41*b*, instead of the gusset bag. This pouch is also called standing pouch. A bottom can be formed with this pouch, and the container 30 can be stably kept in the barrier container 40.

Figure 5:
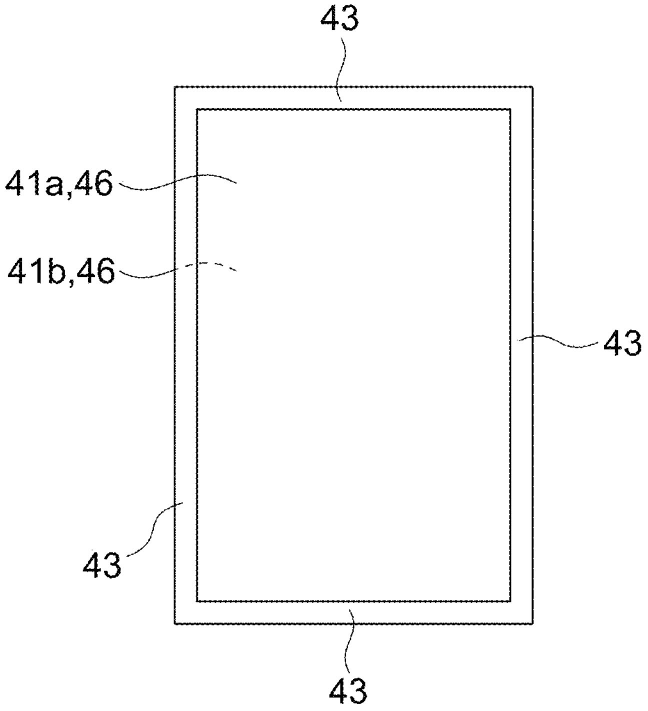
FIG. 5 is a perspective view that shows further another example of the barrier container.
Figure 6:
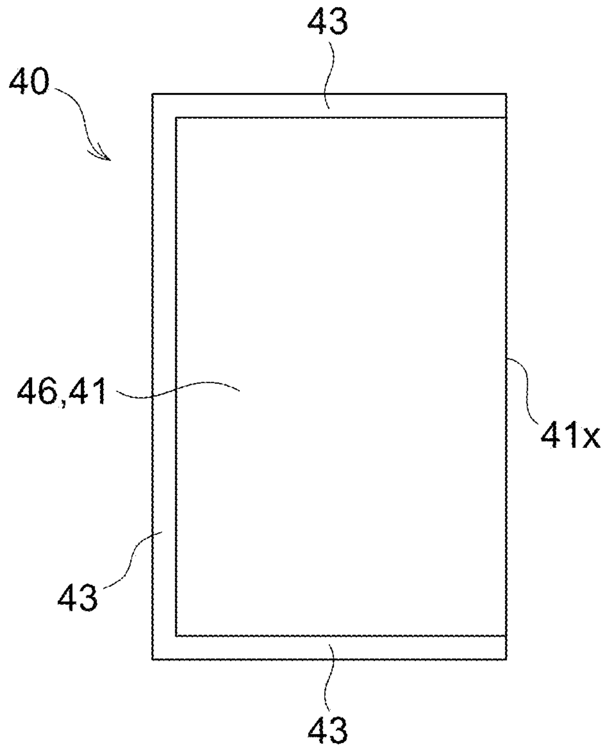
FIG. 6 is a perspective view that shows further another example of the barrier container.
Figure 7:
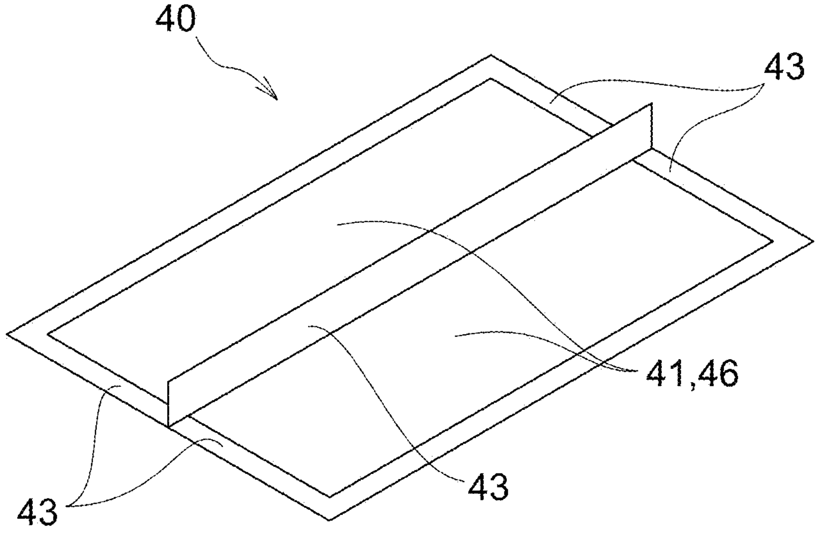
FIG. 7 is a perspective view that shows further another example of the barrier container.

As shown in FIGS. 5 to 7, the barrier container 40 that can be developed in a planar shape may be used. The barrier containers 40 respectively shown in FIGS. 5 to 7 each can be manufactured by joining a resin film to the seal part 43. The barrier container 40 shown in FIG. 5 can be manufactured by joining the first main film 41*a* and the second main film 41*b* at the seal part 43 provided in the circumferential shape.

The barrier container 40 shown in FIG. 6 includes a film 41 folded back at a fold back part 41*x*. The barrier container 40 can be manufactured by joining facing parts of the folded film 41 at the seal part 43. In the barrier container 40 shown in FIG. 6, an accommodation space is formed at a part surrounded by the fold back part 41*x* and the three-way seal part 43.

The barrier container 40 shown in FIG. 7 is called a pillow type. The film 41 is formed into a cylindrical shape by joining both ends of the single film 41 with each other as a seal part 43, and both ends of the cylindrical shape are further joined as a seal part 43, with the result that the barrier container 40 is obtained.

When the container 30 is accommodated in any one of the barrier container 40 shown in FIGS. 5 to 7, the barrier container 40 shown in any one of FIGS. 5 to 7 may be supported by a stand member or the like such that the container 30 is still standing. Particularly, each of the barrier containers 40 respectively shown in FIGS. 5 to 7 may be supported by a stand member or the like such that the container 30 is upright. For example, the barrier container 40 is supported such that the opening part 33 of the container body 32 is oriented upward.

In the above-described various examples, a film that forms the barrier container 40 may be transparent.

Figure 8:
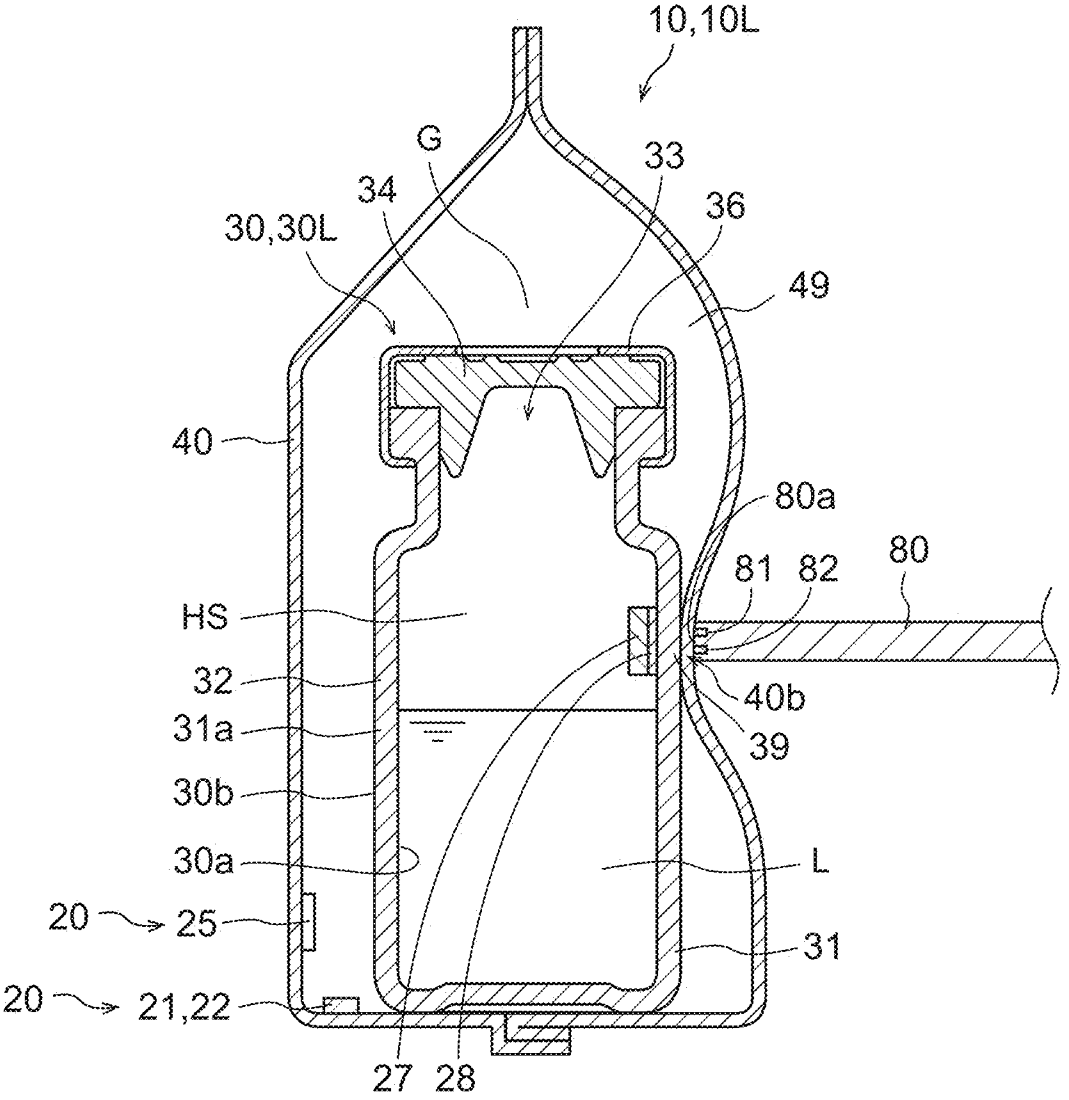
FIG. 8 is a sectional view that shows a state where the barrier container is deformed in the liquid-filled combination container of FIG. 1.
Figure 9:
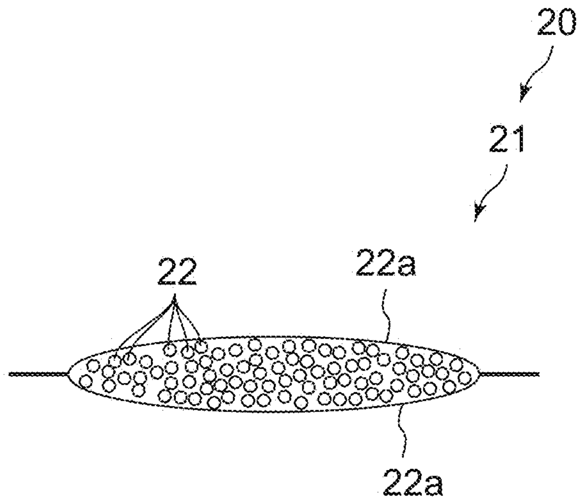
FIG. 9 is a sectional view that shows an example of an oxygen absorber.

In an example, the barrier container 40 contacts with the outer surface 30*b* of the container 30 at the fluorescent material installation location 39 (described later). In an example, the barrier container 40 contacts with the outer surface 30*b* at the fluorescent material installation location 39 when the fluorescence time or the fluorescence intensity of the fluorescent material 27 is measured by applying light to the fluorescent material 27 with an inspection method (described later). The barrier container 40 touches the outer surface 30*b* at the fluorescent material installation location 39 at a light transmission location 40*b*. The barrier container 40 does not need to contact with the outer surface 30*b* at the fluorescent material installation location 39 when the fluorescence time or the fluorescence intensity of the fluorescent material 27 is measured by applying light to the fluorescent material 27 with an inspection method (described later). Hereinafter, unless otherwise specified, the liquid-filled combination container 10L including the barrier container 40 that contacts with the outer surface 30*b* of the container 30 at the fluorescent material installation location 39 will be described as the liquid-filled combination container 10L according to the first embodiment. The barrier containers 40 respectively shown in FIGS. 1, and 4 to 7 each have deformable flexibility so as to contact with the outer surface 30*b* of the container 30 at the fluorescent material installation location 39. Particularly, the barrier containers 40 each have deformable flexibility so as to contact at the light transmission location 40*b* with the outer surface 30*b* of the container 30 at the fluorescent material installation location 39. FIG. 8 is a sectional view that shows a state where the barrier container 40 is deformed so as to contact with the outer surface 30*b* of the container 30 at the fluorescent material installation location 39 in the liquid-filled combination container 10L shown in FIG. 1. FIG. 8 does not show the layer configuration of the container body 32 and shows the outer shape of the cross section of the container body 32. In FIG. 8, for the sake of convenience of illustration, a location where the oxygen absorber 21 and an oxygen sensing material 25 (described later) are fixed to the inner surface of the barrier container 40 is changed from the location of FIG. 1.

The above-described specific configurations of the barrier containers 40 are only illustrative, and various modifications are possible.

As shown in FIG. 1, the liquid-filled combination container 10L further includes at least one oxygen reactant 20 that can react with oxygen in the barrier container 40. The oxygen reactant 20 is the oxygen absorber 21 that absorbs oxygen in the barrier container 40 or the oxygen sensing material 25 that senses an oxygen status in the barrier container 40. The liquid-filled combination container 10L may include a plurality of the oxygen reactants 20. In the example shown in FIG. 1, the liquid-filled combination container 10L includes two oxygen reactants 20. In the example shown in FIG. 1, the liquid-filled combination container 10L includes the oxygen absorber 21 as a first oxygen reactant 20. The liquid-filled combination container 10L includes the oxygen sensing material 25 as a second oxygen reactant 20.

The oxygen reactant 20 is fixed to at least any one of the outer surface 30*b* of the container 30 and the inner surface of the barrier container 40. In the example shown in FIG. 1, the two oxygen reactants 20 are fixed to the inner surface of the barrier container 40.

The oxygen reactant 20 is fixed at a location where the oxygen reactant 20 does not interfere with application of light for causing the fluorescent material 27 to emit fluorescence to the fluorescent material 27 at the time when the oxygen concentration in the container 30 is inspected in the inspection method for the liquid-filled combination container 10L (described later). In an example, when the oxygen reactant 20 is fixed to the outer surface 30*b* of the container 30, the oxygen reactant 20 is fixed to a location on the outer surface 30*b* of the container 30, which does not overlap the fluorescent material installation location 39. In an example, when the oxygen reactant 20 is fixed to the inner surface of the barrier container 40, the oxygen reactant 20 is fixed at a location on the inner surface of the barrier container 40, which does not overlap the fluorescent material installation location 39 in a direction perpendicular to the inner surface of the barrier container 40. In an example, the oxygen reactant 20 is fixed so as not to be located between the light transmission location 40*b* of the barrier container 40 and the fluorescent material installation location 39 of the container 30. Thus, blocking of light that penetrates through the barrier container 40 at the light transmission location 40*b* and the container 30 at the fluorescent material installation location 39 by the oxygen reactant 20 is reduced. For this reason, light can be applied from outside the barrier container 40 to the fluorescent material 27 by allowing the light to penetrate through the barrier container 40 at the light transmission location 40*b* and the container 30 at the fluorescent material installation location 39.

A method of fixing the oxygen reactant 20 to at least any one of the outer surface 30*b* of the container 30 and the inner surface of the barrier container 40 is not limited. The oxygen reactant 20 may be fixed to at least any one of the outer surface 30*b* of the container 30 and the inner surface of the barrier container 40 by being bonded with a bonding material or the like. The oxygen reactant 20 may be fixed to the outer surface 30*b* of the container 30 and the inner surface of the barrier container 40 so as to be held between the outer surface 30*b* of the container 30 and the inner surface of the barrier container 40. The oxygen reactant 20 may be fixed to at least any one of the outer surface 30*b* of the container 30 and the inner surface of the barrier container 40 with a member (not shown) disposed inside the barrier container 40 and outside the container 30. Each of the oxygen absorber 21 and the oxygen sensing material 25 shown in FIG. 1 may be bonded to the inner surface of the barrier container 40 with a bonding material (not shown).

The oxygen reactant 20 may be fixed to the outer surface 30*b* of the container 30 such that, even when the orientation of the liquid-filled combination container 10L is changed, the location with respect to the outer surface 30*b* of the container 30 does not change. The oxygen reactant 20 can be fixed to the outer surface 30*b* of the container 30 by using, for example, a bonding material such that, even when the orientation of the liquid-filled combination container 10L is changed, the location with respect to the outer surface 30*b* of the container 30 does not change. The oxygen reactant 20 may be fixed to the inner surface of the barrier container 40 such that, even when the orientation of the liquid-filled combination container 10L is changed, the location with respect to the inner surface of the barrier container 40 does not change. The oxygen reactant 20 can be fixed to the inner surface of the barrier container 40 by using, for example a bonding material such that, even when the orientation of the liquid-filled combination container 10L is changed, the location with respect to the inner surface of the barrier container 40 does not change.

The oxygen reactant 20 may be fixed to at least any one of the outer surface 30*b* of the container 30 and the inner surface of the barrier container 40 by using the action of gravitational force in a state where the container 30 of the liquid-filled combination container 10L is still standing, particularly, in a state where the container 30 is upright. For example, the oxygen reactant 20 may be restricted to move in a horizontal direction by being held between the outer surface 30*b* of the container 30 and the inner surface of the barrier container 40 and restricted to move in an up and down direction by the action of gravitational force. In this case, the oxygen reactant 20 is regarded as being fixed to the outer surface 30*b* of the container 30 and the inner surface of the barrier container 40. The oxygen reactant 20 may be restricted to move in the horizontal direction by being held between a member (not shown) disposed inside the barrier container 40 and outside the container 30 and the outer surface 30*b* of the container 30 and restricted to move in the up and down direction by the action of gravitational force. In this case, the oxygen reactant 20 is regarded as being fixed to the outer surface 30*b* of the container 30. The oxygen reactant 20 may be restricted to move in the horizontal direction by being held between a member (not shown) disposed inside the barrier container 40 and outside the container 30 and the inner surface of the barrier container 40 and restricted to move in the up and down direction by the action of gravitational force. In this case, the oxygen reactant 20 is regarded as being fixed to the inner surface of the barrier container 40. Even in the above-described mode of fixing using the action of gravitational force, the location of the oxygen reactant 20 in the liquid-filled combination container 10L is stably determined. Even in the above-described mode of fixing using the action of gravitational force, movement of the oxygen reactant 20 due to swinging or the like of the liquid-filled combination container 10L is suppressed.

The oxygen absorber 21 is not limited as long as the oxygen absorber 21 contains a composition that can absorb oxygen. An iron-based oxygen absorber or a non-iron-based oxygen absorber can be used as the oxygen absorber 21. The oxygen absorber 21 includes, for example, an oxygen absorber composition that includes an inorganic reductant, such as metal powder, including iron powder or the like, and iron compounds, an organic reductant, such as polyhydric phenols, polyhydric alcohols, ascorbic acids, and their salts, a metal complex, or the like as a base compound for oxygen absorption reaction. The oxygen absorber 21 contains, for example, iron oxide. The oxygen absorber 21 is, for example, an oxygen absorber available from Mitsubishi Gas Chemical Company, Inc. as a product name "AGELESS". The above-described composition is contained in the oxygen absorber 21 as, for example, oxygen absorber bodies 22 shown in FIG. 9.

As shown in FIG. 1, the liquid-filled combination container 10L includes the oxygen absorber 21 accommodated in the barrier container 40 together with the liquid-filled container 30L. The oxygen absorber 21 may include the oxygen absorber bodies 22. In the example shown in FIG. 9, the oxygen absorber 21 includes a package 22*a* having oxygen permeability and the oxygen absorber bodies 22 contained in the package 22*a*. An iron-based moisture dependent FX type, an iron-based self-reaction S type, SPE type, ZP type, ZI-PT type, ZJ-PK type, or E type, an organic self-reaction GLS type, GL-M type, or GE type, or the like, available from Mitsubishi Gas Chemical Company, Inc., may be used as the oxygen absorber 21 including the oxygen absorber bodies 22. A ZH type, Z-PK YA, Z-PR, Z-PKR, ZM type, or the like intended for pharmaceuticals and available from Mitsubishi Gas Chemical Company, Inc. may be used as the oxygen absorber 21 including the oxygen absorber bodies 22.

Figure 10:
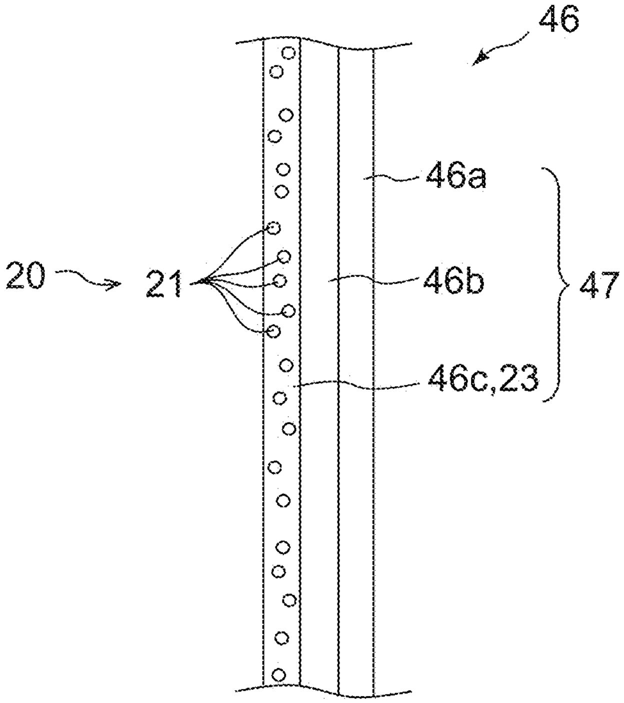
FIG. 10 is a sectional view that shows an example of an oxygen absorbing film that contains an oxygen absorber.

The oxygen absorber 21 may be contained in an oxygen absorbing film 23. FIG. 10 shows an example of a multilayer body 46 including the oxygen absorbing film 23. The multilayer body 46 including the oxygen absorbing film 23 may be a component of at least part of the barrier container 40. For example, the multilayer body 46 including the oxygen absorbing film 23 may form the films 41*a* to 41*e* of the barrier containers 40 respectively shown in FIGS. 1, and 4 to 7. The multilayer body 46 shown in FIG. 10 includes a first layer 46*a*, a second layer 46*b*, and a third layer 46*c*. The first layer 46*a* may be an outermost layer made of polyethylene terephthalate, nylon, or the like. The second layer 46*b* may be an oxygen barrier layer made up of an aluminum foil, an inorganic vapor deposition film, a metal vapor deposition film, or the like. The third layer 46*c* may be an innermost layer that is a heat seal layer. The illustrated third layer 46*c* includes a base material made of thermoplastic resin, and the oxygen absorber 21 dispersed in the base material. As in the case of the example shown in FIG. 10, the barrier container 40 may include the oxygen absorbing film 23 containing the oxygen absorber 21 as a part of the multilayer body 46. The oxygen absorber 21 is not limited to being contained in the heat seal layer or the innermost layer 46*c* and may be contained in an adhesion layer or an intermediate layer of the multilayer body. In another example, the container 30 may include the oxygen absorbing film 23 containing the oxygen absorber 21. The oxygen absorber 21 may be provided separately from the container 30 or the barrier container 40 as in the case of the example shown in FIG. 1 or FIG. 8 or may be provided as a part of the container 30 or the barrier container 40 as shown in FIG. 10. As shown in FIG. 10, when the multilayer body 46 including the oxygen absorbing film 23 containing the oxygen absorber 21 is a component of at least part of the barrier container 40, the oxygen absorber 21 is regarded as being fixed to the inner surface of the barrier container 40. When the container 30 includes the oxygen absorbing film 23 containing the oxygen absorber 21, the oxygen absorber 21 is regarded as being fixed to the outer surface 30*b* of the container 30.

The oxygen absorbing film 23 that is not a component of at least part of the barrier container 40 may be fixed to at least any one of the outer surface 30*b* of the container 30 and the inner surface of the barrier container 40. When the oxygen absorbing film 23 that is not a component of at least part of the barrier container 40 is fixed to the outer surface 30*b* of the container 30, the oxygen absorber 21 is regarded as being fixed to the outer surface 30*b* of the container 30. When the oxygen absorbing film 23 that is not a component of at least part of the barrier container 40 is fixed to the inner surface of the barrier container 40, the oxygen absorber 21 is regarded as being fixed to the inner surface of the barrier container 40.

When the oxygen absorber 21 absorbs oxygen, the oxygen concentration in the barrier container 40 decreases, and oxygen in the container 30 moves to the barrier container 40. By using the oxygen absorber 21, the oxygen concentration in the barrier container 40 and the oxygen concentration in the container 30 can be further effectively reduced. According to the investigation of the inventors of the subject application, when a sufficient amount of the oxygen absorber 21 is used, the oxygen concentration in the barrier container 40 and the oxygen concentration in the container 30 can be maintained to be low and, for example, may be maintained to be lower than 0.3%, lower than or equal to 0.1%, lower than or equal to 0.05%, lower than 0.03%, or 0%. When the oxygen concentration in the container 30 decreases, the oxygen dissolution amount of the liquid L contained in the container 30 also reduces. According to the investigation of the inventors of the subject application, by using a sufficient amount of the oxygen absorber 21, the oxygen dissolution amount of the liquid L can be remarkably reduced and, for example, may be maintained to be less than 0.15 mg/L, less than 0.04 mg/L, less than or equal to 0.03 mg/L, less than or equal to 0.02 mg/L, less than 0.015 mg/L, or further preferably 0 mg/L.

The amount of the oxygen absorber 21 is set to an amount by which the total amount of oxygen present in the container 30 and the barrier container 40 can be absorbed.

The oxygen concentration (%) in the container 30 can be obtained with a method similar to the method of obtaining the oxygen concentration in the container 30 in the inspection method for the liquid-filled combination container 10L according to the first embodiment or the second embodiment (described later). The oxygen concentration (%) in the barrier container 40 can be obtained with a method similar to the method of obtaining the oxygen concentration in the barrier container 40 in the inspection method for the liquid-filled combination container 10L according to a third embodiment (described later). A saturated solubility of oxygen into the liquid L can be identified from the obtained oxygen concentration (%) and temperature of the head space HS. The oxygen dissolution amount (mg/L) of the liquid L can be identified in accordance with the identified saturated solubility.

The oxygen sensing material 25 may display a detected oxygen status. The oxygen sensing material 25 may sense an oxygen concentration. The oxygen sensing material 25 may display a sensed oxygen concentration value. The oxygen sensing material 25 may display a sensed oxygen concentration value by color.

The oxygen sensing material 25 may contain a variable organic dye that reversibly changes in color due to oxidation-reduction. For example, an oxidation-reduction agent contains an organic dye, such as a thiazin dye, an azine dye, and an oxazine dye, and a reducing agent and may be in a solid state. An oxidation-reduction agent may contain an oxygen indicator ink composition. An oxygen indicator ink composition may include a resin solution, a thiazin dye or the like, reducing saccharides, and an alkaline substance. A thiazin dye or the like, reducing saccharides, and an alkaline substance may be dissolved or dispersed in a resin solution. Substances contained in the oxygen sensing material 25 may reversibly vary by oxidation and reduction. By using the oxygen sensing material 25 including reversible substances, when the oxygen sensing material 25 accommodated in the container changes a display color with absorption of oxygen in the container before absorption of oxygen completes, a state related to oxygen in the container can be grasped by observing the amount of oxygen in the container from outside the transparent container. The oxygen sensing material 25 accommodated in the container can notify through a change in display color of an increase in oxygen concentration after absorption of oxygen completes, for example, a pinhole or the like is formed in the container in, for example, a distribution process or the like and oxygen flows into the container. In an example, the oxygen sensing material 25 includes tablets. In an example, the oxygen sensing material 25 turns into pink when the surrounding oxygen concentration is sufficiently low and turns into blue when the surrounding oxygen concentration is high.

More specifically, for example, the oxygen sensing material 25 available from Mitsubishi Gas Chemical Company, Inc. as a product name "AGELESS EYE" may be used as a commercially available tablet-type oxygen sensing material. For example, the oxygen sensing material 25 available from Mitsubishi Gas Chemical Company, Inc. as a product name "PAPER EYE" may be used as the oxygen sensing material to which an ink composition having an oxygen sensing function is applied. "AGELESS EYE" and "PAPER EYE" are functional products capable of easily indicating in color change an anoxic state that the oxygen concentration in a transparent container is lower than 0.1 vol %. A substance that can be used for keeping the freshness of foods, keeping the quality of medical pharmaceuticals, or the like may be used together with an oxygen absorber as the oxygen sensing material 25. For example, a substance that can be used for keeping the freshness of foods, keeping the quality of medical pharmaceuticals, or the like may be used together with the oxygen absorber available from Mitsubishi Gas Chemical Company, Inc. as a product name "AGELESS" as the oxygen sensing material 25.

As shown in FIG. 1, the oxygen sensing material 25 includes a display part 26 observable from outside the transparent barrier container 40. In the example shown in FIG. 1, the oxygen sensing material 25, as in the case of the oxygen absorber 21, is accommodated in the barrier container 40. The oxygen sensing material 25 may be joined to the inner surface of the barrier container 40 or the outer surface of the container 30 by welding or via a jointing material. The oxygen sensing material 25 may be disposed such that the display part 26 does not become unobservable by the oxygen absorber 21. When a label is stuck to the container 30, the oxygen absorber 21 and the oxygen sensing material 25 are preferably disposed so as not to cover the label.

Furthermore, the oxygen sensing material 25 may sense an oxygen status in the container 30. The oxygen sensing material 25 may be contained in the container 30. The oxygen sensing material 25 may display a sensed oxygen status in the container 30. The oxygen sensing material 25 may sense the oxygen concentration in the container 30. The oxygen sensing material 25 may also display a sensed oxygen concentration value in the container 30. The oxygen sensing material 25 may display a sensed oxygen concentration value in the container 30 by color.

The fluorescent material 27 is provided on the inner surface 30*a* of the container 30 at the fluorescent material installation location 39. The fluorescent material installation location 39 is placed apart from the contact region 31*a*. In other words, the fluorescent material installation location 39 at which the fluorescent material 27 is provided on the inner surface 30*a* is a location where the container 30 is bordering on the head space HS. In the liquid-filled container 30L shown in FIG. 1, the fluorescent material installation location 39 is located on the container body 32. In other words, the fluorescent material 27 is provided at a part formed by the container body 32 on the inner surface 30*a* of the container 30. Although not shown in the drawing, the fluorescent material installation location 39 may be located at the stopper 34. In other words, the fluorescent material 27 is provided at a part formed by the stopper 34 of the inner surface 30*a* of the container 30. The container 30 has light transmission properties at least at the fluorescent material installation location 39.

The fluorescent material 27 is a material that varies in fluorescence time or fluorescence intensity according to a surrounding oxygen concentration. The excitation wavelength of the fluorescent material 27 is, for example, longer than or equal to 498 nm and shorter than or equal to 600 nm. Examples of the fluorescent material include FITC, HyLyte Flour 488, ATTO 488, MFP488, Oyster 500, ATTO 520, ATTO 532, DY-500XL, Alexa Fluor 555, HiLyte Plus 555, Cy3, DyLight 547, Rhodamine, TRITC, DY-548, DY-554, DY-555, Alexa Fluor 546, DY-556, NorthenLights 557, Oyster 550, 5-TAMRA, DY-505-X5, DY-547, Oyster 556, DY-549, ATTO 550, B-PE, R-PE, DY-560, TAMRA, MFP555, Spectrum Orange, DY-510XL, ATTO 565, CY3.5, ROX (X-Rhodamine, Rhodamine Red X), DY-590, 5-ROX, Spectrum Red, Texas Red, DyLight 594, Alexa Fluor 594, HiLyte Fluor TR, ATTO 590, MFP590, DY-480XL, DY-481XL, DY-520XL, and DY-521XL, produced by Funakoshi Co., Ltd. The fluorescent material 27 has a size to such an extent that the fluorescence time or the fluorescence intensity of the fluorescent material 27 can be measured with a measurement method (described later).

In the example shown in FIG. 2, the liquid-filled container 30L further includes a bonding layer 28 that bonds the fluorescent material 27 to the inner surface 30*a* of the container 30 at the fluorescent material installation location 39. The bonding layer 28 has light transmission properties. The bonding layer 28 contains a nonfluorescent resin. In an example, the bonding layer 28 contains at least one resin selected from the group consisting of a nonfluorescent acrylic resin, a silicone resin, and an epoxy resin. The bonding layer 28 may contain at least one resin selected from the group consisting of a nonfluorescent light-curing acrylic resin, a light-curing silicone resin, and an epoxy resin. Here, the "nonfluorescent light-curing acrylic resin" means a light-curing acrylic resin to which no treatment for fluorescence resulting from application of light, such as containing a fluorescent agent, is not performed. The "nonfluorescent light-curing acrylic resin" includes a light-curing acrylic resin that emits fluorescence of the material itself that occurs as a result of application of light, that is, autofluorescence, although not treated so as to emit fluorescence resulting from application of light. Whether the acrylic resin light is a curing acrylic resin and whether the silicone resin is a light-curing silicone resin can be discriminated by chemical composition analysis of the resin, particularly, analysis of a monomer contained in the resin.

Specifically, the fluorescent material 27 may be bonded to the inner surface 30*a* of the container 30 at the fluorescent material installation location 39 by the following method. Initially, a nonfluorescent light-curing acrylic resin is disposed between the inner surface 30*a* of the container 30 at the fluorescent material installation location 39 and the fluorescent material 27. Subsequently, the light-curing acrylic resin is cured by application of light to form the bonding layer 28. Alternatively, the fluorescent material 27 may be bonded by disposing a light-curing silicone resin between the inner surface 30*a* of the container 30 at the fluorescent material installation location 39 and the fluorescent material 27 and curing the light-curing silicone resin by application of light. Alternatively, the fluorescent material 27 may be bonded by disposing an epoxy resin between the inner surface 30*a* of the container 30 at the fluorescent material installation location 39 and the fluorescent material 27 and curing the epoxy resin.

As will be described later, in the liquid-filled combination container 10L, light can be applied from outside the barrier container 40 to the fluorescent material 27 by allowing the light to penetrate through the barrier container 40 at the light transmission location 40*b* and the container 30 at the fluorescent material installation location 39.

An inspection method of inspecting the oxygen concentration in the container 30 of the liquid-filled combination container 10L will be described. The inspection method of inspecting the oxygen concentration in the container 30 of the liquid-filled combination container 10L includes a fluorescence measurement step and a measurement step. An inspection method of inspecting the oxygen concentration in the container 30 of the liquid-filled container 30L includes a fluorescence measurement step and a measurement step. The inspection method of inspecting the oxygen concentration in the container 30 of the liquid-filled combination container 10L further includes a step of bringing the barrier container 40 into contact with the outer surface 30*b* of the container 30 at the fluorescent material installation location 39.

In the inspection method of inspecting the oxygen concentration in the container 30 of the liquid-filled combination container 10L, initially, the step of bringing the barrier container 40 into contact with the outer surface 30*b* of the container 30 at the fluorescent material installation location 39. In the step of bringing the barrier container 40 into contact with the outer surface 30*b* of the container 30 at the fluorescent material installation location 39, the barrier container 40 is brought into contact with the outer surface 30*b* of the container 30 at the fluorescent material installation location 39 by bringing a detecting apparatus 80 into contact with the barrier container 40 and pressing the barrier container 40 with the detecting apparatus 80 as shown in FIG. 8. Particularly, the barrier container 40 is brought into contact at the light transmission location 40*b* with the outer surface 30*b* of the container 30 at the fluorescent material installation location 39. The barrier container 40 has flexibility as described above. For this reason, the barrier container 40 is brought into contact with the outer surface 30*b* of the container 30 at the fluorescent material installation location 39 by pressing the barrier container 40 with the detecting apparatus 80.

The detecting apparatus 80 is an apparatus that measures the fluorescence time or the fluorescence intensity of the fluorescent material. In the example shown in FIG. 8, the detecting apparatus 80 has a rod shape. The detecting apparatus 80 includes an illuminating portion 81 and a sensor portion 82. In the example shown in FIG. 8, the illuminating portion 81 and the sensor portion 82 are provided at one end 80*a* of the detecting apparatus 80 having a rod shape.

The illuminating portion 81 is a portion that emits light for causing the fluorescent material 27 to emit fluorescence. Illumination used as the illuminating portion 81 is not limited as long as the illumination emits light with a wavelength by which the fluorescent material 27 is caused to emit fluorescence. For example, an LED light is used as the illuminating portion 81. In an example, when the fluorescent material 27 is FITC produced by Funakoshi Co., Ltd., a light source that emits light with a wavelength of about 500 nm is used as the illuminating portion 81. When the fluorescent material 27 is ATTO 520 produced by Funakoshi Co., Ltd., illumination that emits light with a wavelength of about 520 nm is used as the illuminating portion 81. When the fluorescent material 27 is AlexaFluor 555 produced by Funakoshi Co., Ltd., illumination that emits light with a wavelength of about 550 nm is used as the illuminating portion 81. The illuminating portion 81 may be an LED light that emits green light with a wavelength of 525 nm.

The sensor portion 82 is a portion that measures the fluorescence time or the fluorescence intensity of a fluorescent material. The sensor portion 82 is not limited as long as the sensor portion 82 is a sensor capable of measuring the fluorescence time or the fluorescence intensity of the fluorescent material 27. A sensor used as the sensor portion 82 is, for example, a detector attached to XY-1 SMA trace produced by PreSens. A sensing area of the sensor is, for example, a CCD array.

In the example shown in FIG. 8, one end 80*a* of the detecting apparatus 80 where the illuminating portion 81 and the sensor portion 82 are provided is brought into contact with the barrier container 40, and the barrier container 40 is pressed by the detecting apparatus 80. Thus, the barrier container 40 contacts with the outer surface 30*b* of the container 30 at the fluorescent material installation location 39.

After the barrier container 40 is brought into contact with the outer surface 30*b* of the container 30 at the fluorescent material installation location 39, the fluorescence measurement step is performed. In the fluorescence measurement step, the fluorescence time or the fluorescence intensity of the fluorescent material 27 is measured by applying light for causing the fluorescent material 27 to emit fluorescence to the fluorescent material 27. Application of light for causing the fluorescent material 27 to emit fluorescence is performed by using the illuminating portion 81. Measurement of the fluorescence time or the fluorescence intensity of the fluorescent material 27 is performed by using the sensor portion 82.

In the fluorescence measurement step, light for causing the fluorescent material 27 to emit fluorescence is applied to the fluorescent material 27 by allowing the light to penetrate through the barrier container 40 at the light transmission location 40*b* and the container 30 at the fluorescent material installation location 39. The fluorescence measurement step is performed in a state where the barrier container 40 is in contact with the outer surface 30*b* of the container 30 at the fluorescent material installation location 39. Then, in the fluorescence measurement step, light for causing the fluorescent material 27 to emit fluorescence is applied to the fluorescent material 27 by allowing the light to penetrate through the barrier container 40 and the container 30 at the fluorescent material installation location 39. In the example shown in FIG. 8, the barrier container 40 is in contact with the outer surface 30*b* of the container 30 at the fluorescent material installation location 39 by being pressed by the detecting apparatus 80.

In the example shown in FIG. 8, in a state where the detecting apparatus 80 is brought into contact with a part where the barrier container 40 contacts with the fluorescent material installation location 39, light is applied to the fluorescent material 27 by using the illuminating portion 81. Thus, light from the illuminating portion 81 is applied to the fluorescent material 27 by allowing the light to penetrate through a part that contacts with the container 30 at the fluorescent material installation location 39 and that contacts with the barrier container 40 at the fluorescent material installation location 39. Light generated by fluorescence of the fluorescent material 27 penetrates through a part of the container 30 at the fluorescent material installation location 39 and a part of the barrier container 40 at the fluorescent material installation location 39 and reaches the sensor portion 82. For this reason, the fluorescence time or the fluorescence intensity of the fluorescent material 27 can be measured by using the sensor portion 82. When the illuminating portion 81 is an LED light that emits green light with a wavelength of 525 nm, the fluorescent material 27 emits light with a wavelength longer than 525 nm, for example, red light.

In the measurement step, the oxygen concentration in the container 30 is inspected in accordance with the fluorescence time or the fluorescence intensity of the fluorescent material 27, measured in the fluorescence measurement step. As described above, the fluorescent material 27 varies in fluorescence time or fluorescence intensity according to a surrounding oxygen concentration. In the measurement step, the oxygen concentration (%) in the container 30 is measured in accordance with a correspondence relationship between a surrounding oxygen concentration and the fluorescence time or the fluorescence intensity, in the fluorescent material 27. The oxygen concentration (%) in the container 30, measured in the measurement step, is an oxygen concentration (%) in gas contained in the head space HS in the container 30.

For the liquid-filled combination container 10L in which the barrier container 40 does not contact with the outer surface 30*b* of the container 30 at the fluorescent material installation location 39, when the oxygen concentration in the container 30 is inspected, the step of bringing the barrier container 40 into contact with the outer surface 30*b* of the container 30 at the fluorescent material installation location 39 is not performed. In this case as well, in the fluorescence measurement step, the oxygen concentration in the container 30 can be inspected by applying light for causing the fluorescent material 27 to emit fluorescence to the fluorescent material 27 by allowing the light to penetrate through the container 30 at the fluorescent material installation location 39.

With the above-described inspection method, the state of the liquid-filled container 30L or liquid-filled combination container 10L can be inspected by inspecting the oxygen concentration (%) in the container 30, measured in the measurement step. For example, whether the oxygen concentration in the container 30 is sufficiently reduced by the oxygen absorber 21 or the like can be inspected from the measured oxygen concentration (%) in the container 30. For example, when the oxygen concentration (%) in the container 30, measured in the measurement step, is lower than 0.3%, it can be determined that the oxygen concentration in the container 30 is sufficiently reduced. When the measured oxygen concentration (%) in the container 30 is lower than or equal to 0.1%, lower than or equal to 0.05%, or lower than 0.03%, it may be determined that the oxygen concentration in the container 30 is sufficiently reduced.

In the above-described inspection method, whether the oxygen dissolution amount (mg/L) of the liquid L in the liquid-filled container 30L is sufficiently reduced by the oxygen absorber 21 or the like may be inspected from the oxygen concentration (%) in the container 30, measured in the measurement step. Whether the oxygen dissolution amount (mg/L) of the liquid L is sufficiently reduced can be inspected in accordance with, for example, a temporal change in the oxygen concentration (%) in the container 30. When a time elapsed from when the liquid-filled combination container 10L is manufactured is sufficiently long, movement of oxygen between the head space HS and the liquid L in the container 30 reaches an equilibrium state. In an example, in such an equilibrium state, when the oxygen concentration (%) in the container 30 is sufficiently reduced, it can be determined that the oxygen dissolution amount (mg/L) of the liquid L is sufficiently reduced. A temporal change in the oxygen concentration (%) in the container 30 is obtained by measuring the oxygen concentration (%) in the container 30 with the above-described method at a plurality of different time points in the time elapsed from when the liquid-filled combination container 10L is manufactured. In this case, measurement of the oxygen concentration (%) in the container 30 is performed, for example, day by day.

A specific method of inspecting whether the oxygen dissolution amount (mg/L) of the liquid L is sufficiently reduced in accordance with a temporal change in the oxygen concentration (%) in the container 30 will be described. Initially, in a temporal change in the oxygen concentration (%) in the container 30, a time point at which the oxygen concentration (%) in the container 30 becomes lower than a reference value is identified. Then, a temporal change in the oxygen concentration (%) in the container 30 is observed for 14 days or longer from the time point at which the oxygen concentration (%) in the container 30 becomes lower than the reference value, and, when the oxygen concentration (%) in the container 30 does not become higher than or equal to the reference value, it can be determined that the oxygen dissolution amount (mg/L) of the liquid L is sufficiently reduced. The reference value of the oxygen concentration (%) in the container 30 in this case is, for example, 0.3%. The reference value of the oxygen concentration (%) in the container 30 may be 0.1%, may be 0.05%, or may be 0.03%.

A rate of reduction in the oxygen concentration (%) in the container 30 may be calculated in accordance with the temporal change in the oxygen concentration (%) in the container 30, obtained by measuring the oxygen concentration (%) in the container 30 with the above-described method, and whether the rate of reduction is sufficiently high may be inspected.

The "rate of reduction" used for the oxygen concentration (%) means a proportion (%) of the rate of reduction (%) in oxygen concentration value for 24 hours from the last day before a target day to the target day with respect to an oxygen concentration value (%) for the last day before the target day. In other words, "(Rate of reduction)=((Oxygen concentration for the last day before a target day)−(Oxygen concentration for the target day))/(Oxygen concentration for the last day before the target day)×100(%)". The unit of the "rate of reduction" is (%/day). The rate of reduction (%/day) can be adjusted by the amount of the oxygen absorber 21, the volume of the container 30, the volume of the barrier container 40, the amount of the liquid L, the oxygen permeability of the container 30, or the like.

For example, if the rate of reduction higher than or equal to 15%/day is maintained from when the barrier container 40 accommodating the container 30 is closed to when the oxygen concentration in the container 30 becomes lower than or equal to 0.1%, it can be determined that the rate of reduction in the oxygen concentration (%) in the container 30 is sufficiently high. The reference value of the rate of reduction until the oxygen concentration in the container 30 becomes lower than or equal to 0.1%, in which the rate of reduction in the oxygen concentration (%) in the container 30 is determined to be sufficiently high, may be higher than or equal to 20%/day, may be higher than or equal to 25%/day, may be higher than or equal to 30%/day, may be higher than or equal to 35%/day, or may be higher than or equal to 40%/day.

In the measurement step, an oxygen partial pressure in the container 30 may be measured together with the oxygen concentration in the container 30, and the state of the liquid-filled container 30L or the liquid-filled combination container 10L may be inspected in accordance with the oxygen partial pressure in the container 30.

A manufacturing method for the liquid-filled combination container 10L will be described. The liquid-filled container 30L of which the oxygen concentration is adjusted is obtained by manufacturing the liquid-filled combination container 10L. The manufacturing method for the liquid-filled combination container 10L may include an inspection step of inspecting the liquid-filled combination container 10L with the above-described inspection method.

Initially, the liquid-filled container 30L and the barrier container 40 before being closed are prepared. The liquid-filled container 30L is manufactured by filling the container 30 with the liquid L. For example, the liquid L, such as a food and a drug, is manufactured by using a manufacturing line installed in an aseptic environment maintained at a positive pressure. The aseptic environment is maintained at a positive pressure from the viewpoint of suppressing entry of foreign matter, such as fungi. As a result, the obtained internal pressure of the liquid-filled container 30L is a positive pressure as in the case of the manufacturing environment.

A partial volume (the volume of the head space HS) of the container 30, obtained by subtracting the volume of the liquid L from the volume of the container 30, may be less than or equal to 50 mL, may be 30 mL, may be 10 mL, or may be less than or equal to 5 mL. By adjusting the partial volume of the container 30 in this way, when the barrier container 40 accommodating the container 30 in a step (described later), a time from when the barrier container 40 is closed to when permeation of oxygen through the container 30 becomes equilibrium can be shortened.

The volume of the liquid L contained in the container 30 may be less than or equal to 20 mL or may be less than or equal to 10 mL. By adjusting the volume of the liquid L in this way, a time from when the barrier container 40 accommodating the container 30 is closed to when permeation of oxygen through the container 30 becomes equilibrium can be shortened.

An upper limit and a lower limit may be set for the proportion (%) of the partial volume of the container 30 (the volume of the head space HS) (mL) obtained by subtracting the volume of the liquid L from the volume of the container 30 with respect to the partial volume (mL) of the barrier container 40, obtained by subtracting a volume occupied by the container 30 from the volume of the barrier container 40. This proportion may be lower than or equal to 50% or may be lower than or equal to 20%. By setting such an upper limit, the oxygen concentration in the container 30 can be sufficiently and quickly reduced. An accommodation space for the container 30 can be ensured in the barrier container 40, so the container 30 can be easily accommodated in the barrier container 40. Furthermore, a time from when the barrier container 40 accommodating the container 30 is closed to when permeation of oxygen through the container 30 becomes equilibrium can be shortened. Thus, decomposition of the liquid L by oxygen can be suppressed. This proportion may be higher than or equal to 5% or may be higher than or equal to 10%. By setting a lower limit in this way, the barrier container 40 does not become excessively large with respect to the container 30, so handling of the liquid-filled combination container 10L can be improved.

Figure 11:
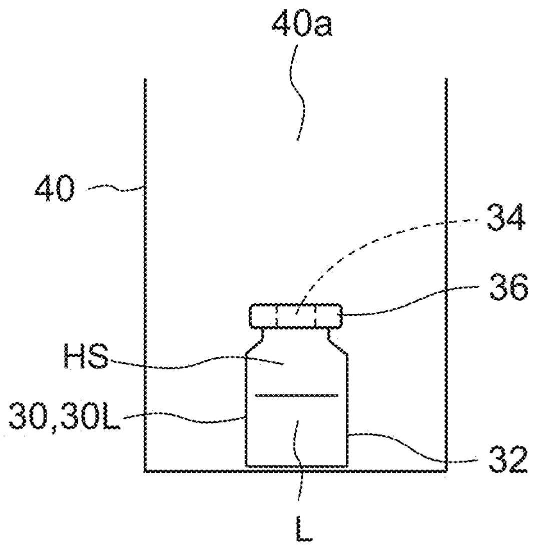
FIG. 11 is a view that illustrates an example of the liquid-filled combination container of FIG. 1 and a manufacturing method for the liquid-filled container of FIG. 2.

Subsequently, as shown in FIG. 11, the obtained liquid-filled container 30L is accommodated in the barrier container 40. As shown in FIG. 11, the barrier container 40 before being closed still includes the opening 40*a* for accommodating the liquid-filled container 30L. In the barrier container 40 shown in FIG. 1, for example, the upper edges of the films 41*a* to 41*d* form the opening 40*a* without being joined to one another. Then, as shown in FIG. 11, the liquid-filled container 30L is accommodated in the barrier container 40 via the opening 40*a*.

At least one oxygen reactant 20 that can react with oxygen in the barrier container 40 is provided. In an example, the oxygen absorber 21 that absorbs oxygen in the barrier container 40 is provided. For example, when at least one of the container 30 and the barrier container 40 includes the oxygen absorbing film 23 (see FIG. 10), no special work is needed for providing the oxygen absorber 21. When the oxygen absorber 21 shown in FIGS. 1 and 8 is used, the oxygen absorber 21 is accommodated in the barrier container 40. Any of disposing the oxygen reactant 20, such as the oxygen absorber 21, in the barrier container 40 and disposing the liquid-filled container 30L in the barrier container 40 may be performed first or both may be performed in parallel.

The amount of the oxygen absorber 21 is set to an amount by which the total amount of oxygen present in the container 30 and the barrier container 40 can be absorbed.

Before a step of closing the barrier container 40 (described later), the inside of the barrier container 40 may be replaced with inert gas. The oxygen concentration (%) in the barrier container 40 can be sufficiently reduced as compared to atmospheric pressure by replacement with inert gas. This induces movement of oxygen from the container 30 to the barrier container 40, so the amount of oxygen in the container 30 can be quickly reduced. Since the amount of oxygen in the container 30 is quickly reduced, decomposition of the liquid L by oxygen can be further effectively suppressed. The inert gas is stable gas lower in reactivity. Examples of the inert gas include nitrogen, and noble gases, such as helium, neon, and argon.

Replacement with inert gas can be achieved by, for example blowing inert gas into the barrier container 40, closing the barrier container 40 in a chamber in which the atmosphere is replaced with inert gas, or the like. With these, the oxygen concentration in the barrier container 40 can be reduced to higher than or equal to 0.5% and lower than or equal to 1.0%. Inert gas replacement in the barrier container 40 can be smoothly performed because the barrier container 40 does not directly contain liquid.

After that, as shown in FIGS. 1 and 8, the barrier container 40 accommodating the liquid-filled container 30L is closed. With the barrier container 40 shown in FIG. 1, the barrier container 40 is closed by closing the opening 40*a* in a manner such that the upper edges of the films 41*a* to 41*d* are joined to one another. Jointing may be performed by using a jointing material, such as an adhesion material and a bonding material, or may be performed by welding, such as a heat seal and ultrasonic bonding. The barrier container 40 is closed to be in an airtight state.

In the step of closing the barrier container 40 accommodating the liquid-filled container 30L, gas having a smaller volume than a volume obtained by subtracting the volume of the liquid-filled container 30L from the maximum volume that the inside of the barrier container 40 can take may be enclosed. In an example, in the step of closing the barrier container 40 accommodating the liquid-filled container 30L, gas is discharged from the inside of the barrier container 40, and then the barrier container 40 is closed. Thus, in a state where gas having a smaller volume than a volume obtained by subtracting the volume of the liquid-filled container 30L from the maximum volume that the inside of the barrier container 40 can take is enclosed, the barrier container 40 can be closed. In this case, preferably, gas having a volume that is 5% or higher than the maximum volume that the inside of the barrier container 40 can take is discharged from the inside of the barrier container 40, and then the barrier container 40 is closed. More preferably, gas having a volume that is 10% or higher than the maximum volume that the inside of the barrier container 40 can take is discharged from the inside of the barrier container 40. Further preferably, gas having a volume that is 20% or higher than the maximum volume that the inside of the barrier container 40 can take is discharged from the inside of the barrier container 40.

When gas having a smaller volume than a volume obtained by subtracting the volume of the liquid-filled container 30L from the maximum volume that the inside of the barrier container 40 can take is enclosed, the following advantageous effect is obtained. The oxygen concentration in the head space HS in the container 30 is decreased by the action of the liquid-filled combination container 10L, and, when the oxygen dissolution amount of the liquid L is decreased, the rate of decrease in the oxygen concentration in the head space HS and the rate of reduction in the oxygen dissolution amount of the liquid L can be increased. The volume of the space formed between the barrier container 40 and the container 30 reduces. Thus, as in the case of a fourth embodiment and a fifth embodiment (described later), when the oxygen reactant 20 is held in the space formed between the barrier container 40 and the container 30, the oxygen reactant 20 can be further stably held in the space formed between the barrier container 40 and the container 30.

The step until the barrier container 40 is closed may be performed in an aseptic environment. In other words, the liquid-filled container 30L manufactured in an aseptic condition, the barrier container 40 sterilized or manufactured in an aseptic condition, and the oxygen reactant 20, such as the oxygen absorber 21, are put into an aseptic environment, such as an aseptic chamber. The barrier container 40 accommodating the liquid-filled container 30L is closed in an aseptic environment. The inside of the barrier container 40 accommodating the liquid-filled container 30L is also in an aseptic condition. In other words, the liquid-filled container 30L can be kept in the barrier container 40 in an aseptic condition.

After that, the liquid-filled container 30L is kept in the barrier container 40. The barrier container 40 has oxygen barrier properties. Movement of oxygen in an environment in which the barrier container 40 is disposed into the barrier container 40 is suppressed. The oxygen absorber 21 absorbs oxygen in the barrier container 40. Therefore, the oxygen concentration (%) in the barrier container 40 that is the outside of the container 30 is reduced by absorption of oxygen with the oxygen absorber 21 and becomes lower than the oxygen concentration (%) in the container 30. The container 30 has oxygen permeability. Therefore, oxygen in the container 30 permeates through the container 30 and moves into the barrier container 40. With movement of oxygen from the container 30 to the barrier container 40, the oxygen concentration in the container 30 decreases. In this way, by keeping the liquid-filled container 30L in the barrier container 40, the amount of oxygen in the container 30 accommodated in the barrier container 40 can be adjusted. In a final equilibrium state where permeation of oxygen through the container 30 counterbalances, the oxygen concentration in the container 30 can coincide with the oxygen concentration in the barrier container 40.

In addition, once the oxygen concentration in the container 30 decreases, the oxygen partial pressure in the container 30 decreases. Once the oxygen partial pressure in the container 30 decreases, the saturated solubility (mg/L) of oxygen to the liquid L in the container 30 also decreases. As a result, the oxygen dissolution amount (mg/L) of the liquid L can be reduced.

Adjustment of the amount of oxygen in the container 30 inside the barrier container 40 may be performed until permeation of oxygen through the container 30 counterbalances. Adjustment of the amount of oxygen in the container 30 inside the barrier container 40 may be performed until the oxygen concentration (%) in the container 30 decreases to a predetermined value. Adjustment of the amount of oxygen in the container 30 inside the barrier container 40 may be performed until the oxygen dissolution amount (mg/L) of the liquid L in the container 30 decreases to a predetermined value. Adjustment of the amount of oxygen in the container 30 inside the barrier container 40 may be performed until the liquid L in the liquid-filled combination container 10L is used. While the amount of oxygen in the container 30 inside the barrier container 40 is being adjusted, the liquid-filled combination container 10L may be distributed.

Whether permeation of oxygen through the container 30 is in an equilibrium state can be determined in accordance with the oxygen concentration in the container 30, measured in the inspection step (described later). In this determination, when a difference between an oxygen concentration value (%) in the container 30 at one time point and an oxygen concentration value (%) in the container 30 at a time point 24 hours before the one time point is smaller than or equal to +5% of the oxygen concentration value (%) in the container 30 at the one time point, it is determined to be in an equilibrium state.

Since the part of the container 30 having oxygen permeability is at least partially placed apart from the barrier container 40, movement of oxygen from the inside of the container 30 to the inside of the barrier container 40 can be facilitated. In the example shown in FIG. 1, a gap G is formed between the barrier container 40 and the stopper 34, having oxygen permeability, of the container 30 accommodated in the barrier container 40. According to this example, it is possible to reduce a situation in which the barrier container 40 having oxygen barrier properties covers the stopper 34 having oxygen permeability. Thus, interference of the barrier container 40 with permeation of oxygen through the container 30 can be suppressed. Therefore, by providing the gap G, a reduction in the amount of oxygen in the container 30 can be facilitated.

The gap G can be ensured by increasing the space for accommodating the barrier container 40 as compared to the outer shape of the container 30. When the barrier container 40 is made of a flexible material, such as a resin film, the gap G between the stopper 34 and the barrier container 40 can be formed by adjusting the shape of the barrier container 40.

As described above, the manufacturing method for the liquid-filled combination container 10L may include an inspection step of inspecting the liquid-filled combination container 10L with the above-described inspection method. In other words, after the liquid-filled container 30L is accommodated in the barrier container 40, the inspection step of inspecting the oxygen concentration in the container 30 may be performed by the above-described inspection method to complete manufacturing of the liquid-filled combination container 10L.

Specifically, after the liquid-filled container 30L is accommodated in the barrier container 40, the oxygen concentration (%) in the container 30 may be measured with the above-described inspection method to inspect whether the oxygen concentration (%) in the container 30 is sufficiently reduced. A temporal change in the oxygen concentration (%) in the container 30 may be obtained, and whether the oxygen dissolution amount (mg/L) of the liquid L is sufficiently reduced may be inspected in accordance with the temporal change in the oxygen concentration (%) in the container 30. A rate of reduction in the oxygen concentration (%) in the container 30 may be calculated in accordance with the temporal change in the oxygen concentration (%) in the container 30, and whether the rate of reduction is sufficiently high may be inspected.

As described above, the liquid-filled container 30L and the liquid-filled combination container 10L, of which the oxygen concentration and the oxygen dissolution amount are adjusted, can be obtained.

A manufacturing method for the liquid-filled combination container 10L includes a step of closing the barrier container 40 accommodating the container 30, and a step of adjusting the amount of oxygen in the container 30 accommodated in the barrier container 40. Then, at least one oxygen reactant 20 that can react with oxygen in the barrier container 40 is provided. In an example, the oxygen absorber 21 that absorbs oxygen in the barrier container 40 is provided. In the step of adjusting the amount of oxygen, the oxygen concentration in the container 30 decreases as a result of permeation of oxygen in the container 30 through the container 30, with the result that the oxygen dissolution amount by which oxygen is dissolved in the liquid L can be reduced. According to the present embodiment, the oxygen concentration in the container 30 can be reduced to, for example, lower than 0.3%, lower than or equal to 0.1%, lower than or equal to 0.05%, lower than 0.03%, or 0%. According to the present embodiment, the oxygen concentration in the barrier container 40 and the oxygen concentration in the container 30 can be sufficiently reduced and can be reduced to, for example, lower than 0.3%, lower than or equal to 0.1%, lower than or equal to 0.05%, lower than 0.03%, or 0%. The oxygen dissolution amount of the liquid L in the container 30 can be sufficiently reduced and can be reduced to, for example, less than 0.15 mg/L, less than or equal to 0.04 mg/L, preferably less than or equal to 0.03 mg/L, more preferably less than or equal to 0.02 mg/L, more preferably less than 0.015 mg/L, or further preferably 0 mg/L. Thus, decomposition by oxygen in the liquid L in the container 30 can be suppressed. Since the oxygen absorber 21 can be disposed outside the container 30, the oxygen absorber 21 does not impair the aseptic condition inside the container 30.

The operations of the liquid-filled container 30L and the liquid-filled combination container 10L will be described. The liquid L can be decomposed by oxygen. The solvent of the liquid L serving as an aqueous solution can be decomposed by oxygen. A solid content, such as particles, contained in the liquid L serving as a suspension can be decomposed by oxygen. Decomposition by oxygen is a further remarkable problem in the liquid L, such as a food and a drug. The hypersensitive liquid L is easily decomposed by oxygen.

With the liquid-filled container 30L and the liquid-filled combination container 10L, the oxygen concentration in the container 30 can be sufficiently reduced as described above. Thus, the oxygen dissolution amount of the liquid L contained in the container 30 can be sufficiently reduced. The amount of oxygen in the container 30, that is, the total amount of oxygen in the head space HS and oxygen dissolved in the liquid L can be reduced. Thus, decomposition of the liquid L by oxygen can be suppressed.

The oxygen concentration in the space not occupied by the liquid L in the container 30, that is, the head space HS shown in FIGS. 1 and 2, is decreased to about lower than or equal to 1.5% by replacing the head space HS with inert gas, bubbling the liquid L with inert gas, or the like before the stopper 34 is attached to the container body 32. In an example, the oxygen concentration in the head space HS decreases to higher than or equal to 0.5% and lower than or equal to 1%. With the configuration in which liquid is manufactured in an atmosphere replaced with inert gas and the liquid is contained in the container having oxygen barrier properties, the oxygen dissolution amount of the liquid contained in the container presumably can be reduced. However, installing the entire line for manufacturing liquid in an atmosphere replaced with inert gas needs extensive renovation of manufacturing equipment and enormous capital investment. In the field of expensive drugs and the like, the drugs are frozen and dried into a powder form and stored in order to ensure safety against temperature, oxygen, moisture, light, and the like. However, forming liquid drugs into a powder form for storage and returning power drugs to liquid at the time of use have a large disadvantage in terms of work, time, and cost.

In contrast, according to the present embodiment, the container 30 containing the liquid L can be manufactured by using existing equipment and the like without a significant change of an existing technique. Therefore, equipment renovation and capital investment can be avoided. Particularly, in application to liquid, such as drugs, it is useful in terms of making it possible to omit an application for approval to a public institution related to a change in manufacturing equipment or a manufacturing process. It is also possible to omit work to freeze and dry the liquid L or return powder to liquid. Furthermore, the container 30 is not subjected to any special restriction. Therefore, materials, such as glass and resins, that are widespread as containers for foods, drugs, and the like because of a small elution amount can be adopted. When the container body 32 has barrier properties, the material of the container body 32 is, for example, glass. When the container body 32 does not have barrier properties, the material of the container body 32 is, for example, polyethylene, polypropylene, or the like.

Next, a method of using the liquid-filled combination container 10L will be described.

In using the liquid L contained in the combination container 10, initially, the barrier container 40 is opened. subsequently, the liquid-filled container 30L is taken out from the opened barrier container 40. After that, the liquid L can be taken out from the liquid-filled container 30L and used. As for the illustrated container 30, the fixing tool 36 is detached from the container body 32, and the stopper 34 is further detached from the container body 32, with the result that the container 30 can be opened. Thus, the liquid L in the container 30 can be used.

Figure 12:
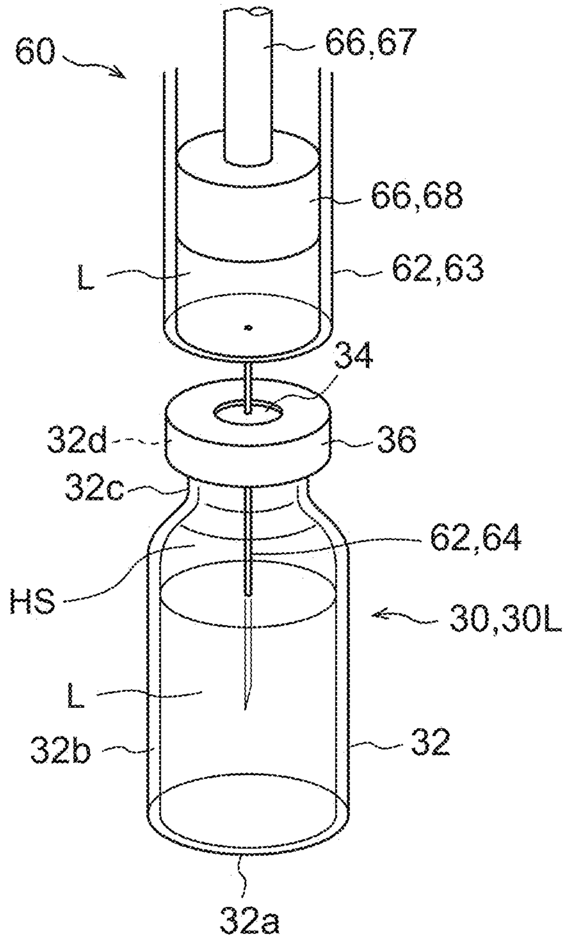
FIG. 12 is a perspective view that shows a method of using the liquid-filled container of FIG. 2.

As shown in FIG. 12, the liquid L may be a drug to be injected into a syringe 60. The liquid L may be liquid contained in the container 30 that is a vial bottle. The liquid L may be an injection among drugs. Examples of the injection include anticancer drug, antiviral drug, vaccine, and antipsychotic drug. The syringe 60 includes a cylinder 62 and a piston 66. The cylinder 62 includes a cylinder body 63 and a needle 64 protruding from the cylinder body 63. The cylindrical needle 64 allows to access the space for containing the liquid L in the cylinder body 63. The piston 66 includes a piston body 67 and a gasket 68 held by the piston body 67. The gasket 68 can be made of rubber or the like. The gasket 68 is inserted in the cylinder body 63 and defines a space for containing the liquid L in the cylinder body 63. The liquid L injected into the syringe 60 may be transferred from the syringe 60 to another syringe, container, or the like before being administered to a patient or the like. In this example, the liquid L injected into the syringe 60 may be administered from another syringe, a container, or the like to a patient.

Incidentally, the pressure in the liquid-filled container 30L may be adjusted. In an example, the pressure in the liquid-filled container 30L may be maintained to be low. The pressure in the liquid-filled container 30L may be maintained at a negative pressure. According to this example, unintended leakage of liquid when the liquid is stored in the liquid-filled container 30L, a splash of the liquid L when the container 30 is opened, and the like can be effectively suppressed. A problem of leakage or splash is more serious in liquid having some toxicity, for example, a drug with a high pharmacological activity.

Hypersensitive liquid that degrades as a result of post sterilization performed after manufacturing using, for example, gas, heat, gamma ray, or the like, that is, for example, foods and drugs, more specifically, anticancer drugs, antiviral drugs, vaccines, antipsychotic drugs, and the like are manufactured in an aseptic environment and enclosed in the container. In other words, liquid to which final sterilization cannot be applied is manufactured by aseptic manipulation. An aseptic environment in the aseptic manipulation is ordinarily maintained at a positive pressure in order to suppress entry of fungi. Therefore, the pressure in the container containing the liquid L is a predetermined positive pressure compatible with the aseptic environment.

According to the present embodiment, such an inconvenience can also be handled. As described above, the liquid-filled container 30L is stored in the barrier container 40. During the storage, oxygen in the container 30 permeates through the container 30 and moves into the barrier container 40. The pressure in the container 30 can be decreased by permeation of oxygen. In other words, the pressure in the container 30 containing the liquid L can be adjusted after the container 30 is closed to enclose the liquid L.

Next, the advantageous effects of the inspection method for the liquid-filled container 30L and the inspection method for the liquid-filled combination container 10L according to the first embodiment will be described. The inspection method according to the first embodiment includes a fluorescence measurement step of measuring the fluorescence time or the fluorescence intensity of the fluorescent material 27 by applying light to the fluorescent material 27 provided on the inner surface 30*a* of the container 30. The inspection method according to the first embodiment also includes a measurement step of measuring the oxygen concentration in the container 30 in accordance with the fluorescence time or the fluorescence intensity of the fluorescent material 27, measured in the fluorescence measurement step. Thus, the oxygen concentration in the container 30 can be measured and inspected without opening the container 30.

In addition, in the inspection method according to the first embodiment, in a state where the detecting apparatus 80 including the illuminating portion 81 and the sensor portion 82 is brought into contact with a part of the barrier container 40, which contacts with the fluorescent material installation location 39, the fluorescence time or the fluorescence intensity of the fluorescent material 27 is measured by using the sensor portion 82 by applying light to the fluorescent material 27 with the illuminating portion 81. Since the detecting apparatus 80 is in contact with the part of the barrier container 40, which contacts with the fluorescent material installation location 39, the positional relationship among the fluorescent material 27, the illuminating portion 81, and the sensor portion 82 is determined. For this reason, when the oxygen concentration in the container 30 of the same liquid-filled combination container 10L is measured at a plurality of time points, the positional relationship among the fluorescent material 27, the illuminating portion 81, and the sensor portion 82 at each time point of measurement can be aligned. When the oxygen concentrations in the containers 30 of the plurality of liquid-filled combination containers 10L are measured, the positional relationship among the fluorescent material 27, the illuminating portion 81, and the sensor portion 82 at the time point of measurement can be aligned. Thus, when the oxygen concentration in the container 30 of the same liquid-filled combination container 10L is measured at a plurality of time points or the oxygen concentrations in the containers 30 of the plurality of liquid-filled combination containers 10L are measured, conditions for measuring the oxygen concentration can be aligned. Thus, the measurement accuracy of the oxygen concentration can be improved. Since the detecting apparatus 80 is in contact with the part of the barrier container 40, which contacts with the fluorescent material installation location 39, the oxygen concentration can be measured in a state where the distance between both the illuminating portion 81 and the sensor portion 82 and the fluorescent material 27 is sufficiently small. Thus, the measurement accuracy of the oxygen concentration can be improved.

In addition, the inspection method according to the first embodiment further includes a step of bringing the detecting apparatus 80 into contact with the deformable barrier container 40 and bringing the barrier container 40 into contact with the outer surface 30*b* of the container 30 at the fluorescent material installation location 39 by pressing the barrier container 40 with the detecting apparatus 80. Thus, the barrier container 40 can be brought into contact with the container 30 at the fluorescent material installation location 39. In addition, the detecting apparatus 80 can be brought into contact with a part of the barrier container 40, which contacts with the fluorescent material installation location 39. Thus, as described above, the positional relationship among the fluorescent material 27, the illuminating portion 81, and the sensor portion 82 is determined.

The manufacturing method for the liquid-filled combination container 10L according to the first embodiment inspects the liquid-filled combination container 10L with the above-described inspection method. Thus, the oxygen concentration in the container 30 can be measured and inspected without opening the container 30, and then the liquid-filled combination container 10L can be manufactured.

Next, the advantageous effects of the liquid-filled container 30L and the liquid-filled combination container 10L according to the first embodiment in performing the above-described inspection method will be described. The liquid-filled container 30L and the liquid-filled combination container 10L according to the first embodiment include the fluorescent material 27 provided on the inner surface 30*a* of the container 30 of the container 30. For this reason, with the above-described inspection method, the oxygen concentration in the container 30 can be measured and inspected without opening the container 30. The oxygen concentration in the container 30 can be measured and inspected without opening the barrier container 40.

In addition, the oxygen reactant 20 is fixed to at least any one of the outer surface 30*b* of the container 30 and the inner surface of the barrier container 40. This advantageous effect will be described. Assuming that the oxygen reactant 20 is not fixed to any of the outer surface 30*b* of the container 30 and the inner surface of the barrier container 40. In this case, even when the oxygen reactant 20 is disposed at a location where the oxygen reactant 20 does not interfere with application of light for causing the fluorescent material 27 to emit fluorescence to the fluorescent material 27, the oxygen reactant 20 can move to a location where the oxygen reactant 20 interferes with application of light for causing the fluorescent material 27 to emit fluorescence to the fluorescent material 27. Particularly, when the oxygen reactant 20 moves to a location where the oxygen reactant 20 interferes with application of light to the fluorescent material 27 after the barrier container 40 is closed, it is difficult to correct the location of the oxygen reactant 20 without opening the barrier container 40. In contrast, the oxygen reactant 20 according to the first embodiment is fixed to at least any one of the outer surface 30*b* of the container 30 and the inner surface of the barrier container 40. Thus, it is possible to suppress movement of the oxygen reactant 20 to a location where the oxygen reactant 20 interferes with application of light to the fluorescent material 27. Particularly, by fixing the oxygen reactant 20 at a location where the oxygen reactant 20 does not interfere with application of light for causing the fluorescent material 27 to emit fluorescence to the fluorescent material 27, the light can be applied to the fluorescent material 27 without interference of the oxygen reactant 20.

In addition, the fluorescent material 27 is provided on the inner surface 30*a* of the container 30 at the fluorescent material installation location 39 apart from the contact region 31*a* of the containing portion 31. For this reason, since the liquid L contained in the containing portion 31 is present around the fluorescent material 27, a decrease in the measurement accuracy of the oxygen concentration in gas contained in the head space HS in the container 30 is suppressed.

In addition, the container 30 includes the coating layer 38 that is a component of the inner surface 30*a* of the container 30 and that suppresses adhesion of the liquid L to the inner surface 30*a* of the container 30. This suppresses a situation in which the liquid L adheres to the inner surface 30*a* of the container 30 around the fluorescent material installation location 39 and the liquid L adhering to the inner surface 30*a* further transfers to the fluorescent material 27. For this reason, a decrease in the measurement accuracy of the oxygen concentration in gas contained in the head space HS in the container 30 due to adhesion of the liquid L to the fluorescent material 27 is suppressed.

In addition, the container 30 includes at least any one material of glass and cyclic olefin polymer. The above-described material has a small intensity of fluorescence of the material itself, that is, a small intensity of autofluorescence, generated as a result of application of light. Particularly, the intensity of autofluorescence generated as a result of application of green light with a wavelength of 525 nm is small. For this reason, by using the above-described material as the material of the container 30, a decrease in the accuracy of measuring the fluorescence time or the fluorescence intensity of the fluorescent material 27 due to the influence of autofluorescence of the material of the container 30 can be suppressed. Thus, the measurement accuracy of the oxygen concentration can be improved. Particularly, glass has a small intensity of autofluorescence. For this reason, it is particularly preferable that the container 30 contain glass. When the container 30 contains glass, a decrease in the accuracy of inspecting the fluorescence time or the fluorescence intensity of the fluorescent material 27 can be further effectively suppressed.

In addition, the barrier container 40 contains at least any one resin of acrylic resin and polyethylene terephthalate resin. When the above-described material is used as the material of the barrier container 40, the oxygen barrier properties of the barrier container 40 can be ensured. When the above-described material is used as the material of the barrier container 40, the thickness of the wall of the barrier container 40 can be reduced. For this reason, it is easy to ensure the transparency of the barrier container 40. Therefore, light can be efficiently applied from outside the barrier container 40 to the fluorescent material 27. The fluorescence time or the fluorescence intensity of the fluorescent material 27 can be accurately measured from outside the barrier container 40. It is easy to impart flexibility to the barrier container 40 such that the barrier container 40 is deformable so as to contact with the outer surface 30*b* of the container 30 at the at the fluorescent material installation location 39. The above-described material has a small intensity of autofluorescence. Particularly, the intensity of autofluorescence generated as a result of application of green light with a wavelength of 525 nm is small. For this reason, by using the above-described material as the material of the barrier container 40, a decrease in the accuracy of measuring the fluorescence time or the fluorescence intensity of the fluorescent material 27 due to the influence of autofluorescence of the material of the barrier container 40 can be suppressed. Thus, the measurement accuracy of the oxygen concentration can be improved.

In addition, the bonding layer 28 that bonds the fluorescent material 27 to the inner surface 30*a* of the container 30 contains at least one resin selected from the group consisting of a nonfluorescent light-curing acrylic resin, a light-curing silicone resin, and an epoxy resin. When the above-described material is used as the material of the bonding layer 28, the transparency of the bonding layer 28 can be ensured. For this reason, light can be efficiently applied to the fluorescent material 27 via the bonding layer 28. The fluorescence time or the fluorescence intensity of the fluorescent material 27 can be accurately measured via the bonding layer 28.

When the above-described material is used as the material of the bonding layer 28, it is possible to suppress elution into the liquid L when, for example, the material of the bonding layer 28 contacts with the liquid L. In an example, the bonding layer 28 satisfies specifications regarding an eluted material of an aqueous injection container made of polyethylene or polypropylene when an eluted material test of test methods for plastic containers, stipulated in the Japanese Pharmacopoeia, eighteenth edition, is performed. In other words, when an eluted material test of test methods for plastic containers, stipulated in the Japanese Pharmacopoeia, is performed, almost all the generated bubbles disappear within three minutes in a foaming test. In a pH test, the difference between a test solution and a blank test solution is less than or equal to 1.5. In a test of potassium permanganate-reducing substances, the difference in the consumption of 0.002 mol/L potassium permanganate solution is less than or equal to 1.0 ml. In a test of an ultraviolet absorption spectrum, an absorbance in wavelengths longer than or equal to 220 nm and shorter than 241 nm is lower than or equal to 0.08, and an absorbance in wavelengths longer than or equal to 241 nm and shorter than or equal to 350 nm is lower than or equal to 0.05. In a test of a residue on evaporation, the mass of a residue on evaporation is less than or equal to 1.0 mg.

The above-described material is a material used as a medical adhesive and usable even in a living body of a human or the like. The above-described material is a material particularly used as an adhesive in a living body of a human or the like and less likely to influence a living body even when eluted into liquid in the living body. For this reason, by using the above-described material as the material of the bonding layer 28, the influence on the liquid L due to elution of the bonding layer 28 and a living body taking in the liquid L can be reduced even when the material of the bonding layer 28 elutes into the liquid L. Particularly, when the liquid L is liquid L that is taken in by a living body, such as a food and a drug, the influence on the liquid L due to elution of the bonding layer 28 and a living body taking in the liquid L can be reduced even when the material of the bonding layer 28 elutes into the liquid L. A nonfluorescent light-curing acrylic resin is less likely to influence particularly a living body. For this reason, the bonding layer 28 particularly preferably includes a nonfluorescent light-curing acrylic resin. When the container 30 contains a nonfluorescent light-curing acrylic resin, the influence on the liquid L due to elution of the bonding layer 28 and a living body taking in the liquid L can be further effectively reduced. The above-described material has a small intensity of fluorescence of the material itself, such as autofluorescence of resin contained in the material. Particularly, the intensity of fluorescence of the material itself, generated as a result of application of green light with a wavelength of 525 nm, is small. For this reason, by using the above-described material as the material of the bonding layer 28, a decrease in the accuracy of measuring the fluorescence time or the fluorescence intensity of the fluorescent material 27 due to the influence of autofluorescence of the material of the bonding layer 28 can be suppressed.

In an example, the container 30 is transparent at least at the fluorescent material installation location 39. The barrier container 40 is transparent at least at the part that contacts with the outer surface 30*b* at the fluorescent material installation location 39. Thus, light can be efficiently applied to the fluorescent material 27 via the container 30 and the barrier container 40.

Various changes may be applied to the above-described first embodiment. Hereinafter, modifications of the first embodiment will be described with reference to the drawings as needed. In the following description and the drawings used in the following description, like reference signs to the reference signs used for corresponding portions in the first embodiment are used for portions that can be similarly configured to those of the first embodiment, and the description thereof may not be repeated. When the operation and advantageous effects obtained in the first embodiment are also apparently obtained in the modifications, the description thereof may be omitted.

First Modification

In the above-described first embodiment, the inspection method for the liquid-filled combination container 10L, including the step of bringing the barrier container 40 into contact with the outer surface 30*b* of the container 30 at the fluorescent material installation location 39 by pressing the barrier container 40 with the detecting apparatus 80 has been described. However, a method of bringing the barrier container 40 into contact with the outer surface 30*b* of the container 30 at the fluorescent material installation location 39 is not limited thereto.

Figure 13:
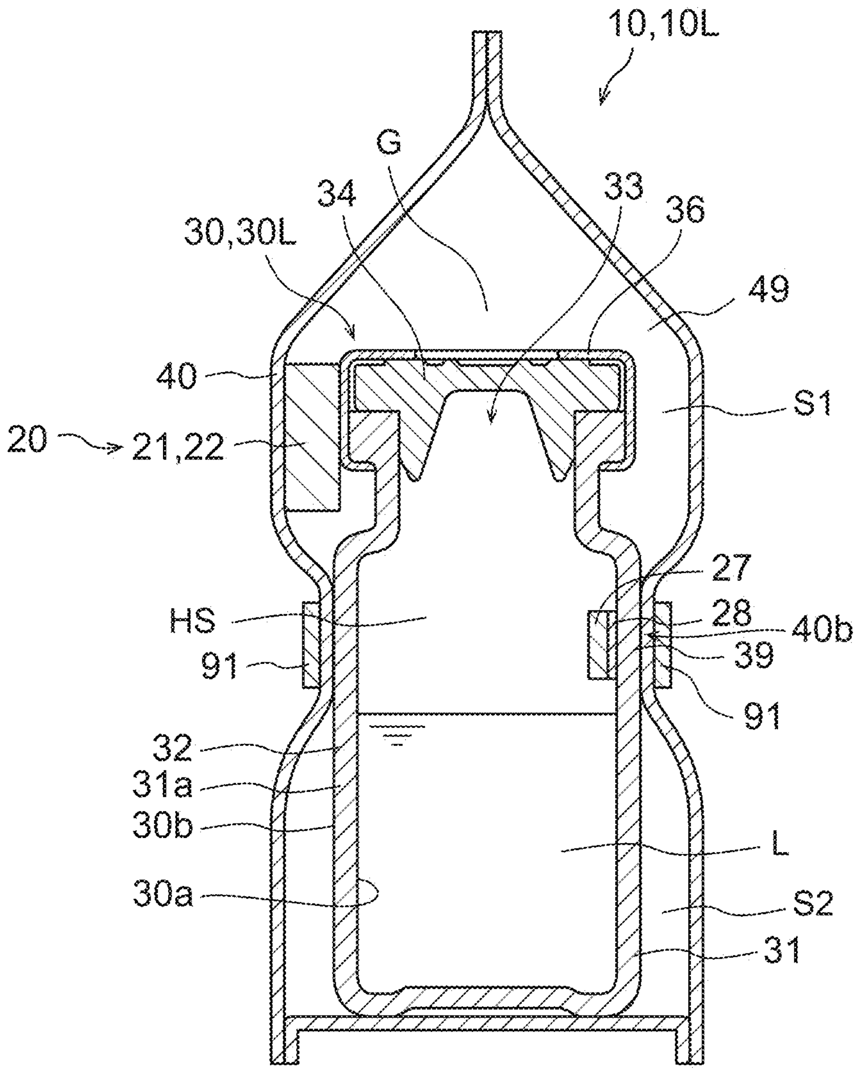
FIG. 13 is a view that shows an example of an inspection method for a liquid-filled combination container according to a first modification.
Figure 14:
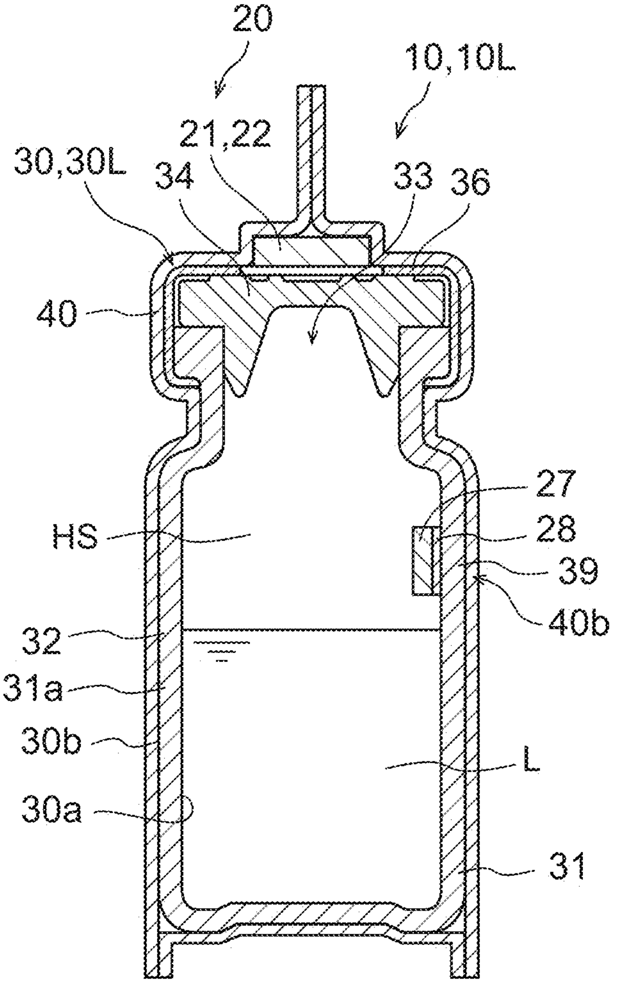
FIG. 14 is a view that shows another example of the inspection method for a liquid-filled combination container according to the first modification.

FIG. 13 is a view that shows an example of a state where the barrier container 40 is brought into contact with the outer surface 30*b* of the container 30 at the fluorescent material installation location 39 in an inspection method for the liquid-filled combination container 10L according to a first modification. FIG. 14 is a view that shows another example of a state where the barrier container 40 is brought into contact with the outer surface 30*b* of the container 30 at the fluorescent material installation location 39 in the inspection method for the liquid-filled combination container 10L according to the first modification. The liquid-filled combination container 10L shown in FIGS. 13 and 14 includes the liquid-filled container 30L shown in FIGS. 1 and 2, and the barrier container 40 shown in FIG. 4, accommodating the liquid-filled container 30L. FIGS. 13 and 14 correspond to the sectional view of the liquid-filled combination container 10L in a state where the barrier container 40 is brought into contact with the outer surface 30*b* of the container 30 at the fluorescent material installation location 39. In the example shown in FIGS. 13 and 14, the liquid-filled combination container 10L includes the single oxygen reactant 20. In the example shown in FIGS. 13 and 14, the oxygen reactant 20 is the oxygen absorber 21. In the example shown in FIG. 13, the oxygen reactant 20 is fixed to the inner surface of the barrier container 40. In the example shown in FIG. 14, the oxygen reactant 20 is fixed to the outer surface 30*b* of the container 30. In the example shown in FIG. 14, the oxygen reactant 20 is fixed to the stopper 34 of the container 30.

In the example shown in FIG. 13, the liquid-filled combination container 10L further includes a shrink film 91 wound around the barrier container 40 so as to cover the container 30 at the fluorescent material installation location 39. The shrink film 91 is a resin film having heat-shrinkable properties. The material of the shrink film 91 is, for example, polystyrene, polypropylene, polyethylene, polyethylene terephthalate, or polyvinyl chloride. In the example shown in FIG. 13, the barrier container 40 is brought into contact with the outer surface 30*b* of the container 30 at the fluorescent material installation location 39 by adding heat to the shrink film 91 wound around the barrier container 40 to thermally shrink the shrink film 91. In the liquid-filled combination container 10L shown in FIG. 13, the barrier container 40 is fixed to the container 30 by the shrink film 91. In the liquid-filled combination container 10L shown in FIG. 13, the positional relationship among the fluorescent material 27, the illuminating portion 81, and the sensor portion 82 is determined by bringing the detecting apparatus 80 into contact with the part of the shrink film 91, which overlaps the fluorescent material installation location 39.

In the example shown in FIG. 14, by deairing the inside of the barrier container 40 into a vacuum, the barrier container 40 is brought into contact with the outer surface 30*b* of the container 30 at the fluorescent material installation location 39. In the liquid-filled combination container 10L shown in FIG. 14, the barrier container 40 is fixed to the container 30 by deairing the inside of the barrier container 40.

Creases are preferably not formed at the part of the barrier container 40, which is brought into contact with the outer surface 30*b* of the container 30 at the fluorescent material installation location 39. When no crease is formed, a decrease in the measurement accuracy of the oxygen concentration due to creases can be suppressed. For example, a decrease in the measurement accuracy of the oxygen concentration resulting from irregular reflection of light applied to the fluorescent material 27 or fluorescence of the fluorescent material 27 due to creases at the part can be suppressed.

In the mode shown in FIG. 13 or FIG. 14, when the barrier container 40 is brought into contact with the outer surface 30*b* of the container 30 at the fluorescent material installation location 39, an operation to bring the barrier container 40 into contact with the outer surface 30*b* of the container 30 at the fluorescent material installation location 39 may be performed after the step of adjusting the amount of oxygen in manufacturing the liquid-filled combination container 10L before the inspection method for the liquid-filled combination container 10L is performed. Before the step of adjusting the amount of oxygen in manufacturing the liquid-filled combination container 10L, an operation to bring the barrier container 40 into contact with the outer surface 30*b* of the container 30 at the fluorescent material installation location 39 may be performed. An operation to bring the barrier container 40 into contact with the outer surface 30*b* of the container 30 at the fluorescent material installation location 39 is, for example, an operation to wind the shrink film 91 around the barrier container 40 and add heat or an operation to deair the inside of the barrier container 40 into a vacuum.

When the barrier container 40 is brought into contact with the outer surface 30*b* of the container 30 at the fluorescent material installation location 39 before the step of adjusting the amount of oxygen in manufacturing the liquid-filled combination container 10L or when it is expected to perform the step of adjusting the amount of oxygen after the inspection method is performed, the following point may be noted. It may be noted that bringing the barrier container 40 into contact with the outer surface 30*b* of the container 30 at the fluorescent material installation location 39 does not interfere with movement of oxygen between the part of the container 30, having oxygen permeability, and the oxygen reactant 20. Thus, when the oxygen reactant 20 is the oxygen absorber 21, oxygen having permeated through the part of the container 30, having oxygen permeability, can be quickly reduced by absorption of oxygen with the oxygen absorber 21. When the oxygen reactant 20 is the oxygen sensing material 25, an oxygen status in the space of the barrier container 40, into which oxygen having permeated through the part of the container 30, having oxygen permeability, flows can be sensed by the oxygen sensing material 25. In the example shown in FIG. 13, the barrier container 40 is in contact with the outer surface 30*b* of the container 30 over all the outer circumference of the container 30 including the fluorescent material installation location 39.

For this reason, movement of gas including oxygen between a first space S1 located above the fluorescent material installation location 39 in the barrier container 40 and a second space S2 located below the fluorescent material installation location 39 is interfered. In the example shown in FIG. 13, the stopper 34 of the container 30 has oxygen permeability. The stopper 34 that is the part of the container 30, having oxygen permeability, is located in the first space S1. In this case, as shown in FIG. 13, the oxygen reactant 20 may be disposed in the first space S1. In this case, this arrangement does not interfere with movement of oxygen between the part of the container 30, having oxygen permeability, and the oxygen reactant 20. In the example shown in FIG. 13, the oxygen reactant 20 is the oxygen absorber 21. For this reason, oxygen having permeated through the part of the container 30, having oxygen permeability, can be quickly reduced by absorption of oxygen with the oxygen absorber 21. Although not shown in the drawing, when the oxygen reactant 20 is disposed in the second space S2, the barrier container 40 may be brought into contact with the outer surface 30*b* of the container 30 at the fluorescent material installation location 39 such that a gap connecting the first space S1 with the second space S2 remains between the barrier container 40 and the container 30. In this case as well, interference with movement of oxygen between the part of the container 30, having oxygen permeability, and the oxygen reactant 20 can be suppressed. When the oxygen reactant 20 is the oxygen absorber 21, oxygen having permeated through the part of the container 30, having oxygen permeability, can be quickly reduced by absorption of oxygen with the oxygen absorber 21.

Second Modification

Figure 15:
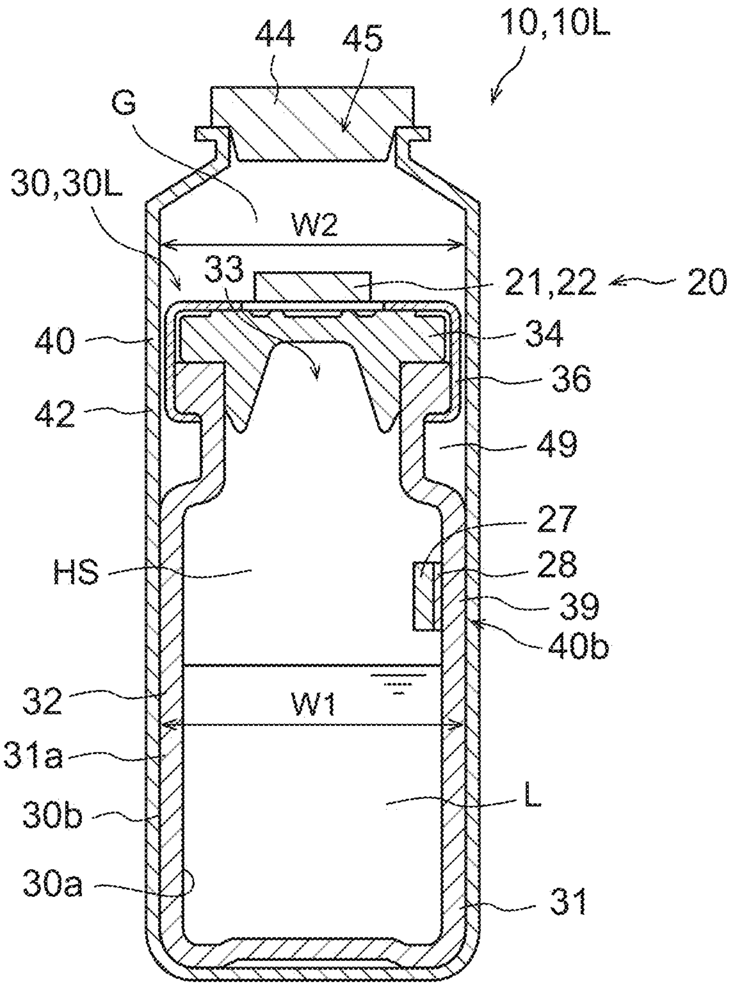
FIG. 15 is a sectional view that shows a liquid-filled combination container according to a second modification.

The barrier container 40 may be designed such that, when the container 30 is accommodated in the barrier container 40, the barrier container 40 contacts with the outer surface 30*b* of the container 30 at the fluorescent material installation location 39. FIG. 15 is a view that shows a liquid-filled combination container 10L according to the second modification. FIG. 15 corresponds to the sectional view of the liquid-filled combination container 10L in a state where the barrier container 40 is brought into contact with the outer surface 30*b* of the container 30 at the fluorescent material installation location 39.

The barrier container 40 of the liquid-filled combination container 10L shown in FIG. 15 does not have deformable flexibility. The barrier container 40 shown in FIG. 15 is a vial bottle. The barrier container 40 includes a container body 42 and a cap 44 inserted into an opening part 45 of a container body 42. The material of the container body 42 is, for example, glass or resin. The container body 42 may be a glass bottle. The opening part 45 of the container body 42 has such a size that the container 30 can be accommodated in the container body 42. The liquid-filled container 30L of the liquid-filled combination container 10L shown in FIG. 15 is similar to the liquid-filled container 30L shown in FIGS. 1 and 2. In the example shown in FIG. 15, the liquid-filled combination container 10L includes the single oxygen reactant 20. In the example shown in FIG. 15, the oxygen reactant 20 is the oxygen absorber 21. In the example shown in FIG. 15, the oxygen reactant 20 is fixed to the outer surface 30*b* of the container 30. In the example shown in FIG. 15, the oxygen reactant 20 is fixed to the stopper 34 of the container 30.

The barrier container 40 shown in FIG. 15 is designed such that, when the container 30 is accommodated in the barrier container 40, the barrier container 40 contacts with the outer surface 30*b* of the container 30 at the fluorescent material installation location 39. As described above, the container 30 is a vial bottle including the container body 32 that is a glass bottle, and the stopper 34. The container 30 has substantially a circular cylindrical outer shape. The barrier container 40 has substantially a circular cylindrical outer shape. Then, as shown in FIG. 15, the outside diameter w1 of the container 30 coincides with the inside diameter w2 of the barrier container 40. For this reason, when the container 30 is accommodated in the barrier container 40, the barrier container 40 voluntarily contacts with the outer surface 30*b* of the container 30 at the fluorescent material installation location 39. In the liquid-filled combination container 10L shown in FIG. 15, the container 30 of the liquid-filled combination container 10L is in a still standing state, particularly, in an upright state. In this state, movement of the container 30 in the horizontal direction is suppressed by the barrier container 40. Movement of the container 30 in the up and down direction is suppressed by the barrier container 40. In the liquid-filled combination container 10L shown in FIG. 15, the barrier container 40 is fixed to the container 30 by accommodating the container 30 in the barrier container 40 to use the action of gravitational force.

The barrier container 40 shown in FIG. 15 can stably maintain, particularly, a state where the barrier container 40 contacts with the outer surface 30*b* of the container 30 at the fluorescent material installation location 39. In the barrier container 40 shown in FIG. 15 as well, the positional relationship among the fluorescent material 27, the illuminating portion 81, and the sensor portion 82 is determined by bringing the detecting apparatus 80 into contact with the part of the barrier container 40, which contacts with the fluorescent material installation location 39.

The barrier container 40 shown in FIG. 15 can contain gas while maintaining the gas at a negative pressure in an air atmosphere because the barrier container 40 does not have deformable flexibility. The phrase "gas can be contained while being maintained at a negative pressure under atmospheric pressure" means that gas can be contained without breakage while the internal pressure is maintained at a negative pressure higher than or equal to 0.80 atm. The barrier container 40 that can contain gas while maintaining the gas at a negative pressure under atmospheric pressure may be in an airtight state when the internal pressure is 0.80 atm. With the container that can contain gas while maintaining the gas at a negative pressure under atmospheric pressure, the volume in the case where the internal pressure is 0.80 atm may be maintained at 95% or higher of the volume in the case where the internal pressure is 1.0 atm. The barrier container 40 may be able to contain gas while maintaining the gas at a positive pressure under atmospheric pressure. The phrase "gas can be contained while being maintained at a positive pressure under atmospheric pressure" means that gas can be contained without breakage while the internal pressure is maintained at a positive pressure higher than or equal to 1.2 atm. The barrier container 40 that can contain gas while maintaining the gas at a positive pressure under atmospheric pressure may be in an airtight state when the internal pressure is 1.20 atm. With the container that can contain gas while maintaining the gas at a positive pressure under atmospheric pressure, the volume in the case where the internal pressure is 1.2 atm may be maintained at 105% or lower of the volume in the case where the internal pressure is 1.0 atm. The barrier container 40 has such a stiffness that the shape can be sufficiently maintained. However, the barrier container 40 may deform to some extent at atmospheric pressure when the internal pressure is maintained at a negative pressure or a positive pressure.

In this way, when the barrier container 40 that can contain gas while maintaining the gas at a negative pressure in an air atmosphere is used, the barrier container 40 accommodating the container 30 may be closed in the atmosphere maintained at a negative pressure. The pressure in the closed barrier container 40 is lower than atmospheric pressure. In this case, permeation of oxygen from the container 30 to the barrier container 40 is facilitated. Particularly, the pressure in the container 30 can be adjusted by a large amount by ensuring a large volume of the barrier container 40 or significantly decreasing the initial pressure of the barrier container 40. Thus, the pressure in the container 30, which is initially the positive pressure, can be adjusted to a negative pressure by keeping the container 30 in the barrier container 40. Thus, the liquid-filled container 30L adjusted in pressure can be manufactured without depending on a manufacturing method for the liquid L or an environment or the like in which the liquid L is enclosed in the container 30.

Closing the barrier container 40 while the barrier container 40 is at a negative pressure facilitates permeation of oxygen through the container 30. Therefore, a time from when the barrier container 40 accommodating the liquid-filled container 30L is closed to when permeation of oxygen through the container 30 becomes equilibrium can be shortened.

A negative pressure means a pressure lower than 1 atm that is atmospheric pressure. A positive pressure means a pressure exceeding 1 atm that is atmospheric pressure. Whether the inside of the container is at a negative pressure can be determined by using a pressure gauge when the pressure gauge is provided in the container. When no pressure gauge is provided in the container, it can be determined even by using a syringe. Specifically, it may be determined in accordance with, when the needle of the syringe is inserted into the container that is a target, whether liquid or gas contained in the syringe in a state where only atmospheric pressure is applied to the piston of the syringe flows into the container. When liquid or gas contained in the syringe flows into the container, it is determined that the inside of the container is at a negative pressure. Similarly, whether the inside of the container is a positive pressure can be determined by using a pressure gauge and can also be determined by using a syringe as well. Specifically, it may be determined in accordance with, when the needle of the syringe is inserted into the container that is a target, whether liquid or gas contained in the container in a state where only atmospheric pressure is applied to the piston of the syringe flows into the syringe. When liquid or gas contained in the container flows into the syringe, it is determined that the inside of the container is at a positive pressure.

Third Modification

The container 30 may be fixed to the barrier container 40. In an example, the container 30 is fixed to the barrier container 40 so that, even when the orientation of the liquid-filled combination container 10L is changed, a location with respect to the barrier container 40 does not change. The container 30 may be fixed to the barrier container 40 by using the action of gravitational force in a state where the container 30 of the liquid-filled combination container 10L is still standing, particularly, in a state where the container 30 is upright. In an example, the container 30 is fixed to the barrier container 40 by a first fixing member 921 different from the container 30 or the barrier container 40. When the container 30 is fixed to the barrier container 40, the barrier container 40 may contact with the outer surface 30*b* of the container 30 at the fluorescent material installation location 39.

Figure 16:
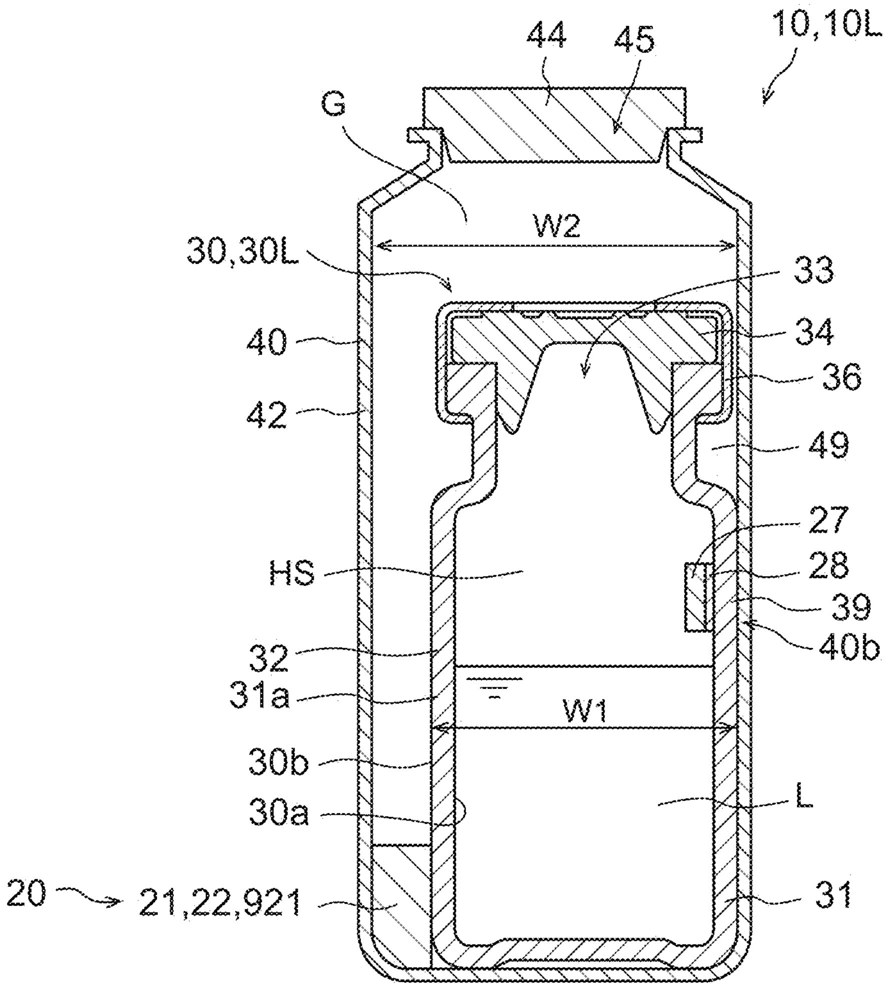
FIG. 16 is a sectional view that shows a liquid-filled combination container according to a third modification.

FIG. 16 is a view that shows the liquid-filled combination container 10L according to a third modification. The barrier container 40 of the liquid-filled combination container 10L shown in FIG. 16 is similar to the barrier container 40 shown in FIG. 15 except that the dimensions are different. The liquid-filled container 30L of the liquid-filled combination container 10L shown in FIG. 16 is similar to the liquid-filled container 30L shown in FIGS. 1 and 2. In the example shown in FIG. 16, the liquid-filled combination container 10L includes the single oxygen reactant 20. In the example shown in FIG. 16, the oxygen reactant 20 is the oxygen absorber 21. In the example shown in FIG. 16, the oxygen reactant 20 is held between the outer surface 30*b* of the container 30 and the inner surface of the barrier container 40. Thus, movement of the oxygen reactant 20 in the horizontal direction is suppressed. In the example shown in FIG. 16, the container 30 of the liquid-filled combination container 10L is in a still standing state, particularly, in an upright state. In this state, movement of the oxygen reactant 20 in the up and down direction is suppressed by the action of gravitational force. Thus, the oxygen reactant 20 is fixed to the outer surface 30*b* of the container 30 and the inner surface of the barrier container 40.

In the example shown in FIG. 16, the container 30 is fixed to the barrier container 40 by the first fixing member 921 different from the container 30 or the barrier container 40. In the example shown in FIG. 16, the inside diameter w2 of the barrier container 40 is greater than the outside diameter w1 of the container 30. For this reason, the location of the barrier container 40 with respect to the container 30 is not fixed only by accommodating the container 30 in the barrier container 40. In this case, as in the case of the example shown in FIG. 16, the container 30 may be fixed to the barrier container 40 by the first fixing member 921 different from the container 30 or the barrier container 40. In the example shown in FIG. 16, because the space between the container 30 and the barrier container 40 is occupied by the first fixing member 921, movement of the barrier container 40 in the horizontal direction with respect to the container 30 is suppressed. In the example shown in FIG. 16, the container 30 of the liquid-filled combination container 10L is in a still standing state, particularly, in an upright state. In this state, movement of the barrier container 40 in the up and down direction with respect to the container 30 is suppressed by the action of gravitational force. Thus, the container 30 is fixed to the barrier container 40. By fixing the container 30 to the barrier container 40, the barrier container 40 may be brought into contact with the outer surface 30*b* of the container 30 at the fluorescent material installation location 39. In an example, the first fixing member 921 is provided inside the barrier container 40. The first fixing member 921 is held between the outer surface 30*b* of the container 30 and the inner surface of the barrier container 40 to fix the container 30 to the barrier container 40 and to bring the barrier container 40 into contact with the outer surface 30*b* of the container 30 at the fluorescent material installation location 39.

In the example shown in FIG. 16, the oxygen reactant 20 serves as the first fixing member 921. In other words, the oxygen reactant 20 is held between the outer surface 30*b* of the container 30 and the inner surface of the barrier container 40 to fix the container 30 to the barrier container 40.

Although not shown in the drawings, the first fixing member 921 may be a member different from the oxygen reactant 20. A member that can bring the barrier container 40 into contact with the outer surface 30*b* of the container 30 at the fluorescent material installation location 39 by fixing the container 30 to the barrier container 40 is used as the first fixing member 921 as needed according to the mode of the container 30 and the barrier container 40.

Second Embodiment

Next, a second embodiment will be described. In the following description and the drawings used in the following description, like reference signs to the reference signs used for corresponding portions in the above-described first embodiment and first to third modifications are used for portions that can be similarly configured to those of the above-described first embodiment and first to third modifications, and the description thereof may not be repeated. When the operation and advantageous effects obtained in the above-described first embodiment and first to third modifications are also apparently obtained in the second embodiment, the description thereof may be omitted.

Figure 17:
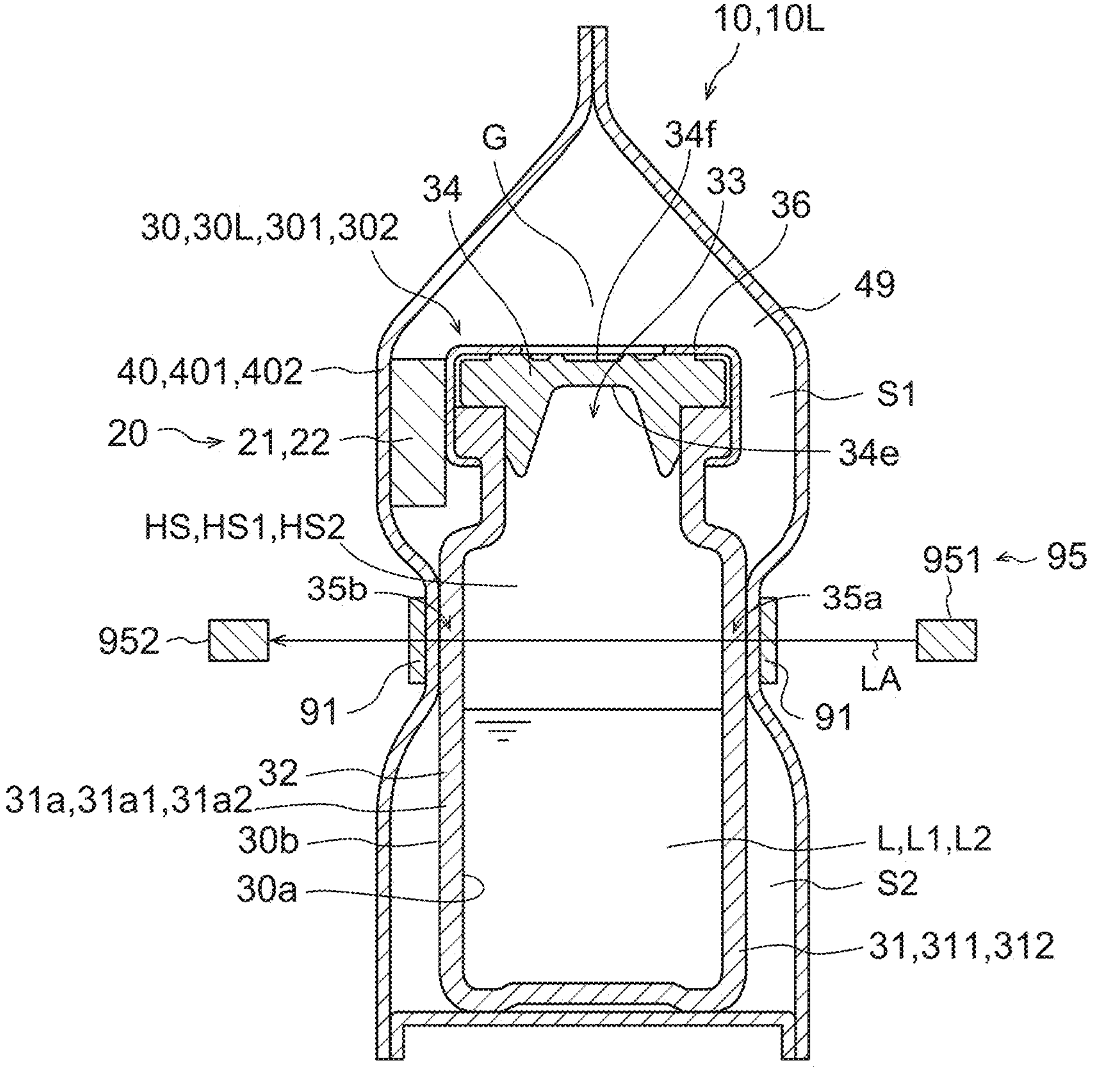
FIG. 17 is a sectional view that shows an example of a liquid-filled combination container according to a second embodiment of the present disclosure.
Figure 18:
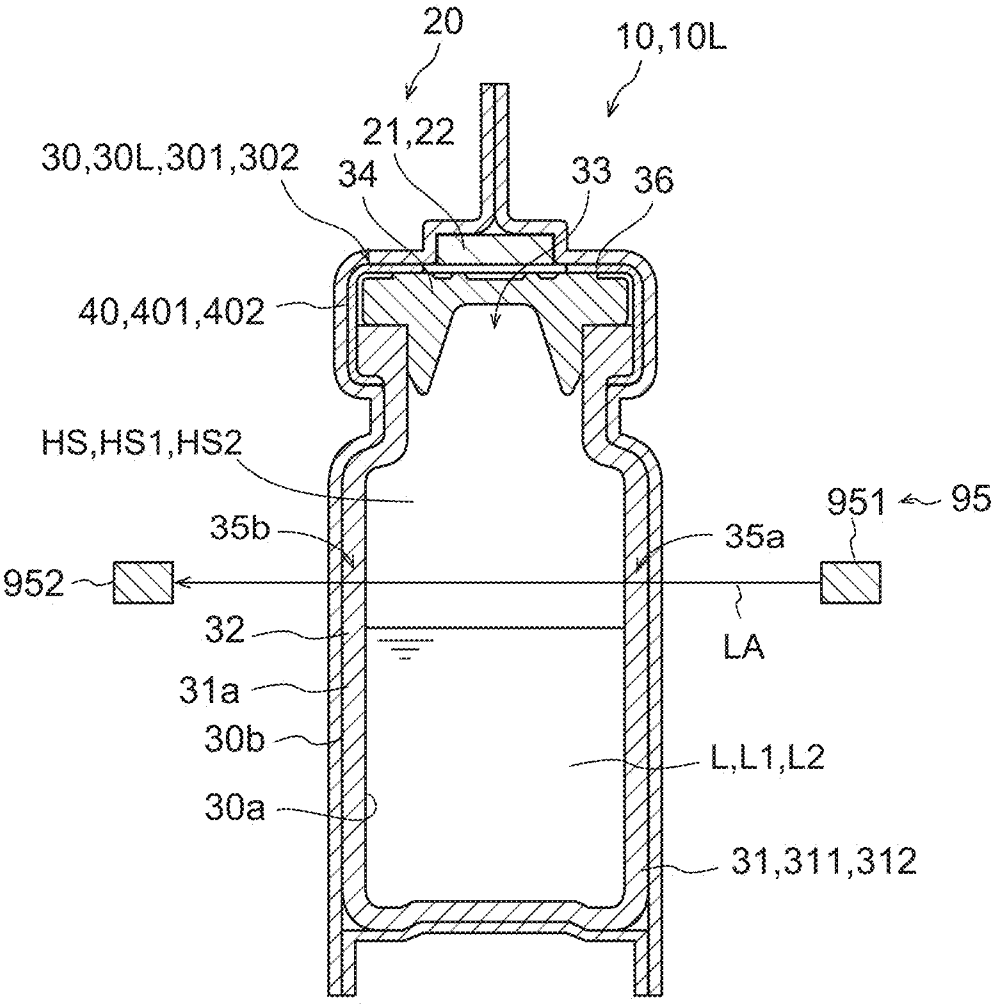
FIG. 18 is a sectional view that shows another example of the liquid-filled combination container according to the second embodiment of the present disclosure.

FIGS. 17 and 18 are views that illustrate the second embodiment of the present disclosure. The liquid-filled combination container 10L according to the second embodiment, as in the case of the liquid-filled combination container 10L according to the first embodiment, includes the container 30 having oxygen permeability and containing the liquid L in the containing portion 31 and the barrier container 40 having oxygen barrier properties and accommodating the container 30.

The liquid-filled combination container 10L according to the second embodiment can inspect the oxygen concentration in the container 30 by measuring the attenuation factor of laser light or LED light with a wavelength to be attenuated according to the oxygen concentration in an optical path LA through application of the laser light or the LED light to the liquid-filled combination container 10L such that the laser light or the LED light penetrates through a part of the container 30 apart from the contact region 31*a* of the containing portion 31.

FIG. 17 is a view that shows an example of the liquid-filled combination container 10L according to the second embodiment. The liquid-filled combination container 10L shown in FIG. 17 is similar to the liquid-filled combination container 10L shown in FIG. 13 except that no fluorescent material 27 is provided. In other words, the liquid-filled combination container 10L shown in FIG. 17 includes the shrink film 91 wound around the barrier container 40 together with the liquid-filled container 30L and the barrier container 40. Then, in the liquid-filled combination container 10L shown in FIG. 17, the barrier container 40 contacts with the outer surface 30*b* of the container 30 as a result of heat shrink of the shrink film 91 wound around the barrier container 40. FIG. 18 is a view that shows another example of the liquid-filled combination container 10L according to the second embodiment. The liquid-filled combination container 10L shown in FIG. 18 is similar to the liquid-filled combination container 10L shown in FIG. 14 except that no fluorescent material 27 is provided. In other words, in the liquid-filled combination container 10L shown in FIG. 18, the barrier container 40 is in contact with the outer surface 30*b* of the container 30 by deairing the inside of the barrier container 40 into a vacuum.

In the second embodiment, the container 30 includes a first location 35*a* and a second location 35*b* apart from the contact region 31*a* of the containing portion 31. The container 30 has light transmission properties at least at the first location 35*a* and the second location 35*b*. The barrier container 40 has light transmission properties at least at a location that intersects with a straight line connecting the first location 35*a* with the second location 35*b*. In the example shown in FIGS. 17 and 18, a straight line representing the optical path LA corresponds to the straight line connecting the first location 35*a* with the second location 35*b*. Then, the barrier container 40 has light transmission properties at least at a location that intersects with a straight line connecting the optical path LA. In the example shown in FIGS. 17 and 18, the barrier container 40 contacts with the container 30 at the first location 35*a* and the second location 35*b*. Particularly, the barrier container 40 contacts at a location having light transmission properties with the outer surface 30*b* of the container 30 at the first location 35*a* and the second location 35*b*. In this case, the attenuation factor of laser light or LED light can be measured by applying the laser light or the LED light to the liquid-filled combination container 10L such that the laser light or the LED light penetrates through the container 30 at the first location 35*a* and the second location 35*b*. The alternate long and short dashes line in the drawings represents the optical path LA of laser light or LED light.

In the example shown in FIGS. 17 and 18, the barrier container 40 is in contact with the container 30 over all around the outer circumference of the container 30 at a location apart from the contact region 31*a* of the containing portion 31 of the container 30 and at a location above the contact region 31*a*. In other words, the barrier container 40 is in contact with the container 30 over all around the outer circumference of the container 30 at a location where the container 30 is bordering on the head space HS. In this case, the first location 35*a* and the second location 35*b* are determined as follows. A selected location apart from the contact region 31*a* of the containing portion 31 of the container 30 and that the barrier container 40 touches is determined as the first location 35*a*. A selected location apart from the contact region 31*a* of the containing portion 31 of the container 30 and that the barrier container 40 touches and through which laser light or LED light having penetrated through the first location 35*a* and the head space HS can penetrate is determined as the second location 35*b*. In other words, the first location 35*a* and the second location 35*b* are determined at locations placed on both sides of the head space HS.

In the example shown in FIGS. 17 and 18, the optical path LA of laser light or LED light that penetrates through the first location 35*a* and the second location 35*b* is perpendicular to the wall of the container 30 at the first location 35*a* and is perpendicular to the wall of the container 30 at the second location 35*b*. In other words, the first location 35*a* and the second location 35*b* are determined at locations where the optical path LA of laser light or LED light that penetrates through the first location 35*a* and the second location 35*b* is perpendicular to the wall of the container 30 at the first location 35*a* and is perpendicular to the wall of the container 30 at the second location 35*b*.

The liquid-filled combination container 10L according to the second embodiment further includes at least one oxygen reactant 20 that can react with oxygen in the barrier container 40. The oxygen reactant 20 is fixed to at least any one of the outer surface 30*b* of the container 30 and the inner surface of the barrier container 40. In the example shown in FIGS. 17 and 18, the liquid-filled combination container 10L includes the single oxygen reactant 20. In the example shown in FIGS. 17 and 18, the oxygen reactant 20 is the oxygen absorber 21. In the example shown in FIG. 17, the oxygen reactant 20 is fixed to the inner surface of the barrier container 40. In the example shown in FIG. 18, the oxygen reactant 20 is fixed to the outer surface 30*b* of the container 30. In the example shown in FIG. 18, the oxygen reactant 20 is fixed to the stopper 34 of the container 30.

The oxygen reactant 20 according to the second embodiment is fixed to a location where, at the time when the oxygen concentration in the container 30 is inspected in the inspection method for the liquid-filled combination container 10L (described later), the oxygen reactant 20 does not interfere with penetration of laser light or LED light through the container 30 at the first location 35*a* and the second location 35*b*.

The oxygen reactant 20 according to the second embodiment is spaced apart from a straight line connecting the first location 35*a* with the second location 35*b*. In the example shown in FIGS. 17 and 18, a straight line representing the optical path LA corresponds to the straight line connecting the first location 35*a* with the second location 35*b*. Then, the oxygen reactant 20 is spaced apart from the straight line representing the optical path LA. In other words, the oxygen reactant 20 is not located on the straight line connecting the first location 35*a* with the second location 35*b*. Thus, laser light or LED light can be applied so as to penetrate through the container 30 by setting the straight line connecting the first location 35*a* with the second location 35*b* for the optical path LA.

In an example, when the oxygen reactant 20 is fixed to the outer surface 30*b* of the container 30, the oxygen reactant 20 is fixed to a location on the outer surface 30*b* of the container 30, which does not overlap the first location 35*a* or the second location 35*b*. In an example, when the oxygen reactant 20 is fixed to the inner surface of the barrier container 40, the oxygen reactant 20 is fixed at a location on the inner surface of the barrier container 40, which does not overlap the first location 35*a* or the second location 35*b* in a direction perpendicular to the inner surface of the barrier container 40.

The positional relationship between the container 30 and the oxygen reactant 20 may be determined. The phrase "the positional relationship between the container 30 and the oxygen reactant 20 is determined" means that relative movement of the oxygen reactant 20 with respect to the container 30 is suppressed. In an example, when the oxygen reactant 20 is fixed to the outer surface 30*b* of the container 30, the positional relationship between the container 30 and the oxygen reactant 20 is determined. In another example, when the oxygen reactant 20 is fixed to the inner surface of the barrier container 40 and the container 30 is fixed to the barrier container 40 (described later), the positional relationship between the container 30 and the oxygen reactant 20 is determined via the barrier container 40.

In the example shown in FIG. 18, the oxygen reactant 20 is located on the second face 34*f* side of the stopper 34. In the example shown in FIG. 18, the liquid-filled combination container 10L is disposed on the placement surface in a state where the container 30 is upright. In other words, the liquid-filled combination container 10L is disposed on the placement surface in a state where the opening part 33 of the container body 32 is oriented upward. In the example shown in FIG. 18, the oxygen reactant 20 is disposed above the stopper 34.

An inspection method of inspecting the oxygen concentration in the container 30 of the liquid-filled combination container 10L according to the second embodiment will be described. The inspection method of inspecting the oxygen concentration in the container 30 of the liquid-filled combination container 10L includes an attenuation factor measurement step and a measurement step. The inspection method of inspecting the oxygen concentration in the container 30 of the liquid-filled combination container 10L further includes a step of bringing the barrier container 40 into contact with the outer surface 30*b* of the container 30 at the first location 35*a* and the second location 35*b*. The inspection method of inspecting the oxygen concentration in the container 30 of the liquid-filled combination container 10L further includes a first standard sample measurement step and a second standard sample measurement step.

In a step of bringing the barrier container 40 into contact with the outer surface 30*b* of the container 30 at the first location 35*a* and the second location 35*b*, for example, an operation to wind the shrink film 91 around the barrier container 40 and add heat, an operation to deair the inside of the barrier container 40 into a vacuum, or the like is performed. By winding the shrink film 91 around the barrier container 40 and add heat, the barrier container 40 contacts with the outer surface 30*b* of the container 30 at the first location 35*a* and the second location 35*b* as in the case of the example shown in FIG. 17. By deairing the inside of the barrier container 40 into a vacuum, the barrier container 40 contacts at a location having light transmission properties with the outer surface 30*b* of the container 30 at the first location 35*a* and the second location 35*b* as in the case of the example shown in FIG. 18. In this step, the barrier container 40 is brought into contact at a location having light transmission properties with the outer surface 30*b* of the container 30 at the first location 35*a* and at the second location 35*b*.

A specific method of bringing the barrier container 40 into contact with the outer surface 30*b* of the container 30 at the first location 35*a* and the second location 35*b* is not limited to the above-described example. A method of bringing the barrier container 40 into contact with the outer surface 30*b* of the container 30 at the first location 35*a* and the second location 35*b* can be widely adopted.

Creases are preferably not formed at the part of the barrier container 40, which is brought into contact with the outer surface 30*b* of the container 30 at the first location 35*a* and the second location 35*b*. When no crease is formed, a decrease in the measurement accuracy of the oxygen concentration due to creases, in the measurement step (described later), can be suppressed. For example, a decrease in the measurement accuracy of the oxygen concentration resulting from irregular reflection of laser light or LED light that penetrates through the container 30 at the first location 35*a* and the second location 35*b* due to creases at the part can be suppressed.

In the attenuation factor measurement step, the attenuation factor of laser light or LED light is measured by applying the laser light or the LED light to the liquid-filled combination container 10L such that the laser light or the LED light penetrates through the part of the container 30 apart from the contact region 31*a* of the containing portion 31. Particularly, in a state where the barrier container 40 is in contact with the outer surface 30*b* at the first location 35*a* and the second location 35*b* apart from the contact region 31*a* of the containing portion 31 of the container 30, laser light or LED light is applied to the liquid-filled combination container 10L such that the laser light or the LED light penetrates through the barrier container 40 at a location having light transmission properties and the container 30 at the first location 35*a* and the second location 35*b*.

The attenuation factor of laser light or LED light is measured by using a measuring device 95. The measuring device 95 includes a light source 951 that applies laser light or LED light and a measuring instrument 952 that measures the attenuation factor of laser light or LED light. Measurement of the attenuation factor of laser light or LED light in the attenuation factor measurement step and measurement of the oxygen concentration in the measurement step (described later) are performed by a so-called head space analyzer system. The measuring device 95 is a so-called head space analyzer. A desktop head space analyzer may be used as the head space analyzer or an inline head space analyzer may be used as the head space analyzer. A desktop head space analyzer has a size such that the desktop head space analyzer can be disposed on a desk. The desktop head space analyzer is a head space analyzer capable of measuring the oxygen concentration in the container 30 by manually installing the liquid-filled combination container 10L for which the oxygen concentration in the container 30 is measured. An inline head space analyzer is a head space analyzer capable of automatically measuring the oxygen concentration in the container 30 of the liquid-filled combination container 10L produced, by being incorporated in a production line to produce the liquid-filled combination container 10L. The head space analyzer used as the measuring device 95 is, for example, a head space analyzer FMS760 produced by Lighthouse.

In the attenuation factor measurement step, initially, the light source 951 is disposed such that laser light or LED light penetrates through a part of the container 30 apart from the contact region 31*a* of the containing portion 31. The measuring instrument 952 is disposed at a location where the measuring instrument 952 can measure the intensity of laser light or LED light having penetrated through the part of the container 30 apart from the contact region 31*a* of the containing portion 31. In other words, the measuring instrument 952 is disposed such that the optical path LA of laser light or LED light extends from the light source 951 to the measuring instrument 952. In an example, in the measuring device 95, the positional relationship between the light source 951 and the measuring instrument 952 is determined. In this case, the part of the container 30 apart from the contact region 31*a* of the containing portion 31 is disposed between the light source 951 and the measuring instrument 952. In the example shown in FIGS. 17 and 18, the light source 951 is disposed such that laser light or LED light penetrates through the container 30 at the first location 35*a* and the second location 35*b*.

Subsequently, with the light source 951, laser light or LED light is applied so as to penetrate through the part of the container 30 apart from the contact region 31*a* of the containing portion 31. Then, with the measuring instrument 952, the attenuation factor of laser light or LED light having penetrated through the part of the container 30 apart from the contact region 31*a* of the containing portion 31 is measured. Frequency modulation spectroscopy may be used to measure the attenuation factor in the attenuation factor measurement step. In other words, the attenuation factor may be measured by adding frequency modulation to laser light or LED light to be applied, demodulating light having penetrated through the containing portion 31 of the container 30, and obtaining a difference between light before modulation is added and light after demodulation.

In an example, laser light or LED light to be applied to the liquid-filled combination container 10L has a wavelength to be attenuated according to the oxygen concentration in the optical path LA. The wavelength of laser light or LED light includes a wavelength absorbed by oxygen. For this reason, since part of the wavelength included in the wavelength of laser light or LED light is absorbed by oxygen, laser light or LED light is attenuated according to the oxygen concentration in the optical path LA. In an example, laser light or LED light having a wavelength of 760 nm is absorbed by oxygen. For this reason, the wavelength of laser light or LED light may include a wavelength of 760 nm. From the viewpoint of improving the measurement accuracy of oxygen concentration by selectively applying light with a wavelength to be attenuated according to the oxygen concentration in the optical path LA to the liquid-filled combination container 10L, light to be applied to the liquid-filled combination container 10L is preferably laser light.

The "attenuation factor" is a value indicating the proportion of the intensity of laser light or LED light measured by the measuring instrument 952 to the intensity of laser light or LED light applied from the light source 951. Particularly, the proportion of the intensity of laser light or LED light measured by the measuring instrument 952 at a wavelength considered to be attenuated according to the oxygen concentration in the optical path LA to the intensity of laser light or LED light applied from the light source 951 at the wavelength may be measured as an attenuation factor. For example, the proportion of the intensity of laser light or LED light measured by the measuring instrument 952 at a wavelength of 760 nm to the intensity of laser light or LED light applied from the light source 951 at a wavelength of 760 nm may be measured as an attenuation factor.

The measuring instrument 952 may measure information, other than intensity, of light applied from the light source 951. The measuring instrument 952 may measure, for example, a difference in the magnitude of amplitude per period, a difference in the magnitude of wavelength per period, and the like of light applied from the light source 951. In this case, the attenuation factor may be corrected by using information other than the intensity measured by the measuring instrument 952. In this case, in the measurement step (described later), the oxygen concentration in the container 30 may be measured in accordance with the corrected attenuation factor.

Measuring the attenuation factor in the attenuation factor measurement step includes measuring a numeric value that varies with the attenuation factor, for example, a numeric value proportional to the attenuation factor. Measuring the oxygen concentration in the container 30 in accordance with the attenuation factor in the measurement step (described later) includes measuring the oxygen concentration in the container 30 substantially in accordance with the attenuation factor by measuring the oxygen concentration in the container 30 in accordance with a numeric value that varies with the attenuation factor. For example, measuring the oxygen concentration in the container 30 in accordance with the attenuation factor in the measurement step (described later) includes measuring the oxygen concentration in the container 30 in accordance with a numeric value proportional to the attenuation factor. Furthermore, in the measurement step (described later), the oxygen concentration may be measured by combining measuring the oxygen concentration in accordance with the attenuation factor of the intensity of light with measuring the oxygen concentration in accordance with a numeric value that varies with the attenuation factor. Thus, the oxygen concentration can be measured with further high accuracy. In addition, in the attenuation factor measurement step, a rate of change in light, including the attenuation factor of the intensity of light, may be measured. The "rate of change in light" is a value measurable in relation to light and is a rate of change in value considered to vary with an oxygen concentration in an optical path along which light is applied. In the measurement step (described later), the oxygen concentration may be measured in accordance with the rate of change in light. In an example, in the attenuation factor measurement step, a change in the amplitude of light or a change in wavelength may be measured. In the measurement step, an oxygen concentration may be measured by using a change in the amplitude of light or a change in wavelength.

Here, the oxygen concentration in the container 30 of the same liquid-filled combination container 10L may be desired to be measured at a plurality of time points. For example, at the time of determining whether the oxygen dissolution amount of the liquid L contained in the container 30 is sufficiently reduced by observing a temporal change in the oxygen concentration in the container 30, the oxygen concentration in the container 30 of the same liquid-filled combination container 10L is desired to be measured at a plurality of time points. At the time of calculating the rate of reduction in the oxygen concentration in the container 30 in accordance with a temporal change in oxygen concentration in the container 30, the oxygen concentration in the container 30 of the same liquid-filled combination container 10L is desired to be measured at a plurality of time points. The oxygen concentration in each of the containers 30 of a plurality of liquid-filled combination containers 10L may be desired to be measured. In these cases, the positional relationship among the container 30, the barrier container 40, the light source 951, and the measuring instrument 952 is preferably aligned among the time points of measurement of the attenuation factor. Thus, by aligning the conditions of measurement of the attenuation factor, such as the length of the optical path LA of laser light or LED light, the measurement accuracy of the oxygen concentration to be measured in accordance with the attenuation factor can be improved.

In the example shown in FIGS. 17 and 18, laser light or LED light passes through the inside of the container 30 and passes through the outside of the liquid-filled combination container 10L before the laser light or the LED light exits from the light source 951 and reaches the measuring instrument 952. In this case, when the positional relationship among the container 30, the barrier container 40, the light source 951, and the measuring instrument 952 is aligned among the time points of measurement of the attenuation factor, particularly, the following advantageous effect is obtained. The length of the optical path LA of laser light or LED light can be aligned. Particularly, a distance that laser light or LED light passes through the inside of the container 30 can be aligned. In addition, a distance that laser light or LED light passes through the outside of the liquid-filled combination container 10L can be aligned. For this reason, variations of the attenuation factor measured in the attenuation factor measurement step due to a difference in distance that laser light or LED light passes through the inside of the container 30 or a difference in distance that laser light or LED light passes through the outside of the liquid-filled combination container 10L are reduced. Thus, large and small attenuation factors measured in the attenuation factor measurement step further accurately correspond to large and small oxygen concentrations in the container 30. Thus, the measurement accuracy at the time of measuring the oxygen concentration in accordance with the attenuation factor in the measurement step (described later) can be improved.

In the first standard sample measurement step, the attenuation factor of laser light or LED light is measured by applying the laser light or the LED light to a first standard sample. A part of the first standard sample, which can be configured similarly to the liquid-filled combination container 10L that is a target of the inspection method, is called the same name; however, different reference signs are assigned to those different from the corresponding parts of the liquid-filled combination container 10L. In FIGS. 17 and 18, reference signs representing the components of the liquid-filled combination container 10L are assigned, and reference signs representing the components of the first standard sample are assigned. The first standard sample includes a container 301 and a barrier container 401 accommodating the container 301, similar to the container 30 of the liquid-filled combination container 10L that is the target of the inspection method and the barrier container 40 accommodating the container 30.

The oxygen concentration inside the container 301 of the first standard sample is identified. In an example, air is contained in the container 301 of the first standard sample. In this case, the oxygen concentration inside the container 301 of the first standard sample can be identified as the oxygen concentration of air. Generally, the oxygen concentration of air is known as a value close to 20.95%. For this reason, the oxygen concentration inside the container 301 containing air in the first standard sample can be regarded as 20.95%. In an example, the pressure of air contained in the container 301 of the first standard sample is equal to atmospheric pressure.

The container 301 of the first standard sample may contain liquid L1, similar to the liquid L contained in the containing portion 31 of the container 30 of the liquid-filled combination container 10L, in a containing portion 311 or does not need to contain liquid L1. When the container 301 of the first standard sample contains the liquid L1 in the containing portion 311, the oxygen concentration in a head space HS1 in the container 301 may be identified. Specifically, air may be contained in the head space HS1 in the container 301, and the oxygen concentration in the head space HS1 in the container 301 may b identified as the oxygen concentration of air. When the container 301 of the first standard sample does not contain liquid L1 in the containing portion 311, the oxygen concentration of the entire inside of the container 301 may be identified. Specifically, air may be contained in the entire inside of the container 301, and the oxygen concentration in the entire inside of the container 301 may be identified as the oxygen concentration of air.

In the first standard sample measurement step, the attenuation factor of laser light or LED light is measured by applying the laser light or the LED light to the first standard sample such that the laser light or the LED light penetrates through the inside of the container 301. In the first standard sample measurement step, the attenuation factor is measured by using the light source 951 and the measuring instrument 952 similar to the light source 951 and the measuring instrument 952 used in the attenuation factor measurement step. The wavelength of laser light or LED light applied to the first standard sample in the first standard sample measurement step is similar to the wavelength of laser light or LED light applied to the liquid-filled combination container 10L in the attenuation factor measurement step. In the first standard sample measurement step, laser light or LED light may be applied to the first standard sample such that the laser light or the LED light penetrates through a part of the container 301 apart from a contact region 31*a*1 of the containing portion 311.

With the first standard sample measurement step, the attenuation factor in a case where the oxygen concentration inside the container 301 is equal to the oxygen concentration of air can be measured. Particularly, by using the first standard sample in which air is contained inside the container 301, the attenuation factor in a case where the oxygen concentration inside the container 301 is 20.95% can be measured.

In the second standard sample measurement step, the attenuation factor of laser light or LED light is measured by applying the laser light or the LED light to a second standard sample. A part of the second standard sample, which can be configured similarly to the liquid-filled combination container 10L that is a target of the inspection method, is called the same name; however, different reference signs are assigned to those different from the corresponding parts of the liquid-filled combination container 10L. In FIGS. 17 and 18, reference signs representing the components of the liquid-filled combination container 10L are assigned, and reference signs representing the components of the second standard sample are assigned. The second standard sample includes a container 302 and a barrier container 402 accommodating the container 302, similar to the container 30 of the liquid-filled combination container 10L that is the target of the inspection method and the barrier container 40 accommodating the container 30.

The oxygen concentration inside the container 302 of the second standard sample is lower than the oxygen concentration inside the container 301 of the first standard sample, and is identified. When air is contained inside the container 301 of the first standard sample, the oxygen concentration inside the container 302 of the second standard sample is lower than the oxygen concentration of air and is identified.

A specific example of a method of preparing the second standard sample including the container 302 inside which the oxygen concentration is identified will be described. In an example, a specific example of a method of preparing the second standard sample including the container 302 inside which the oxygen concentration is identified as 0% will be described. Initially, the inside of the container 302 of the second standard sample containing air is deaired into a vacuum. Subsequently, nitrogen gas is flowed into the container 302 of the second standard sample. Nitrogen gas is, for example, standard gas of National Institute of Standards and Technology (NIST). The above-described operation to deair the inside of the container 302 of the second standard sample into a vacuum and operation to flow nitrogen gas into the container 302 of the second standard sample are repeated five times. Then, the oxygen concentration inside the container 302 of the second standard sample subjected to the above operations is regarded as 0%. Thus, the second standard sample in which the oxygen concentration inside the container 302 is identified as 0% can be prepared.

The container 302 of the second standard sample may contain liquid L2, similar to the liquid L contained in the containing portion 31 of the container 30 of the liquid-filled combination container 10L, in a containing portion 312 or does not need to contain liquid L2. When the container 302 of the second standard sample contains the liquid L2 in the containing portion 312, air may be contained in a head space HS2 in the container 302. When the container 302 of the second standard sample does not contain the liquid L2 in the containing portion 312, air may be contained in the entire inside of the container 302.

In the second standard sample measurement step, the attenuation factor of laser light or LED light is measured by applying the laser light or the LED light to the second standard sample such that the laser light or the LED light penetrates through the inside of the container 302. In the second standard sample measurement step, the attenuation factor is measured by using the light source 951 and the measuring instrument 952 similar to the light source 951 and the measuring instrument 952 used in the attenuation factor measurement step. The wavelength of laser light or LED light applied to the second standard sample in the second standard sample measurement step is similar to the wavelength of laser light or LED light applied to the liquid-filled combination container 10L in the attenuation factor measurement step. In the second standard sample measurement step, laser light or LED light may be applied to the second standard sample such that the laser light or the LED light penetrates through a part of the container 302 apart from a contact region 31*a*2 of the containing portion 312.

With the second standard sample measurement step, the attenuation factor in a case where the oxygen concentration inside the container 302 is a specific value lower than the oxygen concentration of air can be measured. Particularly, by using the second standard sample in which the oxygen concentration inside the container 302 is identified as 0% and which is prepared by a specific example of a method of preparing the above-described second standard sample, the attenuation factor in a case where the oxygen concentration inside the container 302 is 0% can be measured.

In the measurement step, the oxygen concentration in the container 30 is measured in accordance with the attenuation factor measured in the attenuation factor measurement step. The measurement step according to the second embodiment includes a step of calculating the oxygen concentration in the container 30 of the liquid-filled combination container 10L from the attenuation factor measured in the attenuation factor measurement step, in accordance with the measurement results of the first standard sample measurement step and the second standard sample measurement step. As the measurement result of the first standard sample measurement step, the relationship between the attenuation factor measured in the first standard sample measurement step and the oxygen concentration inside the container 301 of the first standard sample is used. As the measurement result of the second standard sample measurement step, the relationship between the attenuation factor measured in the second standard sample measurement step and the oxygen concentration inside the container 302 of the second standard sample is used.

Specifically, initially, on the assumption that the oxygen concentration Y (%) is a linear function of the attenuation factor X (%), the expression of the linear function expressing the relationship between the oxygen concentration Y (%) and the attenuation factor X (%) is obtained in accordance with the measurement results of the first standard sample measurement step and the second standard sample measurement step.

The attenuation factor measured in the first standard sample measurement step is defined as x1(%). The oxygen concentration inside the container 301 in the first standard sample is defined as y1(%). The attenuation factor measured in the second standard sample measurement step is defined as x2(%). The oxygen concentration inside the container 302 in the second standard sample is defined as y2(%). In this case, the expression of the linear function expressing the relationship between the oxygen concentration Y (%) and the attenuation factor X (%) is expressed as the following expression (1).

[Expression 1]

$$Y = \frac{y1 - y2}{x1 - x2}X + \frac{x1 \times y2 - x2 \times y1}{x1 - x2} \quad \text{Expression (1)}$$

When the oxygen concentration inside the container 301 in the first standard sample is regarded as 20.95% as described above, the value of y1 is 20.95. When the oxygen concentration inside the container 301 in the second standard sample is regarded as 0% as described above, the value of y2 is 0. In this case, the expression of the linear function expressing the relationship between the oxygen concentration Y (%) and the attenuation factor X (%) is expressed as the following expression (2).

[Expression 2]

$$Y = \frac{20.95}{x1 - x2}X + \frac{-20.95 \times x2}{x1 - x2} \quad \text{Expression (2)}$$

By substituting the attenuation factor X (%) measured in the attenuation factor measurement step into the expression (1) or the expression (2) and calculating Y (%), the oxygen concentration (%) in the container 30 of the liquid-filled combination container 10L can be calculated.

The first standard sample is not limited to the above-described one in which air is contained inside the container 301. A sample including the container 301 inside which the oxygen concentration is identified and the barrier container 401 accommodating the container 301 can be used as the first standard sample. The second standard sample is not limited to the above-described one in which the inside of the container 302 is deaired. A sample including the container 302 inside which the oxygen concentration is lower than the oxygen concentration inside the container 301 of the first standard sample and is identified and the barrier container 402 accommodating the container 302 can be used as the second standard sample. An attenuation factor may be measured in each of three or more standard samples including the first standard sample and the second standard sample, and the oxygen concentration in the container 30 of the liquid-filled combination container 10L may be calculated in accordance with the relationship between the attenuation factor and oxygen concentration of each of the three or more standard samples.

A method of identifying the oxygen concentration of each of standard samples including the first standard sample and the second standard sample is not limited to the above-described example. For example, the oxygen concentration of a standard sample may be identified by using the above-described inspection method according to the first embodiment. In other words, the oxygen concentration of the container of a standard sample may be identified by providing a fluorescent material on the inner surface of the container of the standard sample and measuring the fluorescence time or the fluorescence intensity of the fluorescent material by applying light to the fluorescent material. When laser light or LED light is applied to penetrate through the inside of the container 302 in identifying the oxygen concentration in each of the standard samples including the first standard sample and the second standard sample, the oxygen concentration may be identified by the following method. A numeric value that varies with the attenuation factor may be measured, and the oxygen concentration in the container 30 may be measured in accordance with the numeric value. For example, a numeric value proportional to the attenuation factor may be measured, and the oxygen concentration in the container 30 may be measured in accordance with the numeric value. Furthermore, the oxygen concentration may be measured by combining measuring the oxygen concentration in accordance with the attenuation factor of the intensity of light with measuring the oxygen concentration in accordance with a numeric value that varies with the attenuation factor. Thus, the oxygen concentration can be measured with further high accuracy. In addition, a rate of change in light, including the attenuation factor of the intensity of light, may be measured, and the oxygen concentration may be measured in accordance with the rate of change in light. In an example, a change in the amplitude of light or a change in wavelength may be measured, and the oxygen concentration may be measured by using the change in the amplitude of light or the change in wavelength.

Next, the advantageous effect of the inspection method for the liquid-filled combination container 10L according to the second embodiment will be described. The inspection method according to the second embodiment can include an attenuation factor measurement step of measuring the attenuation factor of laser light or LED light with a wavelength to be attenuated according to the oxygen concentration in the optical path LA through application of the laser light or the LED light to the liquid-filled combination container 10L such that the laser light or LED light penetrates through a part of the container 30 apart from the contact region 31*a* of the containing portion 31. Measuring the attenuation factor in the attenuation factor measurement step includes measuring a numeric value that varies with the attenuation factor, for example, a numeric value proportional to the attenuation factor. In addition, in the attenuation factor measurement step, a rate of change in light, including the attenuation factor of the intensity of light, may be measured. In an example, in the attenuation factor measurement step, a change in the amplitude of light or a change in wavelength may be measured. The inspection method according to the second embodiment includes a measurement step of measuring the oxygen concentration in the container 30 in accordance with the attenuation factor measured in the attenuation factor measurement step. Measuring the oxygen concentration in the container 30 in accordance with the attenuation factor in the measurement step includes measuring the oxygen concentration in the container 30 substantially in accordance with the attenuation factor by measuring the oxygen concentration in the container 30 in accordance with a numeric value that varies with the attenuation factor. For example, measuring the oxygen concentration in the container 30 in accordance with the attenuation factor in the measurement step includes measuring the oxygen concentration in the container 30 in accordance with a numeric value proportional to the attenuation factor. Furthermore, in the measurement step, the oxygen concentration may be measured by combining measuring the oxygen concentration in accordance with the attenuation factor of the intensity of light with measuring the oxygen concentration in accordance with a numeric value that varies with the attenuation factor. In addition, in the measurement step, the oxygen concentration may be measured in accordance with the rate of change in light. In an example, in the measurement step, an oxygen concentration may be measured by using a change in the amplitude of light or a change in wavelength. Thus, the oxygen concentration in the container 30 can be measured and inspected without opening the container 30.

In addition, in the inspection method according to the second embodiment, in a state where the barrier container 40 is in contact with the outer surface 30*b* at the first location 35*a* and the second location 35*b* of the container 30 apart from the contact region 31*a* of the containing portion 31, laser light or LED light is applied to the liquid-filled combination container 10L such that the laser light or the LED light penetrates through the container 30 at the first location 35*a* and the second location 35*b*. For this reason, the optical path LA does not pass through a space (also referred to as barrier container space 49) inside the barrier container 40 and outside the container 30. Thus, the influence of the oxygen concentration in the barrier container space 49 on the attenuation factor to be measured can be removed. The influence of the oxygen concentration in the barrier container space 49 on a numeric value that varies with the attenuation factor, measured in the attenuation factor measurement step, for example, a numeric value proportional to the attenuation factor, can be removed. The influence of the oxygen concentration in the barrier container space 49 on a rate of change in light, measured in the attenuation factor measurement step, can be removed. For example, the influence of the oxygen concentration in the barrier container space 49 on a change in the amplitude of light or a change in wavelength, measured in the attenuation factor measurement step, can be removed. The positional relationship between the container 30 and the barrier container 40 is determined by the contact of the barrier container 40 with the outer surface 30*b* of the container 30. For this reason, when the oxygen concentration in the container 30 of the same liquid-filled combination container 10L is measured at a plurality of time points, the positional relationship between the container 30 and the barrier container 40 at each time point of measurement can be aligned because of the contact of the barrier container 40 with the outer surface 30*b* of the container 30. Similarly, in a case where the oxygen concentration in each of the containers 30 of a plurality of liquid-filled combination containers 10L is measured, the positional relationship between the container 30 and the barrier container 40 at a time point of measurement can be aligned. Thus, by aligning the conditions of measurement of the attenuation factor, such as the length of the optical path LA of laser light or LED light, the measurement accuracy of the oxygen concentration to be measured in accordance with the attenuation factor can be improved. In the attenuation factor measurement step, the conditions of measurement of a numeric value that varies with the attenuation factor, for example, a numeric value proportional to the attenuation factor, can be aligned. In the attenuation factor measurement step, conditions of measurement of a rate of change in light can be aligned. For example, in the attenuation factor measurement step, conditions of measurement of a change in the amplitude of light or a change in wavelength can be aligned.

In addition, the inspection method according to the second embodiment further includes a step of bringing the barrier container 40 into contact with the outer surface 30*b* of the container 30 at the first location 35*a* and the second location 35*b*. Thus, as described above, in a state where the barrier container 40 is in contact with the outer surface 30*b* of the container 30 at the first location 35*a* and the second location 35*b*, laser light or LED light can be applied to the liquid-filled combination container 10L.

In addition, in the inspection method according to the second embodiment, the wavelength of the laser light or the LED light includes a wavelength of 760 nm. Laser light or LED light with a wavelength of 760 nm is attenuated according to the oxygen concentration in the optical path LA and is less likely to be attenuated according to other factors, such as the concentration of a substance other than oxygen. For this reason, since the wavelength of laser light or LED light to be applied includes a wavelength of 760 nm, the measurement accuracy of the oxygen concentration in the measurement step can be improved.

In addition, the inspection method according to the second embodiment further includes a first standard sample measurement step of measuring the attenuation factor by applying laser light or LED light to a first standard sample and a second standard sample measurement step of measuring the attenuation factor by applying laser light or LED light to a second standard sample. Thus, the oxygen concentration in the container 30 of the liquid-filled combination container 10L can be measured in accordance with the relationship between the attenuation factor and the oxygen concentration in the first standard sample and the relationship between the attenuation factor and the oxygen concentration in the second standard sample.

In addition, in the inspection method according to the second embodiment in the first standard sample measurement step, the barrier container 401, the light source 951, and the measuring instrument 952 of the first standard sample are disposed with respect to the container 301 of the first standard sample so as to be similar to the disposition of the barrier container 40, the light source 951, and the measuring instrument 952 with respect to the container 30 when laser light or LED light is applied to the liquid-filled combination container 10L in the attenuation factor measurement step, and laser light or LED light may be applied to the first standard sample. In the second standard sample measurement step, the barrier container 402, the light source 951, and the measuring instrument 952 of the second standard sample are disposed with respect to the container 302 of the second standard sample so as to be similar to the disposition of the barrier container 40, the light source 951, and the measuring instrument 952 with respect to the container 30 when laser light or LED light is applied to the liquid-filled combination container 10L in the attenuation factor measurement step, and laser light or LED light may be applied to the first standard sample. Thus, the conditions of measurement of the attenuation factor, such as the length of the optical path LA of laser light or LED light, can be aligned among the attenuation factor measurement step, the first standard sample measurement step, and the second standard sample measurement step.

In an example, the container 30 is transparent at least at the first location 35*a* and the second location 35*b*. The barrier container 40 is transparent at least at a part that contacts with the outer surface 30*b* at the first location 35*a* and the second location 35*b*. Thus, the influence of attenuation of laser light or LED light at the time of penetrating through the container 30 and the barrier container 40 on the attenuation factor to be measured can be reduced.

Next, the advantageous effects of the liquid-filled container 30L and the liquid-filled combination container 10L according to the second embodiment in performing the above-described inspection method will be described. The oxygen reactant 20 according to the second embodiment is spaced apart from a straight line connecting the first location 35*a* with the second location 35*b*. For this reason, laser light or LED light can be applied so as to penetrate through the container 30 by setting the straight line connecting the first location 35*a* with the second location 35*b* for the optical path LA. Thus, with the above-described inspection method, the oxygen concentration in the container 30 can be measured and inspected without opening the container 30. The oxygen concentration in the container 30 can be measured and inspected without opening the barrier container 40.

In addition, the oxygen reactant 20 is fixed to at least any one of the outer surface 30*b* of the container 30 and the inner surface of the barrier container 40. Thus, movement of the oxygen reactant 20 to a location where the oxygen reactant 20 interferes with penetration of laser light or LED light through the container 30 at the first location 35*a* and the second location 35*b* can be suppressed. Particularly, by fixing the oxygen reactant 20 to a location where the oxygen reactant 20 does not interfere with penetration of laser light or LED light through the container 30 at the first location 35*a* and the second location 35*b*, laser light or LED light can be applied so as to penetrate through the container 30 without interference of the oxygen reactant 20.

In addition, since the positional relationship between the container 30 and the oxygen reactant 20 is determined, the following advantageous effect is obtained. The oxygen reactant 20 can be used as a marker at the time of identifying a location suitable as a location where laser light or LED light is applied to the container 30. An example of a method of identifying a location where laser light or LED light is applied to the container 30 by using the oxygen reactant 20 as a marker will be described. The positional relationship between the location of the oxygen reactant 20 with respect to the container 30 and a location suitable as a location where laser light or LED light is applied to the container 30 in the container 30 is identified. The location of the oxygen reactant 20 is identified by, for example, image detection with a camera. Then, a location suitable as a location where laser light or LED light is applied to the container 30 in the container 30 is identified from the positional relationship between the location of the oxygen reactant 20 with respect to the container 30 and a location suitable as a location where laser light or LED light is applied to the container 30 and the location of the oxygen reactant 20, identified by image detection or the like. Thus, a location suitable as a location where laser light or LED light is applied to the container 30 can be identified.

When the characteristic that the positional relationship between the container 30 and the oxygen reactant 20 is determined is combined with the liquid-filled combination container 10L according to the first embodiment, the following advantageous effect is obtained. The oxygen reactant 20 can be used as a marker at the time of identifying a location suitable as a location where light for causing the fluorescent material 27 to emit fluorescence is applied to the container 30.

In addition, the oxygen reactant 20 is located on the second face 34*f* side of the stopper 34. Thus, this arrangement is less likely to interfere with movement of oxygen between the stopper 34 and the oxygen reactant 20. In the example shown in FIG. 17, the barrier container 40 is in contact with the outer surface 30*b* of the container 30 over all the outer circumference of the container 30 including the first location 35*a* and the second location 35*b*. For this reason, movement of gas including oxygen between a first space S1 located above the first location 35*a* and the second location 35*b* in the barrier container 40 and a second space S2 located below the first location 35*a* and the second location 35*b* is impaired. In this case, when the oxygen reactant 20 is determined to be located on the second face 34*f* side of the stopper 34, the oxygen reactant 20 is disposed in the first space S1. Thus, this arrangement is less likely to interfere with movement of oxygen between the stopper 34 and the oxygen reactant 20. For this reason, when the stopper 34 has oxygen permeability, it is possible to suppress interference with movement of oxygen between the stopper 34 and the oxygen absorber 21. Thus, when the oxygen reactant 20 is the oxygen absorber 21, oxygen having permeated through the stopper 34 can be quickly reduced by absorption of oxygen with the oxygen absorber 21. When the oxygen reactant 20 is the oxygen sensing material 25, an oxygen status in the space of the barrier container 40, into which oxygen having permeated through the part of the container 30, having oxygen permeability, flows can be sensed by the oxygen sensing material 25.

A common characteristic and an advantageous effect between the liquid-filled combination container 10L according to the first embodiment and the liquid-filled combination container 10L according to the second embodiment will be described.

The liquid-filled combination container 10L according to the first embodiment and the liquid-filled combination container 10L according to the second embodiment have a common characteristic that the oxygen reactant 20 is fixed to at least any one of the outer surface 30*b* of the container 30 and the inner surface of the barrier container 40.

In the liquid-filled combination container 10L according to the first embodiment, with the above characteristic, movement of the oxygen reactant 20 to a location where the oxygen reactant 20 interferes with application of light for causing the fluorescent material 27 to emit fluorescence to the fluorescent material 27 is suppressed by the above characteristic. In the liquid-filled combination container 10L according to the second embodiment, with the above characteristic, movement of the oxygen reactant 20 to a location where the oxygen reactant 20 interferes with penetration of laser light or LED light through the container 30 at the first location 35*a* and the second location 35*b* is suppressed. As described above, with the liquid-filled combination container 10L according to the first embodiment and the liquid-filled combination container 10L according to the second embodiment, with the above configuration, the common advantageous effect that movement of the oxygen reactant 20 to a location where the oxygen reactant 20 interferes with application of light applied to the container 30 in order to measure the oxygen concentration is suppressed.

In the liquid-filled combination container 10L according to the first embodiment, the barrier container 40 contacts with the outer surface 30*b* of the container 30 at the fluorescent material installation location 39. When the barrier container 40 contacts with the outer surface 30*b* of the container 30 at the fluorescent material installation location 39, the positional relationship between the fluorescent material installation location 39 of the container 30 and the barrier container 40 is easily determined. Therefore, the optical path of light that is emitted from the illuminating portion 81 and that penetrates through the barrier container 40 and the container 30 at the fluorescent material installation location 39 to cause the fluorescent material 27 to emit fluorescence is easily determined. Specifically, when the oxygen concentration in the container 30 of the same liquid-filled combination container 10L is measured at a plurality of time points, the positional relationship between the fluorescent material installation location 39 of the container 30 and the barrier container 40 at each time point of measurement can be aligned. Similarly, in a case where the oxygen concentration in each of the containers 30 of a plurality of liquid-filled combination containers 10L is measured, the positional relationship between the fluorescent material installation location 39 of the container 30 and the barrier container 40 at a time point of measurement can be aligned. Thus, the optical path of light that is emitted from the illuminating portion 81 and penetrates through the barrier container 40 and the container 30 at the fluorescent material installation location 39 to cause the fluorescent material 27 to emit fluorescence can be aligned.

On the other hand, in the liquid-filled combination container 10L according to the second embodiment, the barrier container 40 contacts with the outer surface 30*b* of the container 30 at the first location 35*a* and the second location 35*b*. When the barrier container 40 contacts with the outer surface 30*b* of the container 30 at the first location 35*a* and the second location 35*b*, the positional relationship between both the first location 35*a* and the second location 35*b* of the container 30 and the barrier container 40 is easily determined. Therefore, the optical path LA of laser light or LED light that is emitted from the light source 951 and penetrates through the barrier container 40 and the container 30 at the first location 35*a* and the second location 35*b* to reach the measuring instrument 952 is easily determined. Specifically, when the oxygen concentration in the container 30 of the same liquid-filled combination container 10L is measured at a plurality of time points, the positional relationship between both the first location 35*a* and the second location 35*b* of the container 30 and the barrier container 40 at each time point of measurement can be aligned. Similarly, in a case where the oxygen concentration in each of the containers 30 of a plurality of liquid-filled combination containers 10L is measured, the positional relationship between both the first location 35*a* and the second location 35*b* of the container 30 and the barrier container 40 at a time point of measurement can be aligned. Thus, the optical path LA of laser light or LED light that is emitted from the light source 951 and penetrates through the barrier container 40 and the container 30 at the first location 35*a* and the second location 35*b* to reach the measuring instrument 952 can be aligned.

As described above, the liquid-filled combination container 10L according to the first embodiment and the liquid-filled combination container 10L according to the second embodiment have a common characteristic that the barrier container 40 contacts with at least part of the outer surface 30*b* of the container 30. With the liquid-filled combination container 10L according to the first embodiment and the liquid-filled combination container 10L according to the second embodiment, with the above characteristic, the common advantageous effect that the optical path of light applied to the container 30 in order to measure the oxygen concentration is easily determined.

When the container 30 is upright in the barrier container 40, the oxygen reactant 20 may be used to adjust the location of the container 30 in the up and down direction inside the barrier container 40. In an example, the oxygen reactant 20 is disposed below the upright container 30. In this case, the container 30 can be disposed above as compared to a case where the oxygen reactant 20 is not disposed below the container 30. Thus, the positional relationship between the container 30 and an apparatus used to measure the oxygen concentration, that is, for example, the light source 951 and the measuring instrument 952, can be adjusted.

The oxygen reactant 20 may be disposed above the upright container 30. In this case, as described above, the oxygen reactant 20 is easily used as a marker at the time of identifying a location suitable as a location where laser light or LED light is applied to the container 30. The oxygen reactant 20 is easily used as a marker at the time of identifying a location suitable as a location where light for causing the fluorescent material 27 to emit fluorescence is applied to the container 30.

There is a case where a pressing member for pressing the container 30 is brought close to the liquid-filled combination container 10L from above and deforms the flexible barrier container 40 to hold the container 30 between the pressing member and the placement surface and then the oxygen concentration in the container 30 is measured. In this case, there is a case where, because of a small dimension in the up and down direction of the upright container 30, the pressing member cannot contact with the container 30 and, as a result, the container 30 cannot be held between the pressing member and the placement surface. In this case, the oxygen reactant 20 may be disposed above the upright container 30. Thus, force from the pressing member via the oxygen reactant 20 can be transmitted to the container 30 by bringing the pressing member into contact with the oxygen reactant 20. For this reason, the container 30 together with the oxygen reactant 20 can be held between the pressing member and the placement surface.

Various changes may be applied to the above-described second embodiment. Hereinafter, modifications of the second embodiment will be described with reference to the drawings as needed. In the following description and the drawings used in the following description, like reference signs to the reference signs used for corresponding portions in the second embodiment are used for portions that can be similarly configured to those of the second embodiment, and the description thereof may not be repeated. When the operation and advantageous effects obtained in the second embodiment are also apparently obtained in the modifications, the description thereof may be omitted.

Fourth Modification

Figure 19:
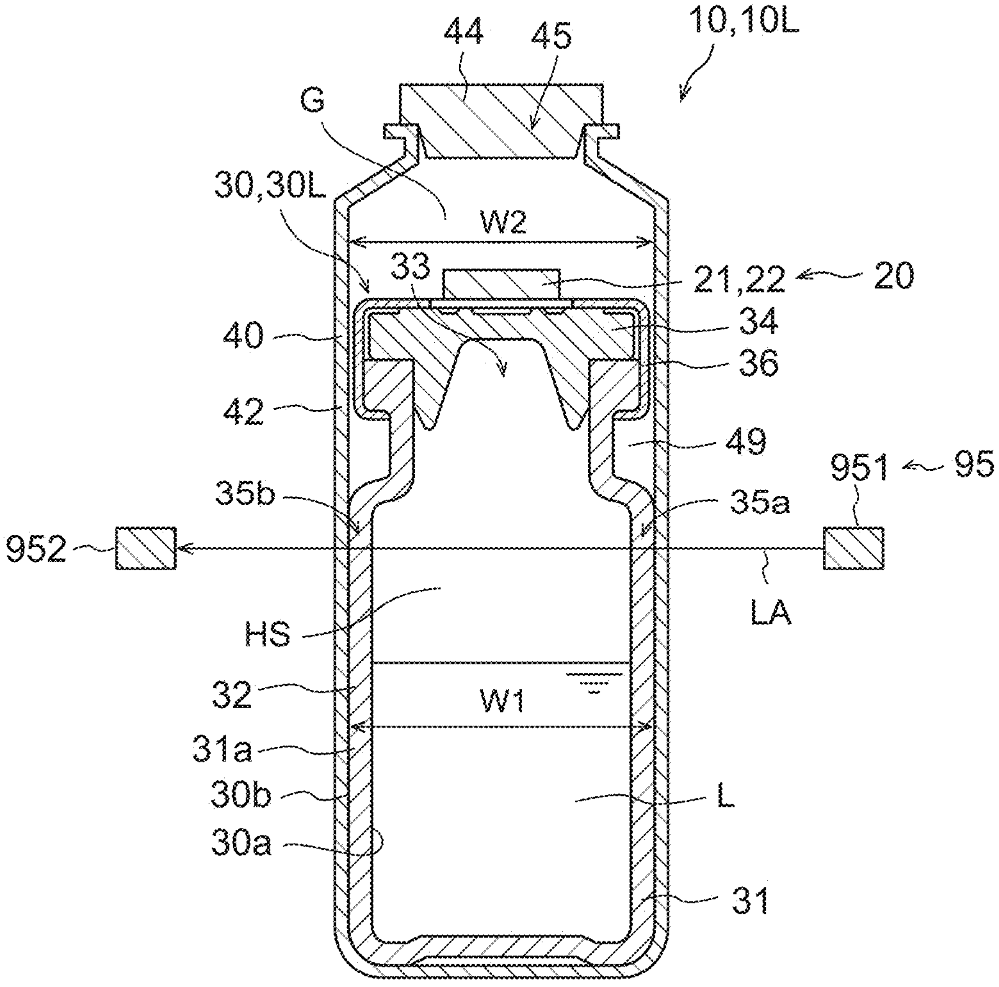
FIG. 19 is a sectional view that shows a liquid-filled combination container according to a fourth modification.

The barrier container 40 may be designed such that, when the container 30 is accommodated in the barrier container 40, the barrier container 40 contacts with the outer surface 30*b* of the container 30 at the first location 35*a* and the second location 35*b*. FIG. 19 is a view that shows the liquid-filled combination container 10L according to a fourth modification. FIG. 19 corresponds to the sectional view of the liquid-filled combination container 10L in a state where the barrier container 40 is brought into contact with the outer surface 30*b* of the container 30 at the first location 35*a* and the second location 35*b*.

The liquid-filled combination container 10L shown in FIG. 19 is similar to the liquid-filled combination container 10L shown in FIG. 15 except that no fluorescent material 27 is provided. As in the case of the liquid-filled combination container 10L shown in FIG. 15, the container 30 is a vial bottle including the container body 32 that is a glass bottle, and the stopper 34. The container 30 has substantially a circular cylindrical outer shape. The barrier container 40 has substantially a circular cylindrical outer shape. Then, as shown in FIG. 19, the outside diameter w1 of the container 30 coincides with the inside diameter w2 of the barrier container 40. For this reason, when the container 30 is accommodated in the barrier container 40, the barrier container 40 voluntarily contacts with the outer surface 30*b* of the container 30 at the first location 35*a* and the second location 35*b*.

The barrier container 40 shown in FIG. 19 can stably maintain, particularly, a state where the barrier container 40 contacts with the outer surface 30*b* of the container 30 at the first location 35*a* and the second location 35*b*. In the barrier container 40 shown in FIG. 19 as well, since the barrier container 40 is in contact with the outer surface 30*b* of the container 30 at the first location 35*a* and the second location 35*b*, the influence of the oxygen concentration in the barrier container space 49 on the attenuation factor to be measured can be removed. The positional relationship between the container 30 and the barrier container 40 is determined.

Fifth Modification

In the above-described second embodiment and fourth modification, the liquid-filled combination container 10L in which the barrier container 40 contacts with the outer surface 30*b* of the container 30 at the first location 35*a* and the second location 35*b* has been described. In the above-described second embodiment and fourth modification, the inspection method of, in a state where the barrier container 40 is in contact with the outer surface 30*b* of the container 30 at the first location 35*a* and the second location 35*b*, applying laser light or LED light to the liquid-filled combination container 10L has been described. However, the liquid-filled combination container 10L and the inspection method for the liquid-filled combination container 10L are not limited thereto.

The first location 35*a* and the second location 35*b* that allow laser light or LED light to penetrate therethrough are not limited as long as the oxygen reactant 20 is spaced apart from a straight line connecting the first location 35*a* with the second location 35*b*. In the liquid-filled combination container 10L, the barrier container 40 does not need to contact with the outer surface 30*b* of the container 30 at the first location 35*a* and the second location 35*b*. In other words, the first location 35*a* and the second location 35*b* of the container 30 may be determined at locations where the barrier container 40 does not contact with the outer surface 30*b*. In the inspection method for the liquid-filled combination container 10L, in a state where the barrier container 40 is not in contact with the outer surface 30*b* of the container 30, laser light or LED light may be applied to the liquid-filled combination container 10L. In the inspection method for the liquid-filled combination container 10L, laser light or LED light may be applied to the liquid-filled combination container 10L so as to penetrate through a location where the container 30 is not in contact with the barrier container 40. In this case, when the oxygen concentration in the container 30 of the same liquid-filled combination container 10L is measured at a plurality of time points or when the oxygen concentration in each of the containers 30 of a plurality of liquid-filled combination containers 10L is measured, the inspection method is performed as follows. The positional relationship among the container 30, the barrier container 40, the light source 951, and the measuring instrument 952 is aligned, and laser light or LED light is applied to the liquid-filled combination container 10L. Thus, by aligning the conditions of measurement of the attenuation factor, such as the length of the optical path LA of laser light or LED light, the measurement accuracy of the oxygen concentration to be measured in accordance with the attenuation factor can be improved.

Figure 20:
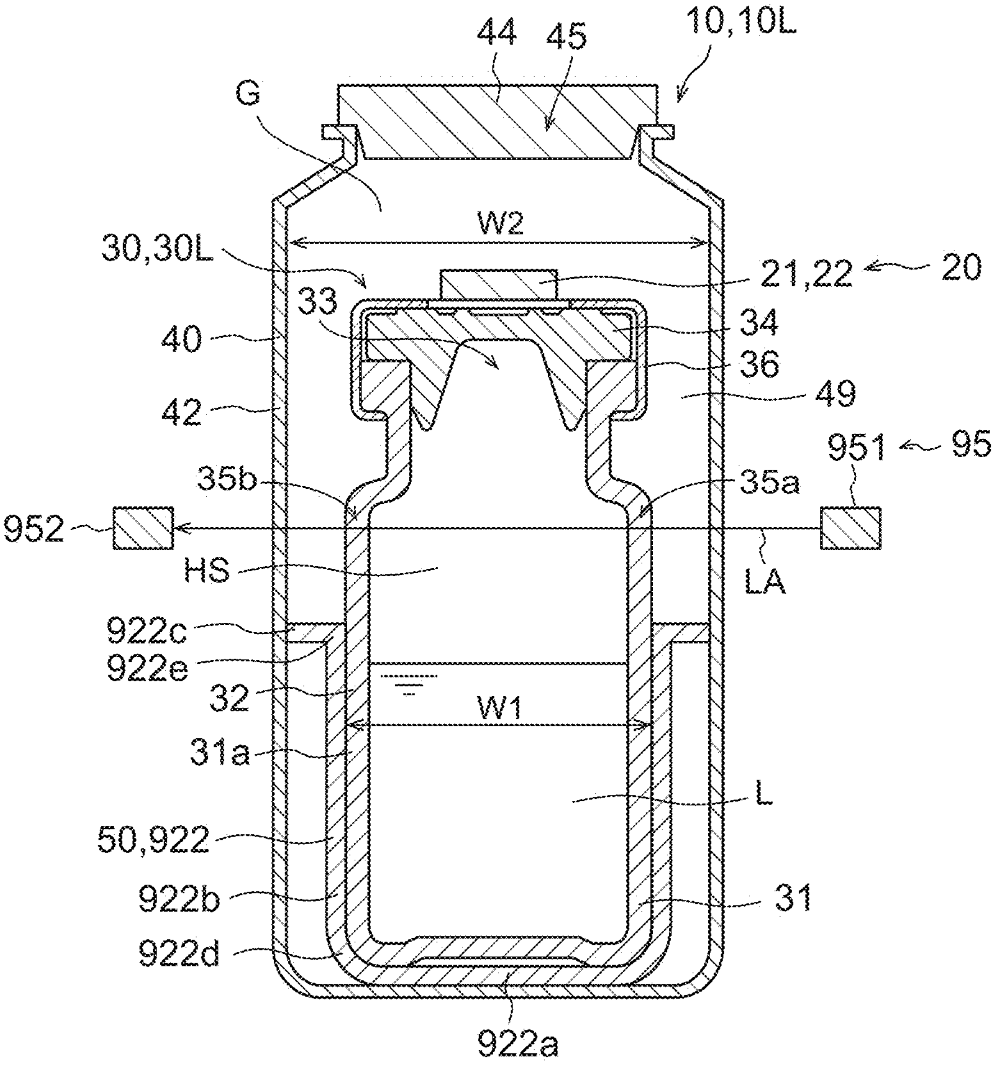
FIG. 20 is a view that shows an example of an inspection method for a liquid-filled combination container according to a fifth modification.
Figure 21:
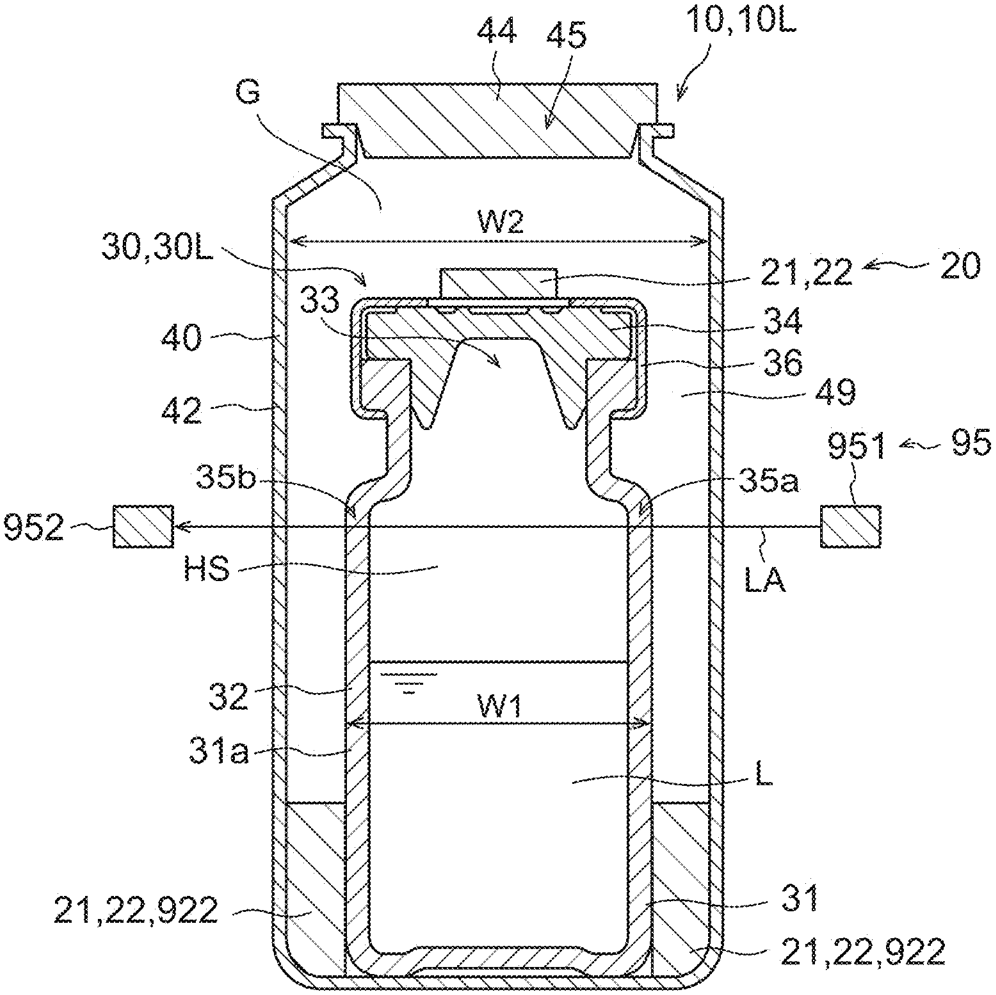
FIG. 21 is a view that shows another example of the inspection method for the liquid-filled combination container according to the fifth modification.

In the fifth modification, the container 30 is fixed to the barrier container 40. FIG. 20 is a view that shows an example of a state where laser light or LED light is applied to the liquid-filled combination container 10L in the inspection method for the liquid-filled combination container 10L according to the fifth modification. FIG. 21 is a view that shows another example of a state where laser light or LED light is applied to the liquid-filled combination container 10L in the inspection method for the liquid-filled combination container 10L according to the fifth modification. In the example shown in FIGS. 20 and 21, the container 30 is fixed to the barrier container 40 by the second fixing member 922 different from the container 30 or the barrier container 40. In an example, the container 30 is fixed to the barrier container 40 at least while laser light or LED light is applied to the liquid-filled combination container 10L. Although not shown in the drawing, the container 30 may be fixed to the barrier container 40 by being bonded to the inner surface of the barrier container 40 with a bonding material or the like. The liquid-filled combination container 10L in which the positional relationship between the container 30 and the barrier container 40 is determined by the contact between the outer surface 30*b* of the container 30 and the inner surface of the barrier container 40 as shown in FIG. 19 is also included in the liquid-filled combination container 10L in which the container 30 is fixed to the barrier container 40. Since the container 30 is fixed to the barrier container 40, the oxygen concentration can be measured while the positional relationship between the container 30 and the barrier container 40 is aligned. Specifically, when the oxygen concentration in the container 30 of the same liquid-filled combination container 10L is measured at a plurality of time points or when the oxygen concentration in each of the containers 30 of a plurality of liquid-filled combination containers 10L is measured, the oxygen concentration can be measured while the positional relationship between the container 30 and the barrier container 40 is aligned.

The barrier container 40 of the liquid-filled combination container 10L shown in FIGS. 20 and 21 is similar to the barrier container 40 shown in FIG. 16. The liquid-filled container 30L of the liquid-filled combination container 10L shown in FIGS. 20 and 21 is similar to the liquid-filled container 30L shown in FIGS. 1 and 2 except that no fluorescent material 27 is provided. In the example shown in FIGS. 20 and 21, the liquid-filled combination container 10L includes the single oxygen reactant 20. In the example shown in FIGS. 20 and 21, the oxygen reactant 20 is the oxygen absorber 21. In the example shown in FIG. 20, the oxygen reactant 20 is fixed to the outer surface 30*b* of the container 30. In the example shown in FIG. 20, the oxygen reactant 20 is fixed to the stopper 34 of the container 30.

In the example shown in FIGS. 20 and 21, the location of the barrier container 40 with respect to the container 30 is fixed by a second fixing member 922 different from the container 30 or the barrier container 40. Thus, the positional relationship between the container 30 and the barrier container 40 can be aligned.

In the example shown in FIG. 20, the second fixing member 922 is a tray container. A container that accommodates the container 30 and that is accommodated in the barrier container 40, like the tray container shown in FIG. 20, is referred to as an intermediate container 50. The second fixing member 922 shown in FIG. 20 includes a bottom part 922*a*, a side part 922*b*, and a flange 922*c*. The side part 922*b* is connected to the periphery of the bottom part 922*a* at a first end 922*d*. The side part 922*b* is connected to the flange 922*c* at a second end 922*e* located on an opposite side to the first end 922*d*. In this case, the material of the second fixing member 922 is similar to, for example, the material of the container 30 or the barrier container 40.

In the example shown in FIG. 20, the second fixing member 922 is held between the outer surface 30*b* of the container 30 and the inner surface of the barrier container 40 to fix the location of the barrier container 40 with respect to the container 30. The second fixing member 922 is in contact with the outer surface 30*b* of the container 30 at the bottom part 922*a* and the side part 922*b* and is in contact with the inner surface of the barrier container 40 at the flange 922*c*.

The container 30 is accommodated in the intermediate container 50 to be supported by the intermediate container 50 and is still standing. Particularly, the container 30 is upright in the barrier container 40. In the example shown in FIG. 20, the whole of the second fixing member 922 (intermediate container 50) is located below the first location 35*a* and the second location 35*b* of the container 30 upright in the barrier container 40.

In the example shown in FIG. 21, the oxygen reactant 20 serves as the second fixing member 922. In other words, the oxygen reactant 20 is held between the outer surface 30*b* of the container 30 and the inner surface of the barrier container 40 to fix the location of the barrier container 40 with respect to the container 30. In the example shown in FIG. 21, the oxygen reactant 20 is the oxygen absorber 21. In the example shown in FIG. 21, the oxygen reactant 20 is held between the outer surface 30*b* of the container 30 and the inner surface of the barrier container 40. Thus, movement of the oxygen reactant 20 in the horizontal direction is suppressed. In the example shown in FIG. 21, the container 30 of the liquid-filled combination container 10L is in a still standing state, particularly, in an upright state. In this state, movement of the oxygen reactant 20 in the up and down direction is suppressed by the action of gravitational force. Thus, the oxygen reactant 20 is fixed to the outer surface 30*b* of the container 30 and the inner surface of the barrier container 40.

In the fifth modification, the parts of the container 30 and the barrier container 40, which allow laser light or LED light to penetrate therethrough, are transparent. Thus, the influence of attenuation of laser light or LED light at the time of penetrating through the container 30 and the barrier container 40 on the attenuation factor to be measured can be reduced.

When the first standard sample measurement step is performed in the fifth modification, laser light or LED light may be applied to the first standard sample in a state where the location of the barrier container 401 of the first standard sample with respect to the container 301 of the first standard sample is fixed by the second fixing member 922. When the second standard sample measurement step is performed in the fifth modification, laser light or LED light may be applied to the second standard sample in a state where the location of the barrier container 402 of the second standard sample with respect to the container 302 of the second standard sample is fixed by the second fixing member 922. Thus, the conditions of measurement of the attenuation factor, such as the length of the optical path LA of laser light or LED light, can be aligned among the attenuation factor measurement step, the first standard sample measurement step, and the second standard sample measurement step.

Sixth Modification

Figure 22A:
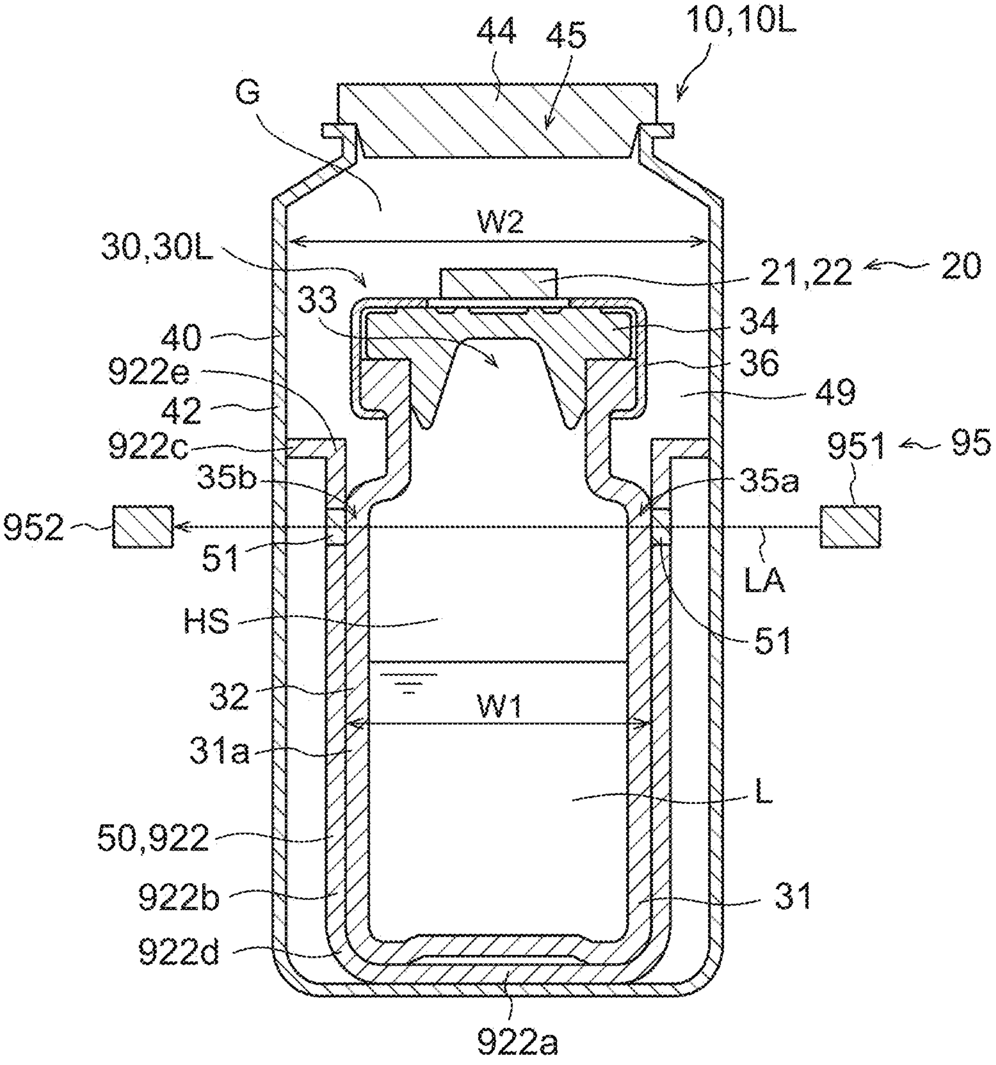
FIG. 22A is a view that shows an example of a liquid-filled combination container according to a sixth modification.

The mode of the intermediate container 50 is not limited to the mode shown in FIG. 20. FIG. 22A is a view that shows an example of a state where laser light or LED light is applied to the liquid-filled combination container 10L in the inspection method for the liquid-filled combination container 10L according to a sixth modification. The liquid-filled combination container 10L shown in FIG. 22A is similar to the barrier container 40 shown in FIG. 20 except that the mode of the intermediate container 50 is different.

In the example shown in FIG. 22A, part of the intermediate container 50 is located above the first location 35*a* and the second location 35*b* of the container 30 upright in the barrier container 40. For this reason, the intermediate container 50 covers the first location 35*a* and the second location 35*b* of the container 30 from the outer circumference of the container 30. As shown in FIG. 22A, the intermediate container 50 includes intermediate container light transmitting portions 51 that intersect with a straight line connecting the first location 35*a* with the second location 35*b* of the container 30 and that pass light. In the example shown in FIG. 22A, the straight line representing the optical path LA corresponds to the straight line connecting the first location 35*a* with the second location 35*b*. In the example shown in FIG. 22A, the intermediate container 50 includes the pair of intermediate container light transmitting portions 51. The mode of the intermediate container light transmitting portions 51 is not limited as long as the intermediate container light transmitting portions 51 pass light. In an example, the intermediate container light transmitting portions 51 are made of a material having light transmission properties. The intermediate container light transmitting portions 51 may be through-holes provided at the wall of the intermediate container 50. When the intermediate container light transmitting portions 51 are through-holes, the intermediate container light transmitting portions 51 are regarded as intersecting with the straight line connecting the first location 35*a* with the second location 35*b* when the straight line connecting the first location 35*a* with the second location 35*b* of the container 30 passes through the through-holes.

Since the intermediate container 50 includes the intermediate container light transmitting portions 51, even when the intermediate container 50 covers the first location 35*a* and the second location 35*b* of the container 30, laser light or LED light can be applied so as to penetrate through the container 30 at the first location 35*a* and the second location 35*b*.

Seventh Modification

Figure 22B:
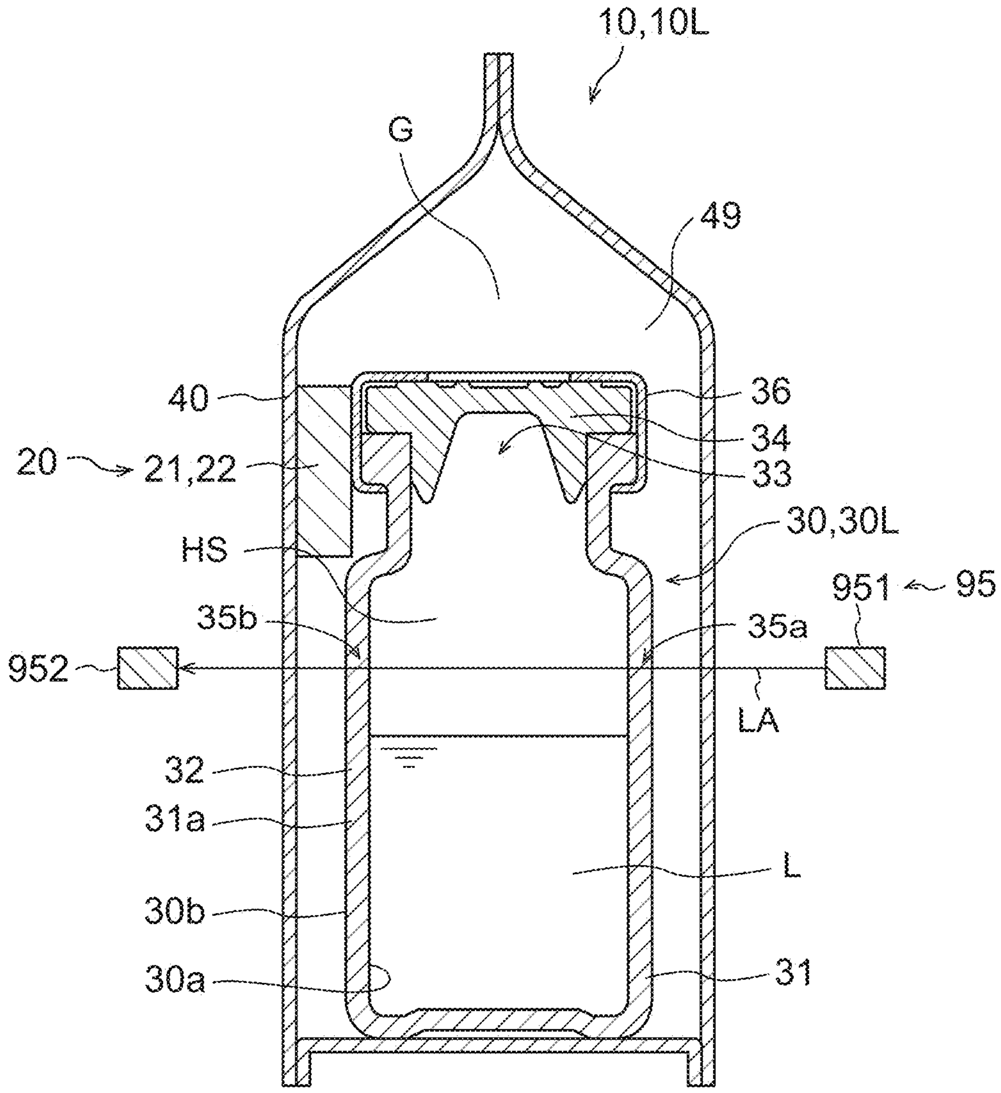
FIG. 22B is a view that shows an example of a liquid-filled combination container according to a seventh modification.

The barrier container 40 does not need to be fixed to the container 30. FIG. 22B is a view that shows an example of a state where laser light or LED light is applied to the liquid-filled combination container 10L in the inspection method for the liquid-filled combination container 10L according to a seventh modification. The liquid-filled combination container 10L shown in FIG. 22B is similar to the liquid-filled combination container 10L shown in FIG. 17 except that no shrink film 91 is provided and the barrier container 40 is not in contact with the outer surface 30*b* of the container 30 at the first location 35*a* and the second location 35*b*.

In the example shown in FIG. 22B, the barrier container 40 is not fixed to the container 30. In the liquid-filled combination container 10L shown in FIG. 22B as well, the oxygen concentration in the container 30 can be measured in accordance with the attenuation factor of laser light or LED light, measured by applying the laser light or the LED light to the liquid-filled combination container 10L. Particularly, in a case where the influence of oxygen located outside the container 30 on the attenuation factor to be measured is sufficiently smaller than the influence of oxygen located inside the container 30, the measurement accuracy of the oxygen concentration can be sufficiently high even when the barrier container 40 is not fixed to the container 30. The case where the influence of oxygen located outside the container 30 on the attenuation factor to be measured is sufficiently smaller than the influence of oxygen located inside the container 30 is, for example, a case where the oxygen concentration outside the container 30 is sufficiently smaller than the oxygen concentration in the container 30.

In the example shown in FIG. 22B, the optical path LA passes through the inside of the container 30 and passes through the barrier container space 49 and the outside of the barrier container 40. For this reason, the attenuation factor to be measured receives the influence of oxygen inside the container 30 and receives the influence of oxygen inside the barrier container space 49 and outside the barrier container 40. In this case, in a case where the influence of oxygen inside the barrier container space 49 and outside the barrier container 40 on the attenuation factor is sufficiently smaller than the influence of oxygen located inside the container 30, the measurement accuracy of the oxygen concentration can be sufficiently high even when the barrier container 40 is not fixed to the container 30.

Although not shown in the drawing, the characteristic that the barrier container 40 is not fixed to the container 30 may be combined with the liquid-filled combination container 10L including the fluorescent material 27 according to the first embodiment. In this case as well, the oxygen concentration in the container 30 can be measured in accordance with the fluorescence time or the fluorescence intensity of the fluorescent material 27, measured by applying light for causing the fluorescent material 27 to emit fluorescence to the fluorescent material 27. Particularly, in a case where the influence of oxygen located outside the container 30 on the fluorescence time or the fluorescence intensity of the fluorescent material 27 to be measured is sufficiently smaller than the influence of oxygen located inside the container 30, the measurement accuracy of the oxygen concentration can be sufficiently high.

Eighth Modification

Figure 22C:
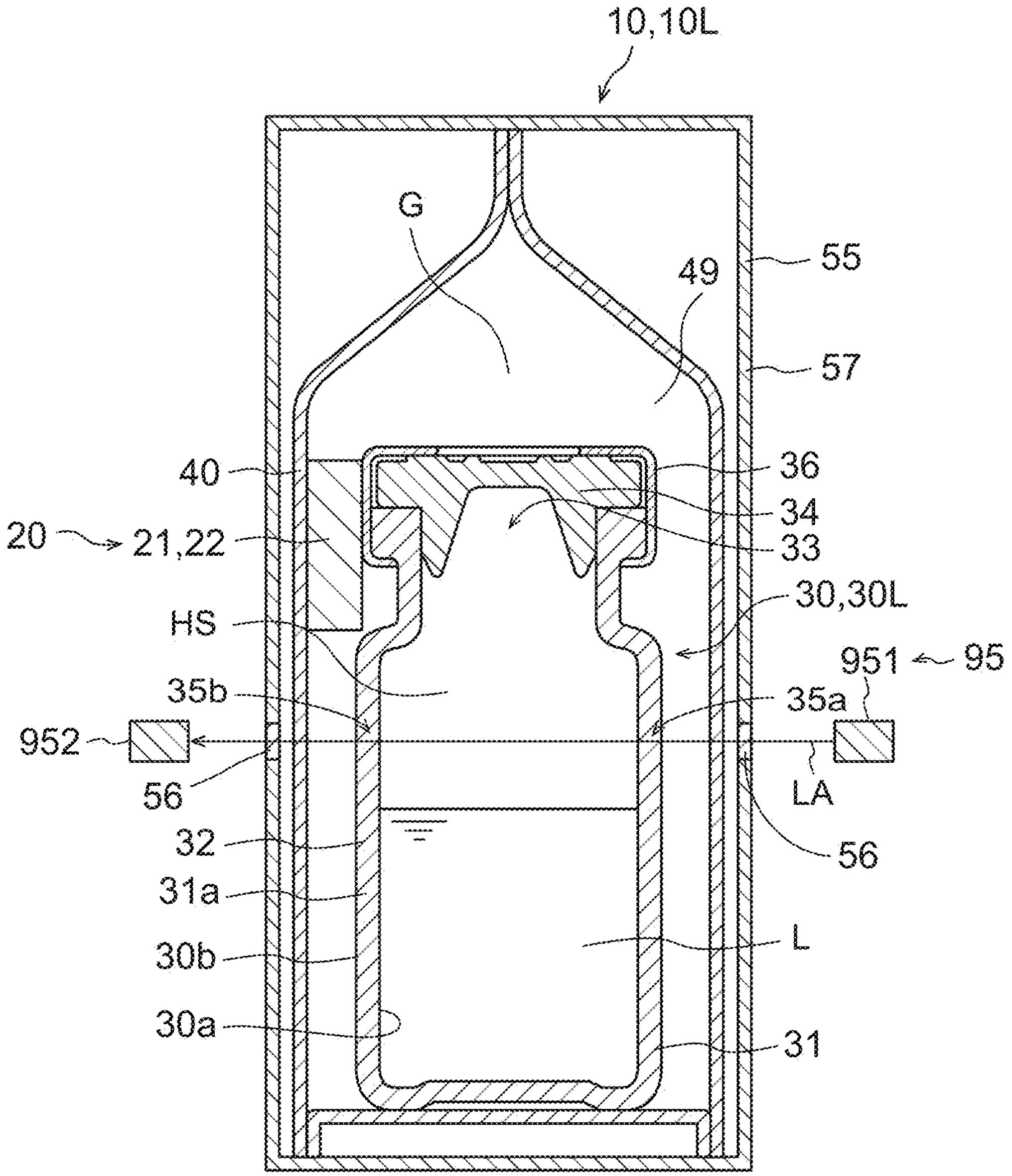
FIG. 22C is a view that shows an example of a liquid-filled combination container according to an eighth modification.

The liquid-filled combination container 10L may further include an outer container 55 that accommodates the barrier container 40. FIG. 22C is a view that shows an example of a state where laser light or LED light is applied to the liquid-filled combination container 10L in the inspection method for the liquid-filled combination container 10L according to an eighth modification. The liquid-filled combination container 10L shown in FIG. 22C is similar to the liquid-filled combination container 10L shown in FIG. 22B except that the outer container 55 is provided. The outer container 55 may support the container 30 and the barrier container 40. The container 30 may be supported by the outer container 55 to be still standing.

As shown in FIG. 22C, the outer container 55 includes light transmitting portions 56 that intersect with a straight line connecting the first location 35*a* with the second location 35*b* of the container 30 and that pass light. In the example shown in FIG. 22C, the straight line representing the optical path LA corresponds to the straight line connecting the first location 35*a* with the second location 35*b*. In the example shown in FIG. 22C, the outer container 55 includes the pair of light transmitting portions 56.

In the example shown in FIG. 22C, the outer container 55 includes an outer container body 57 and the light transmitting portions 56 provided in the outer container body 57. In an example, the outer container body 57 does not have light transmission properties. The material of the outer container body 57 is, for example, paper. The outer container body 57 is, for example, a paper box.

The mode of the light transmitting portions 56 is not limited as long as the light transmitting portions 56 pass light. In an example, the light transmitting portions 56 are made of a material having light transmission properties. The light transmitting portions 56 may be through-holes provided in the outer container body 57. When the light transmitting portions 56 are through-holes, the light transmitting portions 56 are regarded as intersecting with the straight line connecting the first location 35*a* with the second location 35*b* when the straight line connecting the first location 35*a* with the second location 35*b* of the container 30 passes through the through-holes.

Since the outer container 55 includes the light transmitting portions 56, even when the barrier container 40 includes the outer container 55, laser light or LED light can be applied so as to penetrate through the container 30 at the first location 35*a* and the second location 35*b*.

Ninth Modification

Figure 23A:
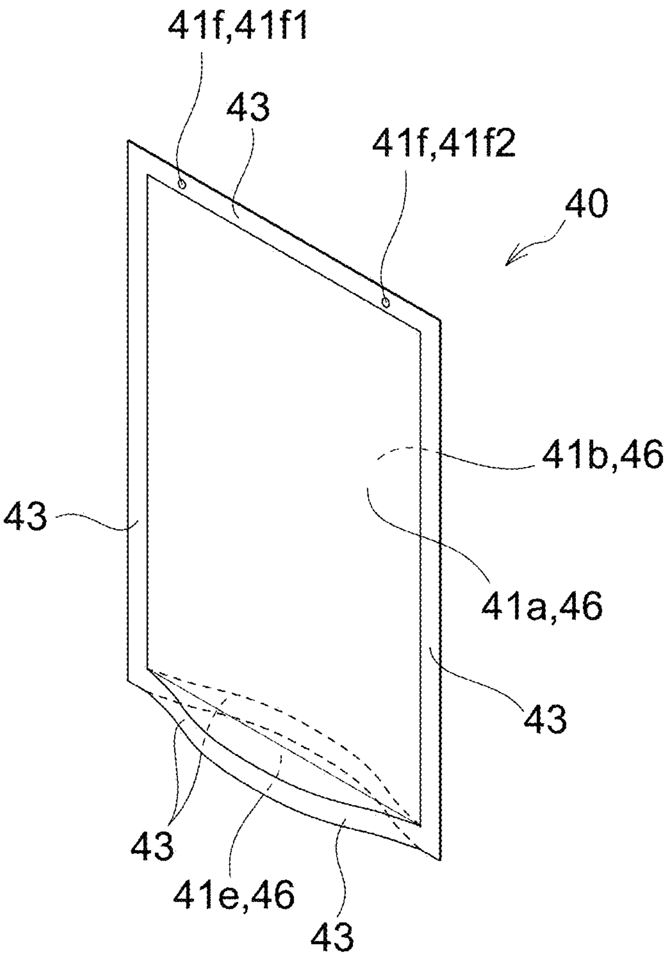
FIG. 23A is a view that shows an example of a barrier container according to a ninth modification.

The mode of the barrier container 40 is not limited to the above-described modes. FIG. 23A is a perspective view that shows an example of a barrier container 40 according to a ninth modification. The barrier container 40 shown in FIG. 23A, as in the case of the barrier container 40 shown in FIG. 4, is closed by joining films to form the seal part 43. The mode of the barrier container 40 shown in FIG. 23A is similar to the barrier container 40 shown in FIG. 4 except a point described later. The barrier container 40 shown in FIG. 23A includes seal part through-holes 41*f* provided in the seal part 43.

An opposite side to the bottom side of the barrier container 40 shown in FIG. 23A is referred to as an upper end side of the barrier container 40. In the barrier container 40 shown in FIG. 23A, the seal part through-holes 41*f* are provided at parts of the seal part 43, located at the upper end side of the barrier container 40.

Since the barrier container 40 includes the seal part through-holes 41*f*, the liquid-filled combination container 10L can be transferred by using the seal part through-holes 41*f*. For example, the liquid-filled combination container 10L can be hung by a hook-shaped member by passing the distal end of the hook-shaped member through the seal part through-holes 41*f*. When the hook-shaped member is moved in a state where the liquid-filled combination container 10L is hung by the hook-shaped member, the liquid-filled combination container 10L can be transferred. The barrier container 40 may include the plurality of seal part through-holes 41*f*. In this case, at the time of hanging the liquid-filled combination container 10L by using the seal part through-holes 41*f*, the distal end of each of the plurality of hook-shaped members may be passed through a corresponding one of the plurality of seal part through-holes 41*f*. In the example shown in FIG. 23A, the barrier container 40 includes the two seal part through-holes 41*f*, that is, a first seal part through-hole 41*f*1 and a second seal part through-hole 41*f*2. In this case, a first hook-shaped member may be passed through the first seal part through-hole 41*f*1, and a second hook-shaped member may be passed through the second seal part through-hole 41*f*2.

When the oxygen concentration in the container 30 is measured in a state where the liquid-filled combination container 10L is hung by passing the distal ends of the hook-shaped members through the seal part through-holes 41*f* of the barrier container 40, the following advantageous effect is obtained. The location of the container 30 in the barrier container 40 is determined by the action of gravitational force. For this reason, when the oxygen concentration in the container 30 of the same liquid-filled combination container 10L is measured at a plurality of time points, the location of the container 30 in the barrier container 40 at each time point of measurement can be aligned. Similarly, in a case where the oxygen concentration in each of the containers 30 of a plurality of liquid-filled combination containers 10L is measured, the location of the container 30 in the barrier container 40 at a time point of measurement can be aligned. Thus, the measurement accuracy of the oxygen concentration can be improved by aligning the conditions of measurement for measuring the oxygen concentration in the container 30. Particularly, by passing the distal end of each of the plurality of hook-shaped members through a corresponding one of the plurality of seal part through-holes 41*f*, the liquid-filled combination container 10L is stably supported by the hook-shaped members. For this reason, the location of the container 30 in the barrier container 40 in a state where the liquid-filled combination container 10L is hung is further stably determined. Thus, the measurement accuracy of the oxygen concentration can be further improved.

As shown in FIG. 4, the barrier container 40 does not need to include a seal part through-hole 41*f*. The barrier container 40 shown in FIG. 4 and the barrier container 40 shown in FIG. 23A each can be hung by a first member and a second member by sandwiching the seal part 43 by the first member and the second member. By hanging the barrier container 40 with the first member and the second member, the location of the container 30 in the barrier container 40 is determined by the action of gravitational force. Thus, the measurement accuracy of the oxygen concentration can be improved.

The container 30 may be still standing by hanging the liquid-filled combination container 10L. In other words, the location of the container 30 in the barrier container 40 may be determined by hanging the liquid-filled combination container 10L, and the liquid level of the liquid L contained in the containing portion 31 may be stable.

Tenth Modification

In the above-described first embodiment, second embodiment, and modifications, an example in which the oxygen reactant 20 is fixed to at least any one of the outer surface 30*b* of the container 30 and the inner surface of the barrier container 40 has been described. However, the liquid-filled combination container 10L is not limited thereto. The oxygen reactant 20 does not need to be fixed to any of the outer surface 30*b* of the container 30 and the inner surface of the barrier container 40.

Figure 23B:
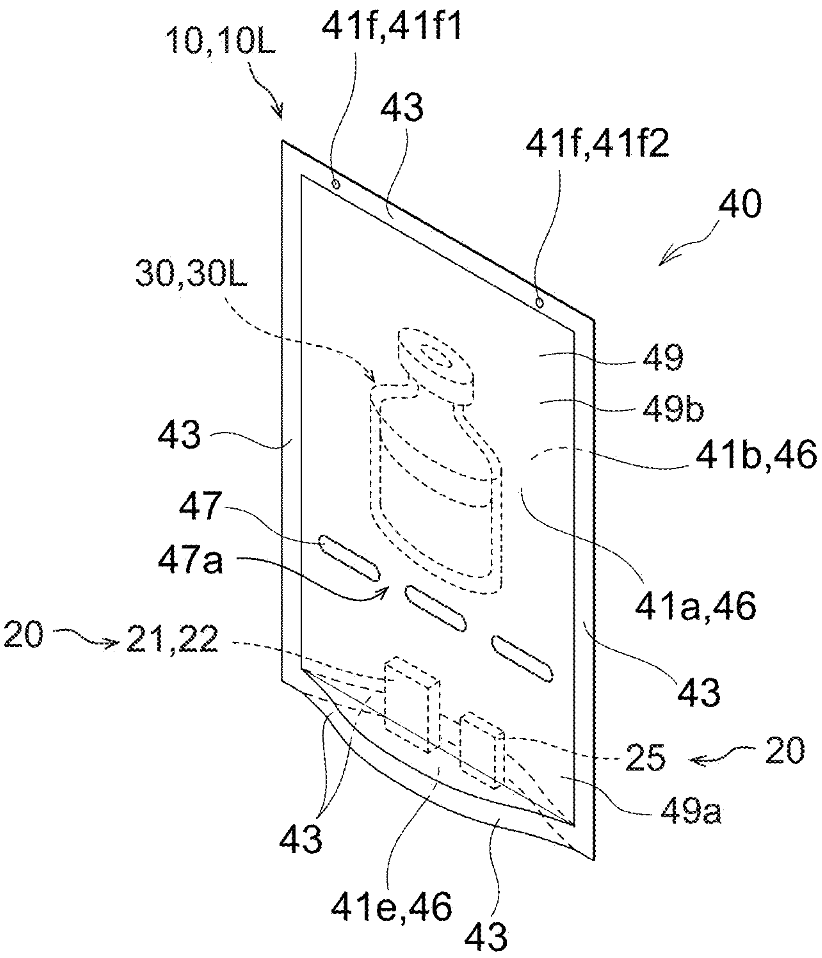
FIG. 23B is a view that shows an example of a liquid-filled combination container according to a tenth modification.

FIG. 23B is a perspective view that shows an example of the liquid-filled combination container 10L according to a tenth modification. The barrier container 40 of the liquid-filled combination container 10L shown in FIG. 23B is similar to the barrier container 40 shown in FIG. 23A except a point described later. The oxygen reactant 20 is not fixed to the inner surface of the barrier container 40 shown in FIG. 23B. An oxygen reactant accommodating portion 49*a* that accommodates the oxygen reactant 20 is defined in part in the barrier container 40 shown in FIG. 23B. The oxygen reactant accommodating portion 49*a* is defined in part of the barrier container space 49. The liquid-filled combination container 10L shown in FIG. 23B further includes the container 30 containing liquid L, and the oxygen reactants 20. The liquid-filled combination container 10L shown in FIG. 23B includes the oxygen absorber 21 and the oxygen sensing material 25 as the oxygen reactants 20.

In the liquid-filled combination container 10L shown in FIG. 23B, the oxygen concentration in the container 30 can be measured by the following method. Appropriate locations of the container 30 are determined as the first location 35*a* and the second location 35*b*. Subsequently, the attenuation factor of laser light or LED light is measured by applying the laser light or the LED light to the liquid-filled combination container 10L such that the laser light or the LED light penetrates through the first location 35*a* and the second location 35*b*. Then, the oxygen concentration in the container 30 is measured from the measured attenuation factor.

In an example, the containing portion of the barrier container 40 is divided into a plurality of portions including the oxygen reactant accommodating portion 49*a* and a container accommodating portion 49*b* accommodating the container 30 containing the liquid L. The accommodating portion of the barrier container 40 shown in FIG. 23B is divided into two portions including the oxygen reactant accommodating portion 49*a* and the container accommodating portion 49*b*. The accommodating portion of the barrier container 40 is divided such that oxygen can move between the oxygen reactant accommodating portion 49*a* and the container accommodating portion 49*b* and the container 30 and the oxygen reactants 20 cannot move between the oxygen reactant accommodating portion 49*a* and the container accommodating portion 49*b*.

The first main film 41*a* and the second main film 41*b* of the barrier container 40 shown in FIG. 23B are joined to each other by the seal part 43 and are joined to each other by a dividing seal part 47. The dividing seal part 47 divides the containing portion of the barrier container 40. In the example shown in FIG. 23B, the containing portion of the barrier container 40 is divided by the dividing seal part 47 into the oxygen reactant accommodating portion 49*a* and the container accommodating portion 49*b*. The dividing seal part 47 includes gaps 47*a* where the first main film 41*a* and the second main film 41*b* are not joined to each other. The width of each gap is smaller than the minimum width of each of the container 30 and the oxygen reactants 20. Oxygen can move between the oxygen reactant accommodating portion 49*a* and the container accommodating portion 49*b* via the gaps 47*a* of the dividing seal part 47. Movement of the container 30 accommodated in the container accommodating portion 49*b* to the oxygen reactant accommodating portion 49*a* is stopped by the dividing seal part 47. Movement of the oxygen reactants 20 accommodated in the oxygen reactant accommodating portion 49*a* to the container accommodating portion 49*b* is stopped by the dividing seal part 47.

A method of dividing the containing portion of the barrier container 40 into a plurality of portions including the oxygen reactant accommodating portion 49*a* is not limited to the method of providing the dividing seal part 47. The accommodating portion of the barrier container 40 may be divided by, for example, forming a plurality of through-holes extending through the first main film 41*a* and the second main film 41*b* and deforming and engaging the first main film 41*a* and the second main film 41*b* around the through-holes formed.

In the liquid-filled combination container 10L shown in FIG. 23B, the container 30 is in an upright state. In the liquid-filled combination container 10L shown in FIG. 23B, the oxygen reactant accommodating portion 49*a* is located below the container accommodating portion 49*b*. The positional relationship between the oxygen reactant accommodating portion 49*a* and the container accommodating portion 49*b* is not limited to the example shown in FIG. 23B. Although not shown in the drawing, in the liquid-filled combination container 10L in which the container 30 is in an upright state, the oxygen reactant accommodating portion

49*a* may be located above the container accommodating portion 49*b*. Although not shown in the drawing, in the liquid-filled combination container 10L in which the container 30 is in an upright state, the oxygen reactant accommodating portion 49*a* and the container accommodating portion 49*b* may be arranged in a horizontal direction.

When the oxygen reactants 20 are accommodated in the oxygen reactant accommodating portion 49*a*, the oxygen reactants 20 are disposed at a location spaced apart from a straight line connecting the first location 35*a* with the second location 35*b*. In other words, the oxygen reactants 20 accommodated in the oxygen reactant accommodating portion 49*a* are not located on the straight line connecting the first location 35*a* with the second location 35*b*. For this reason, laser light or LED light can be applied so as to penetrate through the container 30 by setting the straight line connecting the first location 35*a* with the second location 35*b* for the optical path LA.

As shown in FIG. 23B, when the containing portion of the barrier container 40 is divided such that the container 30 and the oxygen reactants 20 cannot move between the oxygen reactant accommodating portion 49*a* and the container accommodating portion 49*b*, the following advantageous effect is particularly obtained. Movement of the oxygen reactants 20 to a location where the oxygen reactants 20 interfere with penetration of laser light or LED light through the container 30 at the first location 35*a* and the second location 35*b* can be suppressed.

Although not shown in the drawing, the characteristic that the oxygen reactants 20 are not fixed to the inner surface of the barrier container 40 and the oxygen reactant accommodating portion 49*a* that accommodates the oxygen reactants 20 in part of the inside of the barrier container 40 is defined may be combined with the liquid-filled combination container 10L including the fluorescent material 27 according to the first embodiment. In other words, the oxygen reactant accommodating portion 49*a* that accommodates the oxygen reactants 20 may be defined in part of the inside of the barrier container 40 of the liquid-filled combination container 10L including the fluorescent material 27. For example, the liquid-filled combination container 10L shown in FIG. 23B may include the fluorescent material 27 provided on the inner surface 30*a* of the container 30 at the fluorescent material installation location 39 apart from the contact region 31*a* of the containing portion 31, which contacts with the liquid L.

In the thus configured liquid-filled combination container 10L, the oxygen reactants 20 are accommodated in the oxygen reactant accommodating portion 49*a* to be disposed at a location not placed between the fluorescent material installation location 39 and the light transmission location 40*b*. For this reason, light can be applied from outside the barrier container 40 to the fluorescent material 27 by allowing the light to penetrate through the fluorescent material installation location 39 and the light transmission location 40*b*. In the thus configured liquid-filled combination container 10L, the oxygen concentration in the container 30 can be measured in accordance with the fluorescence time or the fluorescence intensity of the fluorescent material 27, measured by applying light for causing the fluorescent material 27 to emit fluorescence to the fluorescent material 27.

When the containing portion of the barrier container 40 of the liquid-filled combination container 10L including the fluorescent material 27 is divided such that the container 30 and the oxygen reactants 20 cannot move between the oxygen reactant accommodating portion 49*a* and the container accommodating portion 49*b*, the following advantageous effect is particularly obtained. It is possible to suppress movement of the oxygen reactants 20 to a location where the oxygen reactants 20 interfere with application of light to the fluorescent material 27.

The above-described characteristic of the liquid-filled combination container 10L shown in FIG. 23B can be applied to the liquid-filled combination container 10L including the fluorescent material 27 unless there is a contradiction.

Eleventh Modification

In the above-described tenth modification, the liquid-filled combination container 10L in which the accommodating portion of the barrier container 40 is divided such that the container 30 and the oxygen reactants 20 cannot move between the oxygen reactant accommodating portion 49*a* and the container accommodating portion 49*b* has been described. However, the liquid-filled combination container 10L is not limited thereto.

Figure 23C:
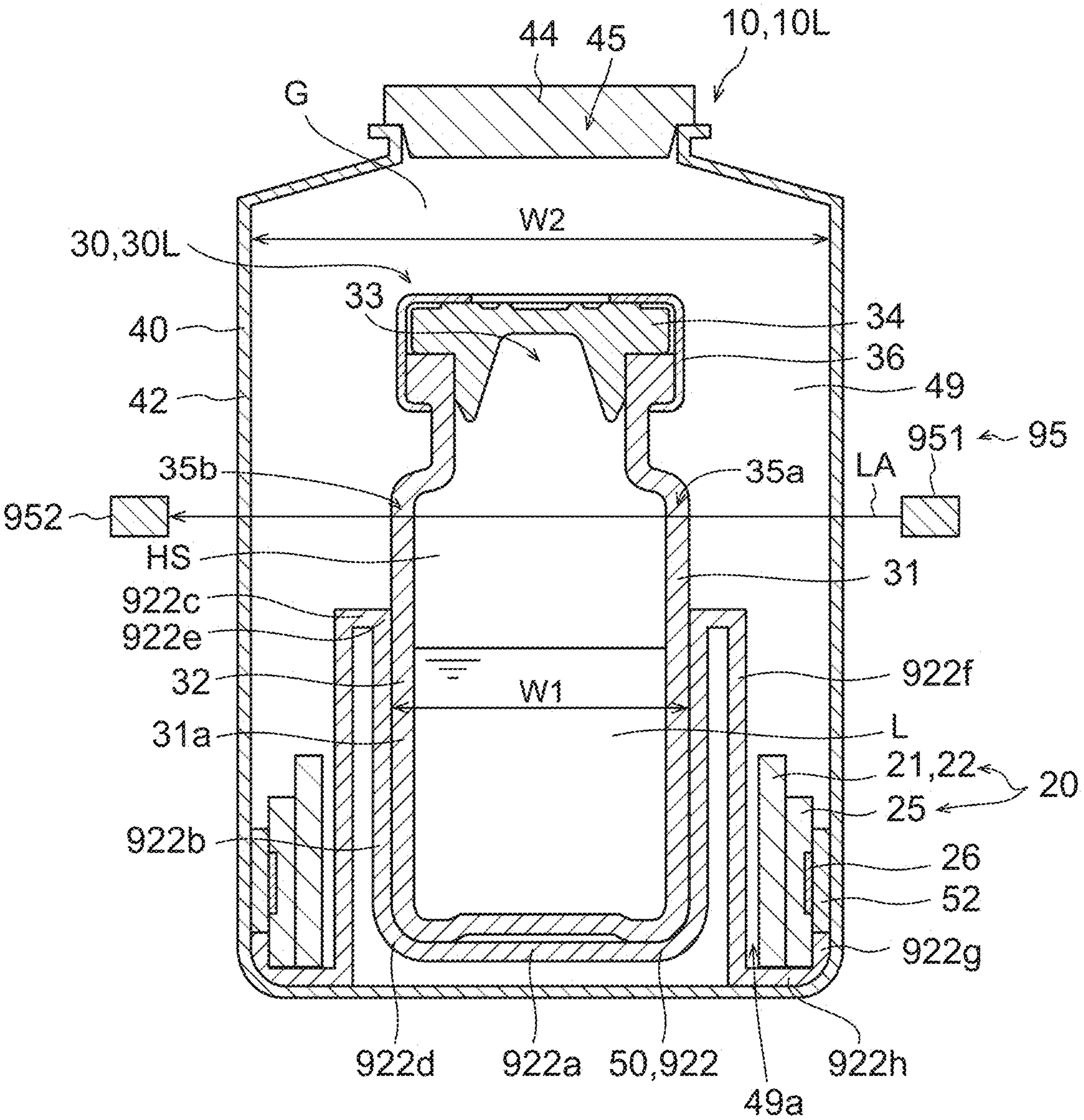
FIG. 23C is a view that shows an example of the liquid-filled combination container according to the tenth modification.

FIG. 23C is a sectional view that shows an example of the liquid-filled combination container 10L according to an eleventh modification. The liquid-filled combination container 10L shown in FIG. 23C is similar to the liquid-filled combination container 10L shown in FIG. 20 except a point described later. In the liquid-filled combination container 10L shown in FIG. 23C, the intermediate container 50 defines the oxygen reactant accommodating portion 49*a* accommodating the oxygen reactants 20 in part of the barrier container 40. The oxygen reactants 20 are accommodated in the oxygen reactant accommodating portion 49*a* defined by the intermediate container 50. The liquid-filled combination container 10L shown in FIG. 23C includes the oxygen absorber 21 and the oxygen sensing material 25 as the oxygen reactants 20.

The container 30 of the liquid-filled combination container 10L shown in FIG. 23C is in a still standing state, particularly, in an upright state. The intermediate container 50 of the liquid-filled combination container 10L shown in FIG. 23C further includes an accommodating portion first side part 922*f*, an accommodating portion second side part 922*g*, and an accommodating portion bottom part 922*h*. The accommodating portion first side part 922*f* is a plate-shaped part parallel to the up and down direction. The accommodating portion first side part 922*f* is connected at its upper end to an end of the flange 922*c* on an opposite side to an end connected to the side part 922*b*. The accommodating portion bottom part 922*h* is a plate-shaped part parallel to the horizontal direction. The accommodating portion bottom part 922*h* is connected at its one end to the lower end of the accommodating portion first side part 922*f*. The accommodating portion second side part 922*g* is a plate-shaped part parallel to the up and down direction. The accommodating portion second side part 922*g* is connected at its lower end to an end of the accommodating portion bottom part 922*h* on an opposite side to the end connected to the accommodating portion first side part 922*f*. The accommodating portion first side part 922*f*, the accommodating portion second side part 922*g*, and the accommodating portion bottom part 922*h* may be provided all around the outer circumference of the flange 922*c* or may be provided in part of the outer circumference of the flange 922*c*. The oxygen reactant accommodating portion 49*a* is defined by the accommodating portion first side part 922*f*, the accommodating portion second side part 922*g*, and the accommodating portion bottom part 922*h*.

In the liquid-filled combination container 10L shown in FIG. 23C, when the container 30 is in a still standing state, particularly, in an upright state, the oxygen reactant 20 is accommodated in the oxygen reactant accommodating portion 49*a* by using the action of gravitational force. In the eleventh modification as well, when the oxygen reactants 20 are accommodated in the oxygen reactant accommodating portion 49*a*, the oxygen reactants 20 are disposed at a location spaced apart from a straight line connecting the first location 35*a* with the second location 35*b*.

When the oxygen sensing material 25 is included in the oxygen reactants 20 accommodated in the oxygen reactant accommodating portion 49*a*, the intermediate container 50 may include a visual recognition allowing part 52 that allows the display part 26 of the oxygen sensing material 25 to be visually recognized from outside the intermediate container 50. In the example shown in FIG. 23C, the visual recognition allowing part 52 is provided at the accommodating portion second side part 922*g*. The mode of the visual recognition allowing part 52 is not limited as long as the visual recognition allowing part 52 allows the display part 26 of the oxygen sensing material 25 accommodated in the oxygen reactant accommodating portion 49*a* to be visually recognized. In an example, the visual recognition allowing part 52 is made of a transparent material. The visual recognition allowing part 52 may be a through-hole or a cutout provided at the wall of the intermediate container 50. When the visual recognition allowing part 52 is provided at the accommodating portion second side part 922*g*, the oxygen sensing material 25 may be accommodated such that the display part 26 is oriented toward the accommodating portion second side part 922*g* as shown in FIG. 23C. The oxygen sensing material 25 may be accommodated in the oxygen reactant accommodating portion 49*a* at a location closer to the accommodating portion second side part 922*g* than the oxygen absorber 21. Thus, the display part 26 can be easily visually recognized from outside the liquid-filled combination container 10L.

Although not shown in the drawing, the characteristic that the liquid-filled combination container 10L includes the intermediate container 50 and the characteristic that the intermediate container 50 defines the oxygen reactant accommodating portion 49*a* may be combined with the liquid-filled combination container 10L including the fluorescent material 27 according to the first embodiment. In other words, the liquid-filled combination container 10L including the fluorescent material 27 may further include the intermediate container 50, and the intermediate container 50 may define the oxygen reactant accommodating portion 49*a*. For example, the liquid-filled combination container 10L shown in FIG. 23C may include the fluorescent material 27 provided on the inner surface 30*a* of the container 30 at the fluorescent material installation location 39 apart from the contact region 31*a* of the containing portion 31, which contacts with the liquid L.

Third Embodiment

Next, a third embodiment will be described. In the following description and the drawings used in the following description, like reference signs to the reference signs used for corresponding portions in the above-described embodiments and modifications are used for portions that can be similarly configured to those of the above-described embodiments and modifications, and the description thereof may not be repeated. When the operation and advantageous effects obtained in the above-described embodiments and modifications are also apparently obtained in the third embodiment, the description thereof may be omitted.

Figure 24:
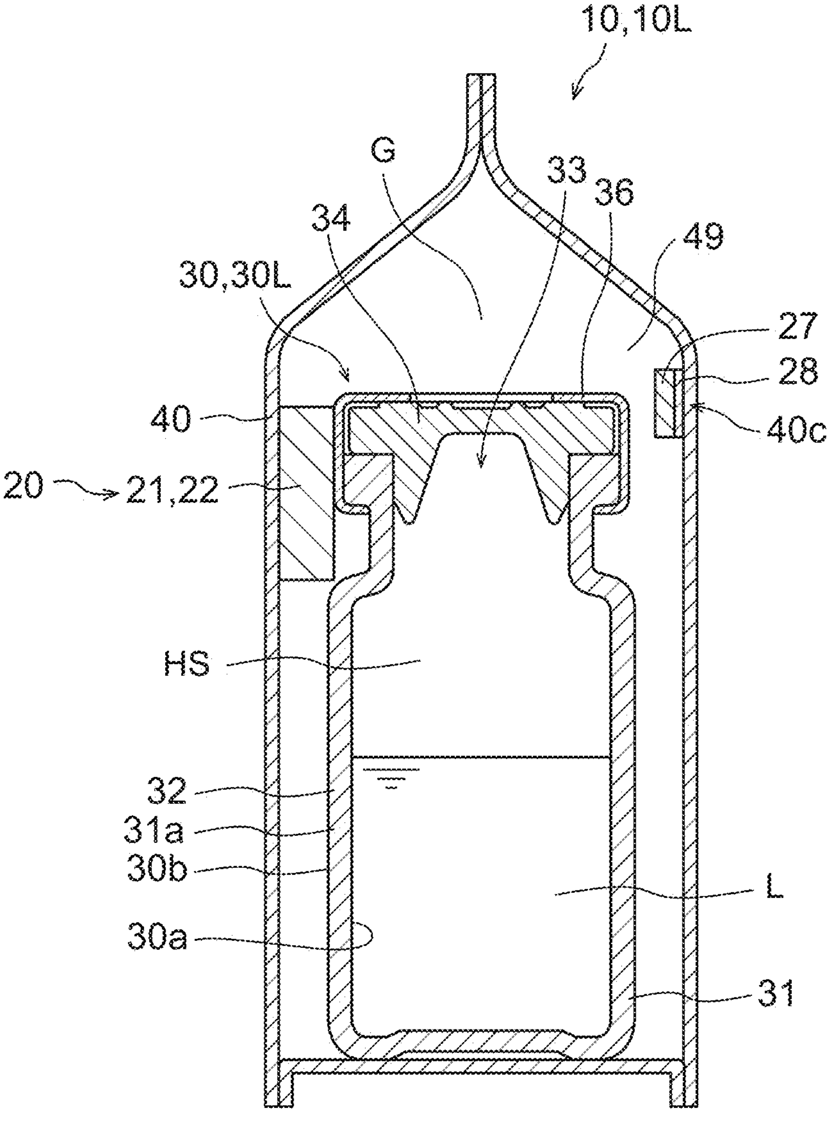
FIG. 24 is a view that shows an example of an inspection method for a liquid-filled combination container according to a third embodiment of the present disclosure.
Figure 25:
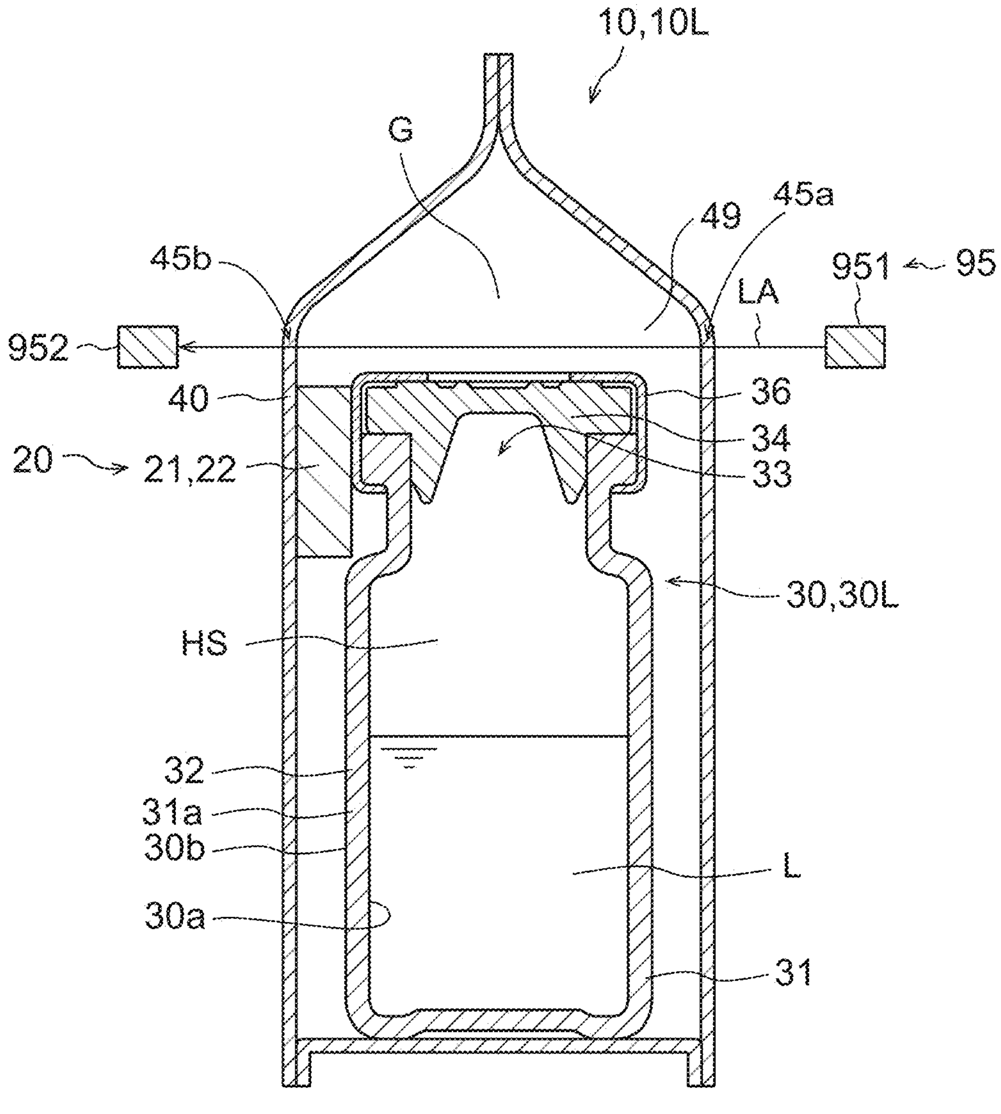
FIG. 25 is a view that shows another example of the inspection method for the liquid-filled combination container according to the third embodiment of the present disclosure.

In an inspection method according to the third embodiment, the oxygen concentration in the barrier container 40 of the liquid-filled combination container 10L is measured. The oxygen concentration in the barrier container 40 means the oxygen concentration in a space inside the barrier container 40 and outside the container 30, that is, the above-described barrier container space 49. FIG. 24 is a view that illustrates an example of the inspection method according to the third embodiment of the present disclosure. FIG. 25 is a view that illustrates another example of the inspection method according to the third embodiment of the present disclosure.

The liquid-filled combination container 10L shown in FIG. 24 is similar to the liquid-filled combination container 10L shown in FIG. 13 except that no shrink film 91 is provided and the fluorescent material 27 is provided on the inner surface of the barrier container 40. In other words, the liquid-filled combination container 10L shown in FIG. 24 includes the container 30, the barrier container 40, and the fluorescent material 27. The container 30 contains liquid L in the containing portion 31 and has oxygen permeability. The barrier container 40 accommodates the container 30 and has oxygen barrier properties. The fluorescent material 27 varies in fluorescence time or fluorescence intensity according to a surrounding oxygen concentration. The location of the barrier container 40, where the fluorescent material 27 is provided on the inner surface, is referred to as barrier container fluorescent material installation location 40*c*. In other words, the fluorescent material 27 is provided on the inner surface of the barrier container 40 at the barrier container fluorescent material installation location 40*c*. The barrier container 40 has light transmission properties at least at the barrier container fluorescent material installation location 40*c*. As shown in FIG. 24, the liquid-filled combination container 10L further includes at least one oxygen reactant 20 that can react with oxygen in the barrier container 40. The oxygen reactant 20 is fixed to at least any one of the outer surface 30*b* of the container 30 and the inner surface of the barrier container 40. As will be described later, in the liquid-filled combination container 10L shown in FIG. 24, light can be applied from outside the barrier container 40 to the fluorescent material 27 by allowing the light to penetrate through the barrier container 40 at the barrier container fluorescent material installation location 40*c*.

The inspection method of inspecting the oxygen concentration in the barrier container 40 of the liquid-filled combination container 10L shown in FIG. 24 includes a barrier container fluorescence measurement step and a barrier container measurement step. In the barrier container fluorescence measurement step, light for causing the fluorescent material 27 to emit fluorescence is applied to the fluorescent material 27 by allowing the light to penetrate through the barrier container 40 at the barrier container fluorescent material installation location 40*c*. Then, the fluorescence time or the fluorescence intensity of the fluorescent material 27 is measured. In the barrier container measurement step, the oxygen concentration in the barrier container 40 is measured in accordance with the fluorescence time or the fluorescence intensity of the fluorescent material 27, measured in the barrier container fluorescence measurement step.

Although not shown in the drawing, in the liquid-filled combination container 10L in which the fluorescent material 27 is provided on the inner surface of the barrier container 40 and the oxygen concentration in the barrier container 40 is measured, the oxygen reactant 20 does not need to be fixed to any of the outer surface 30*b* of the container 30 and the inner surface of the barrier container 40. In this case, the oxygen reactant accommodating portion may be defined in part of the inside of the barrier container 40. When the oxygen reactant 20 is accommodated in the oxygen reactant accommodating portion, the oxygen reactant 20 is disposed at a location where the oxygen reactant 20 does not interfere with application of light from outside the barrier container 40 to the fluorescent material 27. Thus, light to be applied to the fluorescent material 27 can be applied from outside the barrier container 40 to the fluorescent material 27.

The description made on the liquid-filled combination container 10L in the first embodiment, the second embodiment, and the first to eleventh modifications can also be applied to the liquid-filled combination container 10L in which the fluorescent material 27 is provided on the inner surface of the barrier container 40 and the oxygen concentration in the barrier container 40 is measured, unless there is a contradiction. Particularly, the description made on the oxygen reactant accommodating portion 49*a* in the tenth modification and the eleventh modification can also be applied to the oxygen reactant accommodating portion of the liquid-filled combination container 10L in which the fluorescent material 27 is provided on the inner surface of the barrier container 40 and the oxygen concentration in the barrier container 40 is measured, unless there is a contradiction. The description made on the inspection method of inspecting the oxygen concentration in the container 30 in the first embodiment, the second embodiment, and the first to eleventh modifications can also be applied to the inspection method of inspecting the oxygen concentration in the barrier container 40 shown in FIG. 24, unless there is a contradiction. Particularly, the description made on the fluorescence measurement step in the first embodiment, the second embodiment, and the first to eleventh modifications can also be applied to the barrier container fluorescence measurement step, unless there is a contradiction. Particularly, the description made on the measurement step in the first embodiment, the second embodiment, and the first to eleventh modifications can also be applied to the barrier container measurement step in the inspection method for the liquid-filled combination container 10L shown in FIG. 24, unless there is a contradiction.

The liquid-filled combination container 10L shown in FIG. 25 is similar to the liquid-filled combination container 10L shown in FIG. 13 except that no shrink film 91 is provided, no fluorescent material 27 is provided, and a point described later. In other words, the liquid-filled combination container 10L shown in FIG. 25 includes the container 30 and the barrier container 40. The container 30 contains liquid L in the containing portion 31 and has oxygen permeability. The barrier container 40 accommodates the container 30 and has oxygen barrier properties. In an example, the barrier container 40 is transparent at least at a barrier container first location 45*a* and a barrier container second location 45*b* (described later). The liquid-filled combination container 10L shown in FIG. 25 further includes at least one oxygen reactant 20 that can react with oxygen in the barrier container 40. The oxygen reactant 20 is fixed to at least any one of the outer surface 30*b* of the container 30 and the inner surface of the barrier container 40.

In the liquid-filled combination container 10L shown in FIG. 25, the barrier container 40 includes the barrier container first location 45*a* and the barrier container second location 45*b*. The oxygen reactant 20 and the container 30 are spaced apart from a straight line connecting the barrier container first location 45*a* with the barrier container second location 45*b*. In the example shown in FIG. 25, a straight line representing the optical path LA corresponds to the straight line connecting the barrier container first location 45*a* with the barrier container second location 45*b*. Then, the oxygen reactant 20 and the container 30 are spaced apart from the straight line representing the optical path LA. In other words, the oxygen reactant 20 and the container 30 are not located on the straight line connecting the barrier container first location 45*a* with the barrier container second location 45*b*. The barrier container 40 has light transmission properties at least at the barrier container first location 45*a* and the barrier container second location 45*b*. Thus, by setting the straight line connecting the barrier container first location 45*a* with the barrier container second location 45*b* for the optical path LA, laser light or LED light can be applied so as to penetrate through the barrier container 40 and not to penetrate through the container 30.

The inspection method of inspecting the oxygen concentration in the barrier container 40 of the liquid-filled combination container 10L shown in FIG. 25 includes a barrier container attenuation factor measurement step and a barrier container measurement step. In the barrier container attenuation factor measurement step, laser light or LED light with a wavelength to be attenuated according to the oxygen concentration in the optical path LA is applied to the liquid-filled combination container 10L so as to penetrate through the barrier container first location 45*a* and the barrier container second location 45*b*. Particularly, laser light or LED light is applied to the liquid-filled combination container 10L so as to penetrate through the barrier container space 49. Then, the attenuation factor of laser light or LED light is measured. In the barrier container measurement step, the oxygen concentration in the barrier container 40 is measured in accordance with the attenuation factor measured in the barrier container attenuation factor measurement step.

Although not shown in the drawing, in the liquid-filled combination container 10L including the barrier container first location 45*a* and the barrier container second location 45*b* and in which the oxygen concentration in the barrier container 40 is measured, the oxygen reactant 20 does not need to be fixed to any of the outer surface 30*b* of the container 30 and the inner surface of the barrier container 40. In this case, the oxygen reactant accommodating portion may be defined in part of the inside of the barrier container 40. When the oxygen reactant 20 is accommodated in the oxygen reactant accommodating portion, the oxygen reactant 20 is disposed at a location spaced apart from a straight line connecting the barrier container first location 45*a* with the barrier container second location 45*b*. Thus, laser light or LED light can be applied so as to penetrate through the barrier container 40 and not to penetrate through the container 30.

The description made on the liquid-filled combination container 10L in the first embodiment, the second embodiment, and the first to eleventh modifications can also be applied to the liquid-filled combination container 10L that includes the barrier container first location 45*a* and the barrier container second location 45*b* and in which the oxygen concentration in the barrier container 40 is measured, unless there is a contradiction. Particularly, the description made on the oxygen reactant accommodating portion 49*a* in the tenth modification and the eleventh modification can also be applied to the oxygen reactant accommodating portion of the liquid-filled combination container 10L that includes the barrier container first location 45*a* and the barrier container second location 45*b* and in which the oxygen concentration in the barrier container 40 is measured, unless there is a contradiction. The description made on the inspection method of inspecting the oxygen concentration in the container 30 in the first embodiment, the second embodiment, and the first to eleventh modifications can also be applied to the inspection method of inspecting the oxygen concentration in the barrier container 40 shown in FIG. 25, unless there is a contradiction. Particularly, the description made on the attenuation factor measurement step in the first embodiment, the second embodiment, and the first to eleventh modifications can also be applied to the barrier container attenuation factor measurement step, unless there is a contradiction. Particularly, the description made on the measurement step in the first embodiment, the second embodiment, and the first to eleventh modifications can also be applied to the barrier container measurement step in the inspection method for the liquid-filled combination container 10L shown in FIG. 25, unless there is a contradiction.

In the liquid-filled combination container 10L according to the third embodiment, when permeation of oxygen through the container 30 presumably reaches an equilibrium state between the head space HS and the barrier container space 49, the oxygen concentration in the container 30 can be calculated with the following method. With the inspection method according to the third embodiment, the oxygen concentration in the barrier container 40 is measured. Then, the measured oxygen concentration in the barrier container 40 is regarded as the oxygen concentration in the container 30. With the above method, the oxygen concentration in the container 30 can be calculated. The case where permeation of oxygen through the container 30 presumably reaches an equilibrium state between the head space HS and the barrier container space 49 is, for example a case where a sufficient time has elapsed from when the liquid-filled container 30L is accommodated in the barrier container 40 and the barrier container 40 is closed to when permeation of oxygen through the container 30 reaches an equilibrium state.

Fourth Embodiment

Next, a fourth embodiment will be described. In the following description and the drawings used in the following description, like reference signs to the reference signs used for corresponding portions in the above-described embodiments and modifications are used for portions that can be similarly configured to those of the above-described embodiments and modifications, and the description thereof may not be repeated. When the operation and advantageous effects obtained in the above-described embodiments and modifications are also apparently obtained in the fourth embodiment, the description thereof may be omitted.

Figure 26:
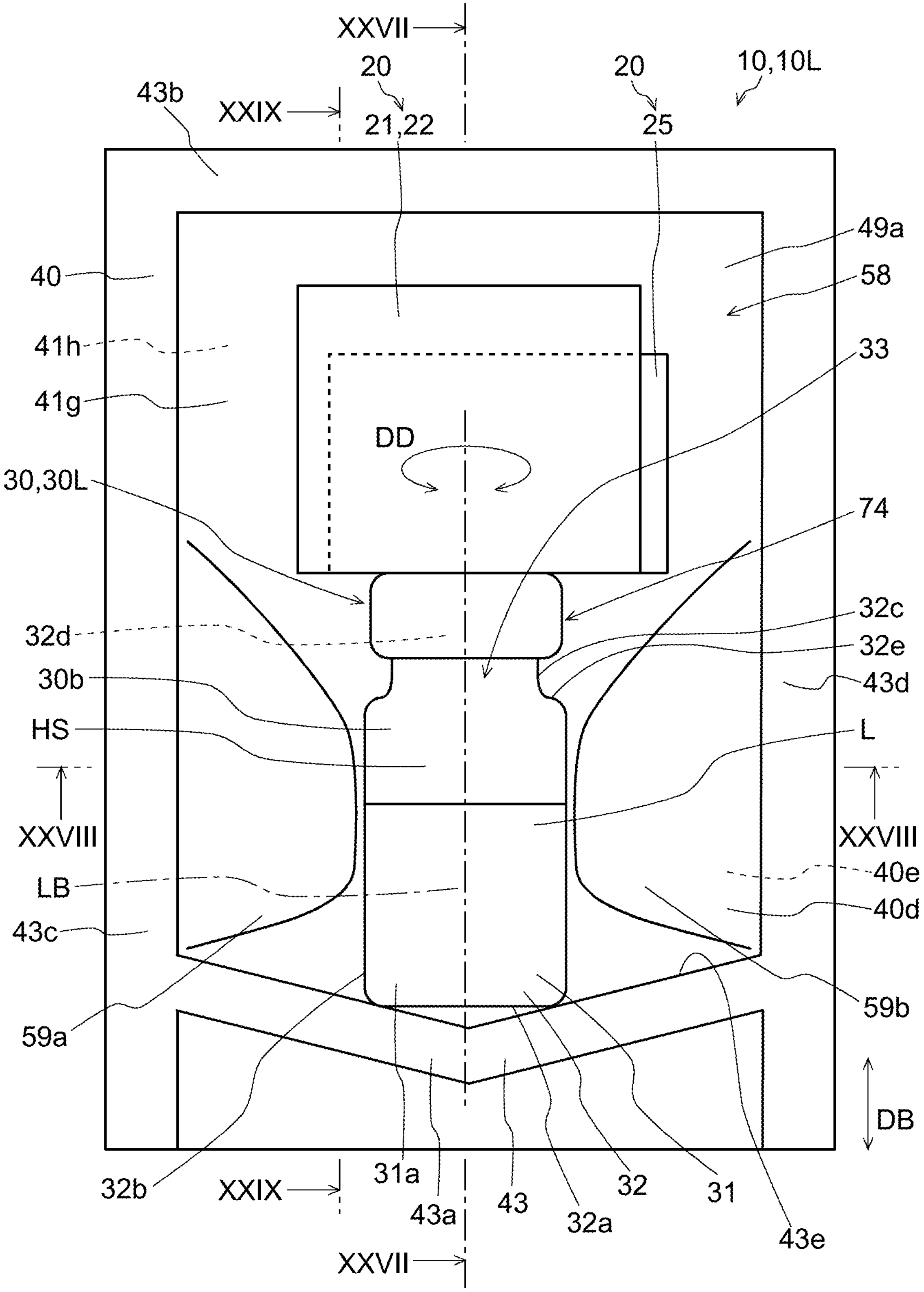
FIG. 26 is a front view that shows a liquid-filled combination container according to a fourth embodiment of the present disclosure.
Figure 27:
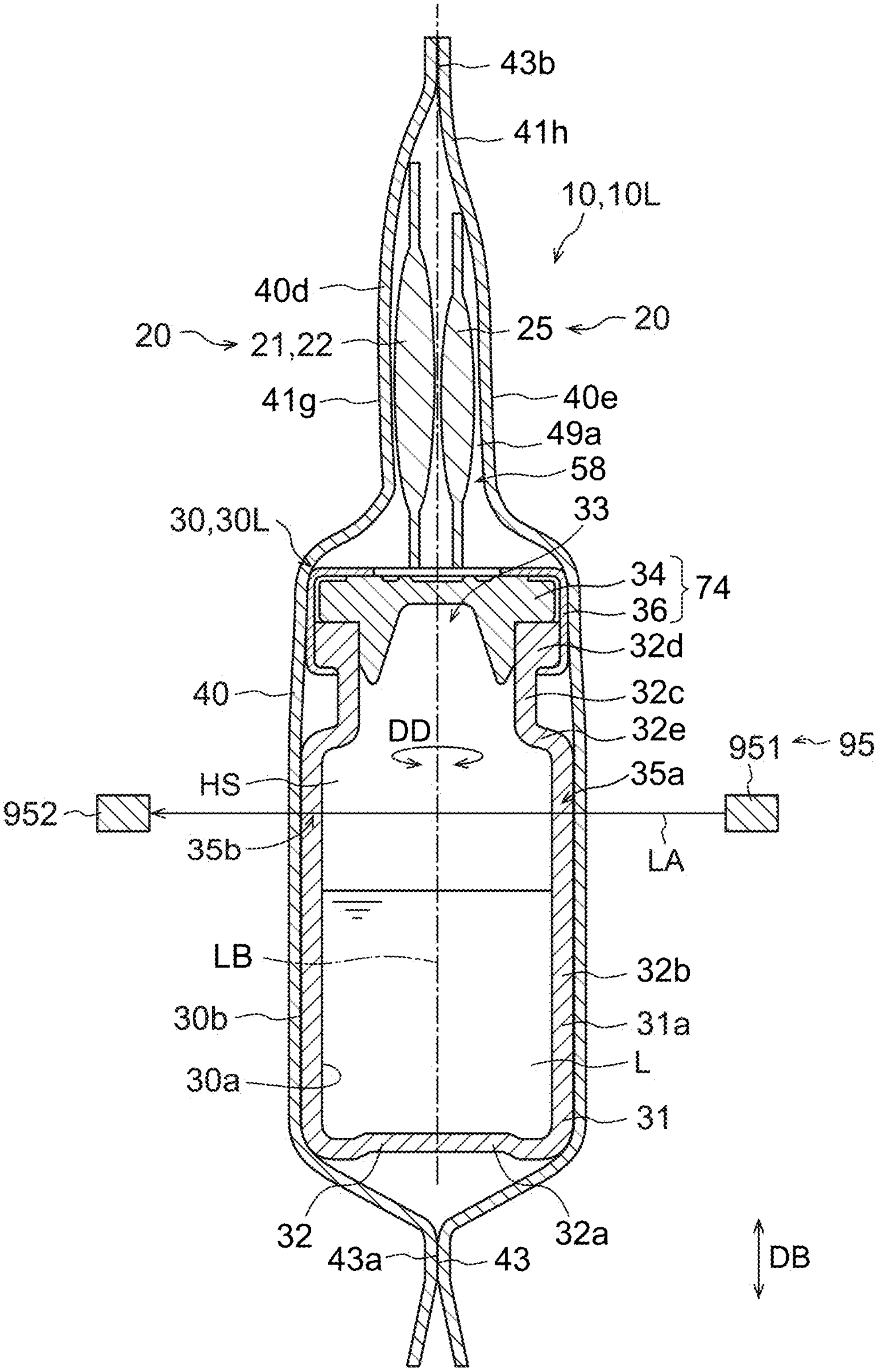
FIG. 27 is a sectional view that shows the liquid-filled combination container according to the fourth embodiment of the present disclosure.

FIGS. 26 and 27 are views that illustrate the fourth embodiment of the present disclosure. FIG. 27 corresponds to a sectional view that shows a cross section of the liquid-filled combination container 10L, taken along the line XXVII-XXVII in FIG. 26. The liquid-filled combination container 10L according to the fourth embodiment, as in the case of the liquid-filled combination container 10L according to the second embodiment, includes the container 30 having oxygen permeability and containing the liquid L in the containing portion 31, the barrier container 40 having oxygen barrier properties and accommodating the container 30, and at least one oxygen reactant 20 that can react with oxygen in the barrier container 40. The container 30 includes a first location 35*a* and a second location 35*b* apart from the contact region 31*a* of the containing portion 31, which contacts with the liquid L. The container 30 has light transmission properties at least at the first location 35*a* and the second location 35*b*. The barrier container 40 has light transmission properties at least at a location that intersects with a straight line connecting the first location 35*a* with the second location 35*b*. In the liquid-filled combination container 10L according to the fourth embodiment, as in the case of the liquid-filled combination container 10L according to the second embodiment, the oxygen concentration in the container 30 can be inspected by measuring the attenuation factor of laser light or LED light through application of the laser light or the LED light such that the laser light or the LED light penetrates through the container 30 at the first location 35*a* and the second location 35*b*.

Unless otherwise specified, the characteristic of the liquid-filled combination container 10L according to the fourth embodiment described in the specification is the characteristic of the liquid-filled combination container 10L in a state where the container 30 and the oxygen reactants 20 are accommodated in the barrier container 40 as shown in FIG. 26 and the upper seal part 43*b* of the barrier container 40 (described later) is grasped and the liquid-filled combination container 10L is lifted without adding strong vibrations.

Here, in the fourth embodiment, the oxygen reactants 20 are held in a holding space 58 formed between part of the outer surface 30*b* of the container 30 and part of the inner surface of the barrier container 40. Then, a straight line (which corresponds to the optical path LA) connecting the first location 35*a* with the second location 35*b* does not pass through the holding space 58. For this reason, by setting the straight line connecting the first location 35*a* with the second location 35*b* for the optical path LA, laser light or LED light can be applied so as to penetrate through the container 30 without interference of the oxygen reactant 20.

The holding space 58 formed between part of the outer surface 30*b* of the container 30 and part of the inner surface of the barrier container 40 in the liquid-filled combination container 10L according to the fourth embodiment is regarded as corresponding to the oxygen reactant accommodating portion 49*a* described in the above-described embodiments and modifications. In other words, the liquid-filled combination container 10L according to the fourth embodiment is regarded as the one that the oxygen reactant accommodating portion 49*a* that accommodates the oxygen reactants 20 is defined in part of the inside of the barrier container 40. In the liquid-filled combination container 10L according to the fourth embodiment as well, the oxygen reactants 20 are regarded as being spaced apart from a straight line (which corresponds to the optical path LA) connecting the first location 35*a* with the second location 35*b*. In the liquid-filled combination container 10L according to the fourth embodiment as well, the oxygen reactants 20 are regarded as being disposed at a location spaced apart from a straight line (which corresponds to the optical path LA) connecting the first location 35*a* with the second location 35*b* when the oxygen reactants 20 are accommodated in the oxygen reactant accommodating portion 49*a*.

The container 30 according to the fourth embodiment, as in the case of the container 30 according to the first embodiment, includes the container body 32 and the stopper 34. The container body 32 includes the trunk portion 32*b*, the neck portion 32*c*, and the head portion 32*d*. The head portion 32*d* is a part including the opening part 33. The neck portion 32*c* is a part coupled to the head portion 32*d*. The trunk portion 32*b* has a greater width than the neck portion 32*c* in a direction orthogonal to an axial direction DB in which the axis LB of the container 30 extends. Here, the axis LB of the container 30 is a rotation symmetry axis of the container body 32 when the container body 32 has a rotation-symmetric shape. The axis LB of the container 30 is a straight line perpendicular to an imaginary plane closing the opening part 33 of the container body 32 and passing through the center of gravity of the imaginary plane when the container body 32 does not have a rotation-symmetric shape. The container body 32 includes the shoulder portion 32*e* that connects the neck portion 32*c* with the trunk portion 32*b*. The width of the shoulder portion 32*e* in a direction orthogonal to the axial direction DB in which the axis LB of the container 30 extends gradually increases from a portion coupled to the neck portion 32*c* toward a portion coupled to the trunk portion 32*b*. The containing portion 31 of the container 30 shown in FIGS. 26 and 27 has a circularly symmetric shape with respect to the axis LB. In other words, a cross section perpendicular to the axis LB of the containing portion 31 is a circle. The trunk portion 32*b*, the neck portion 32*c*, and the shoulder portion 32*e* of the container body 32 shown in FIGS. 26 and 27 have a circularly symmetric shape with respect to the axis LB. In other words, the cross section perpendicular to the axis LB of each of the trunk portion 32*b*, the neck portion 32*c*, and the shoulder portion 32*e* is a circle. The neck portion 32*c* may include a part of which the length of the diameter does not change in the axial direction DB in which the axis LB of the container 30 extends. In other words, the neck portion 32*c* may include a cylindrical part extending in the axial direction DB.

The container 30 further includes the fixing tool 36 that suppresses detachment of the stopper 34 from the container body 32. Members for closing the opening part 33 of the container body 32, like the stopper 34 and the fixing tool 36, are collectively referred to as a cap portion 74. The container 30 according to the fourth embodiment is regarded as including the container body 32 including the opening part 33 and the cap portion 74 including the stopper 34 that closes the opening part 33. The outer surface of the cap portion 74 shown in FIGS. 26 and 27 has a circularly symmetric shape with respect to the axis LB. In other words, the cross section perpendicular to the axis LB of the outer surface of the cap portion 74 is a circle.

The barrier container 40 according to the fourth embodiment is a bag made up of a resin film having oxygen barrier properties and is similar to the barrier container 40 according to the first embodiment in terms of a so-called pouch. The barrier container 40 according to the fourth embodiment includes a first film 41*g* that is a component of a first face 40*d* of the barrier container 40, a second film 41*h* that is a component of a second face 40*e* of the barrier container 40, opposed to the first face 40*d*, and a seal part 43 that joins the first film 41*g* with the second film 41*h* at least at part of the first film 41*g* and the second film 41*h*. The barrier container 40 is a bag accommodating the container 30 between the first film 41*g* and the second film 41*h*. In the example shown in FIGS. 26 and 27, the first film 41*g* and the second film 41*h* are separate films joined to each other. Although not shown in the drawing, the first film 41*g* and the second film 41*h* may be separate parts divided at a folded location from one folded film.

In the barrier container 40 according to the fourth embodiment, the seal part 43 joins the first film 41*g* with the second film 41*h* all around in an in-plane direction of the first film 41*g* and the second film 41*h*. In other words, the seal part 43 is disposed so as to surround at least part of the first film 41*g* and the second film 41*h* when viewed in a thickness direction of the first film 41*g* and joins the first film 41*g* with the second film 41*h*. Thus, the barrier container 40 forms a space accommodating the container 30 without including an additional film, such as the above-described bottom film 41*e*, in the first embodiment. In the example shown in FIG. 26, the first film 41*g* and the second film 41*h* each have a rectangular shape including long sides extending in the up and down direction of FIG. 26 and short sides orthogonal to the long sides.

In the barrier container 40 according to the fourth embodiment, the seal part 43 includes a lower seal part 43*a* that joins parts of the first film 41*g* and the second film 41*h* on a side (lower side in FIG. 26) where the container body 32 is located with reference to the cap portion 74. The seal part 43 includes an upper seal part 43*b* that joins sides of the first film 41*g* and the second film 41*h* on an opposite side (upper side in FIG. 26) to the side where the container body 32 is located with reference to the cap portion 74. The seal part 43 includes a first lateral seal part 43*c* and a second lateral seal part 43*d* connecting the lower seal part 43*a* with the upper seal part 43*b*. The first lateral seal part 43*c* and the second lateral seal part 43*d* face each other in a direction orthogonal to the axial direction DB in which the axis LB of the container 30 extends. The lower seal part 43*a* and the upper seal part 43*b* extend along the short sides of the first film 41*g* and the second film 41*h*. The first lateral seal part 43*c* and the second lateral seal part 43*d* extend along the long sides of the first film 41*g* and the second film 41*h*.

In the example shown in FIG. 26, an outline 43*e* of the lower seal part 43*a* on a side opposed to the upper seal part 43*b* has a V-shape that goes away from the upper seal part 43*b* as approaching a middle point between the first lateral seal part 43*c* and the second lateral seal part 43*d*. Thus, as shown in FIG. 26, when the upper seal part 43*b* is disposed to be oriented upward and the lower seal part 43*a* is disposed to be oriented downward, movement of the container 30 from the center of the barrier container 40 in the horizontal direction can be suppressed.

Here, in the liquid-filled combination container 10L according to the fourth embodiment, the distance between the first film 41*g* and the cap portion 74 and the distance between the second film 41*h* and the cap portion 74 are less than the width of the oxygen reactant 20 in the thickness direction. Here, the meanings of the "thickness direction of the oxygen reactant 20" and the width of the oxygen reactant 20 in the thickness direction" will be described. Assuming that a pair of imaginary planes parallel to each other sandwiches the oxygen reactants 20 and each touches the surface of a corresponding one of the oxygen reactants 20. At this time, a direction perpendicular to the pair of imaginary planes when the distance between the pair of imaginary planes is minimum is the thickness direction of the oxygen reactant 20. The distance between the pair of imaginary planes when the distance between the pair of imaginary planes is minimum is the width of the oxygen reactant 20 in the thickness direction. In the example shown in FIG. 27, the first film 41*g* touches the cap portion 74. In other words, the distance between the first film 41*g* and the cap portion 74 is zero. The second film 41*h* touches the cap portion 74. In other words, the distance between the second film 41*h* and the cap portion 74 is zero.

In the liquid-filled combination container 10L according to the fourth embodiment, the oxygen reactants 20 are located on an opposite side to a side on which the container body 32 is located with reference to the cap portion 74. In other words, the oxygen reactants 20 are located on an upper side of FIGS. 26 and 27 with respect to the cap portion 74. Here, as described above, the distance between the first film 41*g* and the cap portion 74 and the distance between the second film 41*h* and the cap portion 74 are less than the width of the oxygen reactant 20 in the thickness direction.

Thus, movement of the oxygen reactant 20 disposed on the upper side of the cap portion 74 to the lower side of the cap portion 74 through between the first film 41*g* and the cap portion 74 or between the second film 41*h* and the cap portion 74 is suppressed. For this reason, the oxygen reactants 20 can be held on the upper side of the cap portion 74. In other words, since the distance between the first film 41*g* and the cap portion 74 and the distance between the second film 41*h* and the cap portion 74 are less than the width of the oxygen reactant 20 in the thickness direction, the holding space 58 in which the oxygen reactants 20 are held is formed on the upper side of the cap portion 74 between part of the outer surface 30*b* of the container 30 and part of the inner surface of the barrier container 40. The first location 35*a* and the second location 35*b* are located at the trunk portion 32*b* of the container body 32 on the lower side of FIG. 27 with respect to the cap portion 74. Thus, with the liquid-filled combination container 10L according to the fourth embodiment, laser light or LED light can be applied so as to penetrate through the container 30 without interference of the oxygen reactant 20.

In the liquid-filled combination container 10L according to the fourth embodiment, the distance between the first film 41*g* and the shoulder portion 32*e* and the distance between the second film 41*h* and the shoulder portion 32*e* are less than the width of the oxygen reactant 20 in the thickness direction. In the example shown in FIG. 27, the first film 41*g* touches the shoulder portion 32*e*. In other words, the distance between the first film 41*g* and the shoulder portion 32*e* is zero. The second film 41*h* touches the shoulder portion 32*e*. In other words, the distance between the second film 41*h* and the shoulder portion 32*e* is zero.

As described above, the distance between the first film 41*g* and the shoulder portion 32*e* and the distance between the second film 41*h* and the shoulder portion 32*e* are less than the width of the oxygen reactant 20 in the thickness direction. Thus, movement of the oxygen reactant 20 disposed on the upper side of the cap portion 74 to the lower side of the shoulder portion 32*e* through between the first film 41*g* and the shoulder portion 32*e* or between the second film 41*h* and the shoulder portion 32*e* is suppressed. For this reason, the oxygen reactants 20 can be held on the upper side of the shoulder portion 32*e*. In other words, since the distance between the first film 41*g* and the shoulder portion 32*e* and the distance between the second film 41*h* and the shoulder portion 32*e* are less than the width of the oxygen reactant 20 in the thickness direction, the holding space 58 in which the oxygen reactants 20 are held is formed on the upper side of the shoulder portion 32*e* between part of the outer surface 30*b* of the container 30 and part of the inner surface of the barrier container 40. The first location 35*a* and the second location 35*b* are located at the trunk portion 32*b* of the container body 32 on the lower side of FIGS. 26 and 27 with respect to the shoulder portion 32*e*. Thus, with the liquid-filled combination container 10L according to the fourth embodiment, laser light or LED light can be applied so as to penetrate through the container 30 without interference of the oxygen reactant 20.

In FIG. 27, the distance between the first film 41*g* and the cap portion 74 and the distance between the second film 41*h* and the cap portion 74 are less than the width of the oxygen reactant 20 in the thickness direction, and the distance between the first film 41*g* and the shoulder portion 32*e* and the distance between the second film 41*h* and the shoulder portion 32*e* are less than the width of the oxygen reactant 20 in the thickness direction. Although not shown in the drawing, any one of the condition that the distance between the first film 41*g* and the cap portion 74 and the distance between the second film 41*h* and the cap portion 74 are less than the width of the oxygen reactant 20 in the thickness direction and the condition that the distance between the first film 41*g* and the shoulder portion 32*e* and the distance between the second film 41*h* and the shoulder portion 32*e* are less than the width of the oxygen reactant 20 in the thickness direction may be implemented.

Figure 28:
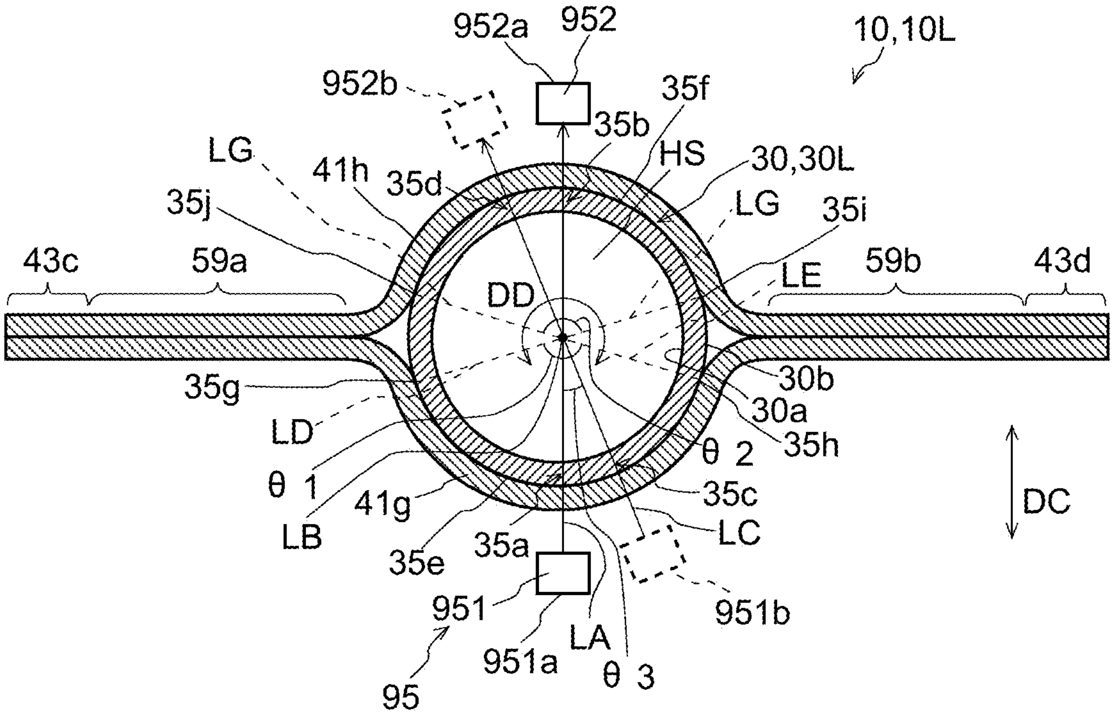
FIG. 28 is a sectional view that shows the liquid-filled combination container according to the fourth embodiment of the present disclosure.
Figure 29:
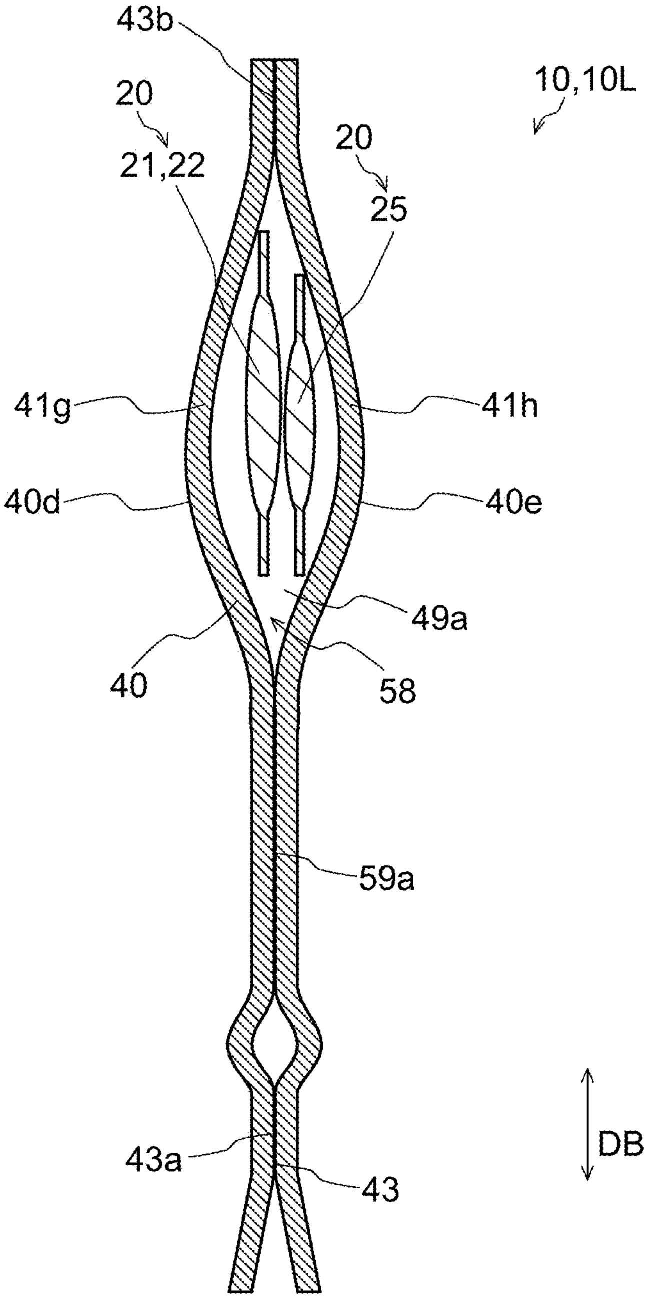
FIG. 29 is a sectional view that shows the liquid-filled combination container according to the fourth embodiment of the present disclosure.

The barrier container 40 according to the fourth embodiment includes a first close contact region 59*a* and a second close contact region 59*b* in which parts not joined by the seal part 43 with which the first film 41*g* and the second film 41*h* are joined are in close contact with each other. The first close contact region 59*a* and the second close contact region 59*b* are formed at locations between which the container 30 is placed in a direction orthogonal to the axial direction DB in which the axis LB of the container 30 extends. FIG. 28 is a sectional view that shows a cross section of the liquid-filled combination container 10L, taken along the line XXVIII-XXVIII in FIG. 26. FIG. 29 is a sectional view that shows a cross section of the liquid-filled combination container 10L, taken along the line XXIX-XXIX in FIG. 26. In the example shown in FIG. 28, at least part of the first close contact region 59*a* is formed between the container 30 and the first lateral seal part 43*c*. At least part of the second close contact region 59*b* is formed between the container 30 and the second lateral seal part 43*d*.

In the liquid-filled combination container 10L according to the fourth embodiment, the container 30 is greater in the width of the first film 41*g* in the thickness direction (the direction DC shown in FIG. 28) than the oxygen reactant 20. For this reason, the barrier container 40 is significantly deformed in conformity with the shape of the container 30 at the periphery of a part where the container 30 is accommodated. The first close contact region 59*a* is formed between the container 30 and the first lateral seal part 43*c* by significant deformation of the barrier container 40 in conformity with the shape of the container 30. The second close contact region 59*b* is formed between the container 30 and the second lateral seal part 43*d* by significant deformation of the barrier container 40 in conformity with the shape of the container 30.

At least part of the first close contact region 59*a* and the second close contact region 59*b* overlaps part of the oxygen reactants 20 in the axial direction DB. In other words, at least part of the first close contact region 59*a* overlaps part of the oxygen reactants 20 in the axial direction DB, and at least part of the second close contact region 59*b* overlaps part of the oxygen reactants 20 in the axial direction DB. In the example shown in FIGS. 26 and 29, part of the first close contact region 59*a* overlaps part of the oxygen absorber 21 and overlaps part of the oxygen sensing material 25 in the axial direction DB. In the example shown in FIG. 26, part of the second close contact region 59*b* overlaps part of the oxygen absorber 21 and overlaps part of the oxygen sensing material 25 in the axial direction DB.

Since the first close contact region 59*a* and the second close contact region 59*b* are formed and at least part of the first close contact region 59*a* and the second close contact region 59*b* overlaps part of the oxygen reactants 20 in the axial direction DB, the following advantageous effect is obtained. Since the first close contact region 59*a* is formed, entry of the oxygen reactant 20 in between the first film 41*g* and the second film 41*h* between the container 30 and the first lateral seal part 43*c* can be suppressed. Since the second close contact region 59*b* is formed, entry of the oxygen reactant 20 in between the first film 41*g* and the second film

41*h* between the container 30 and the second lateral seal part 43*d* can be suppressed. Thus, movement of the oxygen reactant 20 to a location where the oxygen reactant 20 interferes with application of laser light or LED light so as to penetrate through the container 30 can be stably suppressed.

Since the first close contact region 59*a* and the second close contact region 59*b* are formed, movement of the container 30 in the space inside the barrier container 40 can be suppressed. Particularly, movement of the container 30 to around the first lateral seal part 43*c* or the second lateral seal part 43*d* can be suppressed. Thus, formation of a large gap between the container 30 and the second lateral seal part 43*d* resulting from movement of the container 30 to around the first lateral seal part 43*c* and formation of a large gap between the container 30 and the first lateral seal part 43*c* resulting from movement of the container 30 to around the second lateral seal part 43*d* can be suppressed. With this configuration as well, entry of the oxygen reactant 20 in between the container 30 and the first lateral seal part 43*c* or in between the container 30 and the second lateral seal part 43*d* can be suppressed.

The liquid-filled combination container 10L shown in FIGS. 26 to 29 includes two characteristics that the distance between the first film 41*g* and the cap portion 74 and the distance between the second film 41*h* and the cap portion 74 are less than the width of the oxygen reactant 20 in the thickness direction and the first close contact region 59*a* and the second close contact region 59*b* are formed. With the two characteristics, the oxygen reactants 20 are held on the upper side of the cap portion 74, the first close contact region 59*a*, and the second close contact region 59*b*. In other words, with the two characteristics, the holding space 58 in which the oxygen reactants 20 are held is regarded to be formed on the upper side of the cap portion 74, the first close contact region 59*a*, the second close contact region 59*b*. Thus, laser light or LED light can be applied so as to penetrate through the container 30 without interference of the oxygen reactant 20.

Here, the length obtained by subtracting ¼ of the length of the circumference of the container 30 in a circumferential direction DD orbiting around the axis LB from the distance between the first lateral seal part 43*c* and the second lateral seal part 43*d* and then multiplying the subtracted result by 0.8 is preferably less than the maximum width of the oxygen reactant 20 in a direction orthogonal to the thickness direction of the oxygen reactant 20. Here, the distance between the first lateral seal part 43*c* and the second lateral seal part 43*d* is defined as a distance between the first lateral seal part 43*c* and the second lateral seal part 43*d* when the first film 41*g* and the second film 41*h* are supported to be flat in a case where nothing is accommodated in the barrier container 40.

Figure 30:
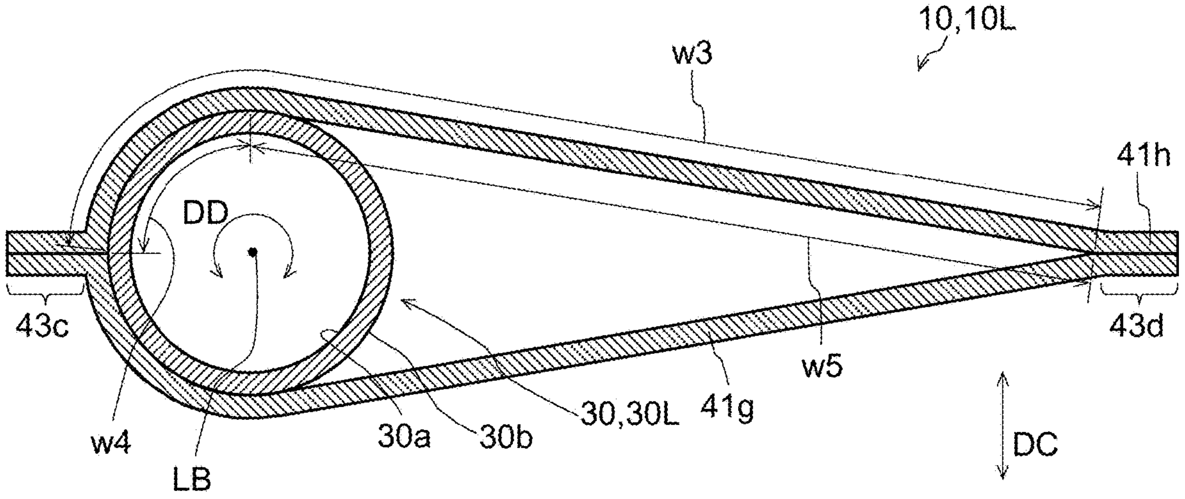
FIG. 30 is a sectional view that shows a state where a container is moved inside a barrier container in the liquid-filled combination container shown in FIG. 29.

The technical significance of the configuration that the length obtained by subtracting ¼ of the length of the circumference of the container 30 in the circumferential direction DD orbiting around the axis LB from the distance between the first lateral seal part 43*c* and the second lateral seal part 43*d* and then multiplying the subtracted result by 0.8 is less than the maximum width of the oxygen reactant 20 in a direction orthogonal to the thickness direction of the oxygen reactant 20 will be described. FIG. 30 shows a state where the container 30 is moved inside the barrier container 40 and is brought into contact with the first lateral seal part 43*c* in the sectional view of the liquid-filled combination container 10L, shown in FIG. 29. In FIG. 30, the length of a curve with the reference sign w3 corresponds to the distance between the first lateral seal part 43*c* and the second lateral seal part 43*d*, and the length of a curve with the reference sign w4 corresponds to ¼ of the length of the circumference of the container 30 in the circumferential direction DD orbiting around the axis LB. Then, the length of a straight line with the reference sign w5 corresponds to the length obtained by subtracting the length w4 from the length w3 and, therefore, corresponds to the length obtained by subtracting ¼ of the length of the circumference of the container 30 in the circumferential direction DD orbiting around the axis LB from the distance between the first lateral seal part 43*c* and the second lateral seal part 43*d*.

As shown in FIG. 30, when the container 30 is brought into contact with the first lateral seal part 43*c*, the width of a gap formed between the container 30 and the second lateral seal part 43*d* is maximum. Then, the maximum of the width of the gap is the length w5. Similarly, when the container 30 is brought into contact with the second lateral seal part 43*d*, the maximum of the width of a gap formed between the container 30 and the first lateral seal part 43*c* is also the length w5. However, as long as the liquid-filled combination container 10L according to the fourth embodiment is used in an ordinary use method, contact of the container 30 with the first lateral seal part 43*c* or the second lateral seal part 43*d* can be suppressed because of the above-described action or the like of the first close contact region 59*a* and the second close contact region 59*b*. For this reason, formation of the gap of which the maximum of the width is the length w5 as shown in FIG. 30 is also suppressed in an ordinary use of the liquid-filled combination container 10L. The developers of the liquid-filled combination container 10L according to the fourth embodiment diligently studied over and over and eventually found that, in an ordinary use, the maximum of the width of a gap formed between the container 30 and the second lateral seal part 43*d* or the maximum of the width of a gap formed between the container 30 and the first lateral seal part 43*c* was less than or equal to 0.8 times the length w5. Accordingly, when the length obtained by subtracting ¼ of the length of the circumference of the container 30 in the circumferential direction DD orbiting around the axis LB from the distance between the first lateral seal part 43*c* and the second lateral seal part 43*d* and then multiplying the subtracted result by 0.8 is less than the maximum width of the oxygen reactant 20 in a direction orthogonal to the thickness direction of the oxygen reactant 20, the following advantageous effect is obtained. Entry of the oxygen reactant 20 in between the container 30 and the first lateral seal part 43*c* or in between the container 30 and the second lateral seal part 43*d* can be further stably suppressed. From the viewpoint of further stably exercising the above-described advantageous effect, the length obtained by subtracting ¼ of the length of the circumference of the container 30 in the circumferential direction DD orbiting around the axis LB from the distance between the first lateral seal part 43*c* and the second lateral seal part 43*d* and then multiplying the subtracted result by 0.9 is more preferably less than the maximum width of the oxygen reactant 20 in a direction orthogonal to the thickness direction of the oxygen reactant 20. The length obtained by subtracting ¼ of the length of the circumference of the container 30 in the circumferential direction DD orbiting around the axis LB from the distance between the first lateral seal part 43*c* and the second lateral seal part 43*d* and then multiplying the subtracted result by 0.95 is further preferably less than the maximum width of the oxygen reactant 20 in a direction orthogonal to the thickness direction of the oxygen reactant 20.

In the example shown in FIG. 26, the oxygen absorber 21 and the oxygen sensing material 25 that serve as the oxygen reactants 20 both have a rectangular shape when viewed in the thickness direction of the oxygen reactant 20. In this case, the length obtained by subtracting ¼ of the length of the circumference of the container 30 in a circumferential direction DD orbiting around the axis LB from the distance between the first lateral seal part 43*c* and the second lateral seal part 43*d* and then multiplying the subtracted result by 0.8 is less than the width of the long side of the rectangular shape of the oxygen reactant 20. The length obtained by subtracting ¼ of the length of the circumference of the container 30 in the circumferential direction DD orbiting around the axis LB from the distance between the first lateral seal part 43*c* and the second lateral seal part 43*d* and then multiplying the subtracted result by 0.8 may be less than the width of the short side of the rectangular shape of the oxygen reactant 20.

In the liquid-filled combination container 10L according to the fourth embodiment, as shown in FIG. 28, the container 30 includes a third location 35*c* and a fourth location 35*d* apart from the contact region 31*a* of the containing portion 31, which contacts with the liquid L, and that are different from the first location 35*a* and the second location 35*b*. The container 30 has light transmission properties at least at the third location 35*c* and the fourth location 35*d*. The barrier container 40 has light transmission properties at least at a location that intersects with a straight line connecting the third location 35*c* with the fourth location 35*d*.

Since the liquid-filled combination container 10L includes the third location 35*c* and the fourth location 35*d* different from the first location 35*a* and the second location 35*b*, laser light or LED light can be allowed to penetrate through the container 30 along an optical path (optical path LC) different from the optical path LA. Thus, the attenuation factors of laser light or LED light in different optical paths can be measured. For this reason, for example, the oxygen concentration in the container 30 can be calculated with further high accuracy by measuring the oxygen concentrations in the container 30 in accordance with the attenuation factors of laser light or LED light in different optical paths and calculating the average value of the oxygen concentrations in the container 30, measured in the different optical paths. In the example shown in FIG. 28, the optical path LA that passes through the first location 35*a* and the second location 35*b* and the optical path LC that passes through the third location 35*c* and the fourth location 35*d* intersect with each other. In the example shown in FIG. 28, the optical path LA and the optical path LC intersect with each other at the location of the axis LB. Although not shown in the drawing, the optical path LA that passes through the first location 35*a* and the second location 35*b* and the optical path LC that passes through the third location 35*c* and the fourth location 35*d* do not need to intersect with each other. An inspection method for the liquid-filled combination container 10L to allow laser light or LED light to penetrate through the container 30 along different optical paths will be described later.

The liquid-filled combination container 10L may include a plurality of locations where laser light or LED light can be allowed to penetrate through the container 30, different from the first location 35*a* and the second location 35*b* or the third location 35*c* and the fourth location 35*d*.

In the example shown in FIG. 28, the length of a line segment located inside the container 30 in a straight line connecting the first location 35*a* with the second location 35*b* (which corresponds to the optical path LA) is equal to the length of a line segment located inside the container 30 in a straight line connecting the third location 35*c* with the fourth location 35*d* (which corresponds to the optical path LC). A total of the length of a line segment located in a space between the container 30 and the barrier container 40 in the straight line connecting the first location 35*a* with the second location 35*b* is equal to a total of the length of a line segment located in a space between the container 30 and the barrier container 40 in the straight line connecting the third location 35*c* with the fourth location 35*d*. In the example shown in FIG. 28, the barrier container 40 is in contact at a location having light transmission properties with the outer surface 30*b* of the container 30 at the first location 35*a* and the second location 35*b* and in contact at a location having light transmission properties with the outer surface 30*b* of the container 30 at the third location 35*c* and the fourth location 35*d*. For this reason, a total of the length of the line segment located in the space between the container 30 and the barrier container 40 in the straight line connecting the first location 35*a* with the second location 35*b* and a total of the length of the line segment located in the space between the container 30 and the barrier container 40 in the straight line connecting the third location 35*c* with the fourth location 35*d* both are zero.

Since the length of the line segment located inside the container 30 in the straight line connecting the first location 35*a* with the second location 35*b* is equal to the length of the line segment located inside the container 30 in the straight line connecting the third location 35*c* with the fourth location 35*d*, the attenuation factor can be measured by aligning the distance by which laser light or LED light passes through the inside of the container 30. Since a total of the length of the line segment located in the space between the container 30 and the barrier container 40 in the straight line connecting the first location 35*a* with the second location 35*b* is equal to a total of the length of the line segment located in the space between the container 30 and the barrier container 40 in the straight line connecting the third location 35*c* with the fourth location 35*d*, the attenuation factor can be measured by aligning the distance by which laser light or LED light passes through the space between the container 30 and the barrier container 40.

When a total of the length of the line segment located in the space between the container 30 and the barrier container 40 in the straight line connecting the first location 35*a* with the second location 35*b* and a total of the length of the line segment located in the space between the container 30 and the barrier container 40 in the straight line connecting the third location 35*c* with the fourth location 35*d* are equal to each other and are not zero, the following advantageous effect is also obtained. When the oxygen concentration inside the liquid-filled combination container 10L is measured as a value close to zero from the attenuation factor of laser light or LED light having penetrated through the liquid-filled combination container 10L, the oxygen concentration inside the container 30 and the oxygen concentration in the space between the container 30 and the barrier container 40 both can be determined as a value close to zero.

In the example shown in FIG. 28, the barrier container 40 is in contact with the container 30 in a first contact region 35*e* continuous in the circumferential direction DD orbiting around the axis LB of the container 30 and a second contact region 35*f* continuous in the circumferential direction DD and opposed to the first contact region 35*e* across the axis LB. The first location 35*a* and the third location 35*c* are located in the first contact region 35*e*. The second location 35*b* and the fourth location 35*d* are located in the second contact region 35*f*. In the example shown in FIG. 28, the first contact region 35*e* is formed from the first film 41*g*. The second contact region 35*f* is formed from the second film 41*h*.

With the thus configured liquid-filled combination container 10L, the following advantageous effect is obtained. Assuming a case where the oxygen concentration in the container 30 is measured with the measuring device 95 including the light source 951 and the measuring instrument 952. In this case, initially, the light source 951 is disposed at a location indicated by the continuous line with the reference sign 951*a* in FIG. 28, and the measuring instrument 952 is disposed at a location indicated by the continuous line with the reference sign 952*a*. When the light source 951 and the measuring instrument 952 are disposed at the locations indicated by the reference signs 951*a*, 952*a*, laser light or LED light applied from the light source 951 passes through the optical path LA, penetrates through the container 30 at the first location 35*a* and the second location 35*b*, and reaches the measuring instrument 952. Subsequently, the attenuation factor is measured by applying laser light or LED light to the optical path LA, and the oxygen concentration in the container 30 is measured in accordance with the attenuation factor in the optical path LA. Subsequently, the light source 951 is disposed at a location indicated by the dashed line with the reference sign 951*b* in FIG. 28, and the measuring instrument 952 is disposed at a location indicated by the continuous line with the reference sign 952*b*. When the light source 951 and the measuring instrument 952 are disposed at the locations indicated by the reference signs 951*b*, 952*b*, laser light or LED light applied from the light source 951 passes through the optical path LC, penetrates through the container 30 at the third location 35*c* and the fourth location 35*d*, and reaches the measuring instrument 952. Subsequently, the attenuation factor is measured by applying laser light or LED light to the optical path LC, and the oxygen concentration in the container 30 is measured in accordance with the attenuation factor in the optical path LC.

With the liquid-filled combination container 10L in which the barrier container 40 includes the first contact region 35*e* and the second contact region 35*f*, the first location 35*a* and the third location 35*c* are located in the first contact region 35*e*, and the second location 35*b* and the fourth location 35*d* are located in the second contact region 35*f*, the following advantageous effect is obtained. When the light source 951 and the measuring instrument 952 are rotated with respect to the liquid-filled combination container 10L about the axis LB from a state where the light source 951 and the measuring instrument 952 are disposed at the locations indicated by the reference signs 951*a*, 952*a*, the light source 951 and the measuring instrument 952 can be disposed at the locations indicated by the reference signs 951*b*, 952*b*. When the liquid-filled combination container 10L is rotated with respect to the light source 951 and the measuring instrument 952 about the axis LB to change relative locations of the light source 951 and the measuring instrument 952 with respect to the liquid-filled combination container 10L as well, the light source 951 and the measuring instrument 952 can be disposed at the locations indicated by the reference signs 951*b*, 952*b*. For this reason, with an operation to rotate any one of the liquid-filled combination container 10L and both the light source 951 and the measuring instrument 952 around the axis LB, the light source 951 and the measuring instrument 952 can be disposed at the locations indicated by the reference signs 951*b*, 952*b* without any other operation. Thus, the positional relationship between the liquid-filled combination container 10L and both the light source 951 and the measuring instrument 952 can be easily aligned between when laser light or LED light applied from the light source 951 through the optical path LA to reach the measuring instrument 952 and when laser light or LED light applied from the light source 951 through the optical path LC to reach the measuring instrument 952. For example, the distance between the liquid-filled combination container 10L and the light source 951 can be easily aligned. The distance between the liquid-filled combination container 10L and the measuring instrument 952 can be easily aligned.

When the first contact region 35*e* is continuous in the circumferential direction DD and the second contact region 35*f* is continuous in the circumferential direction DD, the following advantageous effect is obtained. At a location on the way to move the light source 951 from the location indicated by the reference sign 951*a* to the location indicated by the reference sign 951*b*, and at a location on the way to move the measuring instrument 952 from the location indicated by the reference sign 952*a* to the location indicated by the reference sign 952*b*, laser light or LED light can be applied from the light source 951 to the liquid-filled combination container 10L to reach the measuring instrument 952. Thus, the oxygen concentration in the container 30 can be measured in accordance with the attenuation factor in an optical path passing through a location different from the first location 35*a* or the third location 35*c* in the first contact region 35*e* and a location different from the second location 35*b* or the fourth location 35*d* in the second contact region 35*f*. In this way, the oxygen concentration in the container 30 can be calculated with further high accuracy by measuring the oxygen concentrations in the container 30 in accordance with the attenuation factors in different optical paths and calculating the average value of the oxygen concentrations.

Here, in an imaginary plane perpendicular to the axis LB and passing through the first contact region 35*e* and the second contact region 35*f*, an angle $\theta 1$ formed between a straight line LD connecting one end 35*g* of the first contact region 35*e* in the circumferential direction DD with the axis LB and a straight line LE connecting the other end 35*h* of the first contact region 35*e* in the circumferential direction DD and the axis LB may be larger than or equal to 120°. In the above-described imaginary plane, an angle $\theta 2$ formed between a straight line LF connecting one end 35*i* of the second contact region 35*f* in the circumferential direction DD with the axis LB and a straight line LG connecting the other end 35*j* of the second contact region 35*f* in the circumferential direction DD with the axis LB may be larger than or equal to 120°. In other words, there may be an imaginary plane in which the angle $\theta 1$ is larger than or equal to 120° and the angle $\theta 2$ is larger than or equal to 120°.

FIG. 28 corresponds to a cross section of the liquid-filled combination container 10L, taken along a plane passing through the first contact region 35*e* and the second contact region 35*f* and perpendicular to the axis LB. In the example shown in FIG. 28, the straight line LD connecting one end 35*g* of the first contact region 35*e* in the circumferential direction DD with the axis LB and the straight line LE connecting the other end 35*h* of the first contact region 35*e* in the circumferential direction DD with the axis LB form the angle $\theta 1$. The straight line LF connecting one end 35*i* of the second contact region 35*f* in the circumferential direction DD with the axis LB and the straight line LG connecting the other end 35*j* of the second contact region 35*f* in the circumferential direction DD with the axis LB form the angle $\theta 2$. In this case, when the angle $\theta 1$ of FIG. 28 is larger than or equal to 120° and the angle $\theta 2$ is larger than or equal to 120°, the cross section shown in FIG. 28 is regarded as corresponding to an imaginary plane in which the angle θ1 is larger than or equal to 120° and the angle θ2 is larger than or equal to 120°. In the example shown in FIG. 28, the straight line LD and the straight line LF are located on the same straight line. In other words, the end 35*g*, the axis LB, and the end 35*i* are located on the same straight line. The straight line LE and the straight line LG are located on the same straight line. In other words, the end 35*h*, the axis LB, and the end 35*j* are located on the same straight line.

Since there is an imaginary plane in which the angle θ1 is larger than or equal to 120° and the angle θ2 is larger than or equal to 120°, while the first location 35*a* and the third location 35*c* are disposed in the first contact region 35*e* and the second location 35*b* and the fourth location 35*d* are disposed in the second contact region 35*f*, an angle θ3 formed between the optical path LA passing through the first location 35*a* and the second location 35*b* and the optical path LC passing through the third location 35*c* and the fourth location 35*d* can be increased. In the example shown in FIG. 28, the angle θ3 can be set to up to 120°. Thus, the third location 35*c* is disposed at a location far apart from the first location 35*a*, the fourth location 35*d* is disposed at a location far apart from the second location 35*b*, and the optical path LC is disposed at a location significantly shifted from the optical path LA, and then the oxygen concentration in the container 30 can be measured in accordance with the attenuation factor in each of the optical path LA and the optical path LC. The oxygen concentration in the container 30 can be calculated with further high accuracy by measuring the oxygen concentration in the container 30 in accordance with the attenuation factor in each of the optical path LA and the optical path LC far apart from the optical path LA and calculating the average value of the oxygen concentrations. When the oxygen concentration in the container 30 is measured in accordance with the attenuation factor in an optical path passing through a location different from the first location 35*a* or the third location 35*c* in the first contact region 35*e* and a location different from the second location 35*b* or the fourth location 35*d* in the second contact region 35*f*, a wide region in which a location through which an optical path passes can be disposed can be ensured.

Various changes may be applied to the above-described fourth embodiment. Hereinafter, modifications of the fourth embodiment will be described with reference to the drawings as needed. In the following description and the drawings used in the following description, like reference signs to the reference signs used for corresponding portions in the fourth embodiment are used for portions that can be similarly configured to those of the fourth embodiment, and the description thereof may not be repeated. When the operation and advantageous effects obtained in the fourth embodiment are also apparently obtained in the modifications, the description thereof may be omitted.

Twelfth Modification

Figure 31:
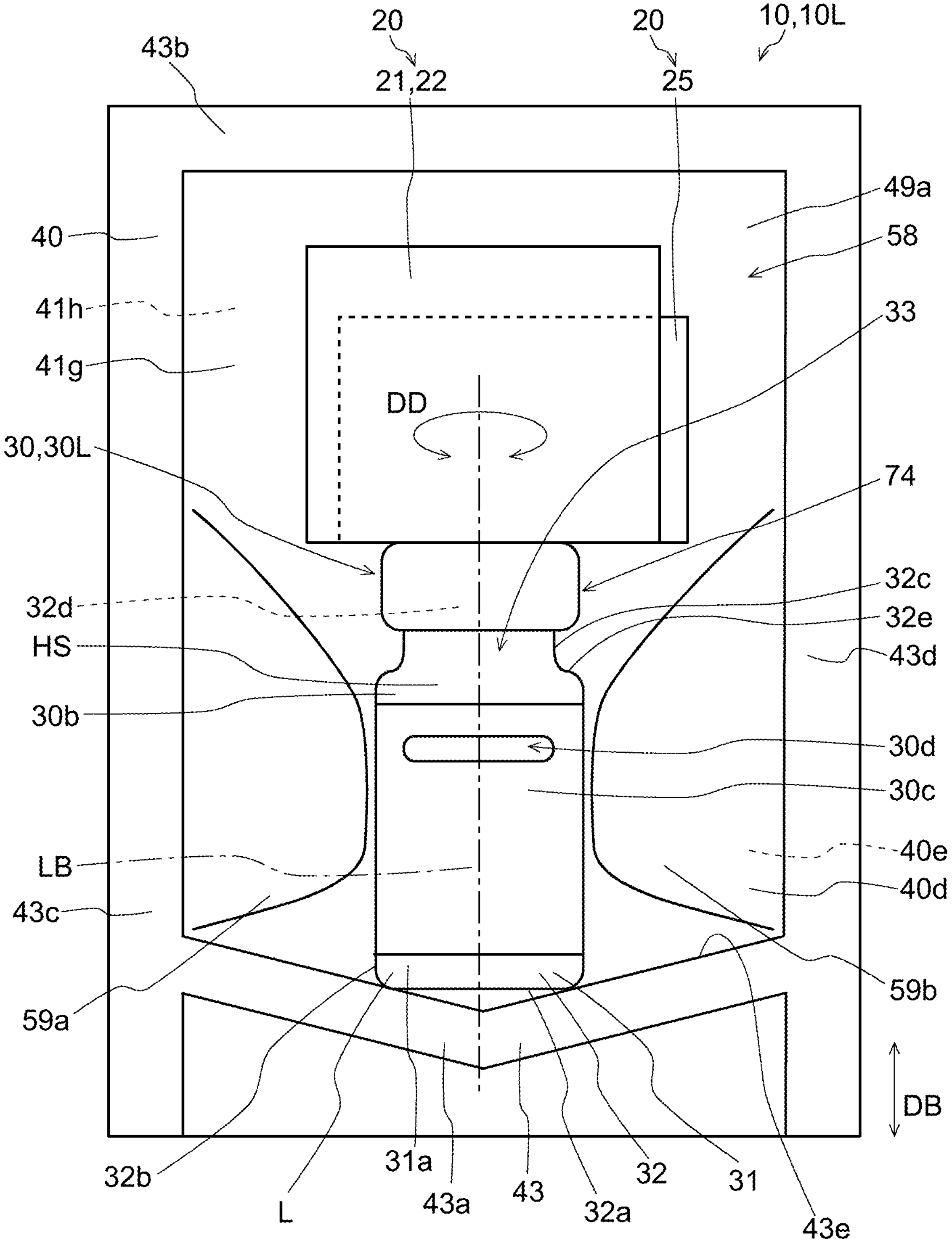
FIG. 31 is a front view that shows an example of a liquid-filled combination container according to a twelfth modification.
Figure 32:
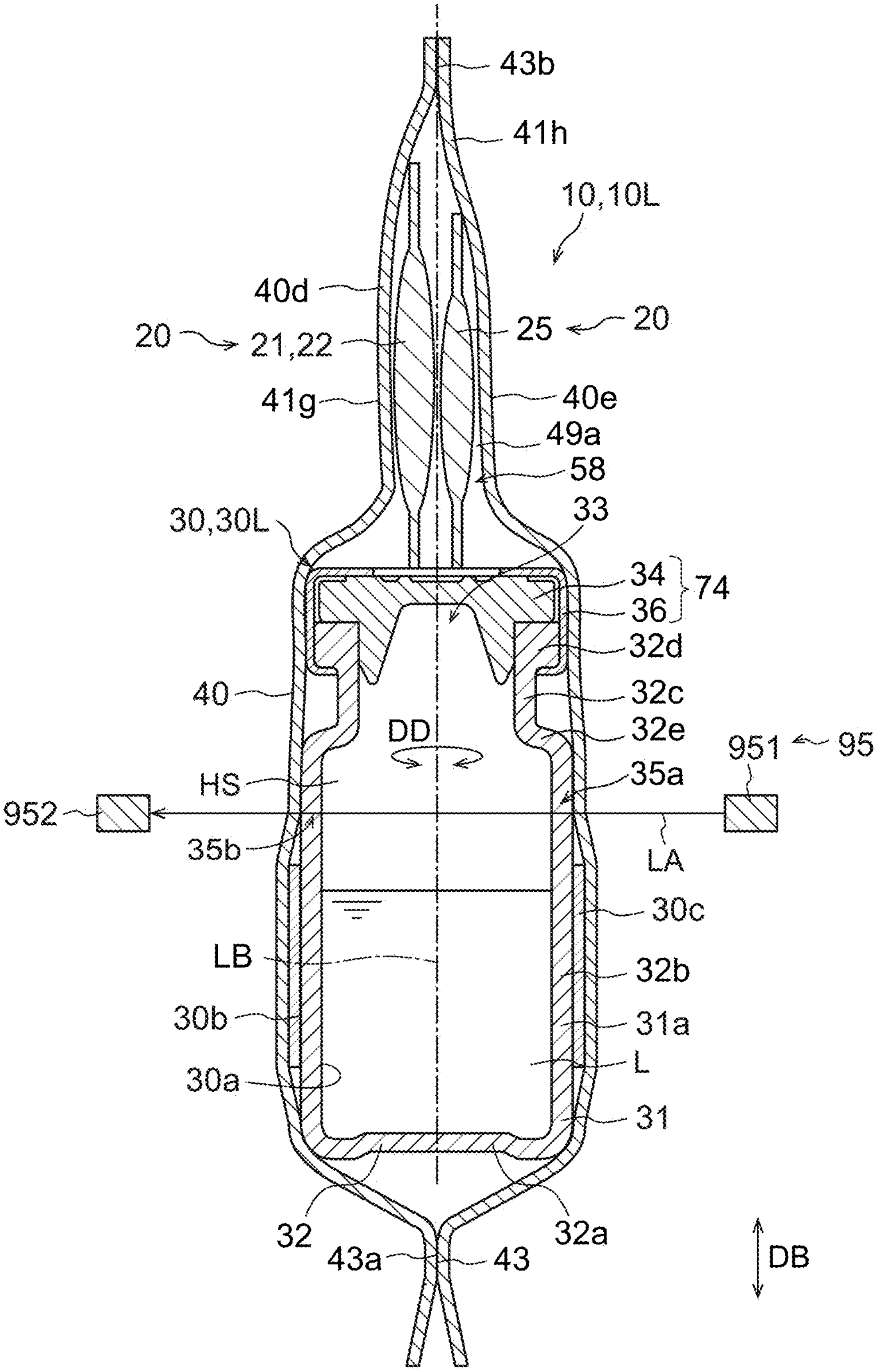
FIG. 32 is a sectional view that shows another example of the liquid-filled combination container according to the twelfth modification.

The liquid-filled combination container 10L further includes a label 30*c*. FIG. 31 is a front view that shows an example of the liquid-filled combination container 10L according to a twelfth modification. FIG. 32 is a sectional view that shows another example of the liquid-filled combination container 10L according to the twelfth modification. In FIGS. 31 and 32, the label 30*c* is attached to a part of the outer surface 30*b* of the container 30, which is a component of the trunk portion 32*b*. In an example, the label 30*c* includes a bonding layer or an adhesion layer. In this case, the label 30*c* is attached to the outer surface 30*b* of the container 30 in a manner such that at least part of the label 30*c* is joined to the outer surface 30*b* of the container 30 by a bonding layer or an adhesion layer. In an example, the entire outer edge of the label 30*c* is joined to the outer surface 30*b* of the container 30 by a bonding layer or an adhesion layer. The label 30*c* shows information, such as text and a picture. In an example, the label 30*c* shows the name of liquid L contained in the container 30 and a description on the fluid L.

In the twelfth modification, a technique is applied to the label 30*c* such that the label 30*c* does not interfere with application of laser light or LED light to penetrate through the container 30.

The label 30*c* shown in FIG. 31 includes a label light transmitting portion 30*d*. The mode of the label light transmitting portion 30*d* is not limited as long as the label light transmitting portion 30*d* passes light. In an example, the label light transmitting portion 30*d* is made of a material having light transmission properties. The label light transmitting portion 30*d* may be a through-hole provided in the label 30*c*. Since the label 30*c* includes the label light transmitting portion 30*d*, when the first location 35*a* and the second location 35*b* are disposed at locations where the first location 35*a* and the second location 35*b* overlap the label light transmitting portion 30*d* of the container 30, laser light or LED light can be applied such that the laser light or the LED light penetrates through the container 30 at the first location 35*a* and the second location 35*b* even when the liquid-filled combination container 10L includes the label 30*c*. Similarly, when the third location 35*c* and the fourth location 35*d* are disposed at locations where the third location 35*c* and the fourth location 35*d* overlap the label light transmitting portion 30*d* of the container 30, laser light or LED light can be applied such that the laser light or the LED light penetrates through the container 30 at the third location 35*c* and the fourth location 35*d* even when the liquid-filled combination container 10L includes the label 30*c*.

In the example shown in FIG. 31, the label light transmitting portion 30*d* extends in the circumferential direction DD orbiting around the axis LB of the container 30. Thus, the first location 35*a*, the second location 35*b*, the third location 35*c*, and the fourth location 35*d* can be disposed such that the first location 35*a* and the third location 35*c* are arranged in the circumferential direction DD and the second location 35*b* and the fourth location 35*d* are arranged in the circumferential direction DD. For this reason, the following advantageous effect is obtained. A case where the light source 951 and the measuring instrument 952 are disposed such that light applied from the light source 951 penetrates through the first location 35*a* and the second location 35*b* and reaches the measuring instrument 952 will be discussed. In this case, the disposition of the light source 951 and the measuring instrument 952 can be changed with an operation to rotate any one of the liquid-filled combination container 10L and both the light source 951 and the measuring instrument 952 about the axis LB such that light applied from the light source 951 penetrates through the third location 35*c* and the fourth location 35*d* and reaches the measuring instrument 952, without the necessity of the other operation.

The label 30*c* shown in FIG. 32 is provided at a location where the label 30*c* does not overlap the first location 35*a* or the second location 35*b* of the container 30. With this configuration as well, laser light or LED light can be applied so as to penetrate through the container 30 at the first location 35*a* and the second location 35*b*.

In the example shown in FIG. 32, the label 30*c* is provided at a location closer to the bottom portion 32*a* of the container body 32 than the first location 35*a* and the second location 35*b* in the axial direction DB in which the axis LB of the container 30 extends. For this reason, the label 30*c* does not overlap the first location 35*a* or the second location 35*b* of the container 30. Although not shown in the drawing, the label 30*c* may overlap only part in the circumferential direction DD orbiting around the axis LB of the container 30 such that the label 30*c* does not overlap the first location 35*a* or the second location 35*b* of the container 30. The entire outer edge of the label 30*c* does not need to be joined to the outer surface 30*b* of the container 30. In other words, part of the outer edge of the label 30*c* may be joined to the outer surface 30*b* of the container 30. In an example, the label 30*c* may have a rectangular shape, and only an outer edge serving as one side of the rectangular shape of the label 30*c* may be joined to the outer surface 30*b* of the container 30. In this case, the label 30*c* does not need to be attached so as to cover the outer surface 30*b* of the container 30 as a whole.

The label 30*c* may have light transmission properties as a whole except a part showing information, such as text and a picture. In this case, when the first location 35*a* and the second location 35*b* of the container 30 are disposed at locations where the first location 35*a* and the second location 35*b* overlap the part of the label 30*c*, having light transmission properties, laser light or LED light can be applied such that the laser light or the LED light penetrates through the container 30 at the first location 35*a* and the second location 35*b* even when the liquid-filled combination container 10L includes the label 30*c*. Similarly, when the third location 35*c* and the fourth location 35*d* of the container 30 are disposed at locations where the third location 35*c* and the fourth location 35*d* overlap the part of the label 30*c*, having light transmission properties, laser light or LED light can be applied such that the laser light or the LED light penetrates through the container 30 at the third location 35*c* and the fourth location 35*d* even when the liquid-filled combination container 10L includes the label 30*c*.

Thirteenth Modification

Figure 33:
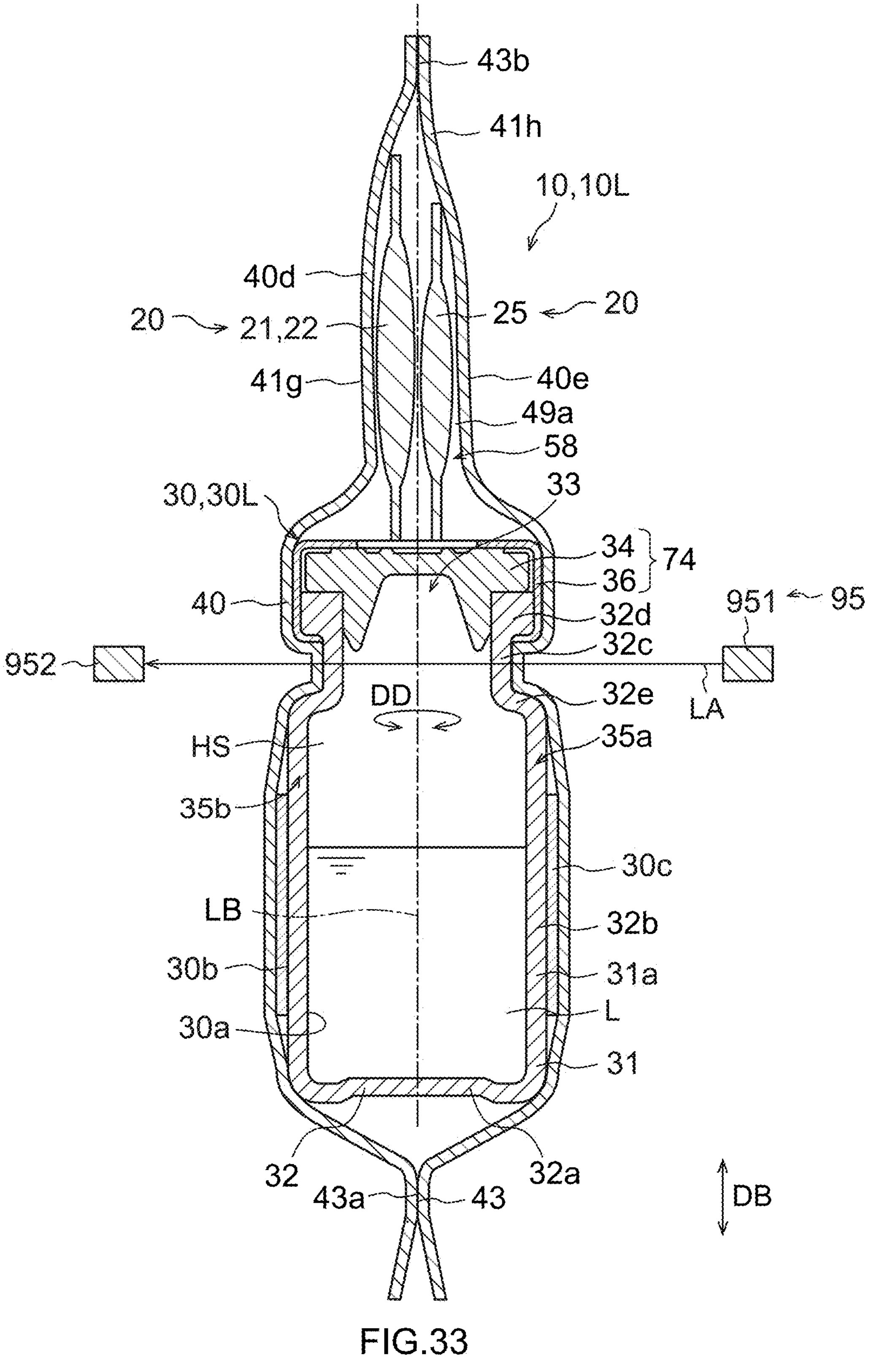
FIG. 33 is a sectional view that shows an example of a liquid-filled combination container according to a thirteenth modification.
Figure 34:
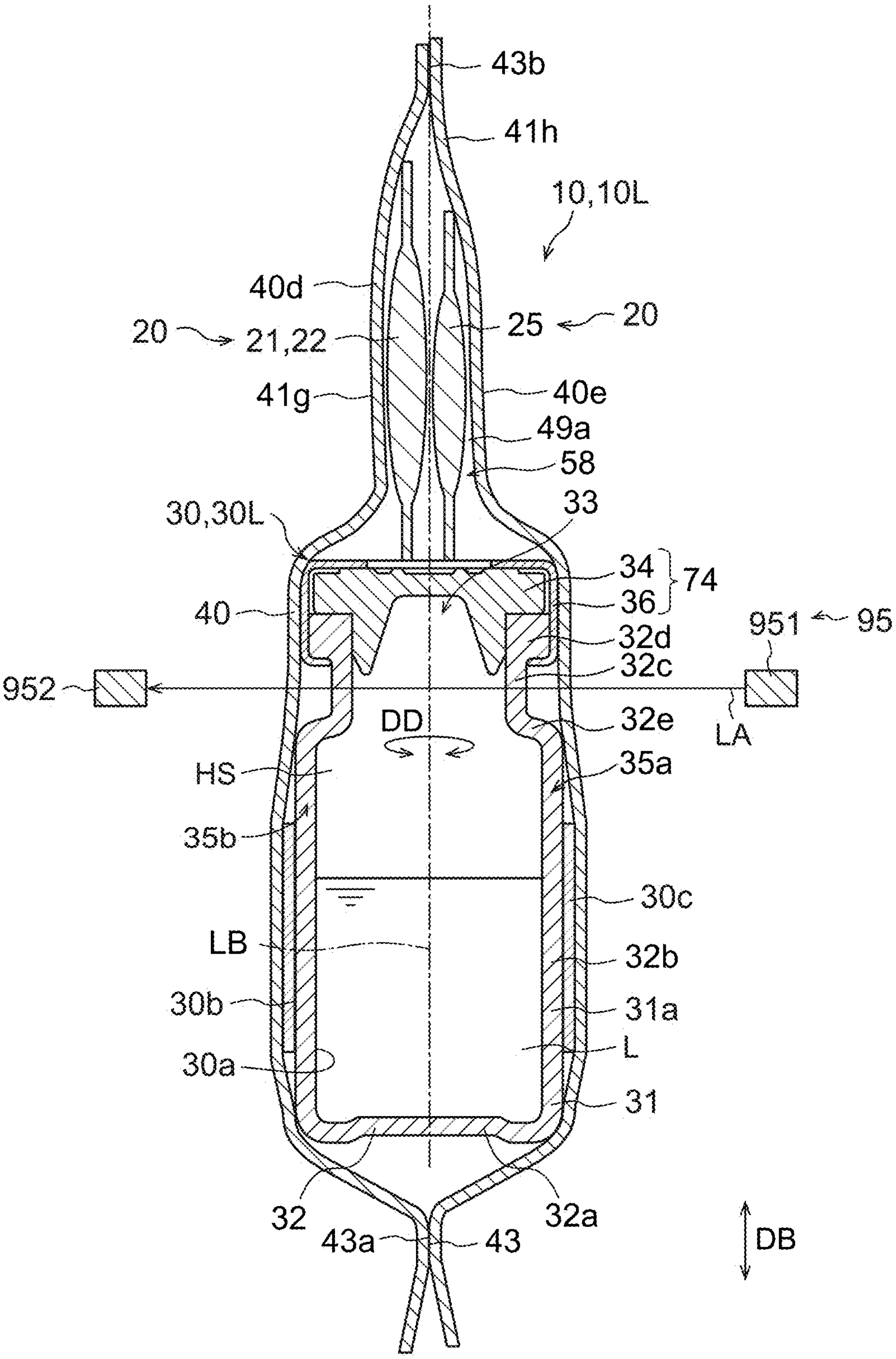
FIG. 34 is a sectional view that shows another example of the liquid-filled combination container according to the thirteenth modification.

In the above-described fourth embodiment, eleventh modification and twelfth modification, an example in which the first location 35*a* and the second location 35*b* are located at the trunk portion 32*b* of the container 30 has been described. However, the disposition of the first location 35*a* and the second location 35*b* is not limited thereto. FIG. 33 is a sectional view that shows another example of the liquid-filled combination container 10L according to a thirteenth modification. FIG. 34 is a sectional view that shows another example of the liquid-filled combination container 10L according to the thirteenth modification. In the example shown in FIGS. 33 and 34, the first location 35*a* and the second location 35*b* are located at the neck portion 32*c*. The third location 35*c* and the fourth location 35*d* are located at the neck portion 32*c*. The neck portion 32*c* of the container 30 shown in FIGS. 33 and 34 has a circularly symmetric shape with respect to the axis LB of the container 30. The label 30*c* is attached to a part of the outer surface 30*b* of the container 30, which is a component of the trunk portion 32*b*.

Since the first location 35*a* and the second location 35*b* are located at the neck portion 32*c*, laser light or LED light can be applied so as to penetrate through the container 30 at the first location 35*a* and the second location 35*b* without interference of the label 30*c* even when the label 30*c* is attached to the trunk portion 32*b*. Similarly, since the third location 35*c* and the fourth location 35*d* are located at the neck portion 32*c*, laser light or LED light can be applied so as to penetrate through the container 30 at the third location 35*c* and the fourth location 35*d* without interference of the label 30*c* even when the label 30*c* is attached to the trunk portion 32*b*.

In the example shown in FIG. 33, the barrier container 40 is in contact at a location having light transmission properties with the outer surface 30*b* of the container 30 at the first location 35*a* and at the second location 35*b* located at the neck portion 32*c*. In this case, although not shown in the drawing, the barrier container 40 may be in contact at a location having light transmission properties with the outer surface 30*b* of the container 30 at the third location 35*c* and the fourth location 35*d* located at the neck portion 32*c*.

A method of bringing the barrier container 40 into contact with the outer surface 30*b* of the container 30 at the first location 35*a* and the second location 35*b* located at the neck portion 32*c* is not limited as long as laser light or LED light can be applied to penetrate through the container 30 at the first location 35*a* and the second location 35*b* in a state where the barrier container 40 is brought into contact with the outer surface 30*b* at the first location 35*a* and the second location 35*b*. In an example, a film that makes up the barrier container 40 is a shrink film. In this case, by adding heat to the shrink film making up the barrier container 40 to cause the shrink film to thermally shrink, a part of the barrier container 40, made up of the shrink film, can be brought into contact with the outer surface 30*b* at the first location 35*a* and the second location 35*b*. In another example, by pressing the barrier container 40 from the outside toward the outer surface 30*b* at the first location 35*a* and the second location 35*b* with a jig, the barrier container 40 can be brought into contact with the outer surface 30*b* at the first location 35*a* and the second location 35*b*. As a method of bringing the barrier container 40 into contact with the outer surface 30*b* of the container 30 at the first location 35*a* and the second location 35*b* located at the neck portion 32*c*, a method of bringing the barrier container 40 into contact with the outer surface 30*b* of the container 30, at the first location 35*a* and the second location 35*b* located at the trunk portion 32*b*, described in the above-described embodiments and modifications, can be applied unless there is a contradiction.

As described above, the neck portion 32*c* of the container 30 shown in FIG. 33 has a circularly symmetric shape with respect to the axis LB of the container 30. In this case, since the barrier container 40 is in contact with the outer surface 30*b* of the container 30 at the first location 35*a* and the second location 35*b* located at the neck portion 32*c* and is in contact with the outer surface 30*b* of the container 30 at the third location 35*c* and the fourth location 35*d* located at the neck portion 32*c*, the following advantageous effect is obtained. While the first location 35*a* and the second location 35*b* are disposed at the neck portion 32*c*, the length of a line segment located inside the container 30 in a straight line connecting the first location 35*a* with the second location 35*b* can be equal to the length of a line segment located inside the container 30 in a straight line connecting the third location 35*c* with the fourth location 35*d*. A total of the length of a line segment located in a space between the container 30 and the barrier container 40 in the straight line connecting the first location 35*a* with the second location 35*b* and a total of the length of a line segment located in a space between the container 30 and the barrier container 40 in the straight line connecting the third location 35*c* with the fourth location 35*d* both can be set to zero. Thus, the attenuation factor can be measured while the distance by which laser light or LED light passes through a space between the container 30 and the barrier container 40 is aligned.

In the example shown in FIG. 34, the barrier container 40 includes a part that contacts with the cap portion 74 and a part that contacts with the shoulder portion 32*e* of the container 30. Thus, the barrier container 40 is stretched without a slack between the cap portion 74 and the shoulder portion 32*e*. In this case, the barrier container 40 may contact with the cap portion 74 and the shoulder portion 32*e* in part in the circumferential direction DD orbiting around the axis LB of the container 30 and be stretched between the cap portion 74 and the shoulder portion 32*e*. The barrier container 40 may contact with the cap portion 74 and the shoulder portion 32*e* entirely in the circumferential direction DD orbiting around the axis LB of the container 30 and be stretched between the cap portion 74 and the shoulder portion 32*e*. The outer surface of the cap portion 74 shown in FIG. 34 has a circularly symmetric shape with respect to the axis LB of the container 30. Then, part of the barrier container 40 is in area contact with the side face of the cap portion 74. The shoulder portion 32*e* of the container 30 shown in FIG. 34 has a circularly symmetric shape with respect to the axis LB. Then, part of the barrier container 40 is in contact with a part of the shoulder portion 32*e*, coupled to the trunk portion 32*b*.

A method of bringing part of the barrier container 40 into contact with the cap portion 74 and bringing another part into contact with the shoulder portion 32*e* is not limited. The container 30 and the barrier container 40 may be designed such that, when the container 30 is accommodated in the barrier container 40, voluntarily, part of the barrier container 40 contacts with the cap portion 74 and another part contacts with the shoulder portion 32*e*. By pressing the barrier container 40 from the outside toward the cap portion 74 or the shoulder portion 32*e* with a jig, part of the barrier container 40 may be brought into contact with the cap portion 74 or the shoulder portion 32*e*.

In the example shown in FIG. 34, the first location 35*a* and the second location 35*b* are disposed such that a straight line connecting the first location 35*a* with the second location 35*b* (which corresponds to the optical path LA) passes through a part of the barrier container 40, stretched between the cap portion 74 and the shoulder portion 32*e*. In this case, although not shown in the drawing, the third location 35*c* and the fourth location 35*d* may be disposed such that a straight line connecting the third location 35*c* with the fourth location 35*d* passes through a part of the barrier container 40, stretched between the cap portion 74 and the shoulder portion 32*e*.

As described above, the neck portion 32*c* of the container 30 shown in FIG. 34 has a circularly symmetric shape with respect to the axis LB of the container 30. The outer surface of the cap portion 74 shown in FIG. 34 has a circularly symmetric shape with respect to the axis LB of the container 30. The shoulder portion 32*e* of the container 30 shown in FIG. 34 has a circularly symmetric shape with respect to the axis LB. In this case, since the first location 35*a* and the second location 35*b* are disposed such that a straight line connecting the first location 35*a* with the second location 35*b* passes through a part of the barrier container 40, stretched between the cap portion 74 and the shoulder portion 32*e*, and the third location 35*c* and the fourth location 35*d* are disposed such that a straight line connecting the third location 35*c* with the fourth location 35*d* passes through a part of the barrier container 40, stretched between the cap portion 74 and the shoulder portion 32*e*, the following advantageous effect is obtained. While the first location 35*a* and the second location 35*b* are disposed at the neck portion 32*c*, the length of a line segment located inside the container 30 in a straight line connecting the first location 35*a* with the second location 35*b* can be equal to the length of a line segment located inside the container 30 in a straight line connecting the third location 35*c* with the fourth location 35*d*. A total of the length of a line segment located in a space between the container 30 and the barrier container 40 in the straight line connecting the first location 35*a* with the second location 35*b* can be made equal to a total of the length of a line segment located in a space between the container 30 and the barrier container 40 in the straight line connecting the third location 35*c* with the fourth location 35*d*. Thus, the attenuation factor can be measured while the distance by which laser light or LED light passes through a space between the container 30 and the barrier container 40 is aligned.

Fifth Embodiment

Next, a fifth embodiment will be described. In the following description and the drawings used in the following description, like reference signs to the reference signs used for corresponding portions in the above-described embodiments and modifications are used for portions that can be similarly configured to those of the above-described embodiments and modifications, and the description thereof may not be repeated. When the operation and advantageous effects obtained in the above-described embodiments and modifications are also apparently obtained in the fifth embodiment, the description thereof may be omitted.

Figure 35:
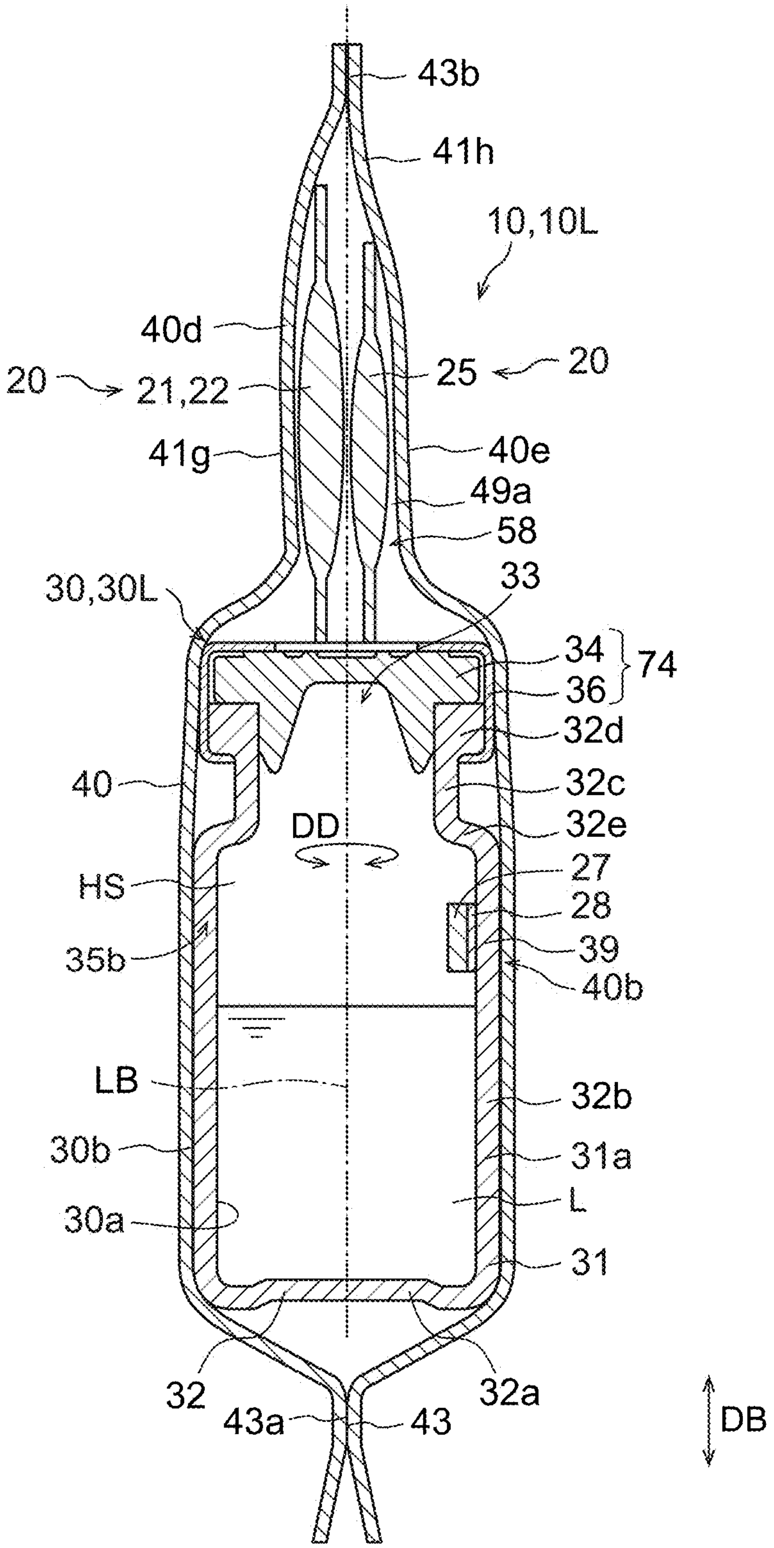
FIG. 35 is a sectional view that shows a liquid-filled combination container according to a fifth embodiment of the present disclosure.

FIG. 35 is a view that illustrates the fifth embodiment of the present disclosure. The liquid-filled combination container 10L according to the fifth embodiment, as in the case of the liquid-filled combination container 10L according to the first embodiment, includes the container 30 having oxygen permeability and containing the liquid L in the containing portion 31, the barrier container 40 having oxygen barrier properties and accommodating the container 30, at least one oxygen reactant 20 that can react with oxygen in the barrier container 40, and the fluorescent material 27 that varies in fluorescence time or fluorescence intensity according to a surrounding oxygen concentration. The fluorescent material 27 is provided on the inner surface 30*a* of the container 30 at the fluorescent material installation location 39 apart from the contact region 31*a* of the containing portion 31, which contacts with the liquid L. The container 30 has light transmission properties at least at the fluorescent material installation location 39. The barrier container 40 includes a light transmission location 40*b* where the barrier container 40 has light transmission properties. The liquid-filled combination container 10L according to the fifth embodiment, as in the case of the liquid-filled combination container 10L according to the first embodiment, can inspect the oxygen concentration in the container 30 by measuring the fluorescence time or the fluorescence intensity of the fluorescent material 27 through application of light for causing the fluorescent material 27 to emit fluorescence to the fluorescent material 27.

Unless otherwise specified, the characteristic of the liquid-filled combination container 10L according to the fifth embodiment described in the specification is the characteristic of the liquid-filled combination container 10L in a state where the container 30, the oxygen reactants 20, and the fluorescent material 27 are accommodated in the barrier container 40 as shown in FIG. 35 and the upper seal part 43*b* of the barrier container 40 (described later) is grasped and the liquid-filled combination container 10L is lifted without adding strong vibrations.

In the liquid-filled combination container 10L according to the fifth embodiment, as in the case of the liquid-filled combination container 10L according to the fourth embodiment, the oxygen reactants 20 are held in the holding space 58 formed between part of the outer surface 30*b* and part of the inner surface of the barrier container 40. In the liquid-filled combination container 10L according to the fifth embodiment, the holding space 58 is not located between the fluorescent material installation location 39 and the light transmission location 40*b*. For this reason, by allowing light for causing the fluorescent material 27 to penetrate through the barrier container 40 at the light transmission location 40*b* and the container 30 at the fluorescent material installation location 39, light can be applied to the fluorescent material 27 without interference of the oxygen reactant 20. The description made on the above-described holding space 58 in the fourth embodiment and the modifications also applies to the liquid-filled combination container 10L according to the fifth embodiment unless there is a contradiction.

The holding space 58 formed between part of the outer surface 30*b* of the container 30 and part of the inner surface of the barrier container 40 in the liquid-filled combination container 10L according to the fifth embodiment is regarded as corresponding to the oxygen reactant accommodating portion 49*a* described in the above-described embodiments and modifications. In other words, the liquid-filled combination container 10L according to the fifth embodiment is regarded as the one that the oxygen reactant accommodating portion 49*a* that accommodates the oxygen reactants 20 is defined in part of the inside of the barrier container 40. In the liquid-filled combination container 10L according to the fifth embodiment as well, the oxygen reactants 20 are regarded as being accommodated in the oxygen reactant accommodating portion 49*a* to be disposed at a location not placed between the fluorescent material installation location 39 and the light transmission location 40*b*.

Sixth Embodiment

Next, a sixth embodiment will be described. In the following description, like reference signs to the reference signs used for corresponding portions in the above-described embodiments and modifications are used for portions that can be similarly configured to those of the above-described embodiments and modifications, and the description thereof may not be repeated. When the operation and advantageous effects obtained in the above-described embodiments and modifications are also apparently obtained in the sixth embodiment, the description thereof may be omitted.

The sixth embodiment relates to an inspection method for the liquid-filled combination container 10L. The inspection method according to the sixth embodiment is an inspection method for the liquid-filled combination container 10L including the container 30 having oxygen permeability and containing liquid L in the containing portion 31, the barrier container 40 having oxygen barrier properties and accommodating the container 30, and at least one oxygen reactant 20 that can react with oxygen in the barrier container 40. The container 30 includes a first location 35*a* and a second location 35*b* apart from the contact region 31*a* of the containing portion 31, which contacts with the liquid L. The container 30 has light transmission properties at least at the first location 35*a* and the second location 35*b*. The barrier container 40 has light transmission properties at least at a location that intersects with a straight line connecting the first location 35*a* with the second location 35*b*. The inspection method according to the sixth embodiment can be widely applied to the above-described liquid-filled combination containers 10L. Hereinafter, a method of inspecting the liquid-filled combination container 10L according to the fourth embodiment will be described unless otherwise specified as an example of the inspection method according to the sixth embodiment.

The inspection method according to the sixth embodiment includes a disposing step, an attenuation factor measurement step, and a measurement step. In the disposing step, the oxygen reactants 20 are disposed at a location spaced apart from a straight line connecting the first location 35*a* with the second location 35*b*. In the attenuation factor measurement step, the attenuation factor of laser light or LED light with a wavelength to be attenuated according to an oxygen concentration in an optical path is measured by applying the laser light or LED light to the liquid-filled combination container 10L such that the laser light or the LED light penetrates through the barrier container 40 at a location having light transmission properties and the container 30 at the first location 35*a* and the second location 35*b*. In the measurement step, the oxygen concentration in the container 30 is measured in accordance with the attenuation factor measured in the attenuation factor measurement step.

The inspection method according to the sixth embodiment further includes an additional disposing step, an additional attenuation factor measurement step, an additional measurement step, and an average value calculation step. In the additional disposing step, the oxygen reactants 20 are disposed at a location spaced apart from a straight line connecting the third location 35*c* with the fourth location 35*d*. In the additional attenuation factor measurement step, the attenuation factor of laser light or LED light with a wavelength to be attenuated according to an oxygen concentration in an optical path is measured by applying the laser light or LED light to the liquid-filled combination container 10L such that the laser light or the LED light penetrates through the barrier container 40 at a location having light transmission properties and the container 30 at the third location 35*c* and the fourth location 35*d*. In the additional measurement step, the oxygen concentration in the container 30 is measured in accordance with the attenuation factor measured in the additional attenuation factor measurement step. In the average value calculation step, an average value of oxygen concentrations in the container 30 is calculated from a plurality of measured oxygen concentrations at least including the oxygen concentration measured in the measurement step and the oxygen concentration measured in the additional measurement step. The inspection method according to the sixth embodiment further includes a contact step of bringing the barrier container 40 into contact with the outer surface 30*b* of the container 30.

In an example, initially, in the contact step, the barrier container 40 is brought into contact with the outer surface 30*b* of the container 30. In the contact step, the barrier container 40 is brought into contact with the outer surface 30*b* of the container 30 at the first location 35*a* and the second location 35*b*. In the contact step, the barrier container 40 may be brought into contact with the outer surface 30*b* of the container 30 at the first location 35*a* and the second location 35*b* and may be brought into contact with the outer surface 30*b* of the container 30 at the third location 35*c* and the fourth location 35*d*. In the contact step, the barrier container 40 may be brought into contact with the container 30 in the first contact region 35*e* continuous in the circumferential direction DD orbiting around the axis LB of the container 30 and the second contact region 35*f* continuous in the circumferential direction DD and opposed to the first contact region 35*e* across the axis LB. The first contact region 35*e* is formed such that the first location 35*a* and the third location 35*c* are located in the first contact region 35*e*. The second contact region 35*f* is formed such that the second location 35*b* and the fourth location 35*d* are located in the second contact region 35*f*.

In the contact step, in an imaginary plane perpendicular to the axis LB and passing through the first contact region 35*e* and the second contact region 35*f*, an angle θ1 formed between a straight line LD connecting one end 35*g* of the first contact region 35*e* in the circumferential direction DD with the axis LB and a straight line LE connecting the other end 35*h* of the first contact region 35*e* in the circumferential direction DD and the axis LB may be larger than or equal to 120°. In the above-described imaginary plane, an angle θ2 formed between a straight line LF connecting one end 35*i* of the second contact region 35*f* in the circumferential direction DD with the axis LB and a straight line LG connecting the other end 35*j* of the second contact region 35*f* in the circumferential direction DD with the axis LB may be larger than or equal to 120°.

As described above, in the liquid-filled combination container 10L according to the fourth embodiment, even when a special operation is not performed in the contact step, the barrier container 40 is in contact with the container 30 in the first contact region 35*e* and the second contact region 35*f*. When the liquid-filled combination container 10L that needs a special operation to be performed in order to bring the barrier container 40 into contact with the container 30 in the first contact region 35*e* and the second contact region 35*f* is inspected, the operation may be performed as a contact step.

In the disposing step, the oxygen reactants 20 are disposed at a location spaced apart from a straight line connecting the first location 35*a* with the second location 35*b*. Disposing the oxygen reactants 20 at a location spaced apart from a straight line connecting the first location 35*a* with the second location 35*b* in the disposing step includes confirming that the oxygen reactants 20 are disposed at a location spaced apart from a straight line connecting the first location 35*a* with the second location 35*b* from the beginning and maintaining the location of the oxygen reactants 20 with no change. In the liquid-filled combination container 10L according to the fourth embodiment, since the oxygen reactants 20 are held in the holding space 58, the oxygen reactants 20 are disposed at a location spaced apart from a straight line connecting the first location 35*a* with the second location 35*b*. In this case, in the disposing step, it is confirmed that the oxygen reactants 20 are disposed at a location spaced apart from a straight line connecting the first location 35*a* with the second location 35*b* because the oxygen reactants 20 are held in the holding space 58, and the location of the oxygen reactants 20 is maintained with no change. When the liquid-filled combination container 10L with no holding space 58 is inspected, the disposition of the oxygen reactants 20 is changed such that the oxygen reactants 20 are spaced apart from a straight line connecting the first location 35*a* with the second location 35*b* in the disposing step. The disposition of the oxygen reactants 20 may be changed such that the oxygen reactants 20 are spaced apart from a straight line connecting the first location 35*a* with the second location 35*b* and spaced apart from a straight line connecting the third location 35*c* with the fourth location 35*d*. In this case, the disposing step and the additional disposing step (described later) are regarded as being performed at the same time.

In the attenuation factor measurement step, the attenuation factor of laser light or LED light with a wavelength to be attenuated according to an oxygen concentration in an optical path is measured by applying the laser light or LED light to the liquid-filled combination container 10L such that the laser light or the LED light penetrates through the barrier container 40 at a location having light transmission properties and the container 30 at the first location 35*a* and the second location 35*b*. The description on the attenuation factor measurement step of the inspection method for the liquid-filled combination container 10L according to the second embodiment is also applied to the attenuation factor measurement step of the inspection method according to the sixth embodiment unless there is a contradiction.

In the measurement step, the oxygen concentration in the container 30 is measured in accordance with the attenuation factor measured in the attenuation factor measurement step. The description on the measurement step of the inspection method for the liquid-filled combination container 10L according to the second embodiment may also be applied to the attenuation factor measurement step of the inspection method according to the sixth embodiment unless there is a contradiction.

In the additional disposing step, the oxygen reactants 20 are disposed at a location spaced apart from a straight line connecting the third location 35*c* with the fourth location 35*d*. Disposing the oxygen reactants 20 at a location spaced apart from a straight line connecting the third location 35*c* with the fourth location 35*d* in the additional disposing step includes confirming that the oxygen reactants 20 are disposed at a location spaced apart from a straight line connecting the third location 35*c* with the fourth location 35*d* from the beginning and maintaining the location of the oxygen reactants 20 with no change. In the liquid-filled combination container 10L according to the fourth embodiment, since the oxygen reactants 20 are held in the holding space 58, the oxygen reactants 20 are disposed at a location spaced apart from a straight line connecting the first location 35*a* with the second location 35*b* and spaced apart from a straight line connecting the third location 35*c* with the fourth location 35*d*. In this case, in the additional disposing step, it is confirmed that the oxygen reactants 20 are disposed at a location spaced apart from a straight line connecting the third location 35*c* with the fourth location 35*d* because the oxygen reactants 20 are held in the holding space 58, and the location of the oxygen reactants 20 is maintained with no change. When the liquid-filled combination container 10L with no holding space 58 is inspected, the disposition of the oxygen reactants 20 is changed such that the oxygen reactants 20 are spaced apart from a straight line connecting the third location 35*c* with the fourth location 35*d* in the additional disposing step.

The inspection method according to the sixth embodiment further includes a measuring device disposition changing step of changing the disposition of the light source 951 and the measuring instrument 952 at least after the attenuation factor measurement step and before the additional attenuation factor measurement step (described later). In the measuring device disposition changing step, the disposition of the light source 951 and the measuring instrument 952 disposed such that light applied from the light source 951 penetrates through the first location 35*a* and the second location 35*b* and reaches the measuring instrument 952 is changed such that light applied from the light source 951 penetrates through the third location 35*c* and the fourth location 35*d* and reaches the measuring instrument 952. In the contact step, by bringing the barrier container 40 into contact with the container 30 in the first contact region 35*e* and the second contact region 35*f*, the disposition of the light source 951 and the measuring instrument 952 can be changed with an operation to rotate any one of the liquid-filled combination container 10L and both the light source 951 and the measuring instrument 952 about the axis LB without the necessity of the other operation in the measuring device disposition changing step. In the contact step, when the angle θ1 is larger than or equal to 120° and the angle θ2 is larger than or equal to 120°, the following advantageous effect is obtained. The third location 35*c* is disposed at a location far apart from the first location 35*a*, the fourth location 35*d* is disposed at a location far apart from the second location 35*b*, and the optical path LC is disposed at a location significantly shifted from the optical path LA, the oxygen concentration in the container 30 can be measured in accordance with the attenuation factor in each of the optical path LA and the optical path LC.

In the additional attenuation factor measurement step, the attenuation factor of laser light or LED light with a wavelength to be attenuated according to an oxygen concentration in an optical path is measured by applying the laser light or LED light to the liquid-filled combination container 10L such that the laser light or the LED light penetrates through the barrier container 40 at a location having light transmission properties and the container 30 at the third location 35*c* and the fourth location 35*d*. In the additional attenuation factor measurement step, a method of measuring an attenuation factor by applying laser light or LED light to the liquid-filled combination container 10L such that the laser light or the LED light penetrates through the first location 35*a* and the second location 35*b* in the above-described attenuation factor measurement step can be applied as a method of measuring an attenuation factor by applying laser light or LED light to the liquid-filled combination container 10L such that the laser light or the LED light penetrates through the third location 35*c* and the fourth location 35*d*, unless there is a contradiction.

Here, the length of a line segment located inside the container 30 in a straight line connecting the first location 35*a* with the second location 35*b* (which corresponds to the optical path LA) is equal to the length of a line segment located inside the container 30 in a straight line connecting the third location 35*c* with the fourth location 35*d* (which corresponds to the optical path LC). A total of the length of a line segment located in a space between the container 30 and the barrier container 40 in the straight line connecting the first location 35*a* with the second location 35*b* is equal to a total of the length of a line segment located in a space between the container 30 and the barrier container 40 in the straight line connecting the third location 35*c* with the fourth location 35*d*. In the inspection method according to the sixth embodiment, the first location 35*a*, the second location 35*b*, the third location 35*c*, and the fourth location 35*d* are disposed such that the above-described positional relationship among the first location 35*a*, the second location 35*b*, the third location 35*c*, and the fourth location 35*d* is satisfied, and inspection is performed. Since the length of the line segment located inside the container 30 in the straight line connecting the first location 35*a* with the second location 35*b* is equal to the length of the line segment located inside the container 30 in the straight line connecting the third location 35*c* with the fourth location 35*d*, the attenuation factor can be measured by aligning the distance by which laser light or LED light passes through the inside of the container 30. Since a total of the length of the line segment located in the space between the container 30 and the barrier container 40 in the straight line connecting the first location 35*a* with the second location 35*b* is equal to a total of the length of the line segment located in the space between the container 30 and the barrier container 40 in the straight line connecting the third location 35*c* with the fourth location 35*d*, the attenuation factor can be measured by aligning the distance by which laser light or LED light passes through the space between the container 30 and the barrier container 40.

In the additional measurement step, the oxygen concentration in the container 30 is measured in accordance with the attenuation factor measured in the additional attenuation factor measurement step. In the additional measurement step, a method of measuring the oxygen concentration in the container 30 in accordance with the attenuation factor measured in the attenuation factor measurement step in the above-described measurement step can be applied as a method of measuring the oxygen concentration in the container 30 in accordance with the attenuation factor measured in the additional attenuation factor measurement step, unless there is a contradiction.

In the average value calculation step, an average value of oxygen concentrations in the container 30 is calculated from a plurality of measured oxygen concentrations at least including the oxygen concentration measured in the measurement step and the oxygen concentration measured in the additional measurement step. Since the inspection method includes the additional attenuation factor measurement step, the additional measurement step, and the average value calculation step, oxygen concentrations in the container 30 can be measured in accordance with attenuation factors of laser light or LED light in different optical paths, and an average value of the oxygen concentrations in the container 30, measured in the different optical paths can be calculated. Thus, the oxygen concentration in the container 30 can be calculated with further high accuracy.

Various changes may be applied to the above-described sixth embodiment. Hereinafter, modifications of the sixth embodiment will be described with reference to the drawings as needed. In the following description and the drawings used in the following description, like reference signs to the reference signs used for corresponding portions in the sixth embodiment are used for portions that can be similarly configured to those of the sixth embodiment, and the description thereof may not be repeated. When the operation and advantageous effects obtained in the sixth embodiment are also apparently obtained in the modifications, the description thereof may be omitted.

Fourteenth Modification

Figure 36:
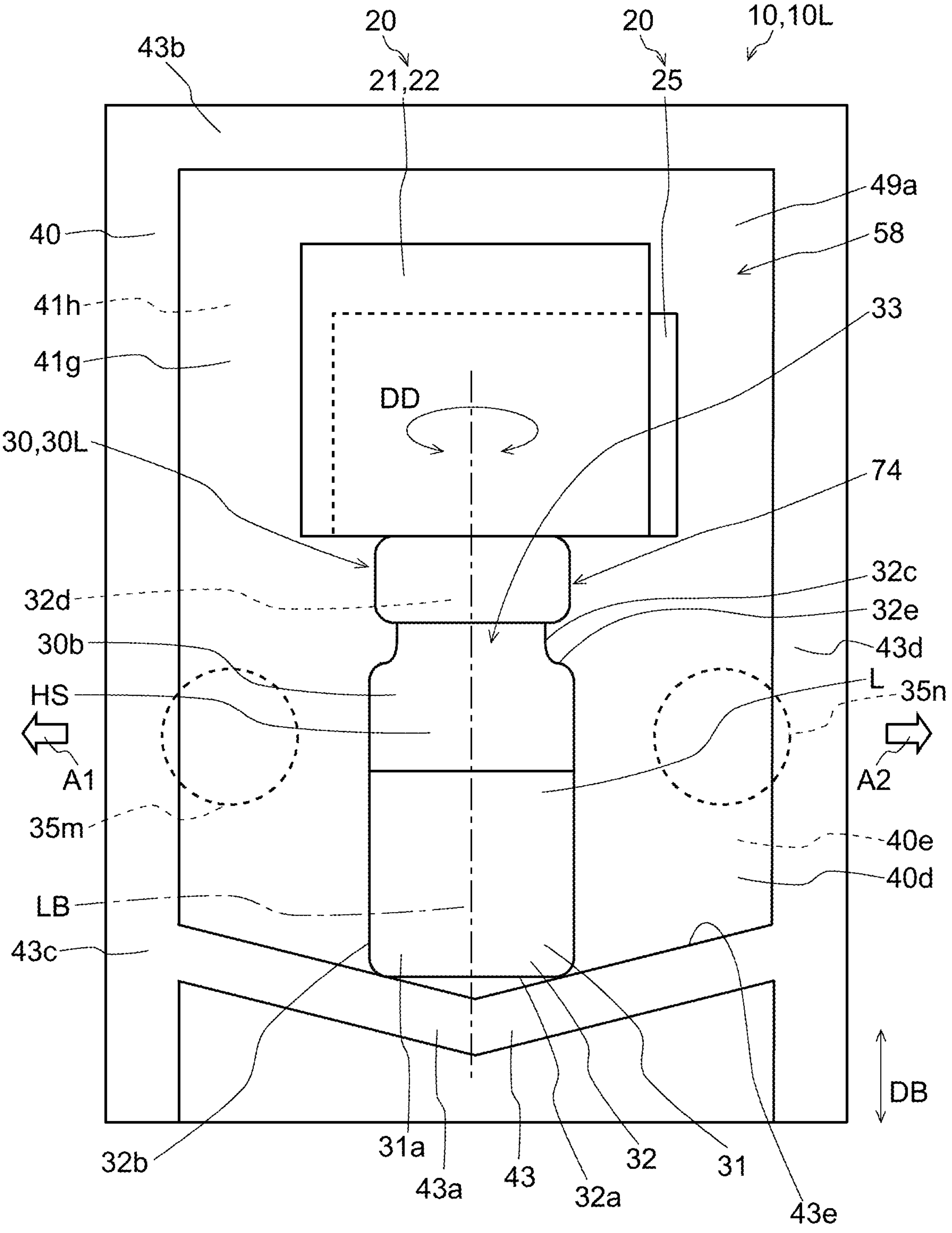
FIG. 36 is a view that shows an example of a contact step in an inspection method according to a fourteenth modification.

When the barrier container 40 includes the first film 41*g* and the second film 41*h*, the barrier container 40 may be brought into contact with the outer surface 30*b* of the container 30 at the first location 35*a* and the second location 35*b* by pulling the barrier container 40 in the contact step. FIG. 36 is a view that shows an example of the contact step in an inspection method according to a fourteenth modification.

The barrier container 40 of the liquid-filled combination container 10L to which the inspection method according to the fourteenth modification is applied includes the first film 41*g* that is a component of the first face 40*d* of the barrier container 40, the second film 41*h* that is a component of the second face 40*e* of the barrier container 40, opposed to the first face 40*d*, and the seal part 43 that joins the first film 41*g* with the second film 41*h* in at least part of the first film 41*g* and the second film 41*h*. The barrier container 40 is a bag accommodating the container 30 between the first film 41*g* and the second film 41*h*.

In the contact step, the barrier container 40 is brought into contact with the outer surface 30*b* of the container 30 at the first location 35*a* and the second location 35*b* by pulling a first pulling region 35*m* of the barrier container 40, not overlapping the container 30 in a plan view in the thickness direction of the first film 41*g*, and a second pulling region 35*n* on an opposite side to the first pulling region 35*m* across the container 30 in a plan view in the thickness direction of the first film 41*g* away from each other.

In the example shown in FIG. 36, a region of the barrier container 40, surrounded by the dashed line with the reference sign 35*m* is the first pulling region 35*m*. The first pulling region 35*m* is located closer to the first lateral seal part 43*c* than the container 30 in a plan view of the liquid-filled combination container 10L in the thickness direction of the first film 41*g*. A region of the barrier container 40, surrounded by the dashed line with the reference sign 35*n*, is the second pulling region 35*n*. The second pulling region 35*n* is located closer to the second lateral seal part 43*d* than the container 30 in a plan view of the liquid-filled combination container 10L in the thickness direction of the first film 41*g*.

In an example, the first pulling region 35*m* and the second pulling region 35*n* can be pulled away from each other by pulling the first pulling region 35*m* in the direction of the arrow A1 in FIG. 36 and pulling the second pulling region 35*n* in the direction of the arrow A2 in FIG. 36. Thus, the barrier container 40 can be brought into contact with the outer surface 30*b* of the container 30 at the first location 35*a* and the second location 35*b*. The barrier container 40 may be brought into contact with the outer surface 30*b* at the first location 35*a* and the second location 35*b* and into contact with the outer surface 30*b* at the third location 35*c* and the fourth location 35*d* by pulling the first pulling region 35*m* and the second pulling region 35*n*. The barrier container 40 may be brought into contact with the container 30 in the first contact region 35*e* and the second contact region 35*f* by pulling the first pulling region 35*m* and the second pulling region 35*n*. Thus, in a state where the barrier container 40 is in contact with the outer surface 30*b* of the container 30, the attenuation factor measurement step or the additional attenuation factor measurement step can be performed.

The first pulling region 35*m* may be disposed closer to the upper seal part 43*b* than the container 30, and the second pulling region 35*n* may be disposed closer to the lower seal part 43*a* than the container 30. In this case, the barrier container 40 can be brought into contact with the outer surface 30*b* of the container 30 at the first location 35*a* and the second location 35*b* by pulling the first pulling region 35*m* to a side where the upper seal part 43*b* is located with reference to the container 30 and pulling the second pulling region 35*n* to a side where the lower seal part 43*a* is located with reference to the container 30. Disposing the first pulling region 35*m* on a side where the upper seal part 43*b* is located with respect to the container 30 and disposing the second pulling region 35*n* on a side where the lower seal part 43*a* is located with respect to the container 30 include hanging the liquid-filled combination container 10L on a part of the barrier container 40 at a side where the upper seal part 43*b* is located with respect to the container 30 as a base point. By hanging the liquid-filled combination container 10L as described above, a region of the barrier container 40, which is a base point for hanging the liquid-filled combination container 10L and a region of the barrier container 40 in which the container 30 is placed are pulled away from each other by the action of gravitational force of the container 30 placed on the inner surface of the barrier container 40.

Fifteenth Modification

Figure 37:
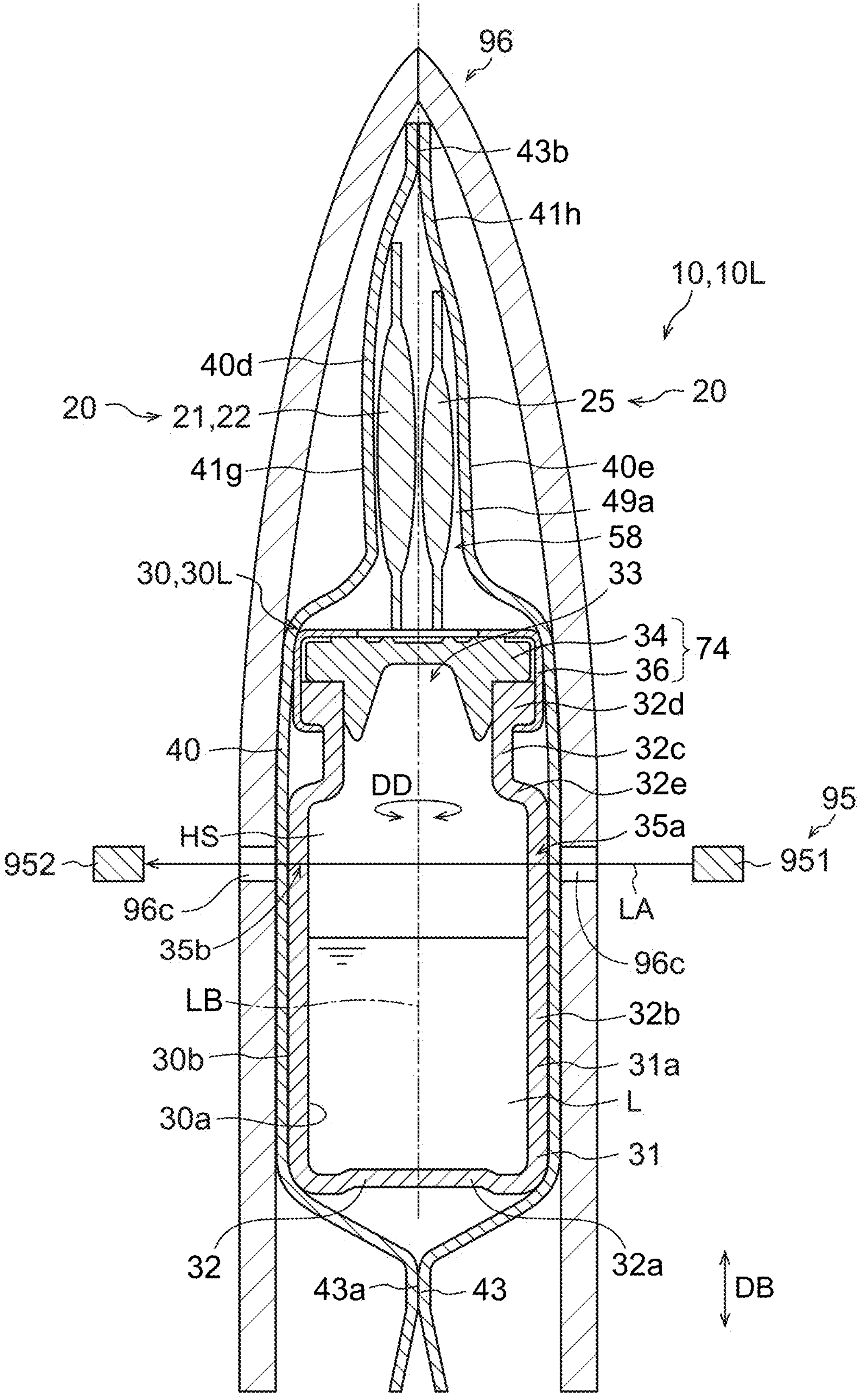
FIG. 37 is a view that shows an example of a contact step in an inspection method according to a fifteenth modification.

When the inspection method includes the contact step of bringing the barrier container 40 into contact with the outer surface 30*b* of the container 30 at the first location 35*a* and the second location 35*b*, the barrier container 40 may be brought into contact with the outer surface 30*b* of the container 30 at the first location 35*a* and the second location 35*b* with a pressing member 96 that presses the barrier container 40 from outside to be brought into contact with the outer surface 30*b* of the container 30 in the contact step. FIG. 37 is a view that shows an example of the contact step in an inspection method according to a fifteenth modification.

In the example shown in FIG. 37, the barrier container 40 is a bag including the first film 41*g*, the second film 41*h*, and the seal part 43 and accommodating the container 30. Then, the pressing member 96 includes a first part 96*a* that presses the first film 41*g* of the barrier container 40 from outside the barrier container 40 and a second part 96*b* that presses the second film 41*h* of the barrier container 40 from outside the barrier container 40. When the first film 41*g* is pressed by the first part 96*a* and the second film 41*h* is pressed by the second part 96*b*, the barrier container 40 contacts with the outer surface 30*b* of the container 30 at the first location 35*a* and the second location 35*b*.

In the example shown in FIG. 37, the pressing member 96 overlaps a region surrounding the first location 35*a* of the container 30 and a region surrounding the second location 35*b* of the container 30. In the example shown in FIG. 37, the pressing member 96 includes pressing member light transmitting portions 96*c*. In the example shown in FIG. 37, the pressing member light transmitting portions 96*c* overlap the container 30 at the first location 35*a* and the second location 35*b*. The mode of the pressing member light transmitting portions 96*c* is not limited as long as the pressing member light transmitting portions 96*c* pass light. In an example, the pressing member light transmitting portions 96*c* are made of a material having light transmission properties. The pressing member light transmitting portions 96*c* may be through-holes provided at the pressing member light transmitting portions 96*c*. Since the pressing member 96 includes the pressing member light transmitting portions 96*c*, in a state where the barrier container 40 is brought into contact with the outer surface 30*b* of the container 30 at the first location 35*a* and the second location 35*b* by the pressing member 96, laser light or LED light can be applied so as to penetrate through the container 30 at the first location 35*a* and the second location 35*b*.

The pressing member 96 may bring the barrier container 40 into contact with the outer surface 30*b* of the container 30 at the third location 35*c* and the fourth location 35*d*. In this case, the pressing member 96 may further includes pressing member light transmitting portions 96*c* that overlap the container 30 at the third location 35*c* and the fourth location 35*d*. In this case, in a state where the barrier container 40 is brought into contact with the outer surface 30*b* of the container 30 at the third location 35*c* and the fourth location 35*d* by the pressing member 96, laser light or LED light can be applied so as to penetrate through the container 30 at the third location 35*c* and the fourth location 35*d*.

The pressing member 96 may bring the barrier container 40 into contact with the outer surface 30*b* of the container 30 at the first location 35*a* and the second location 35*b* without overlapping the container 30 at the first location 35*a* and the second location 35*b*. In this case, in a state where the barrier container 40 is brought into contact with the outer surface 30*b* of the container 30 at the first location 35*a* and the second location 35*b* by the pressing member 96, laser light or LED light can be applied so as to penetrate through the container 30 at the first location 35*a* and the second location 35*b*. The pressing member 96 may bring the barrier container 40 into contact with the outer surface 30*b* of the container 30 at the third location 35*c* and the fourth location 35*d* without overlapping the container 30 at the third location 35*c* and the fourth location 35*d*. In this case, in a state where the barrier container 40 is brought into contact with the outer surface 30*b* of the container 30 at the third location 35*c* and the fourth location 35*d* by the pressing member 96, laser light or LED light can be applied so as to penetrate through the container 30 at the third location 35*c* and the fourth location 35*d*.

Sixteenth Modification

When the container 30 includes the neck portion 32*c*, the first location 35*a* and the second location 35*b* may be located at the neck portion 32*c*. The container 30 of the liquid-filled combination container 10L to which the inspection method according to a sixteenth modification is applied includes the container body 32 including the opening part 33 and the cap portion 74 including the stopper 34 that closes the opening part 33. The container body 32 includes the head portion 32*d* forming the opening part 33, the neck portion 32*c* coupled to the head portion 32*d*, the trunk portion 32*b* having a greater width than the neck portion 32*c* in a direction orthogonal to the axial direction DB in which the axis LB of the container 30 extends, and the shoulder portion 32*e* connecting the neck portion 32*c* with the trunk portion 32*b*. In an example, the inspection method according to the sixteenth modification can be applied to the liquid-filled combination container 10L shown in FIGS. 33 and 34.

In the inspection method according to the sixteenth modification, the first location 35*a* and the second location 35*b* are located at the neck portion 32*c*. In other words, the attenuation factor measurement step is performed while the first location 35*a* and the second location 35*b* are disposed at the neck portion 32*c*. In the inspection method according to the sixteenth modification, the third location 35*c* and the fourth location 35*d* may be located at the neck portion 32*c*. In other words, the attenuation factor measurement step may be performed while the third location 35*c* and the fourth location 35*d* are disposed at the neck portion 32*c*.

With the inspection method according to the sixteenth modification, since the first location 35*a* and the second location 35*b* are located at the neck portion 32*c*, laser light or LED light can be applied so as to penetrate through the container 30 at the first location 35*a* and the second location 35*b* without interference of the label 30*c* even when the label 30*c* is attached to the trunk portion 32*b*. Similarly, since the third location 35*c* and the fourth location 35*d* are located at the neck portion 32*c*, laser light or LED light can be applied so as to penetrate through the container 30 at the third location 35*c* and the fourth location 35*d* without interference of the label 30*c* even when the label 30*c* is attached to the trunk portion 32*b*.

Seventeenth Modification

An inspection method according to a seventeenth modification is an inspection method in which it is confirmed that movement of oxygen between the head space HS and the liquid L in the container 30 has reached an equilibrium state or in a state sufficiently close to the equilibrium state and then the oxygen dissolution amount of the liquid L contained in the container 30 is identified in accordance with the oxygen concentration in the container 30 (the oxygen concentration in the head space HS in the container 30) in an equilibrium state or in a state sufficiently close to the equilibrium state (the oxygen concentration in the head space HS in the container 30).

The inspection method according to the seventeenth modification includes an acquisition step and an identification step. The inspection method according to the seventeenth modification further includes a determination step.

In the acquisition step, at first time and second time later than the first time, the oxygen concentration in the container 30 is measured with any one of the inspection methods of measuring the oxygen concentration in the container 30 (the oxygen concentration in the head space HS in the container 30), described in the above-described embodiments and modifications. Thus, a first oxygen concentration that is the oxygen concentration in the container 30 at the first time and a second oxygen concentration that is the oxygen concentration in the container 30 at the second time are acquired.

In an example, a period of time longer than or equal to one minute and shorter than or equal to five minutes is taken between the first time and the second time. When the period of time taken is longer than or equal to one minute, a difference between the first oxygen concentration and the second oxygen concentration in a case where movement of oxygen between the head space HS and the liquid L in the container 30 is not in a state close to an equilibrium state increases. Thus, due to the difference between the first oxygen concentration and the second oxygen concentration, a state where movement of oxygen between the head space HS and the liquid L in the container 30 is not in a state close to an equilibrium state is easily detected. When the period of time taken is shorter than or equal to five minutes, a period of time used for inspection can be shortened.

The acquisition step may include a step of vibrating the container 30 at time between the first time and the second time. In this case, the container 30 may be vibrated by vibrating the whole of the liquid-filled combination container 10L or the container 30 may be vibrated inside the barrier container 40. With the step of vibrating the container 30, even when a period of time taken between the first time and the second time is not to a long period of time, a difference between the first oxygen concentration and the second oxygen concentration in a case where movement of oxygen between the head space HS and the liquid L in the container 30 is not in a state close to an equilibrium state increases. Thus, due to the difference between the first oxygen concentration and the second oxygen concentration, a state where movement of oxygen between the head space HS and the liquid L in the container 30 is not in a state close to an equilibrium state is easily detected.

When the oxygen concentration in the container 30 (the oxygen concentration in the head space HS in the container 30) of the liquid-filled combination container 10L is measured and the oxygen dissolution amount of the liquid L contained in the container 30 is identified in accordance with the measured oxygen concentration, the oxygen concentration in the container 30 at the first time does not need to be acquired in the acquisition step. In this case, in the acquisition step, a step of vibrating the container 30 and a step of acquiring the second oxygen concentration that is the oxygen concentration in the container 30 at the second time that is time after the step of vibrating the container 30 is performed may be performed. In this case, the determination step (described later) does not need to be performed, and, in the identification step (described later), the oxygen saturation solubility to the liquid L contained in the container 30 may be identified in accordance with the second oxygen concentration, and the oxygen dissolution amount of the liquid L may be identified in accordance with the identified oxygen saturation solubility. With this inspection method, when the step of vibrating the container 30 is performed between the second time at which the second oxygen concentration is acquired, the second oxygen concentration can be acquired in a state where the state of movement of oxygen between the head space HS and the liquid L in the container 30 is sufficiently made close to an equilibrium state. Thus, the measurement accuracy of the second oxygen concentration is improved, so the oxygen saturation solubility to the liquid L and the oxygen dissolution amount of the liquid L can be accurately identified.

The acquisition step may include a step of determining whether the oxygen concentration in the barrier container 40 is lower than or equal to a target value. In this case, the target value of the oxygen concentration in the barrier container 40 can be determined to the oxygen concentration in the head space HS in the container 30 when the oxygen dissolution amount of the liquid L in the container 30 reduces to a target value and movement of oxygen between the head space HS and the liquid L in the container 30 has reached an equilibrium state. The target value of the oxygen dissolution amount of the liquid L in the container 30 can be determined to a value at which decomposition due to oxygen in the liquid L is sufficiently suppressed according to the property of the liquid L contained in the container 30.

A method of determining whether the oxygen concentration in the barrier container 40 is lower than or equal to the target value is not limited. When the liquid-filled combination container 10L includes the oxygen sensing material 25, it may be determined whether the oxygen concentration in the barrier container 40 is lower than or equal to the target value from an oxygen status in the barrier container 40 sensed and indicated by the oxygen sensing material 25. As described in the third embodiment, the liquid-filled combination container 10L may have a characteristic capable of measuring the oxygen concentration in the barrier container 40. In such a case, as described in the third embodiment, it may be determined whether the oxygen concentration in the barrier container 40 is lower than or equal to the target value by measuring the oxygen concentration in the barrier container 40. When the oxygen concentration in the barrier container 40 is measured, the fluorescent material 27 may be provided in the barrier container 40 as shown in FIG. 24. In this case, the fluorescence time or the fluorescence intensity of the fluorescent material 27 may be measured by applying light for causing the fluorescent material 27 to emit fluorescence to the fluorescent material 27, and the oxygen concentration in the barrier container 40 may be measured in accordance with the measured fluorescence time or fluorescence intensity. Alternatively, as shown in FIG. 25, the attenuation factor of laser light or LED light may be measured by applying the laser light or the LED light such that the laser light or the LED light penetrates through the barrier container 40, and the oxygen concentration in the barrier container 40 may be measured in accordance with the measured attenuation factor.

The step of determining whether the oxygen concentration in the barrier container 40 is lower than or equal to the target value may be performed before the first time, may be performed between the first time and the second time, may be performed after the second time, or may be performed just at the first time or the second time.

In the determination step, it is determined whether a condition that the second oxygen concentration is higher than or equal to 100 times a measurement limit and higher than or equal to 0.99 times and lower than or equal to 1.01 times the first oxygen concentration, or the second oxygen concentration is higher than or equal to the measurement limit and lower than 100 times the measurement limit and higher than or equal to 0.9 times and lower than or equal to 1.1 times the first oxygen concentration, or the second oxygen concentration is lower than the measurement limit and the first oxygen concentration is lower than the measurement limit, is satisfied. When it is determined that the condition is satisfied, it is presumable that a change in the oxygen concentration in the head space HS in the container 30 in a period from the first time to the second time is small. For this reason, it may be determined that movement of oxygen between the head space HS and the liquid L in the container 30 has reached an equilibrium state or a state sufficiently close to the equilibrium state. A measurement limit is a measurement limit of a method of measuring the oxygen concentration, used to acquire the first oxygen concentration and the second oxygen concentration in the acquisition step. When the first oxygen concentration and the second oxygen concentration are acquired in the acquisition step of the inspection method according to the seventeenth modification, in a case where the oxygen concentration in the container 30 is measured with a method including the above-described attenuation factor measurement step, the value of the measurement limit is, for example, higher than or equal to 0.1% and lower than or equal to 25%. A case where the oxygen concentration in the container 30 is measured with a method including the above-described attenuation factor measurement step is, for example, a case where the attenuation factor of laser light or LED light is measured by applying the laser light or the LED light and the oxygen concentration in the container 30 is measured in accordance with the attenuation factor. When the first oxygen concentration and the second oxygen concentration are acquired in the acquisition step of the inspection method according to the seventeenth modification, in a case where the oxygen concentration in the container 30 is measured with a method including the above-described fluorescence measurement step, the value of the measurement limit is, for example, higher than or equal to 0.03% and lower than or equal to 100%. A case where the oxygen concentration in the container 30 is measured with a method including the above-described fluorescence measurement step is, for example, a case where an oxygen concentration in the container 30 is measured by measuring the fluorescence time or the fluorescence intensity of the fluorescent material 27 through application of light for causing the fluorescent material 27 to emit fluorescence to the fluorescent material 27.

The identification step is performed when the second oxygen concentration is higher than or equal to 100 times a measurement limit and higher than or equal to 0.99 times and lower than or equal to 1.01 times the first oxygen concentration, or the second oxygen concentration is higher than or equal to the measurement limit and lower than 100 times the measurement limit and higher than or equal to 0.9 times and lower than or equal to 1.1 times the first oxygen concentration, or the second oxygen concentration is lower than the measurement limit and the first oxygen concentration is lower than the measurement limit. In other words, the identification step is performed when it is determined, as a result of the determination step, that movement of oxygen between the head space HS and the liquid L in the container 30 has reached an equilibrium state or a state sufficiently close to the equilibrium state.

In the determination step, when it is determined that a condition that the second oxygen concentration is higher than or equal to 100 times a measurement limit and higher than or equal to 0.99 times and lower than or equal to 1.01 times the first oxygen concentration, or the second oxygen concentration is higher than or equal to the measurement limit and lower than 100 times the measurement limit and higher than or equal to 0.9 times and lower than or equal to 1.1 times the first oxygen concentration, or the second oxygen concentration is lower than the measurement limit and the first oxygen concentration is lower than the measurement limit, is not satisfied, the identification step may be performed after it is determined that the condition is satisfied by repeatedly performing the steps from the acquisition step to the determination step.

When the acquisition step includes the step of determining whether the oxygen concentration in the barrier container 40 is lower than or equal to the target value, the identification step may be performed when the second oxygen concentration is higher than or equal to 100 times a measurement limit and higher than or equal to 0.99 times and lower than or equal to 1.01 times the first oxygen concentration, or the second oxygen concentration is higher than or equal to the measurement limit and lower than 100 times the measurement limit and higher than or equal to 0.9 times and lower than or equal to 1.1 times the first oxygen concentration, or the second oxygen concentration is lower than the measurement limit, the first oxygen concentration is lower than the measurement limit, and the oxygen concentration in the barrier container 40 is lower than or equal to the target value.

In the identification step, the oxygen saturation solubility to the liquid L contained in the container 30 is identified in accordance with the second oxygen concentration, and the oxygen dissolution amount of the liquid L is identified in accordance with the identified oxygen saturation solubility. In the identification step, as a method of identifying the oxygen saturation solubility to the liquid L contained in the container 30 in accordance with the second oxygen concentration and identifying the oxygen dissolution amount of the liquid L in accordance with the identified oxygen saturation solubility, a method of identifying the oxygen saturation solubility to the liquid L contained in the container 30 in accordance with the oxygen concentration in the container 30 (the oxygen concentration in the head space HS in the container 30) and identifying the oxygen dissolution amount of the liquid L in accordance with the identified oxygen saturation solubility, described in the above-described embodiments and modifications, can be applied.

The advantageous effect of the inspection method according to the seventeenth modification will be described. When movement of oxygen between the head space HS and the liquid L in the container 30 has reached an equilibrium state or a state sufficiently close to the equilibrium state, the oxygen dissolution amount of the liquid L can be calculated in accordance with the oxygen concentration in the container 30 (the oxygen concentration in the head space HS in the container 30). However, in the liquid-filled combination container 10L, it is also presumable that movement of oxygen between the head space HS and the liquid L in the container 30 has not reached a state close to an equilibrium state. It is presumable that, for example, a rate of movement of oxygen in the liquid L to the head space HS is low and, therefore, movement of oxygen has not reached a state close to the equilibrium state. In this case, when the oxygen dissolution amount of the liquid L is calculated in accordance with the oxygen concentration in the head space HS in the container 30, the oxygen dissolution amount smaller than an actual value is calculated. It is also presumable that, because of degradation or the like of the barrier container 40, oxygen flows from outside the barrier container 40 to the head space HS in the container 30 through the inside of the barrier container 40. In this case, when the oxygen dissolution amount of the liquid L is calculated in accordance with the oxygen concentration in the head space HS in the container 30, the oxygen dissolution amount larger than an actual value is calculated.

Here, in the inspection method according to the seventeenth modification, the identification step is performed when a condition that the second oxygen concentration is higher than or equal to 100 times a measurement limit and higher than or equal to 0.99 times and lower than or equal to 1.01 times the first oxygen concentration, or the second oxygen concentration is higher than or equal to the measurement limit and lower than 100 times the measurement limit and higher than or equal to 0.9 times and lower than or equal to 1.1 times the first oxygen concentration, or the second oxygen concentration is lower than the measurement limit and the first oxygen concentration is lower than the measurement limit, is satisfied. For this reason, when movement of oxygen between the head space HS and the liquid L in the container 30 has reached an equilibrium state or a state sufficiently close to the equilibrium state, the identification step is performed, so the oxygen saturation solubility to the liquid L and the oxygen dissolution amount of the liquid L can be accurately identified.

Furthermore, the acquisition step includes the step of determining whether the oxygen concentration in the barrier container 40 is lower than or equal to the target value, and the identification step is performed when the oxygen concentration in the barrier container 40 is lower than or equal to the target value, the following advantageous effect is obtained. When the oxygen concentration in the barrier container 40 is lower than or equal to the target value, it is presumable that oxygen does not flow from outside the barrier container 40 into the head space HS in the container 30 through the inside of the barrier container 40. For this reason, it is confirmed that oxygen does not flow from outside the barrier container 40 into the head space HS in the container 30, and then the identification step can be performed. Thus, the oxygen saturation solubility to the liquid L and the oxygen dissolution amount of the liquid L can be accurately identified.

Eighteenth Modification

An inspection method according to an eighteenth modification is an inspection method of calculating a rate of reduction in the oxygen dissolution amount of the liquid L contained in the container 30, determining whether the rate of reduction is higher than or equal to a target value, and determining whether the oxygen concentration in the barrier container 40 is lower than or equal to a target value.

The inspection method according to the eighteenth modification includes a step of acquiring an oxygen concentration in the container 30 at first measurement time and an oxygen concentration in the container 30 at second measurement time later than the first measurement time, a step of identifying a first oxygen dissolution amount that is an oxygen dissolution amount of the liquid L at the first measurement time, a step of identifying a second oxygen dissolution amount that is an oxygen dissolution amount of the liquid L at the second measurement time, a step of calculating a rate of reduction in the oxygen dissolution amount of the liquid L in accordance with the first oxygen dissolution amount and the second oxygen dissolution amount and determining whether the rate of reduction is higher than or equal to a target value, and a step of determining whether an oxygen concentration in the barrier container 40 is lower than or equal to a target value.

in the inspection method according to the eighteenth modification, initially, the step of acquiring an oxygen concentration in the container 30 at first measurement time and an oxygen concentration in the container 30 at second measurement time later than the first measurement time is performed. In the step, the oxygen concentration in the container 30 is measured with any one of the inspection methods of measuring the oxygen concentration in the container 30 (the oxygen concentration in the head space HS in the container 30), described in the above-described embodiments and modifications. Thus, the oxygen concentration in the container 30 at the first measurement time and the oxygen concentration in the container 30 at the second measurement time are acquired. In an example, a period of time longer than or equal to one minute and shorter than or equal to five minutes is taken between the first measurement time and the second measurement time.

Subsequently, the step of identifying an oxygen saturation solubility to the liquid L contained in the container 30 at the first measurement time in accordance with the oxygen concentration in the container 30 at the first measurement time and identifying a first oxygen dissolution amount that is an oxygen dissolution amount of the liquid L at the first measurement time in accordance with the identified oxygen saturation solubility is performed. The step of identifying an oxygen saturation solubility to the liquid L contained in the container 30 at the second measurement time in accordance with the oxygen concentration in the container 30 at the second measurement time and identifying a second oxygen dissolution amount that is an oxygen dissolution amount of the liquid L at the second measurement time in accordance with the identified oxygen saturation solubility is performed. The step of identifying a first oxygen dissolution amount and the step of identifying a second oxygen dissolution amount can be performed by applying a method of identifying an oxygen saturation solubility to the liquid L contained in the container 30 in accordance with an oxygen concentration in the container 30 (an oxygen concentration in the head space HS in the container 30) and identifying an oxygen dissolution amount of the liquid L in accordance with the identified oxygen saturation solubility, described in the above-described embodiments and modifications.

Subsequently, the step of calculating a rate of reduction in the oxygen dissolution amount of the liquid L in accordance with the first oxygen dissolution amount and the second oxygen dissolution amount, and determining whether the rate of reduction is higher than or equal to a target value is performed. With the above-described steps, the first oxygen dissolution amount that is the oxygen dissolution amount of the liquid L at the first measurement time and the second oxygen dissolution amount that is the oxygen dissolution amount of the liquid L at the second measurement time later than the first measurement time are acquired. For this reason, a rate of reduction in the oxygen dissolution amount of the liquid L can be calculated from an elapsed time from the first measurement time to the second measurement time and the values of the first oxygen dissolution amount and the second oxygen dissolution amount.

A value of a rate of reduction expected that an oxygen dissolution amount of the liquid L decreases to a target value or lower after a lapse of a target period of time can be set for the target value of the rate of reduction. In this case, a period of time needed from when the liquid-filled combination container 10L is inspected to when the liquid-filled combination container 10L is shipped and delivered to a user's place can be set as a target period of time. The target value of the oxygen dissolution amount of the liquid L can be determined to a value at which decomposition due to oxygen in the liquid L is sufficiently suppressed according to the property of the liquid L contained in the container 30.

The step of determining whether the oxygen concentration in the barrier container 40 is lower than or equal to a target value is performed. The target value of the oxygen concentration in the barrier container 40 can be determined to the oxygen concentration in the head space HS in the container 30 when the oxygen dissolution amount of the liquid L in the container 30 reduces to a target value and movement of oxygen between the head space HS and the liquid L in the container 30 has reached an equilibrium state. The target value of the oxygen dissolution amount of the liquid L in the container 30 can be determined to a value at which decomposition due to oxygen in the liquid L is sufficiently suppressed according to the property of the liquid L contained in the container 30.

In the step, a method of determining whether the oxygen concentration in the barrier container 40 is lower than or equal to the target value is not limited. When the liquid-filled combination container 10L includes the oxygen sensing material 25, it may be determined whether the oxygen concentration in the barrier container 40 is lower than or equal to the target value from an oxygen status in the barrier container 40 sensed and indicated by the oxygen sensing material 25. As described in the third embodiment, the liquid-filled combination container 10L may have a characteristic capable of measuring the oxygen concentration in the barrier container 40. In such a case, as described in the third embodiment, it may be determined whether the oxygen concentration in the barrier container 40 is lower than or equal to the target value by measuring the oxygen concentration in the barrier container 40. When the oxygen concentration in the barrier container 40 is measured, the fluorescent material 27 may be provided in the barrier container 40 as shown in FIG. 24. In this case, the fluorescence time or the fluorescence intensity of the fluorescent material 27 may be measured by applying light for causing the fluorescent material 27 to emit fluorescence to the fluorescent material 27, and the oxygen concentration in the barrier container 40 may be measured in accordance with the measured fluorescence time or fluorescence intensity. Alternatively, as shown in FIG. 25, the attenuation factor of laser light or LED light may be measured by applying the laser light or the LED light such that the laser light or the LED light penetrates through the barrier container 40, and the oxygen concentration in the barrier container 40 may be measured in accordance with the measured attenuation factor.

The advantageous effect of the inspection method according to the eighteenth modification will be described. In the liquid-filled combination container 10L, the oxygen concentration inside the barrier container 40 decreases because of the oxygen absorber 21 accommodated inside the barrier container 40, accordingly, the oxygen concentration in the head space HS in the container 30 decreases, and, further accordingly, the oxygen dissolution amount of the liquid L in the container 30 decreases. Here, a long period of time may be taken until the oxygen dissolution amount of the liquid L in the container 30 decreases to a target value or below. In an example, a period of two months to three months may be taken from when the liquid-filled combination container 10L is manufactured until the oxygen dissolution amount of the liquid L in the container 30 decreases to a target value or below. If the liquid-filled combination container 10 L is shipped after it is confirmed that the oxygen dissolution amount of the liquid L in the container 30 decreases to a target value or below from when the liquid-filled combination container 10L is manufactured, a period from manufacturing to shipment relatively extends, so space for storing the liquid-filled combination container 10L until the oxygen dissolution amount of the liquid L in the container 30 decreases to a target value or below is needed.

In contrast, with the inspection method according to the eighteenth modification, by calculating the rate of reduction in the oxygen dissolution amount of the liquid L and determining whether the rate of reduction is higher than or equal to a target value, it can be determined whether to expect a decrease in the oxygen dissolution amount of the liquid L to the target value or below after a lapse of a target period of time. Thus, for example, it can be determined whether to expect a decrease in the oxygen dissolution amount of the liquid L to the target value or below before the liquid-filled combination container 10L is shipped and delivered to a user. For this reason, even before a decrease in the oxygen dissolution amount of the liquid L in the container 30 to a target value or below is confirmed, the liquid-filled combination container 10L can be shipped in a state where it is confirmed that the oxygen dissolution amount of the liquid L is expected to decrease to the target value or below before the liquid-filled combination container 10L is shipped and delivered to a user. Thus, it is possible to suppress extension of a period from manufacturing to shipment of the liquid-filled combination container 10L, and space for storing the liquid-filled combination container 10L for a long period of time is not needed.

With the inspection method according to the eighteenth modification, the step of determining whether the oxygen concentration in the barrier container 40 is lower than or equal to a target value is performed. The target value of the oxygen concentration in the barrier container 40 is determined to the oxygen concentration in the head space HS in the container 30 when the oxygen dissolution amount of the liquid L in the container 30 reduces to a target value and movement of oxygen between the head space HS and the liquid L in the container 30 has reached an equilibrium state. Thus, the following advantageous effect is obtained. In the liquid-filled combination container 10L, the oxygen concentration inside the barrier container 40 decreases because of the oxygen absorber 21 accommodated inside the barrier container 40, accordingly, the oxygen concentration in the head space HS in the container 30 decreases, and, further accordingly, the oxygen dissolution amount of the liquid L in the container 30 decreases. Here, even when the rate of reduction in the oxygen dissolution amount of the liquid L is higher than or equal to a target value, but when the oxygen concentration inside the barrier container 40 is high, there is a possibility that the oxygen dissolution amount of the liquid L in the container 30 does not reduce to a target value before a target period of time elapses. By determining whether the oxygen concentration in the barrier container 40 is lower than or equal to a target value with the step of determining whether the oxygen concentration in the barrier container 40 is lower than or equal to the target value, it can be confirmed that the oxygen concentration inside the barrier container 40 is sufficiently small to reduce the oxygen dissolution amount of the liquid L in the container 30 to the target value before a target period of time elapses.

Seventh Embodiment

Next, a seventh embodiment will be described. In the following description, like reference signs to the reference signs used for corresponding portions in the above-described embodiments and modifications are used for portions that can be similarly configured to those of the above-described embodiments and modifications, and the description thereof may not be repeated. When the operation and advantageous effects obtained in the above-described embodiments and modifications are also apparently obtained in the seventh embodiment, the description thereof may be omitted.

The seventh embodiment relates to an inspection method for the liquid-filled combination container 10L. The inspection method according to the seventh embodiment is an inspection method for the liquid-filled combination container 10L including the container 30 having oxygen permeability and containing the liquid L in the containing portion 31, the barrier container 40 having oxygen barrier properties and accommodating the container 30, at least one oxygen reactant 20 that can react with oxygen in the barrier container 40, and the fluorescent material 27 that varies in fluorescence time or fluorescence intensity according to a surrounding oxygen concentration. The fluorescent material 27 is provided on the inner surface 30*a* of the container 30 at the fluorescent material installation location 39 apart from the contact region 31*a* of the containing portion 31, which contacts with the liquid L. The container 30 has light transmission properties at least at the fluorescent material installation location 39. The barrier container 40 includes a light transmission location 40*b* where the barrier container 40 has light transmission properties. The inspection method according to the seventh embodiment can be widely applied to the above-described liquid-filled combination containers 10L. Hereinafter, a method of inspecting the liquid-filled combination container 10L according to the fifth embodiment will be described unless otherwise specified as an example of the inspection method according to the seventh embodiment.

The inspection method according to the seventh embodiment includes a disposing step, a fluorescence measurement step, and a measurement step. In the disposing step, the oxygen reactant 20 is disposed so as not to be located between the fluorescent material installation location 39 and the light transmission location 40*b*. In the fluorescence measurement step, the fluorescence time or the fluorescence intensity of the fluorescent material 27 is measured by applying light for causing the fluorescent material 27 to emit fluorescence to the fluorescent material 27 through the barrier container 40 at the light transmission location 40*b* and the container 30 at the fluorescent material installation location 39. In the measurement step, the oxygen concentration in the container 30 is measured in accordance with the fluorescence time or the fluorescence intensity of the fluorescent material 27, measured in the fluorescence measurement step.

In the disposing step, the oxygen reactant 20 is disposed so as not to be located between the fluorescent material installation location 39 and the light transmission location 40*b*. Disposing the oxygen reactant 20 such that the oxygen reactant 20 is not located between the fluorescent material installation location 39 and the light transmission location 40*b* in the disposing step includes confirming that the oxygen reactant 20 is not located between the fluorescent material installation location 39 and the light transmission location 40*b* from the beginning and maintaining the location of the oxygen reactant 20 with no change. In the liquid-filled combination container 10L according to the fifth embodiment, the oxygen reactant 20 is held in the holding space 58 to be disposed so as not to be located between the fluorescent material installation location 39 and the light transmission location 40*b*. In this case, in the disposing step, it is confirmed that the oxygen reactant 20 is held in the holding space 58 and, therefore, disposed so as not to be located between the fluorescent material installation location 39 and the light transmission location 40*b*, and the location of the oxygen reactant 20 is maintained with no change. When the liquid-filled combination container 10L with no holding space 58 is inspected, the disposition of the oxygen reactant 20 is changed in the disposing step so as not to be located between the fluorescent material installation location 39 and the light transmission location 40*b*.

In the fluorescence measurement step, the fluorescence time or the fluorescence intensity of the fluorescent material 27 is measured by applying light for causing the fluorescent material 27 to emit fluorescence to the fluorescent material 27 through the barrier container 40 at the light transmission location 40*b* and the container 30 at the fluorescent material installation location 39. The description on the fluorescence measurement step of the inspection method for the liquid-filled combination container 10L according to the first embodiment is also applied to the fluorescence measurement step of the inspection method according to the seventh embodiment unless there is a contradiction.

In the measurement step, the oxygen concentration in the container 30 is measured in accordance with the fluorescence time or the fluorescence intensity of the fluorescent material 27, measured in the fluorescence measurement step. The description on the measurement step of the inspection method for the liquid-filled combination container 10L according to the first embodiment is also applied to the attenuation factor measurement step of the inspection method according to the seventh embodiment unless there is a contradiction.

With the inspection method according to the seventh embodiment as well, the oxygen concentration in the container 30 of the liquid-filled combination container 10L can be measured.

The plurality of component elements described in the embodiments and the modifications may be combined as needed. Alternatively, some component elements may be deleted from all the component elements described in the embodiments and the modifications.

REFERENCE SIGNS LIST

10L liquid-filled combination container
10 combination container
20 oxygen reactant
21 oxygen absorber
22 oxygen absorber body
22*a* package
23 oxygen absorbing film
25 oxygen sensing material
27 fluorescent material
28 bonding layer
30L liquid-filled container
30 container
30*a* inner surface
30*b* outer surface
31 containing portion
31*a* contact region
32 container body
33 opening part
34 stopper
35*a* first location
35*b* second location
36 fixing tool
37 base layer
38 coating layer
39 fluorescent material installation location
40 barrier container
40*a* opening
40*b* light transmission location
41*a* first main film
41*b* second main film
41*c* first gusset film
41*d* second gusset film
42 container body
44 cap
49 barrier container space
55 outer container
56 light transmitting portion
58 holding space
59*a* first close contact region
59*b* second close contact region
60 syringe
62 cylinder
63 cylinder body
64 needle
66 piston
67 piston body
68 gasket
70 test container
71 partition wall
72 main wall
72A through-hole
73 barrier jointing material
74 cap portion
L liquid
80 detecting apparatus
81 illuminating portion
82 sensor portion
91 shrink film
921 first fixing member
922 second fixing member
95 measuring device
951 light source
952 measuring instrument

The invention claimed is:

1. An inspection method of inspecting an oxygen concentration in a container of a liquid-filled combination container, wherein the liquid-filled combination container comprises;

the container having oxygen permeability and containing liquid in a containing portion;

a barrier container having oxygen barrier properties and accommodating the container;

at least one oxygen reactant that can react with oxygen in the barrier container; and a fluorescent material that varies in fluorescence time or fluorescence intensity according to a surrounding oxygen concentration, wherein the fluorescent material is provided on an inner surface of the container at a fluorescent material installation location apart from a contact region of the containing portion, the contact region contacting with the liquid, the container has light transmission properties at least at the fluorescent material installation location, the barrier container includes a light transmission location where the barrier container has light transmission properties, the oxygen reactant is fixed to at least any one of an outer surface of the container and an inner surface of the barrier container and therefore light can be applied from outside the barrier container to the fluorescent material by allowing the light to penetrate through the barrier container at the light transmission location and the container at the fluorescent material installation location, and/or the oxygen reactant is disposed at a location not placed between the fluorescent material installation location and the light transmission location when accommodated in an oxygen reactant accommodating portion which is defined in part of the barrier container, the container includes a container body including an opening part and a stopper that closes the opening part, the stopper has oxygen permeability, the stopper includes a first face opposed to the container body and a second face located on an opposite side to the first face, and the stopper may be made of silicone rubber, the inspection method comprising:

an attenuation factor measurement step of measuring an attenuation factor of laser light or LED light with a wavelength to be attenuated according to an oxygen concentration in an optical path by applying the laser light or the LED light to the liquid-filled combination container such that the laser light or the LED light penetrates through the barrier container at the location where the barrier container has light transmission properties and the container at the first location and the second location; and a measurement step of measuring the oxygen concentration in the container in accordance with the attenuation factor measured in the attenuation factor measurement step.

2. The inspection method according to claim 1, wherein the oxygen reactant is fixed to at least any one of an outer surface of the container and an inner surface of the barrier container.

3. The inspection method according to claim 1, wherein;

the oxygen reactant is disposed at a location apart from a straight line connecting the first location with the second location when accommodated in an oxygen reactant accommodating portion which is defined in part of the barrier container, the oxygen reactant accommodating portion is a holding space formed between part of the outer surface of the container and part of the inner surface of the barrier container, the oxygen reactant is held in the holding space, and the holding space is not located between the fluorescent material installation location and the light transmission location.

4. A manufacturing method for a liquid-filled combination container comprising an inspection step of inspecting a liquid-filled combination container with the inspection method according to claim 2.

5. A manufacturing method for a liquid-filled combination container comprising an inspection step of inspecting a liquid-filled combination container with the inspection method according to claim 3.

6. An inspection method of inspecting an oxygen concentration in a barrier container of a liquid-filled combination container wherein;

the liquid-filled combination container comprises;

a container having oxygen permeability and containing liquid in a containing portion;

the barrier container having oxygen barrier properties and accommodating the container; and at least one oxygen reactant that can react with oxygen in the barrier container, wherein the oxygen reactant is fixed to at least any one of an outer surface of the container and an inner surface of the barrier container, the barrier container includes a barrier container first location and a barrier container second location, the oxygen reactant and the container are spaced apart from a straight line connecting the barrier container first location with the barrier container second location, the barrier container has light transmission properties at least at the barrier container first location and the barrier container second location, the container includes a container body including an opening part and a stopper that closes the opening part, the stopper has oxygen permeability, the stopper includes a first face opposed to the container body and a second face located on an opposite side to the first face, and the stopper may be made of silicone rubber, the inspection method comprising:

a barrier container attenuation factor measurement step of measuring an attenuation factor of laser light or LED light with a wavelength to be attenuated according to an oxygen concentration in an optical path by applying the laser light or the LED light to the liquid-filled combination container such that the laser light or the LED light penetrates through the barrier container at the barrier container first location and the barrier container second location; and a barrier container measurement step of measuring an oxygen concentration in the barrier container in accordance with the attenuation factor measured in the barrier container attenuation factor measurement step.

7. The inspection method according to claim 1, wherein the container includes a third location and a fourth location apart from the contact region of the containing portion, the contact region contacting with the liquid, the third location and the fourth location being different from the first location and the second location, the container has light transmission properties at least at the third location and the fourth location, the barrier container has light transmission properties at least at a location that intersects with a straight line connecting the third location with the fourth location, and the inspection method comprises;

an additional disposing step of disposing the oxygen reactant at a location spaced apart from the straight line connecting the third location with the fourth location;

an additional attenuation factor measurement step of measuring an attenuation factor of laser light or LED light with a wavelength to be attenuated according to an oxygen concentration in an optical path by applying the laser light or the LED light to the liquid-filled combination container such that the laser light or the LED light penetrates through the barrier container at the location where the barrier container has light transmission properties and the container at the third location and the fourth location;

an additional measurement step of measuring the oxygen concentration in the container in accordance with the attenuation factor measured in the additional attenuation factor measurement step; and an average value calculation step of calculating an average value of oxygen concentrations in the container from a plurality of measured oxygen concentrations at least including the oxygen concentration measured in the measurement step and the oxygen concentration measured in the additional measurement step.

8. The inspection method according to claim 7, wherein a length of a line segment located in the container in a straight line connecting the first location with the second location is equal to a length of a line segment located in the container in the straight line connecting the third location with the fourth location, and a total of a length of a line segment located in a space between the container and the barrier container in the straight line connecting the first location with the second location is equal to a total of a length of a line segment located in the space between the container and the barrier container in the straight line connecting the third location with the fourth location.

9. The inspection method according to claim 7, further comprising a contact step of bringing the barrier container into contact with an outer surface of the container, wherein in the contact step, the barrier container is brought into contact with the container in a first contact region continuous in a circumferential direction orbiting around an axis of the container and a second contact region continuous in the circumferential direction and opposed to the first contact region across the axis, and the first location and the third location are located in the first contact region, and the second location and the fourth location are located in the second contact region.

10. The inspection method according to claim 1, wherein the barrier container is a bag including a first film that forms a first face of the barrier container, a second film that forms a second face of the barrier container opposed to the first face, and a seal part that joins the first film with the second film at least at part of the first film and the second film, and accommodating the container between the first film and the second film, the inspection method further comprises a contact step of bringing the barrier container into contact with an outer surface of the container at the first location and the second location, and in the contact step, the barrier container is brought into contact with the outer surface of the container at the first location and the second location by pulling a first pulling region of the barrier container, which does not overlap the container in a plan view in a thickness direction of the first film, and a second pulling region on an opposite side to the first pulling region across the container in a plan view in the thickness direction of the first film, such that the first pulling region and the second pulling region separate from each other.

11. The inspection method according to claim 1, further comprising a contact step of bringing the barrier container into contact with an outer surface of the container at the first location and the second location, wherein in the contact step, the barrier container is brought into contact with the outer surface of the container at the first location and the second location by a pressing member pressing the barrier container from outside to bring the barrier container into contact with the outer surface of the container.

12. The inspection method according to claim 1, wherein the container includes a cap portion including the stopper that closes the opening part, the container body includes a head portion forming the opening part, a neck portion coupled to the head portion, a trunk portion having a greater width than the neck portion in a direction orthogonal to an axial direction in which an axis of the container extends, and a shoulder portion connecting the neck portion with the trunk portion, and the first location and the second location are located at the neck portion.

13. The inspection method according to claim 6, wherein the barrier container includes a barrier container third location and a barrier container fourth location being different from the barrier container first location and the barrier container second location, the barrier container has light transmission properties at least at the barrier container third location and the barrier container fourth location, the barrier container has light transmission properties at least at a location that intersects with the straight line connecting the barrier container third location with the barrier container fourth location, and the inspection method comprises;

an additional disposing step of disposing the oxygen reactant at a location spaced apart from the straight line connecting the barrier container third location with the barrier container fourth location;

a barrier container additional attenuation factor measurement step of measuring an attenuation factor of laser light or LED light with a wavelength to be attenuated according to an oxygen concentration in an optical path by applying the laser light or the LED light to the liquid-filled combination container such that the laser light or the LED light penetrates through the barrier container at the barrier container third location and the barrier container fourth location;

a barrier container additional measurement step of measuring the oxygen concentration in the barrier container in accordance with the attenuation factor measured in a barrier container additional attenuation factor measurement step; and a barrier container average value calculation step of calculating an average value of oxygen concentrations in the barrier container from a plurality of measured oxygen concentrations at least including the oxygen concentration measured in the barrier container measurement step and the oxygen concentration measured in the barrier container additional measurement step.

14. The inspection method according to claim 13, wherein a length of a line segment located in the barrier container in the straight line connecting the barrier container first location with the barrier container second location is equal to a length of a line segment located in the barrier container in the straight line connecting the barrier container third location with the barrier container fourth location.

15. The inspection method according to claim 6, wherein the barrier container includes a container body including an opening part and a cap inserted into the opening part, the container body includes a head portion forming the opening part, a neck portion coupled to the head portion, a trunk portion having a greater width than the neck portion in a direction orthogonal to an axial direction in which an axis of the barrier container extends, and a shoulder portion connecting the neck portion with the trunk portion, and the barrier container first location and the barrier container second location are located at the neck portion.

* * * * *